US006986108B2

(12) United States Patent
Savov et al.

(10) Patent No.: US 6,986,108 B2
(45) Date of Patent: Jan. 10, 2006

(54) SYSTEM FOR ACCESSING DIGITAL IMAGING DEVICES

(75) Inventors: Andrey I. Savov, Laguna Hills, CA (US); Michael Yeung, Mission Viejo, CA (US)

(73) Assignees: Toshiba Tec Kabushiki Kaisha, Shizuoka-Ken (JP); Toshiba Corporation, Shizuoka-Ken (JP)

( * ) Notice: Subject to any disclaimer, the term of this patent is extended or adjusted under 35 U.S.C. 154(b) by 551 days.

(21) Appl. No.: 10/103,268

(22) Filed: Mar. 21, 2002

(65) Prior Publication Data

US 2003/0229883 A1 Dec. 11, 2003

(51) Int. Cl.
*G06F 15/00* (2006.01)

(52) U.S. Cl. ............................ 715/838; 715/839
(58) Field of Classification Search ................. 715/762, 715/838, 839, 837, 737, 738, 764, 810
See application file for complete search history.

(56) References Cited

U.S. PATENT DOCUMENTS

| 5,465,364 A | 11/1995 | Lathrop et al. |
| 5,548,731 A | 8/1996 | Chang et al. |
| 5,630,168 A | 5/1997 | Rosebrugh et al. |
| 5,778,226 A | 7/1998 | Adams et al. |
| 5,892,905 A | 4/1999 | Brandt et al. |
| 5,987,256 A | 11/1999 | Wu et al. |
| 6,064,382 A | 5/2000 | Diedrich et al. |
| 6,074,432 A | 6/2000 | Guccione |
| 6,094,548 A | 7/2000 | Gunning et al. |
| 6,163,880 A | 12/2000 | Ramalingam et al. |
| 6,199,136 B1 | 3/2001 | Shteyn |
| 6,199,204 B1 | 3/2001 | Donohue |
| 6,202,147 B1 | 3/2001 | Slaughter et al. |
| 6,269,480 B1 | 7/2001 | Curtis |
| 6,272,673 B1 | 8/2001 | Dale et al. |
| 6,275,869 B1 | 8/2001 | Sieffert et al. |
| 6,279,030 B1 | 8/2001 | Britton et al. |
| 6,373,507 B1 * | 4/2002 | Camara et al. ............. 715/825 |
| 6,771,381 B1 * | 8/2004 | Klein ......................... 358/1.15 |
| 6,784,925 B1 * | 8/2004 | Tomat et al. .......... 348/207.11 |

* cited by examiner

*Primary Examiner*—Cao (Kevin) Nguyen
(74) *Attorney, Agent, or Firm*—Tucker Ellis & West LLP

(57) ABSTRACT

There is provided a system and architecture for accessing and communicating with digital image devices. The system is provided in the form of software components that are platform independent for the development of software for managing or controlling digital image devices. The software components are easily integrated with existing development tools, have native functionality, and can be implemented independently of Common Information Model or Simple Network Management Protocol architectures.

9 Claims, 26 Drawing Sheets

SYSTEM FOR ACCESSING DIGITAL IMAGING DEVICES

BACKGROUND OF THE INVENTION

This invention pertains generally to digital imaging devices and the communication therewith, and more particularly to devices and architecture for customizing and interfacing with digital imaging devices.

Digital imaging devices ("DID") are complex machines that require network administration attention. Such devices include simple printers and fax machines as well as multifunctional peripherals ("MFP"). In order to manage most DIDs on a network, administrators make use of either a Common Information Model ("CIM") or a Simple Networking Management Protocol ("SNMP"). Both architectures provide an almost universal and platform independent mechanism to access and interface with digital imaging devices. For each DID, the Original Equipment Manufacturer ("OEM") creates a description of device management information relating to CIM and SNMP networks. Such management information generally includes textual binary descriptors that describe the nature of the device, the management capabilities of the device, the names of the objects native to the device, the types of actions the device can perform, etc. Value-added resellers ("VAR"), OEMs, or vendors then utilize the device management information to access and control the DIDs and to create software for managing the DIDs.

Due to the nature of the essentially universal solutions provided by the use of CIM and SNMP, both CIM and SNMP are extraordinarily complex. Consequently, there are only a handful of software applications that support these standards, which although popular, are insufficient to address the needs of OEMs and VARs. Additionally, the costs associated with developing the necessary descriptors, testing, and integrating DIDs with device management software are significant. Furthermore, most software applications that work with CIM or SNMP to manage DIDs contain Graphical User Interfaces ("GUI") created by a VARs, OEMs, or vendors. The DID management GUIs are often not easily modifiable, and generally incorporate the software creator's corporate identification and style preferences.

In any given network, there are a number of DIDs. The DIDs may all be of the same brand or be from the same vendor, or they may represent a variety of different vendors, all of In any given network, there are a number of DIDs. The DIDs may all be of the same brand or be from the same vendor, or they may represent a variety of different vendors, all of which utilize different management software and different GUIs. Even multiple devices from the same vendor may utilize different management software. Therefore, in order for network administrators to control the DIDs throughout a network, they must either use a number of different software packages or create their own software package. Using multiple packages presents a number of obvious problems such as inefficiency and an inconsistent look and feel of the software throughout the network. Creating new software packages for controlling DIDs is problematic because of the complexity of the CIM and SNMP models. It would therefore be preferable if VARs, network administrators, and even end users were able to create their own DID management programs or integrate DID management capabilities into their existing programs and network management tools.

SUMMARY OF THE INVENTION

It is therefore an object of the present invention to provide an improved method of communicating with digital imaging devices. According to the present invention, there is provided a system for communicating with digital image devices comprising a language binding software component for receiving information from a software application and a plurality of digital image device software components comprising a plurality of packages and classes for receiving information from the language binding software component and selectively communicating with a digital imaging device in response to the information received from the language binding software component.

Also according to the present invention, there is provided an object model for a component based system for communicating with digital image devices, the object model comprising a first level primary package having a plurality of subpackages, each subpackage having a plurality of classes configured for specific communication with a digital imaging device. The primary package suitably comprises a subpackage having classes configured for communication relative to digital imaging device settings, a subpackage having classes configured for communication relative to the types of jobs the digital imaging device is to perform, a subpackage having classes configured for communication relative to the handling of images, and a subpackage having classes configured for communication relative to network information, protocols and settings.

DETAILED DESCRIPTION OF THE INVENTION

Figure 1:
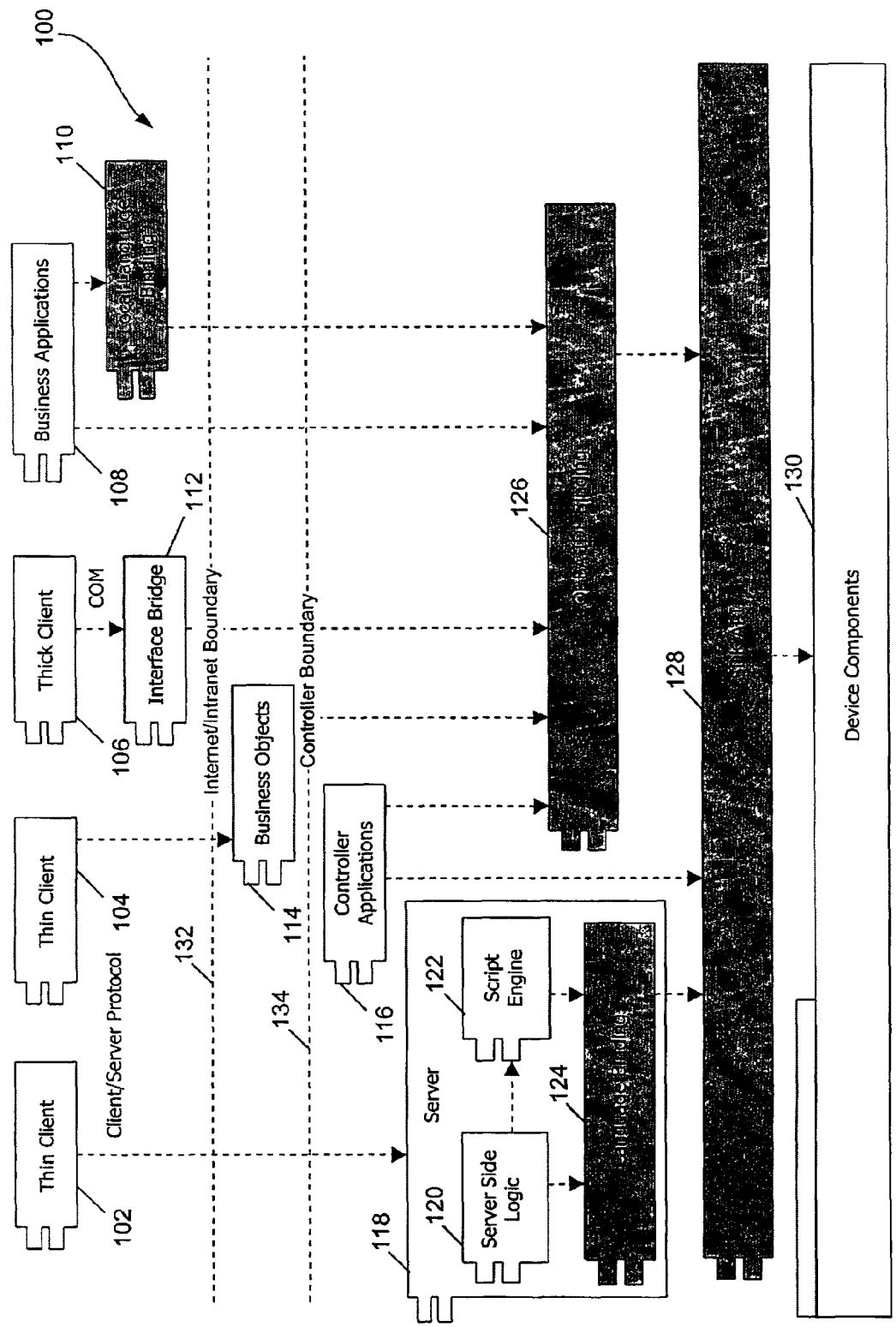
FIG. 1 is a representation of the present invention within a network system.

The present invention provides a solution for software developers desiring to create new DID management software or integrate DID management capability into existing software programs. The invention described herein presents a solution that has all the benefits of Object-Oriented ("OO") data representation, scalability and implementation-independence of CIM and SNMP while providing a simple organizational structure and familiar development environment. The invention provides, as part of one embodiment, a component-based development environment wherein Software Components ("SC") are utilized to manage DIDs.

A Software Component is any piece of pre-written code that defines interfaces that can be called to provide the functionality that the component encapsulates. SCs are typically packaged in "industry standard" ways so that they are callable from multiple languages, or from multiple environments. SCs are units of independent deployment that have no persistent state. As such, SCs provide seamless integration with existing development tools, such Forte for Java or Microsoft Visual Studio. The SCs are suitably used out-of-the-box, or extended and specialized by developers as desired. This simplicity and flexibility allows a developer to focus on the business logic of an application, rather than focusing on methods for communicating and managing DID objects. It should be noted that the SCs of the present invention are suitably designed for any language binding, such as Common Object Request Broker Architecture ("CORBA"), .NET, COM, DCOM, C++, ActiveX, etc.

In a presently preferred embodiment, invention utilizes the Java 2 platform, which is a freely distributed software development and runtime platform manufactured by Sun Microsystems, available for virtually any commercial Operating Systems ("OS"). This platform guarantees "write once, run anywhere" functionality, which detaches the implementation from the underlying OS environment. The invention employs Programming Language Bindings ("PLB"), which greatly contribute to seamless integration with a native Software Development Environment ("SDE"). Because of the PLB of the present invention, software developers are able to use Data Objects ("DO") directly within the developer's SDE while using a language of the developer's choice, as opposed to learning how to interact with yet another object management system and interface.

The present invention utilizes Java Beans ("JB"), which represent classes, properties, methods and events. It should be noted that while JB are a particular type of software component, any type of component is suitably used. The description of the Object Model ("OM") as described herein is specific to a JB implementation; however, the OM itself, classes, packages and their relationships are suitably implemented through any language bindings. Therefore, any changes to the OM necessitated due to changing language bindings are within the scope of the present invention. The following description provides details about package contents and class containment in Unified Modeling Language ("UML") notation.

Turning now to FIG. 1, a diagram depicting an embodiment of the present invention as it relates to a network system is provided. The gray components represent components of the present invention. According to FIG. 1, a network system 100 comprising server(s) and client(s) is shown. The network 100 is illustrative of a LAN or WAN environment in which the devices connected to the network 100 are in communication with or communicatively coupled to one another. The network itself is suitably comprised of physical and transport layers such as illustrated by a myriad of conventional data transport mechanisms such Ethernet, Token-Ring™, 802.11(b), or other wire-based or wireless data communication mechanisms as will be apparent to one of ordinary skill in the art.

The network suitably comprises at least one server, a representative one of which is illustrated by Server 118. The Server 118 suitably comprises a server side logic component 120, a script engine component 122 and a language binding component 124. The Server 118 is suitably any Server for accommodating selective query support, selective data access, data archiving, and like as will be appreciated to one of ordinary skill in the art. One or more Clients, such as representative Thin Clients 102 and 104, are in data communication with the Server 118. Thus, a data path between one or more Servers, such as that illustrated by Server 118, is in shared data communication with one or more Clients, such as Thin Clients 102 and 104. Thin Clients 102 and 104 are suitably simple client programs or hardware devices that rely on a server for the majority of their functionality.

Thin Clients 102 and 104 suitably communicate with Server 118 through a Client/Server Protocol. When the Server 118 is a web server, the communication protocol is suitably Hypertext Transfer Protocol ("HTTP"). The Thin Clients 102 and 104 and Server 118 are suitably on opposite sides of an Internet/Intranet Boundary 132. In addition, the Server 118 and Internet/Intranet Boundary 132 are suitably on opposite sides of a Controller Boundary 134. As such, the Server components suitably exist on a Controller. Thin Clients 102 and 104 also suitably communicate with Business Objects components 114, which are suitably located on the opposite side of the Internet/Intranet Boundary 132 and on the same side of a Controller Boundary 134 as Thin Clients 102 and 104. The Business Object components 114 then suitably communicate across a Controller Boundary 134 with a CORBA Interface Definition Language ("IDL") Binding component 126. The Language Binding component 124 then suitably communicates with a Software Developer Kit ("SDK") Application Programming Interface ("API") 128.

The Server 118 preferably comprises a Server Side Logic component 120, a Script Engine component 122, and a Language Binding component 124. The Server Side Logic component 120 suitably communicates with the Script Engine component 122 and with the Language Binding component 124. The Script Engine component suitably communicates with the Language Binding component 124. The Language Binding component 124 suitably communicates with a SDK API 128.

A Thick Client 106 suitably resides on the same side of the Internet/Intranet Boundary 132 as do the Thin Clients 102 and 104 and suitably communicates with an Interface Bridge component 112 also residing on the same side of the Internet/Intranet Boundary 132. The Thick Client 106 suitably employs a specific Object Model ("OM"), such as DCOM. The Interface Bridge 112 then accepts the DCOM information from the Thick Client 106 and communicates with a CORBA IDL Binding component 126 across both an Internet/Intranet Boundary 132 and a Controller Boundary 134.

Business Application components 108 also suitably reside on the same side of the Internet/Intranet Boundary 132 as do the Thin Clients 102 and 104 and suitably communicates in one instance directly with a CORBA IDL Binding component 126 across both an Internet/Intranet Boundary 132 and a Controller Boundary 134. In another instance, the Business Application components 108 suitably communicates with a Local Language Binding component 110 without crossing the Internet/Intranet Boundary 132. The Local Language Binding component 110 then communicates with a CORBA IDL Binding component 126 across both an Internet/Intranet Boundary 132 and a Controller Boundary 134.

Controller Application components also suitably communicate with a SDK API 128 directly and with CORBA IDL Binding component 126. The CORBA IDL Binding component 126 then communicates with the SDK API 128. The SDK API 128 then communicates with Device Components 130.

The OM structure of the present invention is represented as a set of SCs, otherwise referenced herein as JBs, distributed across a set of packages and classes. Within a main package are subpackages and classes. A package is suitably defined as a named general-purpose mechanism for organizing model elements, including, for instance, classes, use cases, diagrams, and/or other packages, into groups. A package is purely conceptual: it does not exist at run time. A class is suitably defined as a named description of a set of objects that share the same attributes, operations, relationships, and semantics. These objects suitably represent either real-world things or conceptual things.

Figure 2:
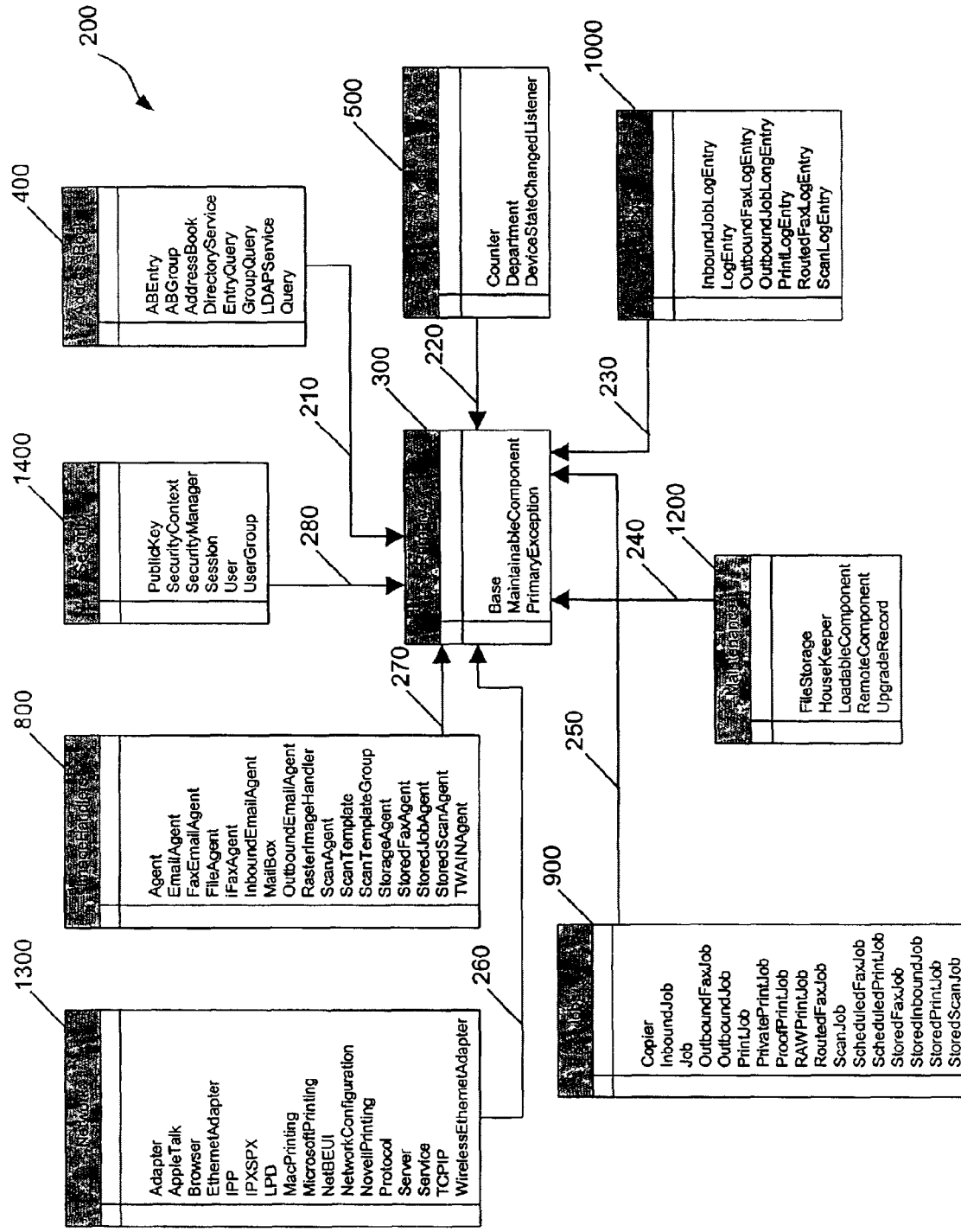
FIG. 2 is a diagram generally representing a primary component package of one embodiment of the present invention and its relation to various first level packages.

Turning now to FIG. 2, the general tree structure of the OM 200, including packages and classes is shown. The OM 200 of the present invention comprises Primary package 300 that comprises a number of packages. The AddressBook package 400 is suitably related to Primary package 300 through the Primary-AddressBook Relationship 210. The Devices package 500 is suitably related to Primary package 300 through the Primary-Devices Relationship 220. The Logs package 1000 is suitably related to Primary package 300 through the Primary-Logs Relationship 230. The Maintenance package 1200 is suitably related to Primary package 300 through the Primary-Maintenance Relationship 240. The Jobs package 900 is suitably related to Primary package 300 through the Primary-Jobs Relationship 250. The Network package 1300 is suitably related to Primary package 300 through the Primary-Network Relationship 260. The ImageHandlers package 800 is suitably related to Primary package 300 through the Primary-ImageHandlers Relationship 270 and the Security package 1400 is suitably related to Primary package 300 through the Primary-Security Relationship 280. The Primary package 300 suitably comprises the related packages. A list of the elements of Primary package 300 is shown in Table 1.

TABLE 1

Structure of Primary Package

| Element | Type |
|---|---|
| Base | Class |
| MaintainableComponent | Class |
| PrimaryException | Class |
| AddressBook | Package |
| ImageHandlers | Package |
| Logs | Package |
| Network | Package |
| Devices | Package |
| Jobs | Package |
| Maintenance | Package |
| Security | Package |

Figure 3:
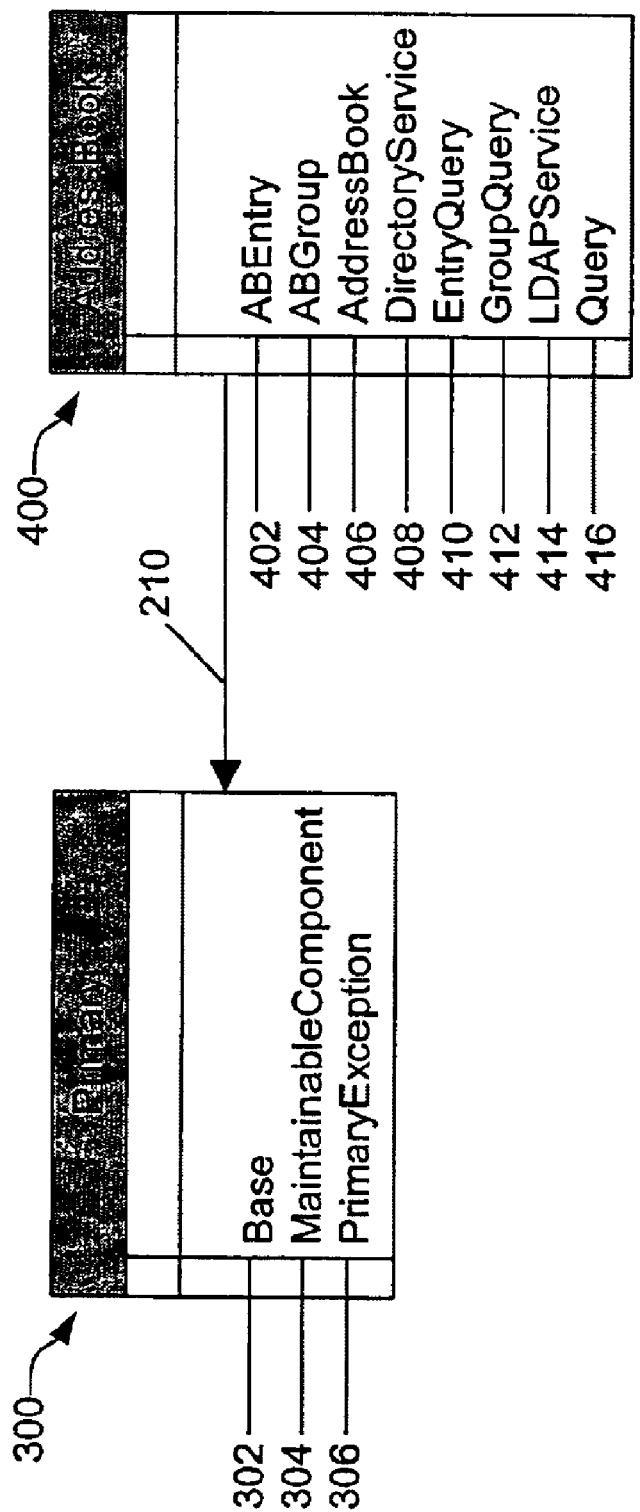
FIG. 3 is a diagram showing the details of one embodiment of an address book component package and its relation to the primary component package.

Turning now to FIG. 3, a diagram is provided showing the classes of Primary package 300 and AddressBook package 400. Primary package 300 comprises three classes: Base 302, MaintainableComponent 304, and PrimaryException 306. The Base class 302 is the base class for all SCs used in the packages subordinate to Primary package 300. Base class 302 is suitably a specialization of java.lang.Object and implements java.io.Serializable. The functionality of Base class 302 is detailed in Table 2.

TABLE 2

Base Class Functions and Descriptions

| Function | Description |
|---|---|
| public Base getRootObject( ) | Retrieves the root object, that is, the object that contains all other objects within its life scope. Generally, this is a subclass of LogicalDevice |

The MaintainableComponent class 304 is an abstraction for a component that is suitably maintained by the user. It is suitably a specialization of Base class 302. The functionality of the MaintainableComponent class 304 is detailed in Table 3.

TABLE 3

MaintainableComponent Class Functions and Descriptions

| Function | Description |
| --- | --- |
| public void Backup(String toURL) | Backs up this component given a target URL. Existing files on the target URL will be replaced<br>Throws: PrimaryException<br>Parameter doc:<br>Incremental - TRUE to perform incremental operation<br>fromURL - URL to restore from |
| public String getCategory( )<br>public String getDescription( )<br>public String getFiles( )<br>public Locale getLocale( )<br>public String getName( )<br>public int getSize( )<br>public String getVersion( ) | |
| public void Restore(String fromURL, boolean incremental) | Restore component from a URL<br>Parameter doc:<br>Incremental - TRUE to perform incremental operation<br>fromURL - URL to restore from |

The PrimaryException class 306 is the base class for all exceptions. It is suitably a specialization of java.lang.Exception. The functionality of PrimaryException class 306 is detailed in Table 4.

TABLE 4

PrimaryException Class Functions

| Function |
| --- |
| public int get ErrorCode( )<br>public String getErrorDesc( ) |

Turning now to FIG. 3, a diagram is provided showing the classes of Primary package 300 and structure of the AddressBook package 400. The AddressBook package 400 is related to Primary package 300 through the Primary-AddressBook Relationship 210. The AddressBook package 400 comprises a number of classes. Its structure is detailed in Table 5.

TABLE 5

Structure of AddressBook Package

| Element | Type |
| --- | --- |
| ABEntry | Class |
| ABGroup | Class |
| AddressBook | Class |
| DirectoryService | Class |
| EntryQuery | Class |
| GroupQuery | Class |
| LDAPService | Class |
| Query | Class |

The ABEntry class 402 suitably represents a single entry in an Address Book. It is suitably a specialization of Base class 302. The functionality of the ABEntry 402 class is detailed in Table 6.

TABLE 6

ABEntry Class Functions and Descriptions

| Function | Description |
| --- | --- |
| public void AddToAddressBook(ABGroup group)<br>public String getEmail( )<br>public String getFirst( )<br>public String getLast( ) | Add this entry to the address book possibly belonging to a group. |

The ABGroup 404 class suitably represents an Address Book group. It is suitably a specialization of Base class 302. The functionality of the ABGroup 404 class is detailed in Table 7.

TABLE 7

ABGroup Class Functions

| Function |
| --- |
| public String getComment( )<br>public ABEntry getEntries( )<br>public String getName( )<br>public ABGroup getSubGroups( ) |

The AddressBook class 406 suitably represents an address book, which is suitably a collection of entries, groups and directory services. The AddressBook class 406 is suitably a specialization of Base class 302. The functionality of the AddressBook class 406 is detailed in Table 8.

TABLE 8

AddressBook Class Functions and Descriptions

| Function | Description |
| --- | --- |
| public EntryQuery CreateEntryQuery(DirectoryService service, String last, String first, String email) | Query entries using specified directory service based on partial first, last and email.<br>Parameter doc:<br>first - partial first name<br>last - partial last name<br>email - partial email address |
| public GroupQuery CreateGroupQuery(DirectoryService service, | Create query for groups using specified directory service and partial group name. |

TABLE 8-continued

AddressBook Class Functions and Descriptions

| Function | Description |
| --- | --- |
| String grpName) | Parameter doc:<br>service - directory service to use; NULL to search address book itself<br>grpName - partial group name |
| public MaintainableComponent getData( ) | |
| public DirectoryService getDirServices( ) | |
| public ABGroup getPrimaryGroup( ) | |
| public MaintainableComponent getSettings( ) | |
| public void setData(MaintainableComponent data) | |
| public void setSettings(MaintainableComponent settings) | |

The DirectoryService class 408 is suitably an abstract representation of a name lookup service or directory service. It is suitably a specialization of Base class 302. The functionality of the DirectoryService class 408 is detailed in Table 9.

TABLE 9

DirectoryService Class Functions

| Function |
| --- |
| public String getName( ) |

The EntryQuery class 410 is suitably a representation of a query for address book entries. It is suitably a specialization of Query class 416. The functionality of the EntryQuery class 410 is detailed in Table 10.

TABLE 10

EntryQuery Class Functions and Descriptions

| Function | Description |
| --- | --- |
| public ABEntry GetNextPage( ) | Retrieve the next page of entries.<br>Throws: PrimaryException |

The GroupQuery 412 class is suitably a representation of a query for address book groups. It is suitably a specialization of Query class 416. The functionality of the GroupQuery class 412 is detailed in Table 11.

TABLE 11

GroupQuery Class Functions and Descriptions

| Function | Description |
| --- | --- |
| public ABGroup GetNextPage( ) | Retrieve the next page of groups.<br>Throws: PrimaryException |

The LDAPService class 414 is suitably a specialization of DirectoryService class 408 for the LDAP protocol. The functionality of the LDAPService class 414 is detailed in Table 12.

TABLE 12

LDAPService Class Functions

| Function |
| --- |
| public String getLDAPserver( ) |
| public int getMaxPageEntries( ) |
| public int getMaxReturnedEntries( ) |
| public String getPassword( ) |
| public int getPortNo( ) |
| public String getSearchBase( ) |
| public int getSearchTimeout( ) |
| public String getUser( ) |
| public boolean isSecure( ) |

The Query class 416 is suitably a representation of a query for address book groups or individual entries. It is suitably a specialization of Base class 302. The functionality of the Query class is detailed in Table 13.

TABLE 13

Query Class Functions and Descriptions

| Function | Description |
| --- | --- |
| public void Close( ) | Close query.<br>Throws: PrimaryException |
| public int getPageCount( ) | |
| public int getRecCount( ) | |
| public void Open( ) | Open or execute query.<br>Throws: PrimaryException |
| public void setPageCount(int pageCount) | |
| public void setRecCount(int recCount) | |

Figure 4:
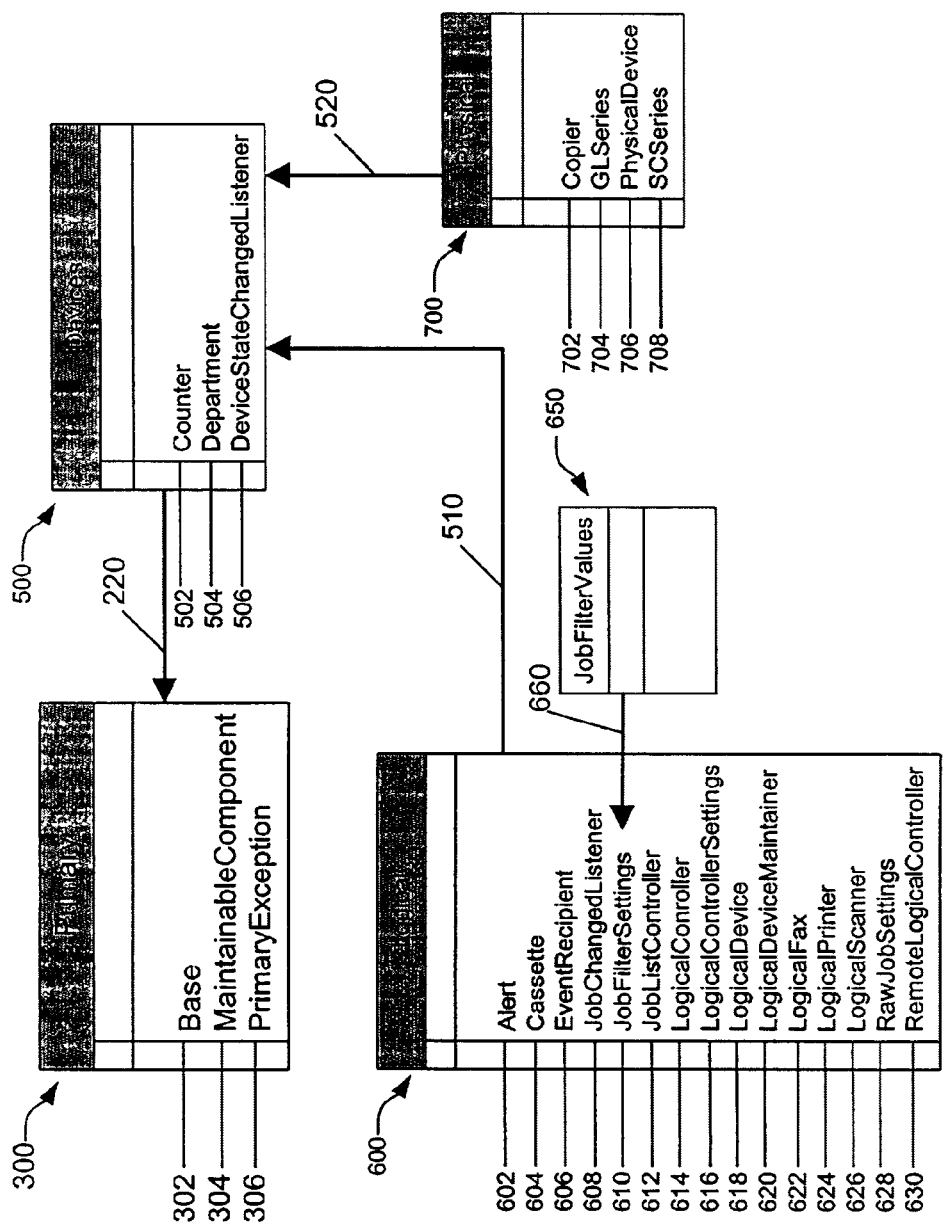
FIG. 4 is a diagram showing the details of one embodiment of a device handling component package and its relation to the primary component package.

Turning now to FIG. 4, a diagram is provided showing the classes of Primary package 300 and structure of the Devices package 500. The Devices package 500 is related to Primary package 300 through the Primary-Devices Relationship 220. The Devices package 500 comprises a number of classes and subpackages. Its structure is detailed in Table 14.

TABLE 14

Structure of Devices Package

| Element | Type |
| --- | --- |
| Counter | Class |
| Department | Class |

TABLE 14-continued

Structure of Devices Package

| Element | Type |
|---|---|
| DeviceStateChangedListener | Class |
| Logical | Package |
| Physical | Package |

The Counter class 502 is suitably a representation of a single job and page counter. It is suitably a specialization of Base class 302. The functionality of the Counter class 502 is detailed in Table 15.

TABLE 15

Counter Class Functions and Descriptions

| Function | Description |
|---|---|
| public int getJobs( ) | |
| public String getLastResetTime( ) | |
| public int getPages( ) | |
| public void Reset( ) | Resets the counts kept in that object. For example, if filtering by Department is active, the filtering operation will apply only to that department. Throws: PrimaryException |

The Department class 504 is suitably a representation of a department. It is an abstraction used to account for resource usage. Each department is suitably assigned a unique identification. In corporate environments, departments often correspond to business subdivisions. The Department class 504 is suitably a specialization of Base class 302. Its functionality is detailed in Table 16.

TABLE 16

Department Class Functions

| Function |
|---|
| public int getDeptCode( ) |
| public String getDeptName( ) |
| public Counter getTotal( ) |
| public boolean isMaster( ) |
| public void setDeptCode(int deptCode) |
| public void setDeptName(String deptName) |

The DeviceStateChangedListener class 506 is suitably the base class for "device changed state" events. It is suitably a specialization of Base class 302 and suitably implements java.util.EventListener. The functionality of the DeviceStateChangedListener class 506 is detailed in Table 17.

TABLE 17

DeviceStateChangedListener Class Functions and Descriptions

| Function | Description |
|---|---|
| public void LogicalDeviceStateChanged(LogicalDevice device) | Called when logical device changed state. |
| public void PhysicalDeviceStateChanged(PhysicalDevice device) | |

The Logical subpackage 600 is related to Devices package 500 through the Devices-Logical Relationship 510. The Logical subpackage 600 comprises a number of classes. Its structure is detailed in Table 18.

TABLE 18

Structure of Logical Subpackage

| Element | Type |
|---|---|
| Alert | Class |
| Cassette | Class |
| EventRecipient | Class |
| JobChangedListener | Class |
| JobFilterSettings | Class |
| JobListChangedListener | Class |
| LogicalController | Class |
| LogicalControllerSettings | Class |
| LogicalDevice | Class |
| LogicalDeviceMaintainer | Class |
| LogicalFax | Class |
| LogicalPrinter | Class |
| LogicalScanner | Class |
| RawJobSettings | Class |
| RemoteLogicalController | Class |

The Alert class 602 is suitably a generic device alert. Alerts suitably originate from logical devices and Alert objects are preferably read-only. The Alert class 602 is suitably a specialization of Base class 302. Its functionality is detailed in Table 19.

TABLE 19

Alert Class Functions and Descriptions

| Function | Description |
|---|---|
| public String getDescription( ) | Retrieves the description of the alert |

The Cassette class 604 suitably represents a single paper cassette of a DID. The Cassette class 604 is suitably a specialization of Base class 302. Its functionality is detailed in Table 20.

TABLE 20

Cassette Class Functions and Descriptions

| Function | Description |
|---|---|
| public int getCapacity( ) | Retrieves capacity of the cassette. |
| public String getName( ) | Retrieves the unique name of the cassette. |
| public String getPaperSize( ) | Retrieves paper size currently loaded in the cassette. |
| public String getPaperType( ) | Retrieves the paper type (logo, hole-punched, etc.) of the casette |
| public String getStatus( ) | Retrieves the status of the cassette. |
| public void setPaperType(String paperType) | |

The EventRecipient class 606 suitably represents a single event recipient. The EventRecipient class 606 is suitably a specialization of Base class 302. Its functionality is detailed in Table 21.

TABLE 21

EventRecipient Class Functions and Descriptions

| Function | Description |
| --- | --- |
| public String getEmail( ) | Retrieve the email address of the recipient. |
| public String getEventNames( ) | |
| public void setEmail(String email) | |
| public void setEventNames(String eventNames) | |

The JobChangedListener class 608 is suitably an abstract base class for job change events listeners. The JobChangedListener class 608 is suitably a specialization of Base class 302 and suitably implements java.util.EventsListener. Its functionality is detailed in Table 22.

TABLE 22

JobChangedListener Class Functions and Descriptions

| Function | Description |
| --- | --- |
| public void JobChanged(Job job) | Called when a job has changed. The argument identifies the particular job that has changed. |

The JobFilterSettings class 610 is suitably a representation of settings for a job or a log filter. The JobFilterSettings class 610 is suitably a specialization of Base class 302. Objects of this class are suitably used to specify how jobs and logs are filtered and sorted prior to their retrieval. Preferably, the JobFilterSettings class 610 comprises a JobFilterValues innerclass 650 for representing objects that contain filter values for fields in a job or job log.

The JobFilterValues innerclass 650 is related to Devices package 500 through the JobFilterSettings-JobFilterValues Relationship 660. Sort numbers and order numbers are suitably represented by the JobFilterValues innerclass 650. Sort numbers are preferably assigned as positive integers when indicating ascending and negative integers when indicating descending sorts. The absolute values of the sort numbers represent the relative sort order of different fields. Order numbers are also suitably assigned so that a determination can be made whether a particular field value should be retrieved and, if the order is important, the order in which the fields will be returned. The functionality of the JobFilterSettings class 610 and the JobFilterValues innerclass 650 are detailed in Table 23 and Table 24, respectively.

TABLE 23

JobFilterSettings Class Functions

| Function |
| --- |
| public int getProperty( ) |
| public String getTypes( ) |
| public boolean isIncludeInvalid( ) |
| public boolean isInvalidOnly( ) |
| public String getTypes( ) |
| public boolean isIncludeInvalid( ) |
| public boolean isInvalidOnly( ) |
| public int getDocument( ) |
| public int getId( ) |
| public int getOwner( ) |
| public int getPages( ) |
| public int getSize( ) |
| public int getStatus( ) |
| public int getTime( ) |

TABLE 23-continued

JobFilterSettings Class Functions

| Function |
| --- |
| public int getType( ) |
| public void setDocument(int document) |
| public void setId(int id) |
| public void setOwner(int owner) |
| public void setPages(int pages) |
| public void setSize(int size) |
| public void setStatus(int status) |
| public void setTime(int time) |
| public void setType(int type) |
| public void setIncludeInvalid(boolean includeInvalid) |
| public void setInvalidOnly(boolean invalidOnly) |
| public void setProperty(int property) |
| public void setTypes(String types) |

TABLE 24

JobFilterValues Class Functions

| Function |
| --- |
| public JobFilterSettings.JobFilterValues getOrder( ) |
| public JobFilterSettings.JobFilterValues getSort( ) |

The JobListChangedListener class 612 is suitably a base class for job list change events. The JobListChangedListener class 612 is suitably a specialization of Base class 302 and suitably implements java.util.EventsListener. Its functionality is detailed in Table 25.

TABLE 25

JobListChangedListener Class Functions and Descriptions

| Function | Description |
| --- | --- |
| public void JobListChanged(String jobType) | Called when the job list has changed. The argument contains the type of job list that has changed. |

The LogicalController class 614 is suitably a representation of a logical device controller, preferably a logical device that controls other logical devices, such as a logical printer or logical scanner. The LogicalController class 614 is suitably a specialization of LogicalDevice class 618. Its functionality is detailed in Table 26.

TABLE 26

LogicalController Class Functions and Descriptions

| Function | Description |
| --- | --- |
| public synchronized void addJobChangedListener(JobChanged Listener listener) | |
| public synchronized void addJobListChangedListener(JobListChangedListener listener) | |
| public static LogicalController BindToThisController( ) | Binds to the LogicalController object to which the server is associated.<br>Return doc: The logical controller |
| public AddressBook getAddressBook( )<br>public Agent getAgents( )<br>public Alert getAlerts( )<br>public LogicalFax getFax( )<br>public Job getJobs( )<br>public HouseKeeper getKeeper( )<br>public LogEntry getLogs( )<br>public LogicalDeviceMaintainer getMaintainer( )<br>public MessageEntry getMessages( )<br>public NetworkConfiguration getNetConfig( )<br>public LogicalPrinter getPrinter( )<br>public LogicalScanner getScanner( )<br>public SecurityManager getSecurityManager( )<br>public LogicalControllerSettings getSettings( ) | |
| public boolean IsOnline( ) | Returns the "online" state of the controller.<br>Return doc:<br>Current state of the controller. |
| public RemoteLogicalController LocateDevices(int[ ] IPfrom, int[ ] IPto, String controllerTypes, String protocols) | Locate devices from a range of IP addresses, controller and network protocol types.<br>Parameter doc:<br>IPfrom - the beginning IP address<br>IPto - the ending IP address controller<br>Types - type names for the controllers to be located<br>protocols - network protocol names to be used for location<br>Return doc:<br>Array of RemoteLogicalController objects -- one for each distinct device found |
| public RemoteLogicalController LocateDevices(String controllerTypes, String protocols, int[ ] subnet) | Locates devices on a particular subnet by specifying controller and network protocol types.<br>Return doc:<br>Array of RemoteLogicalController objects -- one for each distinct device found.<br>Parameter doc:<br>controllerTypes - array of strings containing the type names of the controllers to be located.<br>protocols - array of network protocol names to be used for location<br>subnet - array of integers indicating the subnet to be used for location; if null controller's subnet is used |
| public synchronized void removeJobChangedListener(JobChangedListener listener) | |
| public synchronized void removeJobListChangedListener(JobListChangedListener listener) | |
| public void Restart(boolean bSoft) | Restarts the controller.<br>Parameter doc:<br>bSoft - TRUE to perform software restart; FALSE to reboot completely. |
| public void setNetConfig(NetworkConfiguration netConfig) | |
| public boolean SetOnline(boolean newState) | Sets the controller's online state.<br>Return doc:<br>The previous "online" state. |
| public void ShutDown( ) | Shuts down the controller. |

The LogicalControllerSettings class 616 is suitably a representation of the settings of a logical controller. Preferably, the controller has a set of constants that change only when the controller software is upgraded. The LogicalControllerSettings class 616 is suitably a specialization of Base class 302. Its functionality is detailed in Table 27.

TABLE 27

LogicalControllerSettings Class Functions and Descriptions

| Function | Description |
|---|---|
| public String getBIOSdate( ) | |
| public String getBIOSid( ) | |
| public String getContactName( ) | |
| public String getContactPhone( ) | |
| public String getControllerType( ) | |
| public String getCPUType( ) | |
| public String getDriverVersion( ) | |
| public Date getJavaDate( ) | |
| public Locale getLocale( ) | |
| public String getMessage( ) | |
| public String getName( ) | |
| public String getOSVersion( ) | |
| public String getSoftwareVersion( ) | |
| public String getStatus( ) | |
| public String GetTaggedValue(String name) | Retrieves a tagged value by name. Throws: PrimaryException Return doc: tagged value Parameter doc: name -- name of the value to get |
| public String getTime( ) | |
| public int getUTCOffset( ) | |
| public boolean isDeptCodeEnabled( ) | |
| public boolean isDeptCodeEnforcement( ) | |
| public void setContactName(String contactName) | |
| public void setContactPhone(String contactPhone) | |
| public void setDeptCodeEnforcement(boolean deptCodeEnforcement) | |
| public void setJavaDate(Date javaDate) | |
| public void setLocale(Locale locale) | |
| public void setMessage(String message) | |
| public void SetTaggedValue(String name, String val) | Sets the tagged value. Throws: PrimaryException Parameter doc: name -- name of the value to set val -- value to set |
| public void setTime(String time) | |
| public void setUTCOffset(int UTCOffset) | |

The LogicalDevice 618 class is suitably an abstract class representation a logical device. Logical devices are components of physical devices, which are actual devices that have physical form, i.e. those devices which one can walk up to and use. Each physical device preferably contains at least one logical device, while MFPs contain more than one logical device. The LogicalDevice class 618 is suitably a specialization of Base class 302. Its functionality is detailed in Table 28.

TABLE 28

LogicalDevice Class Functions and Descriptions

| Function | Description |
|---|---|
| public void AddDepartment(int deptCode, String deptName) | Adds a new department to the list. Parameter doc: deptCode - the new department's code deptName - new department's name |
| public synchronized void addDeviceStateChangedListener(DeviceStateChangedListener listener) | |
| public void AddEventRecipient(EventRecipient newRecipient) | Adds an event recipient to the current list of recipients. Parameter doc: newRecipient - the new event recipient. |
| public void DeleteDepartment(int deptCode) | Deletes existing department from the list. Throws: PrimaryException Parameter doc: deptCode - the new department's code |
| public static String getAllEventNames( ) | Static method to retrieve all the possible event names. Return doc: Event names list (localized) |
| public Department getCountFilter( ) | |
| public Department getDepartments( ) | |
| public PhysicalDevice getDevice( ) | |
| public EventRecipient getEventRecipients( ) | |
| public String getFirmwareVersion( ) | |
| public JobFilterSettings getJobFilter( ) | |
| public JobFilterSettings | |

TABLE 28-continued

LogicalDevice Class Functions and Descriptions

| Function | Description |
| --- | --- |
| getLogFilter( )<br>public Counter getTotal( )<br>public synchronized void<br>removeDeviceStateChangedListener(DeviceStateChangedListener listener) | |
| public void<br>RemoveEventRecipient(EventRecipient recipient) | Removes an event recipient from the current list of recipients.<br>Parameter doc:<br>recipient - the existing event recipient. |
| public void<br>setCountFilter(Department countFilter)<br>public void<br>setjobFilter(JobFilterSettings jobFilter)<br>public void<br>setLogFilter(JobFilterSettings logFilter) | |

The LogicalDeviceMaintainer class 620 is closely related to LogicalController class 614. It suitably encapsulates the behavior and semantics associated with the maintenance of the LogicalController class 614. The LogicalDeviceMaintainer class 620 is suitably a specialization of Base class 302. Its functionality is detailed in Table 29.

TABLE 29

LogicalDeviceMaintainer Class Functions and Descriptions

| Function | Description |
| --- | --- |
| public void ClearJobLog(String timeEarliest) | Clears job log.<br>Parameter doc:<br>timeEarliest - earliest time to be left any entries earlier than that time will be cleared<br>NULL - all |
| public void ClearMessageLog(String timeEarliest) | Clears message log.<br>Parameter doc:<br>timeEarliest - earliest time to be left in; any entries earlier than that time will be cleared<br>NULL - all |
| public void ExportCounters(String format, String exportURL) | Export the counter information. If filtering Department is active, that will export information only for that department.<br>Parameter doc:<br>format - format name: "CSV" or "TSV"<br>exportURL - URL to store the exported file |
| public void ExportJobLog(String jobTypes, String jobStatuses, String timeFrom, String timeTo, String format, String exportURL) | Export job log into a specific format file on the network.<br>Throws: PrimaryException<br>Parameter doc:<br>jobTypes - names of thejob types to export; NULL - all<br>jobStatuses - job statuses for log entries to be exported; NULL - all<br>timeTo - end time for job log entries<br>timeFrom - start time for job log entries<br>format - format name: "CSV" or "TSV"<br>exportURL - URL to store the export file |
| public void ExportMessageLog(String jobTypes, String timeFrom, String timeTo, String format, String exportURL) | Exports message log into a particular format network file.<br>Throws: PrimaryException<br>Parameter doc:<br>jobTypes - names of thejob types to export; NULL - all<br>timeFrom - start time for job log entries<br>timeTo - end time for job log entries<br>format - format name: "CSV" or "TSV"<br>exportURL - network path to store the export file |

The LogicalFax class 622 is designed to represent a fax machine device. The LogicalFax class 622 is suitably a specialization of LogicalDevice class 618. Its functionality is detailed in Table 30.

TABLE 30

LogicalFax Class Functions

Function public String getCSID( )
public Counter getInCounter( )
public RoutedFaxJob[] getInJobs( )
public RoutedFaxLogEntry getInLogs( )
public LogicalDeviceMaintainer getInMaintainer( )
public RoutedFaxMessageEntry getInMessages( )
public MailBox getMailboxes( )
public int getNumRetries( )
public Counter getOutCounter( )
public OutboundFaxJob getOutJobs( )
public OutboundFaxLogEntry getOutLogs( )
public LogicalDeviceMaintainer getOutMaintainer( )
public FaxMessageEntry getOutMessages( )
public int getRetryTimeOut( )
public String getTSID( )

The LogicalPrinter class 624 is designed to represent a printer or printing device. The LogicalPrinter class 624 is suitably a specialization of LogicalDevice class 618. Its functionality is detailed in Table 31.

TABLE 31

LogicalPrinter Class Functions and Descriptions

| Function | Description |
|---|---|
| public int getAutoContinueTimeOut( ) | |
| public Cassette getCassettes( ) | |
| public int getDaysToKeepPrJobs( ) | |
| public String getIFaxTray( ) | |
| public PrintJob getJobs( ) | |
| public PrintLogEntry getLogs( ) | |
| public LogicalDeviceMaintainer getMaintainer( ) | |
| public PrintMessageEntry getMessages( ) | |
| public int getPCLFontNum( ) | |
| public float getPCLFontPitch( ) | |
| public int getPCLFontSize( ) | |
| public String getPunchUnitType( ) | |
| public RawJobSettings getRawJobSettings( ) | |
| public String getSorterPriority( ) | |
| public String getStaplerType( ) | |
| public String getStitchType( ) | |
| public boolean isAutoContinueOn( ) | |
| public boolean isIFaxDuplex( ) | |
| public boolean isPrintStartupPage( ) | |
| public void PrintDeviceConfig( ) | Prints logical device configuration sheet. |
| public void PrintPCLFonts( ) | Prints PCL fonts available on the logical device. |
| public void PrintPSFonts( ) | Prints PostScript fonts available on the logical device. |
| public void setAutoContinueOn(boolean autoContinueOn) | |
| public void setAutoContinueTimeOut(int autoContinueTimeOut) | |
| public void setDaysToKeepPrJobs(int daysToKeepPrJobs) | |
| public void setIFaxDuplex(boolean IFaxDuplex) | |
| public void setIFaxTray(String IFaxTray) | |
| public void setPCLFontNum(int PCLFontNum) | |
| public void setPCLFontPitch(float PCLFontPitch) | |
| public void setPCLFontSize(int PCLFontSize) | |

TABLE 31-continued

LogicalPrinter Class Functions and Descriptions

| Function | Description |
|---|---|
| public void setPrintStartupPage(boolean printStartupPage) | |
| public void setSorterPriority(String sorterPriority) | |

The LogicalScanner class 626 is designed to represent a scanner. The LogicalScanner class 626 is suitably a specialization of the LogicalDevice class 618. Its functionality is detailed in Table 32.

TABLE 32

LogicalScanner Class Functions

Function public ScanJob getJobs( )
public ScanLogEntry getLogs( )
public LogicalDeviceMaintainer getMaintainer( )
public ScanMessageEntry getMessages( )
public ScanTemplateGroup getScanTemplateGroups( )

The RawJobSettings class 628 is an abstraction of the configuration parameters for RAW jobs, which are PDL-based jobs with no PJL commands. The RawJobSettings class 628 is suitably a specialization of the Base class 302. Its functionality is detailed in Table 33.

TABLE 33

RawJobSettings Class Functions

Function public String getRawDfltOrient( )
public String getRawDfltPaperSize( )
public String getRawDfltPaperType( )
public String getRawDfltTray( )
public boolean isRawDfltStaplingOn( )
public boolean isRawDuplexPrint( )
public void setRawDfltOrient(String rawDfltOrient)
public void setRawDfltPaperSize(String rawDfltPaperSize)
public void setRawDfltPaperType(String rawDfltPaperType)
public void setRawDfltStaplingOn(boolean rawDfltStaplingOn)
public void setRawDfltTray(String rawDfltTray)
public void setRawDuplexPrint(boolean rawDuplexPrint)

The RemoteLogicalController class 630 is an abstraction of a remote logical controller. This class is useful when locating controllers other than the controller currently being utilized. The RemoteLogicalController class 630 is suitably a specialization of the Base class 302. Its functionality is detailed in Table 34.

TABLE 34

RemoteLogicalController Class Functions

Function public int[] getIP( )
public int[] getIPX( )
public String getNSname( )
public String getType( )

The Physical subpackage 700 is related to Devices package 500 through the Devices-Physical Relationship 520. The Physical subpackage 700 comprises a number of classes. Its structure is detailed in Table 35.

TABLE 35

Structure of Physical Subpackage

| Element | Type |
|---|---|
| Copier | Class |
| GLSeries | Class |
| PhysicalDevice | Class |
| SCSeries | Class |

The Copier class 702 is an abstraction designed to represent a copier machine. The Copier class 702 is suitably a specialization of PhysicalDevice class 706. Its functionality is detailed in Table 36.

TABLE 36

Copier Class Functions

Function public int getAutoClearTimeOut( )
public String getAutoDuplex( )
public int getAutoPowerOff( )
public int getAutoPowerSave( )
public String getDateFormat( )
public int getMaxCopies( )
public LogicalPrinter getPrinter( )
public String getPrinterDSIVersion( )
public String getRomVersion( )
public LogicalScanner getScanner( )
public String getScannerROMVersion( )
public void setAutoClearTimeOut(int autoClearTimeOut)
public void setAutoDuplex(String autoDuplex)
public void setAutoPowerOff(int autoPowerOff)
public void setAutoPowerSave(int autoPowerSave)
public void setDateFormat(String dateFormat)
public void setMaxCopies(int maxCopies)
public void setPrinterDSIVersion(String printerDSIVersion)

It should be noted that an abstraction designed to represent any specific device is suitably added to the Physical subpackage 700. As such, the Physical subpackage is suitably expandable to include classes for any DID device in the world. One such specific device series is the GLSeries device. The GLSeries class 704 is an abstraction designed to represent a GLSeries device. The GLSeries class 704 is suitably a specialization of PhysicalDevice class 706. Its functionality is detailed in Table 37.

TABLE 37

GLSeries Class Functions

Function public LogicalController getController( )

Similarly, the SCSeries class 708 is an abstraction designed to represent an SCSeries device controller. The SCSeries class 708 is suitably a specialization of PhysicalDevice class 706. Its functionality is detailed in Table 38.

TABLE 38

SCSeries Class Functions

Function public LogicalController getController( )
public Copier getCopier( )

The PhysicalDevice class 706 is an abstraction designed to represent a physical device, which is an actual device that has physical form, i.e. those devices which one can walk up to and use. The PhysicalDevice class 706 is suitably a specialization of Base class 302. Its functionality is detailed in Table 39.

TABLE 39

PhysicalDevice Class Functions

Function public synchronized void
addDeviceStateChangedListener(DeviceStateChangedListener listener)
public Department getCountFilter( )
public LogicalDevice getDevices( )
public String getFirmwareVersion( )
public String getLocation( )
public String getManufacturer( )
public String getModel( )
public String getName( )
public Counter getTotal( )
public synchronized void
removeDeviceStateChangedListener(DeviceStateChangedListener listener)
public void setCountFilter(Department countFilter)
public void setLocation(String location)

Figure 5:
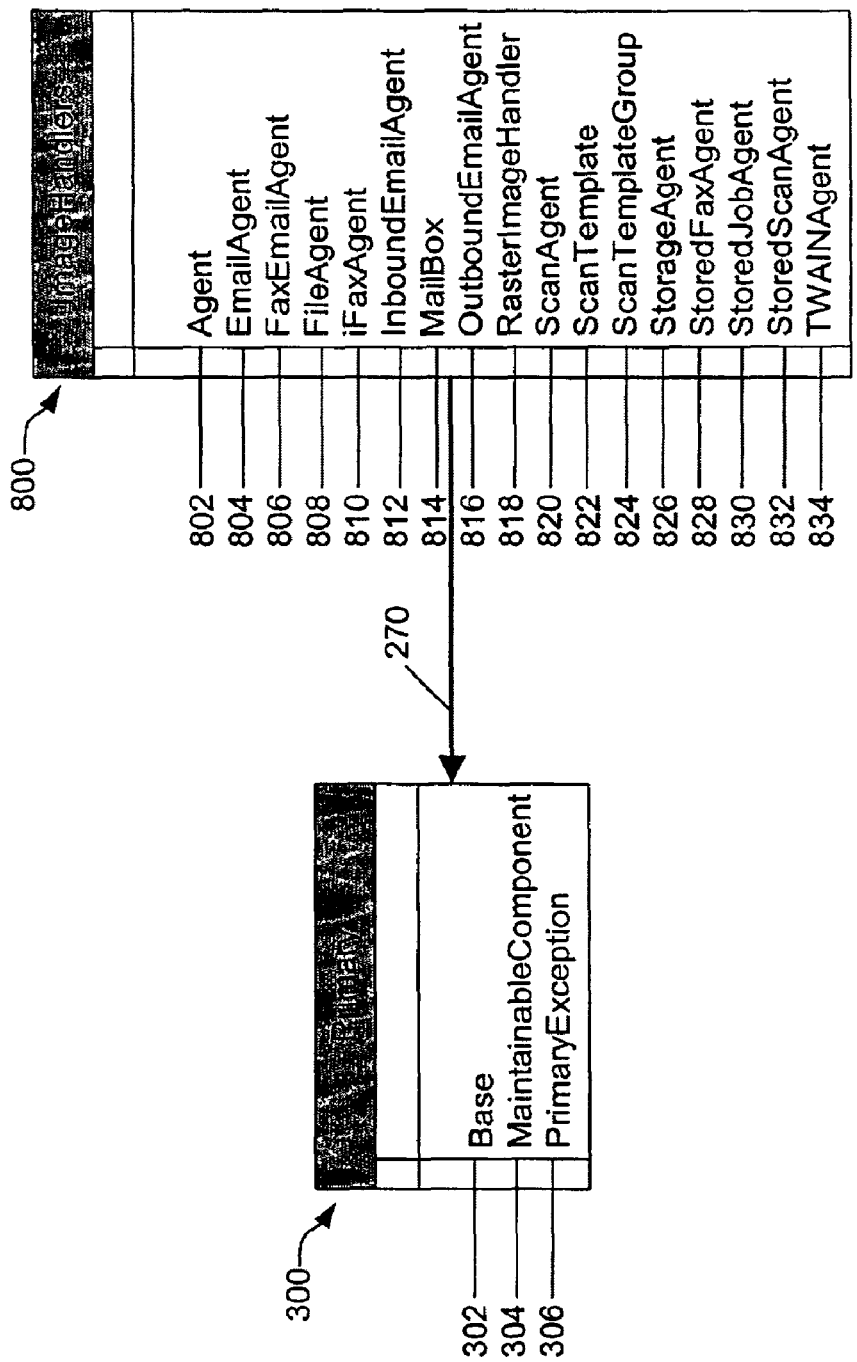
FIG. 5 is a diagram showing the details of one embodiment of an image handling component package and its relation to the primary component package.

Turning now to FIG. 5, a diagram is provided showing the classes of Primary package 300 and structure of the ImageHandlers package 800. The ImageHandlers package 800 is related to Primary package 300 through the Primary-ImageHandlers Relationship 270. The ImageHandlers package 800 comprises a number of classes. Its structure is detailed in Table 40.

TABLE 40

Structure of ImageHandlers Package

| Element | Type |
|---|---|
| Copier | Class |
| Agent | Class |
| EmailAgent | Class |
| FaxEmailAgent | Class |
| FileAgent | Class |
| iFaxAgent | Class |
| InboundEmailAgent | Class |
| MailBox | Class |
| OutboundEmailAgent | Class |
| RasterImageHandler | Class |
| ScanAgent | Class |
| ScanTemplate | Class |
| ScanTemplateGroup | Class |
| StorageAgent | Class |
| StoredFaxAgent | Class |
| StoredJobAgent | Class |
| StoredScanAgent | Class |
| TWAINAgent | Class |

The Agent class 802 is an abstraction designed to represent a generic image processing unit. The Agent class 802 is suitably a specialization of MaintainableComponent class 304. Its functionality is detailed in Table 41.

TABLE 41

Agent Class Functions

Function public String getFileFormat( )
public void setFileFormat(String fileFormat)

The EmailAgent class 804 is an abstraction designed to represent a generic email processing unit. The EmailAgent class 804 is suitably a specialization of Agent class 802. Its functionality is detailed in Table 42.

TABLE 42

EmailAgent Class Functions

Function public int getMaxFragment( )
public int getMaxSize( )
public void setMaxFragment(int maxFragment)
public void setMaxSize(int maxSize)

The FaxEmailAgent class 806 is designed to handle scan-to-iFax requests. The FaxEmailAgent class 806 is suitably a specialization of OutboundEmailAgent class 816.

The FileAgent class 808 designed to handle requests for storage of information into a file share sysetem. The FileAgent class 808 is suitably a specialization of StorageAgent class 826. Its functionality is detailed in Table 43.

TABLE 43

FileAgent Class Functions

Function public String getUser( )
public void setPassword(String password)
public void setUser(String user)

The iFaxAgent class 810 designed to represent iFax-to-print Agent. The iFaxAgent class 810 is suitably a specialization of InboundEmailAgent class 812. Its functionality is detailed in Table 44.

TABLE 44 iFaxAgent Class Functions

Function public String getErrorEmail( )
public String getPrintMode( )
public boolean isPrintError( )
public boolean isSendEmailOnError( )
public void setErrorEmail(String errorEmail)
public void setPrintError(boolean printError)
public void setPrintMode(String printMode)
public void setSendEmailOnError(boolean sendEmailOnError)

The InboundEmailAgent class 812 is an abstraction designed to represent a generic inbound image processing email Agent. The InboundEmailAgent class 812 is suitably a specialization of EmailAgent class 804. Its functionality is detailed in Table 45.

TABLE 45

InboundEmailAgent Class Functions

Function public String getMailDomain( )
public int getPollRate( )
public int getPOPport( )
public String getPOPServer( )
public int getSMTPport( )
public String getSMTPServer( )
public String getUser( )
public void setMailDomain(String mailDomain)
public void setPassword(String password)
public void setPollRate(int pollRate)
public void setPOPport(int POPport)
public void setPOPServer(String POPServer)
public void setSMTPport(int SMTPport)
public void setSMTPServer(String SMTPServer)
public void setUser(String user)

The MailBox class 814 is designed to store inbound receipts prior to their being handled by an agent. For example, after being received, the inbound faxes are stored in the mailbox prior to being handled by an agent. The MailBox class 814 is suitably a specialization of RasterImageHandler class 818. Its functionality is detailed in Table 46.

TABLE 46

Mailbox Class Functions

Function public int getNo( )
public void setNo(int no)
public void setPassword(String password)

The OutboundEmailAgent class 816 is an abstraction designed to represent a generic outbound image processing email Agent. The OutboundEmailAgent class 816 is suitably a specialization of EmailAgent class 804. Its functionality is detailed in Table 47.

TABLE 47

OutboundEmailAgent Class Functions

Function public String getBodyText( )
public String getFromAddress( )
public String getFromName( )
public String getSubject( )
public String getToAddress( )
public String getToName( )
public void setBodyText(String bodyText)
public void setFromAddress(String fromAddress)
public void setFromName(String fromName)
public void setSubject(String subject)
public void setToAddress(String toAddress)
public void setToName(String toName)

The RasterImageHandler class 818 is an abstraction designed to represent a generic raster image processing handler. The RasterImageHandler class 818 is suitably a specialization of MaintainableComponent class 304. Its functionality is detailed in Table 48.

TABLE 48

RasterImageHandler Class Functions

Function public Agent getAgent( )
public Counter getCounter( )
public int getDeptCode( )
public String getDescription( )
public String getName( )
public String getNotificationDest( )
public String getOwner( )
public boolean isNotifyOnError( )
public boolean isNotifyOnJob( )
public void setAgent(Agent agent)
public void setDeptCode(int deptCode)
public void setDescription(String description)
public void setName(String name)
public void setNotificationDest(String notificationDest)
public void setNotifyOnError(boolean notifyOnError)
public void setNotifyOnJob(boolean notifyOnJob)
public void setOwner(String owner)

The ScanAgent class 820 is designed to handle scan-to-file requests. The ScanAgent class 820 is suitably a specialization of InboundEmailAgent class 812.

The ScanTemplate class 822 is a specialization of RasterImageHandler class 818 designed to process scans. The ScanTemplate class 822 is suitably a specialization of RasterImageHandler class 818. Its functionality is detailed in Table 49.

TABLE 49

ScanTemplate Class Functions

Function public ScanAgent getAgent( )
public String getDocType( )
public int getExposure( )
public FileStorage getFileStorageArea( )
public int getIcon( )
public String getOriginalSize( )
public ScanTemplateGroup getParentGroup( )
public int getResolution( )
public int getRotation( )
public boolean isDuplex( )
public void setDocType(String docType)
public void setDuplex(boolean duplex)
public void setExposure(int exposure)
public void setFileStorageArea(FileStorage fileStorageArea)
public void setIcon(int icon)
public void setOriginalSize(String originalSize)
public void setParentGroup(ScanTemplateGroup parentGroup)
public void setResolution(int resolution)
public void setRotation(int rotation)

The ScanTemplateGroup class 824 is a representation of a collection of scan templates. The ScanTemplateGroup class 824 is suitably a specialization of MaintainableComponent class 304. Its functionality is detailed in Table 50.

TABLE 50

ScanTemplateGroup Class Functions

Function public Counter getCounter( )
public String getDfltEmail( )
public String getName( )
public int getNo( )

TABLE 50-continued

ScanTemplateGroup Class Functions

Function public String getOwner( )
public ScanTemplate getTemplates( )
public void setDfltEmail(String dfltEmail)
public void setName(String name)
public void setNo(int no)
public void setOwner(String owner)
public void setPassword(String password)
public void setTemplates(ScanTemplate templates)

The StorageAgent class 826 is an abstract class representing a generic storage-based agent for processing inbound images, which are suitably scanned images. The StorageAgent class 826 is suitably a specialization of Agent class 802. Its functionality is detailed in Table 51.

TABLE 51

StorageAgent Class Functions

Function public int getAutoDeleteDays( )
public FileStorage getDestFileStorageArea( )
public FileStorage getDfltFileStorageArea( )
public String getFileNameTemplate( )
public boolean isLocalStorage( )
public void setAutoDeleteDays(int autoDeleteDays)
public void setDestFileStorageArea(FileStorage destFileStorageArea)
public void setDfltFileStorageArea(FileStorage dfltFileStorageArea)
public void setFileNameTemplate(String fileNameTemplate)
public void setLocalStorage(boolean localStorage)

The StoredFaxAgent class 828 is designed to represent an agent for handling stored fax requests. The StoredFaxAgent class 828 is suitably a specialization of StorageJobAgent class 830.

The StoredJobAgent class 830 is an abstract class representing an agent for storing jobs. The StoredJobAgent class 830 is suitably a specialization of StorageAgent class 826. Its functionality is detailed in Table 52.

TABLE 52

StoredFaxAgent Class Functions

Function public String getFolderType( )
public void setFolderType(String folderType)

The StoredScanAgent class 832 is designed to represent an agent for handling stored scan requests. The StoredScanAgent class 832 is suitably a specialization of StoredJobAgent class 830.

The TWAINAgent class 834 is designed to represent an agent for handling requests for storage into a file share for subsequent TWAIN acquisition. The TWAINAgent class 834 is suitably a specialization of StorageAgent class 826.

Figure 6:
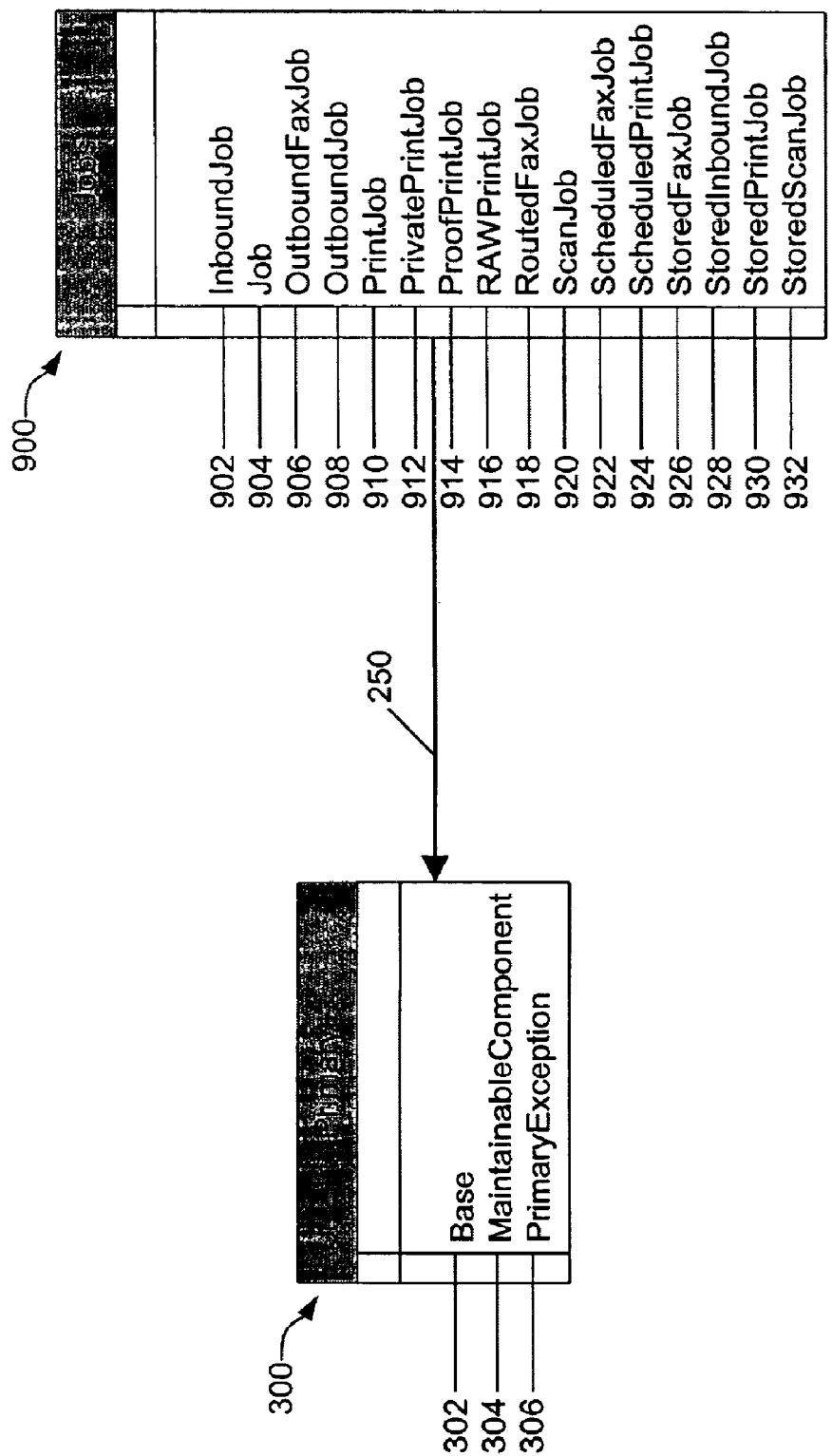
FIG. 6 is a diagram showing the details of one embodiment of a job handling component package and its relation to the primary component package.

Turning now to FIG. 6, a diagram is provided showing the classes of Primary package 300 and structure of the Jobs package 900. The Jobs package 900 is related to Primary package 300 through the Primary-Jobs Relationship 250. The Jobs package 900 comprises a number of classes. Its structure is detailed in Table 53.

TABLE 53

Structure of Jobs Package

| Element | Type |
| --- | --- |
| InboundJob | Class |
| Job | Class |
| OutboundFaxJob | Class |
| OutboundJob | Class |
| PrintJob | Class |
| PrivatePrintJob | Class |
| ProofPrintJob | Class |
| RAWPrintJob | Class |
| RoutedFaxJob | Class |
| ScanJob | Class |
| ScheduledFaxJob | Class |
| ScheduledPrintJob | Class |
| StoredFaxJob | Class |
| StoredInboundJob | Class |
| StoredPrintJob | Class |
| StoredScanJob | Class |

The InboundJob class 902 is an abstract class representing inbound jobs. Inbound jobs are those jobs for which devices receive raster image data. Examples of inbound jobs are incoming faxes and scan jobs. The InboundJob class 902 is suitably a specialization of Job class 904. Its functionality is detailed in Table 54.

TABLE 54

InboundJob Class Functions

| Function |
| --- |
| public Agent getAgent( ) |
| public String getDetailedStatus( ) |

The Job class 904 is an abstract class representing a generic job, which is a rudimentary unit of work for a digital imaging device. The Job class 904 is suitably a specialization of Base class 302. Its functionality is detailed in Table 55.

TABLE 55

Job Class Functions and Descriptions

| Function | Description |
| --- | --- |
| public void Delete( ) | Deletes the job from the queue. Note: The Job object suitably continues to be valid until all references to it are released; the "status" field suitably indicates that the Job has been deleted. |
| public int getDeptCode( ) | |
| public int getID( ) | |
| public int getPages( ) | |
| public String getStatus( ) | |
| public String getTime( ) | |
| public void setDeptCode(int deptCode) | |

The OutboundFaxJob class 906 represents an outbound fax job, i.e. a PC-Fax job. Outbound fax jobs are suitably jobs awaiting immediate transmission. The OutboundFaxJob class 906 is suitably a specialization of OutboundJob class 908. Its functionality is detailed in Table 56.

TABLE 56

OutboundFaxJob Class Functions and Descriptions

| Function | Description |
| --- | --- |
| public static String getJobType( ) | Static method that returns the job type for Outbound Fax jobs. |
| public String getOriginalJobType( ) | |

The OutboundJob class 908 is an abstract class representing an outbound job that represents an outbound fax job, i.e. a PC-Fax job. The OutboundJob class 908 is suitably a specialization of Job class 904. Its functionality is detailed in Table 57.

TABLE 57

OutboundJob Class Functions and Descriptions

| Function | Description |
| --- | --- |
| public String getDocumentName( ) | |
| public String getOwner( ) | |
| public int getSize( ) | |
| public void ReleaseForProcessing( ) | Releases the job for further processing in case this job is invalid. Throws: PrimaryException |

The PrintJob class 910 represents a generic print job. The PrintJob class 910 is suitably a specialization of OutboundJob class 908. Its functionality is detailed in Table 58.

TABLE 58

PrintJob Class Functions and Descriptions

| Function | Description |
| --- | --- |
| public static String getJobType( ) | Static method that returns the job type for regular Print jobs. |
| public String getOriginalJobType( ) | |

The PrivatePrintJob class 912 represents a private print job, which is suitably a print job that must be manually released from a device console. The PrivatePrintJob class 912 is suitably a specialization of PrintJob class 910. Its functionality is detailed in Table 59.

TABLE 59

PrivatePrintJob Class Functions and Descriptions

| Function | Description |
| --- | --- |
| public static String getJobType( ) | Static method that returns the job type for private Print jobs. |
| public void setPassword(String password) | |

The ProofPrintJob class 914 represents a proof-print job. The ProofPrintJob class 914 is suitably a specialization of PrintJob class 910. Its functionality is detailed in Table 60.

TABLE 60

ProofPrintJob Class Functions and Descriptions

| Function | Description |
|---|---|
| public static String getJobType( ) | Static method that returns the job type for Proof Print jobs. |
| public int getNoCopies( ) | |
| public void Release( ) | Releases the job immediately. Throws: PrimaryException |
| public void setNoCopies(int noCopies) | |

The RAWPrintJob class 916 represents a RAW job, which is a job that contains no PJL commands. The RAWPrintJob 916 class is suitably a specialization of PrintJob class 910. Its functionality is detailed in Table 61.

TABLE 61

RAWPrintJob Class Functions and Descriptions

| Function | Description |
|---|---|
| public static String getJobType( ) | Static method that returns the job type for RAW Print jobs. |
| public RawJobSettings getRawJobSettings( ) | |
| public void setRawJobSettings(RawJobSettings rawJobSettings) | |

The RoutedFaxJob class 918 represents an inbound fax job that is being routed to a recipient on the network. The RoutedFaxJob class 918 is suitably a specialization of InboundJob class 902. Its functionality is detailed in Table 62.

TABLE 62

RoutedFaxJob Class Functions and Descriptions

| Function | Description |
|---|---|
| public static String getJobType( ) | Static method that returns the job type for routed fax jobs. |
| public MailBox getMailbox( ) | |

The ScanJob class 920 represents a scan job. Scan jobs are suitably initiated by a user manually wherein a user inserts paper and selects a scan option. The ScanJob class 920 is suitably a specialization of InboundJob class 902. Its functionality is detailed in Table 63.

TABLE 63

ScanJob Class Functions and Descriptions

| Function | Description |
|---|---|
| public ScanTemplateGroup getGroup( ) | |
| public static String getJobType( ) | Static method that returns the job type for scan jobs. |
| public ScanTemplate getTemplate( ) | |

The ScheduledFaxJob class 922 represents a fax job scheduled for future transmission. The ScheduledFaxJob class 922 is suitably a specialization of OutboundFaxJob class 906. Its functionality is detailed in Table 64.

TABLE 64

ScheduledFaxJob Class Functions and Descriptions

| Function | Description |
|---|---|
| public static String getJobType( ) | Static method that returns the job type for scheduled fax jobs. |
| public String getReleaseTime( ) | |
| public void Release( ) | Releases the job immediately. Throws: PrimaryException |
| public void setReleaseTime(String releaseTime) | |

The ScheduledPrintJob class 924 represents a print job scheduled for future transmission. The ScheduledPrintJob class 924 is suitably a specialization of PrintJob class 910. Its functionality is detailed in Table 65.

TABLE 65

ScheduledPrintJob Class Functions and Descriptions

| Function | Description |
|---|---|
| public static String getJobType( ) | Static method that returns the job type for Scheduled Print jobs. |
| public String getReleaseTime( ) | |
| public void Release( ) | Releases the job immediately. Throws: PrimaryException |
| public void setReleaseTime(String releaseTime) | |

The StoredFaxJob class 926 represents stored fax jobs. The StoredFaxJob class 926 is suitably a specialization of StoredInboundJob class 928. Its functionality is detailed in Table 66.

TABLE 66

StoredFaxJob Class Functions and Descriptions

| Function | Description |
|---|---|
| public static String getJobType( ) | Static method that returns the job type for stored fax jobs. |

The StoredInboundJob class 928 is an abstract class representing stored inbound jobs. The StoredInboundJob class 928 is suitably a specialization of InboundJob class 902. Its functionality is detailed in Table 67.

TABLE 67

StoredInboundJob Class Functions and Descriptions

| Function | Description |
|---|---|
| public static String getJobType( ) | Static method that returns the job type for stored inbound jobs. |

The StoredPrintJob class 930 is an abstract class representing a single stored job, which is a job on a device for future printing and/or proofing. The StoredPrintJob class 930 is suitably a specialization of OutboundJob class 908. Its functionality is detailed in Table 68.

TABLE 68

StoredPrintJob Class Functions and Descriptions

| Function | Description |
|---|---|
| public String getFolderName( ) | |
| public String getFolderType( ) | |
| public static String getJobType( ) | Static method that returns the job type for stored jobs. |
| public void setFolderName(String folderName) | |

The StoredScanJob class 932 represents stored scan jobs. The StoredScanJob class 932 is suitably a specialization of StoredInboundJob class 928. Its functionality is detailed in Table 69.

TABLE 69

StoredScanJob Class Functions and Descriptions

| Function | Description |
|---|---|
| public static String getJobType( ) | Static method that returns the job type for stored scan jobs. |

Figure 7:
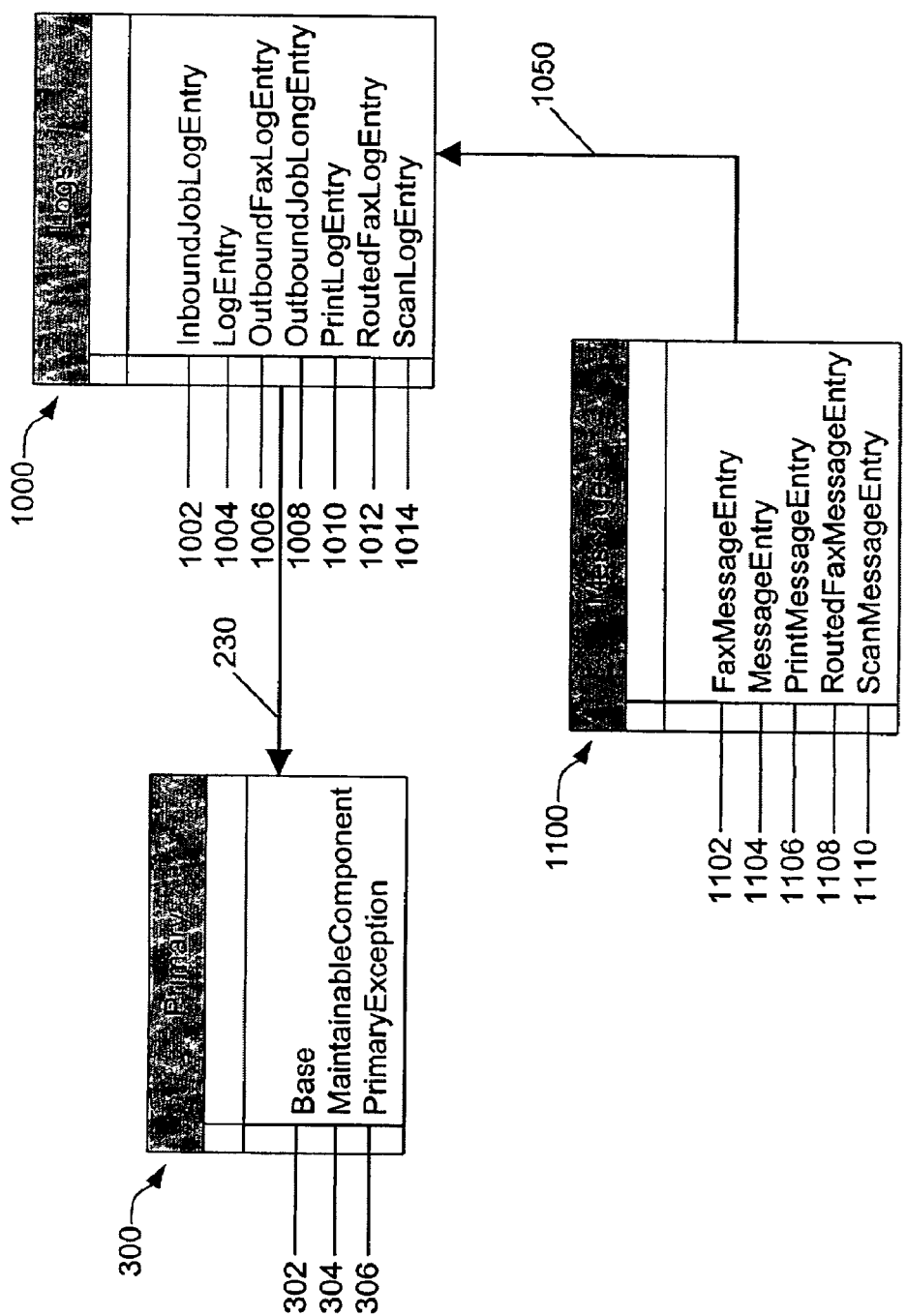
FIG. 7 is a diagram showing the details of one embodiment of a log entry component package and its relation to the primary component package.

Turning now to FIG. 7, a diagram is provided showing the classes of Primary package 300 and structure of the Logs package 1000. The Logs package 1000 is related to Primary package 300 through the Primary-Logs Relationship 230. The Logs package 1000 comprises a number of classes and a subpackage. Its structure is detailed in Table 70.

TABLE 70

Structure of Logs Package

| Element | Type |
|---|---|
| InboundJobLogEntry | Class |
| LogEntry | Class |
| OutboundFaxLogEntry | Class |
| OutboundJobLogEntry | Class |
| PrintLogEntry | Class |
| RoutedFaxLogEntry | Class |
| ScanLogEntry | Class |
| Messages | Package |

The InboundJobLogEntry class 1002 is an abstract class representing a log entry for an incoming job. The InboundJobLogEntry class 1002 is suitably a specialization of LogEntry class 1004. Its functionality is detailed in Table 71.

TABLE 71

InboundJobLogEntry Class Functions

| Function |
|---|
| public Agent getAgent( ) |
| public String getDetailedStatus( ) |

The LogEntry class 1004 is an abstract class representing a generic job log entry. The LogEntry class 1004 is suitably a specialization of Base class 302. Its functionality is detailed in Table 72.

TABLE 72

LogEntry Class Functions

| Function |
|---|
| public int getDeptCode( ) |
| public int getID( ) |
| public int getPages( ) |
| public int getSize( ) |
| public String getStatus( ) |
| public String getTime( ) |
| public void setDeptCode(int deptCode) |

The OutboundFaxLogEntry class 1006 represents a log entry for all kinds of fax jobs. The OutboundFaxLogEntry class 1006 is suitably a specialization of OutboundJobLogEntry class 1008.

The OutboundJobLogEntry class 1008 is an abstract class representing a log entry for an outgoing job. The OutboundJobLogEntry class 1008 is suitably a specialization of LogEntry class 1004. Its functionality is detailed in Table 73.

TABLE 73

OutboundJobLogEntry Class Functions

| Function |
|---|
| public String getDocumentName( ) |
| public String getOriginalJobType( ) |
| public String getOwner( ) |

The PrintLogEntry class 1010 represents a log entry for all kinds of print jobs. The PrintLogEntry class 1010 is suitably a specialization of OutboundJobLogEntry class 1008.

The RoutedFaxLogEntry class 1012 represents a log entry for an inbound routed fax job. The RoutedFaxLogEntry class 1012 is suitably a specialization of InboundJobLogEntry class 1002. Its functionality is detailed in Table 74.

TABLE 74

RoutedFaxLogEntry Class Functions

| Function |
|---|
| public String getBoxNo( ) |

The ScanLogEntry class 1014 represents a log entry for an inbound scan job. The ScanLogEntry class 1014 is suitably a specialization of InboundJobLogEntry class 1002. Its functionality is detailed in Table 75.

TABLE 75

ScanLogEntry Class Functions

| Function |
|---|
| public String getGroup( ) |
| public String getTemplate( ) |

The Message subpackage 1100 is related to Logs package 1000 through the Logs-Messages Relationship 1050. The Message subpackage 1100 comprises a number of classes. Its structure is detailed in Table 76.

TABLE 76

Structure of Messages Subpackage

| Element | Type |
| --- | --- |
| FaxMessageEntry | Class |
| MessageEntry | Class |
| PrintMessageEntry | Class |
| RoutedFaxMessageEntry | Class |
| ScanMessageEntry | Class |

The FaxMessageEntry class 1102 is an abstract class representing a fax message entry. The FaxMessageEntry class 1102 is suitably a specialization of MessageEntry class 1104. Its functionality is detailed in Table 77.

TABLE 77

FaxMessageEntry Class Functions

Function public static String getComponentName( )

The MessageEntry class 1104 is an abstract class representing a generic message log entry. The MessageEntry class 1104 is suitably a specialization of Base class 302. Its functionality is detailed in Table 78.

TABLE 78

MessageEntry Class Functions

Function public String getComponent( )
public String getDescription( )
public int getID( )
public String getSeverity( )
public String getTime( )

The PrintMessageEntry class 1106 is an abstract class for printing message log entries. The PrintMessageEntry class 1106 is suitably a specialization of MessageEntry class 1104. Its functionality is detailed in Table 78.

TABLE 78

PrintMessageEntry Class Functions

Function public static String getComponentName( )

The RoutedFaxMessageEntry class 1108 represents a message entry for a routed fax job. The RoutedFaxMessageEntry class 1108 is suitably a specialization of MessageEntry class 1104. Its functionality is detailed in Table 79.

TABLE 79

RoutedFaxMessageEntry Class Functions

Function public static String getComponentName( )
public String getDetailedStatus( )

The ScanMessageEntry class 1110 represents a message entry for a scan job. The ScanMessageEntry class 1110 is suitably a specialization of MessageEntry class 1104. Its functionality is detailed in Table 80.

TABLE 80

ScanMessageEntry Class Functions

Function public static String getComponentName( )
public String getDetailedStatus( )

Figure 8:
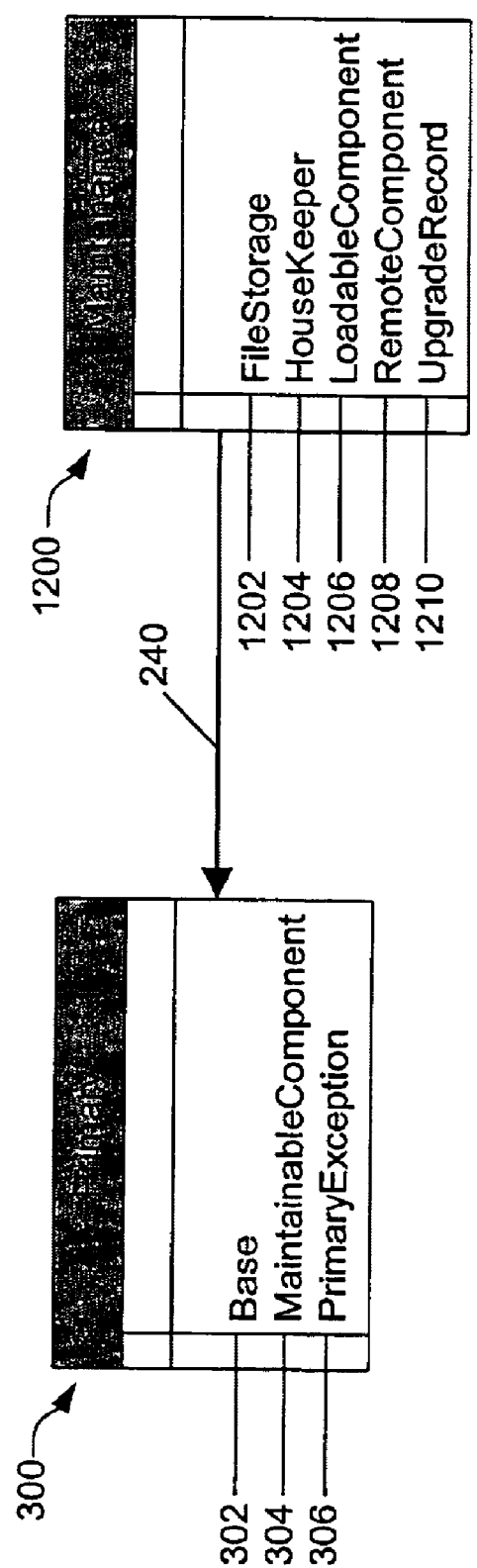
FIG. 8 is a diagram showing the details of one embodiment of a maintenance handling component package and its relation to the primary component package.

Turning now to FIG. 8, a diagram is provided showing the classes of Primary package 300 and structure of the Maintenance package 1200. The Maintenance package 1200 is related to Primary package 300 through the Primary-Maintenance Relationship 240. The Maintenance package 1200 comprises a number of classes. Its structure is detailed in Table 81.

TABLE 81

Structure of Maintenance Package

| Element | Type |
| --- | --- |
| FileStorage | Class |
| HouseKeeper | Class |
| LoadableComponent | Class |
| RemoteComponent | Class |
| UpgradeRecord | Class |

The FileStorage class 1202 is an abstract class representing the file storage associated with a device. The file storage is suitably maintained by the device itself or elsewhere on a network. The FileStorage class 1202 is suitably a specialization of Base class 302. Its functionality is detailed in Table 82.

TABLE 82

FileStorage Class Functions and Descriptions

| Function | Description |
| --- | --- |
| public void Clear( ) | Remove all components (files) in the area. Throws: PrimaryException |
| public String getDescription( ) | |
| public int getFreeDiskSpace( ) | |
| public String getName( ) | |
| public String getURL( ) | |
| public void setDescription(String description) | |
| public void setName(String name) | |
| public void setURL(String URL) | |

The HouseKeeper class 1204 is an abstract class for providing general maintenance functionality. The HouseKeeper class 1204 is suitably designed in the form of a utility class and is suitably a specialization of Base class 302. Its functionality is detailed in Table 83.

TABLE 83

HouseKeeper Class Functions and Descriptions

| Function | Description |
| --- | --- |
| public FileStorage CreateStorageArea(String name, String URL) | Creates a storage area by unique name.<br>Throws: PrimaryException<br>Parameter doc:<br>name - Unique name of the area to be created<br>URL - URL where the storage resides<br>NULL - device discretion |
| public void DownloadComponents(LoadableComponent components, String urlTo) | Download files given a locale, category and component set.<br>Throws: PrimaryException<br>Parameter doc:<br>components - list of components to download<br>urlTo - URL where files are to be stored<br>Exception doc: PrimaryException |
| public LoadableComponent getComponents( ) | |
| public LoadableComponent GetComponents(Locale locale, String category) | Retrieves the component set associated with this file storage given a locale and category.<br>Throws: PrimaryException<br>Parameter doc:<br>locale - object representing the target locale<br>category - name of category this file belongs to<br>Return doc: The component list<br>Exception doc: PrimaryException |
| public RemoteComponent GetComponentsAt(String fromURL) | Retrieve the list of components that are available at the specified URL.<br>Throws: PrimaryException<br>Parameter doc:<br>fromURL - URL where to check for components<br>Return doc: List of components that can be backed up. |
| public FileStorage getDriverStorage( ) | |
| public FileStorage getStorageAreas( ) | |
| public UpgradeRecord getUpgradeHistory( ) | |
| public void InstallUpgrade(String urlFrom, LoadableComponents[] components) | Upgrade components from the specified URL. This method will check for dependent components and will upgrade these first. If intermediate restart is required before the upgrade is complete, this operation will return, IsRestartPending will return TRUE and IsUpgradeComplete will return FALSE.<br>Throws: PrimaryException<br>Parameter doc:<br>urlFrom - Source URL to install from<br>components - List of components to install |
| public boolean IsRestartPending( ) | Determines if a restart is currently pending.<br>Return doc: Indication of whether restart is currently pending or not |
| public boolean IsUpgradeComplete( ) | Indicates if the previously initiated upgrade operation is complete. |
| public boolean IsUpgradePossible( ) | Determines if an upgrade is possible at this moment. The reasons upgrade may not be possible are:<br>1. Upgrade is already running or is not complete<br>2. Restart is pending.<br>Return doc: Indication of whether upgrade is possible or not |

The LoadableComponent class 1206 is an abstract class that represents a software component that can be backed up, downloaded, uploaded, etc. The LoadableComponent class 1206 is suitably a specialization of MaintainableComponent class 304. Its functionality is detailed in Table 84.

TABLE 84

13/37 LoadableComponent Class Functions and Descriptions

| Function | Description |
| --- | --- |
| public void Download(String urlTo) | Downloads all files of the component to a URL.<br>Throws: PrimaryException<br>Parameter doc:<br>urlTo - URL where to download the files to<br>Exception doc: PrimaryException |

TABLE 84-continued

13/37 LoadableComponent Class Functions and Descriptions

| Function | Description |
|---|---|
| public void Export(String toURL, String format) | Export this component to a specified URL.<br>May not be supported by all components.<br>Parameter doc:<br>toURL - URL to export to<br>format -format ID ["CSV", "TSV"] |
| public FileStorage getDfltStorage( ) | |
| public void Import(String toURL, String format, boolean replace) | Import this component from a specified URL.<br>May not be supported by all components.<br>Parameter doc:<br>fromURL - URL to import from<br>format - format ID ["CSV", "TSV"]<br>replace - TRUE: replace contents, FALSE: add/update |
| public boolean isDataOnly( ) | |
| public boolean Match(RemoteComponent counterpart) | Return indication of whether the component matches the remote component supplied as an argument. |
| public void Upload(String urlFrom) | Uploads all files of the component into a device maintained storage.<br>Throws: PrimaryException<br>Parameter doc:<br>urlFrom - URL where to get the file from<br>Exception doc: PrimaryException |
| public void UploadFile(FileStorage storage, String urlFrom) | Uploads a single file into the device maintained storage for a particular locale, category and component. This method is useful when uploading using HTTP protocol, since this protocol allows only single file operation.<br>Throws: PrimaryException<br>Parameter doc:<br>storage - storage on the device to upload file to<br>urlFrom - URL where to get the file from<br>Exception doc: PrimaryException |

The RemoteComponent class 1208 is an abstract class representing a remote component, which is a component that exists at a remote location or URL. The RemoteComponent class 1208 is suitably a specialization of Base class 302. Its functionality is detailed in Table 85.

TABLE 85

RemoteComponent Class Functions

Function public String getCategory( )
public RemoteComponent getDependencies( )
public String getDescription( )
public Locale getLocale( )
public String getName( )
public int getSize( )
public String getVersion( )

The UpgradeRecord class 1210 is an abstract class representing a single historical record of an upgrade operation. The UpgradeRecord class 1210 is suitably a specialization of Base class 302. Its functionality is detailed in Table 86.

TABLE 86

UpgradeRecord Class Functions

Function public RemoteComponent getComponents( )
public String getTime( )
public String getURLfrom( )
public String getUser( )
public boolean isComplete( )

Figure 9:
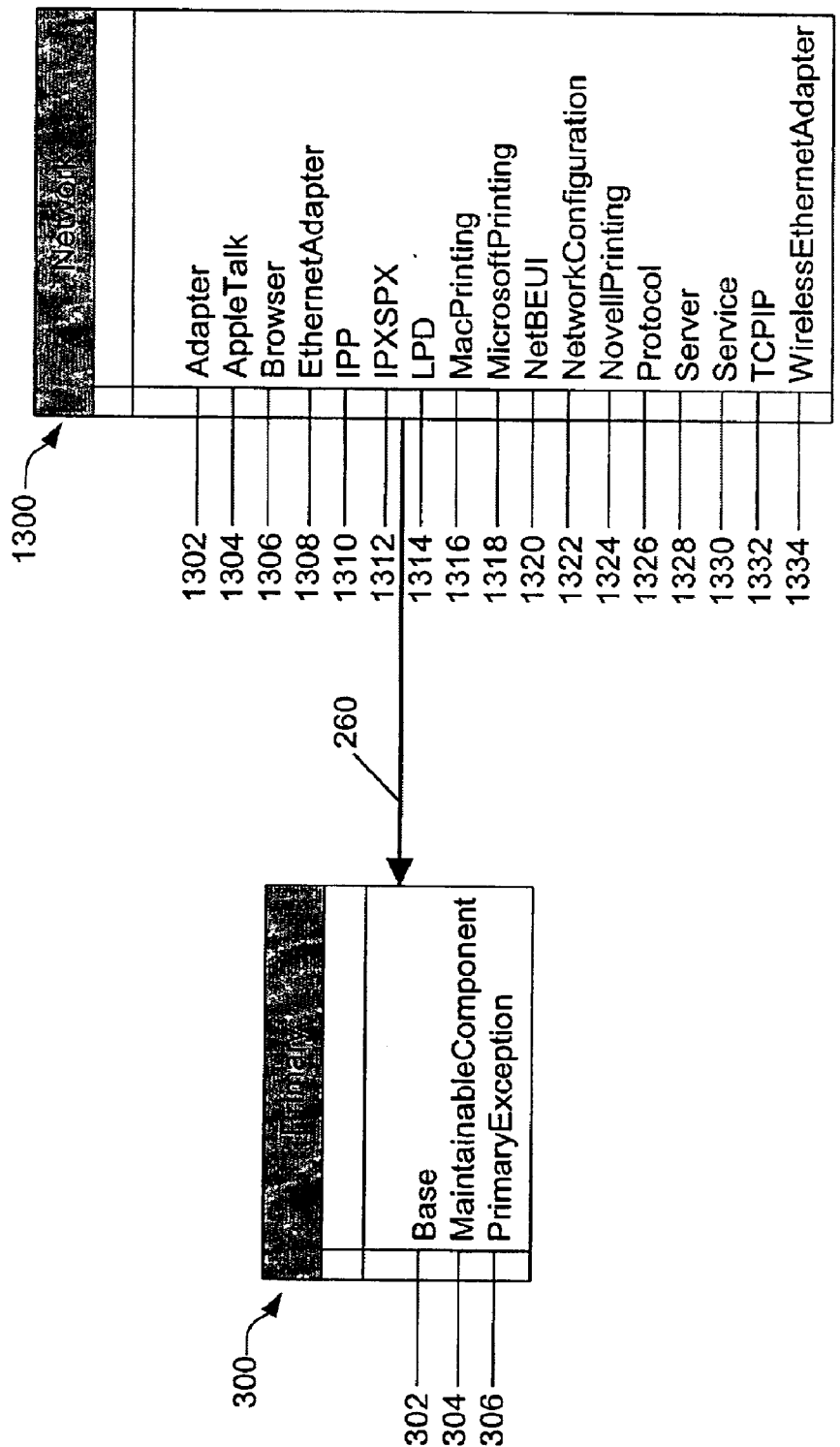
FIG. 9 is a diagram showing the details of one embodiment of a networking component package and its relation to the primary component package.

Turning now to FIG. 9, a diagram is provided showing the classes of Primary package 300 and structure of the Network package 1300. The Network package 1300 is related to Primary package 300 through the Primary-Network Relationship 260. The Network package 1300 comprises a number of classes. Its structure is detailed in Table 87.

TABLE 87

Structure of Network Package

| Element | Type |
|---|---|
| Adapter | Class |
| AppleTalk | Class |
| Browser | Class |
| EthernetAdapter | Class |
| IPP | Class |
| IPXSPX | Class |
| LPD | Class |
| MacPrinting | Class |
| MicrosoftPrinting | Class |
| NetBEUI | Class |
| NetworkConfiguration | Class |
| NovellPrinting | Class |
| Protocol | Class |
| Server | Class |
| Service | Class |
| TCPIP | Class |
| WirelessEthernetAdapter | Class |

The Adapter class 1302 is an abstract class representing a single network adapter. The Adapter class 1302 is suitably a specialization of Base class 302. Its functionality is detailed in Table 88.

TABLE 88

Adapter Class Functions and Descriptions

| Function | Description |
|---|---|
| public String getCardModel( ) | |
| public String getCardType( ) | |
| public String getMACAddress( ) | |
| public Protocol getProtocols( ) | |
| public Service getServices( ) | |
| public boolean isEnabled( ) | |
| public void RestoreDefaults( ) | Restores factory default settings for all properties. |
| public void setEnabled(boolean enabled) | |
| public void setProtocols(Protocol protocols) | |
| public void setServices(Service services) | |

The AppleTalk class 1304 represents the AppleTalk protocol. The AppleTalk class 1304 is suitably a specialization of Protocol class 1326. Its functionality is detailed in Table 89.

TABLE 89

AppleTalk Class Functions

Function public String getZone( )
public void setZone(String zone)

The Browser class 1306 represents a network browser service. The Browser class 1306 is suitably a specialization of Service class 1330.

The EthernetAdapter class 1308 represents an Ethernet adapter. The EthernetAdapter class 1308 is suitably a specialization of Adapter class 1302. Its functionality is detailed in Table 90.

TABLE 90

EthernetAdapter Class Functions

Function public int getLineSpeed( )

The IPP class 1310 represents a service for printing through use of the Internet Printing Protocol. The IPP class 1310 is suitably a specialization of Service class 1330.

The IPXSPX class 1312 is a specialization of Protocol class 1326 for representing the IPX/SPX protocols. The IPP class 1312 is suitably a specialization of Protocol class 1326. Its functionality is detailed in Table 91.

TABLE 91

IPXSPX Class Functions

Function public String getFrameType( )
public void setFrameType(String frameType)

The LPD class 1314 represents a service for printing through use of the LPD Protocol. The LPD class 1314 is suitably a specialization of Service class 1330.

The MacPrinting class 1316 represents a service for printing through an AppleTalk network. The MacPrinting class 1316 is suitably a specialization of Service class 1330Its functionality is detailed in Table 92. .

TABLE 92

MacPrinting Class Functions

Function public String getName( )
public void setName(String name)

The MicrosoftPrinting class 1318 represents a service for printing through Microsoft networks. The MicrosoftPrinting class 1318 is suitably a specialization of Service class 1330. Its functionality is detailed in Table 93.

TABLE 93

MicrosoftPrinting Class Functions

Function public String getDomain( )
public String getName( )
public void setDomain(String domain)
public void setName(String name)

The NetBEUI class 1320 represents the NetBEUI protocol. The NetBEUI class 1320 is suitably a specialization of Protocol class 1326.

The NetworkConfiguration class 1322 is a container for storing and accessing network configuration parameters. The NetworkConfiguration class 1322 is suitably a specialization of Base class 302. Its functionality is detailed in Table 94.

TABLE 94

NetworkConfiguration Class Functions and Descriptions

| Function | Description |
|---|---|
| public Adapter getAdapters( ) | |
| public Protocol getProtocols( ) | |
| public Service getServices( ) | |
| public void RestoreDefaults( ) | Resets to factory default configuration. |
| public void setAdapters(Adapter adapters) | |
| public void setProtocols(Protocol protocols) | |
| public void setServices(Service services) | |

The NovellPrinting class 1324 represents a service for printing on Novell newtorks. The NovellPrinting class 1324 is suitably a specialization of Service class 1330. Its functionality is detailed in Table 95.

TABLE 95

NovellPrinting Class Functions

Function public String getAdvertisedName( )
public String getContext( )
public String getEnvironment( )
public String getOperatingMode( )
public String getPrimaryFileServerName( )
public int getPrinterNo( )
public String getServerName( )
public String getTree( )
public void setAdvertisedName(String advertisedName)
public void setContext(String context)
public void setEnvironment(String environment)

TABLE 95-continued

NovellPrinting Class Functions

Function public void setOperatingMode(String operatingMode)
public void setPrimaryFileServerName(String primaryFileServerName)
public void setPrinterNo(int printerNo)
public void setServerName(String serverName)
public void setTree(String tree)

The Protocol class 1326 is an abstract class representing a base class for all network protocols. The Protocol class 1326 is suitably a specialization of Base class 302. Its functionality is detailed in Table 96.

TABLE 96

Protocol Class Functions and Descriptions

| Function | Description |
|---|---|
| public Protocol getDependentProtocols( ) | |
| public boolean isEnabled( ) | |
| public void RestoreDefaults( ) | Restores factory default settings for all properties. |
| public void setDependentProtocols(Protocol dependentProtocols) | |
| public void setEnabled(boolean enabled) | |

The Server class 1328 represents a service allowing for file sharing. The Server class 1328 is suitably a specialization of Service class 1330.

The Service class 1330 is the base class for all network services. It suitably extends the function of Base class 302. Its functionality is detailed in Table 97.

TABLE 97

Service Class Functions and Descriptions

| Function | Description |
|---|---|
| public Protocol getRequiredProtocols( ) | |
| public boolean isEnabled( ) | |
| public void RestoreDefaults( ) | Restores factory default settings for all properties. |
| public void setEnabled(boolean enabled) | |

The TCPIP class 1332 represents the TCP/IP protocol. The TCPIP class 1332 is suitably a specialization of Protocol class 1326. Its functionality is detailed in Table 98.

TABLE 98

TCPIP Class Functions

Function public int[ ] getDNS1( )
public int[ ] getDNS2( )
public int[ ] getGateway( )
public int[ ] getIPAddress( )
public int[ ] getSubnetMask( )
public int[ ] getWINS1( )
public int[ ] getWINS2( )
public String getWINSScopeID( )
public boolean isDHCP( )
public void setDHCP(boolean DHCP)
public void setDNS1(int[ ] DNS1)
public void setDNS2(int[ ] DNS2)
public void setGateway(int[ ] gateway)

TABLE 98-continued

TCPIP Class Functions

Function public void setIPAddress(int[ ] IPAddress)
public void setSubnetMask(int[ ] subnetMask)
public void setWINS1(int[ ] WINS1)
public void setWINS2(int[ ] WINS2)
public void setWINSScopeID(String WINSScopeID)

The WirelessEthernetAdapter class 1334 represents a wireless Ethernet adapter. The WirelessEthernetAdapter class 1334 is suitably a specialization of Adapter class 1302. Its functionality is detailed in Table 99.

TABLE 99

WirelessEthernetAdapter Class Functions

Function public String getAdapterModel( )
public String getAdapterVersion( )
public String getAuthenticationType( )
public int getChannel( )
public String getCountryVersion( )
public int getDataRate( )
public int getDataRetries( )
public String getDfltAccessPoint( )
public int getFragmentThreshold( )
public String getManufacturer( )
public String getNetworkType( )
public int getRTSRetryLimit( )
public int getRTSThreshold( )
public String getSSID( )
public int getWEPencryptionStrength( )
public int getXmitPower( )
public void setAdapterModel(String adapterModel)
public void setAdapterVersion(String adapterVersion)
public void setAuthenticationType(String authenticationType)
public void setChannel(int channel)
public void setCountryVersion(String countryVersion)
public void setDataRate(int dataRate)
public void setDataRetries(int dataRetries)
public void setDfltAccessPoint(String dfltAccessPoint)
public void setFragmentThreshold(int fragmentThreshold)
public void setManufacturer(String manufacturer)
public void setNetworkType(String networkType)
public void setRTSRetryLimit(int RTSRetryLimit)
public void setRTSThreshold(int RTSThreshold)
public void setSSID(String SSID)
public void setWEPencryptionStrength(int WEPencryptionStrength)
public void setWEPkey(String WEPkey)
public void setXmitPower(int xmitPower)

Figure 10:
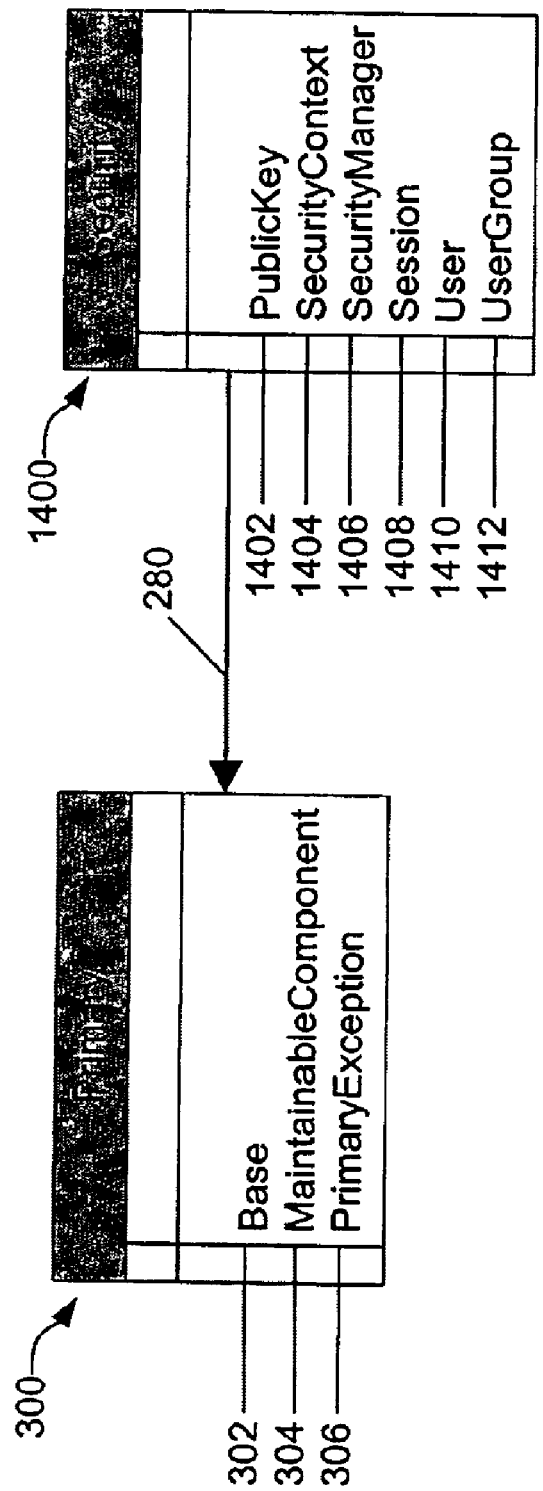
FIG. 10 is a diagram showing the details of one embodiment of a security component package and its relation to the primary component package.

Turning now to FIG. 10, a diagram is provided showing the classes of Primary package 300 and structure of the Security package 1400. The Security package 1400 is related to Primary package 300 through the Primary-Security Relationship 280. The Security package 1400 comprises a number of classes. Its structure is detailed in Table 100.

TABLE 100

Structure of Primary.Security Package

| Element | Type |
|---|---|
| PublicKey | Class |
| SecurityContext | Class |
| SecurityManager | Class |

TABLE 100-continued

Structure of Primary.Security Package

| Element | Type |
|---|---|
| Session | Class |
| User | Class |
| UserGroup | Class |

The PublicKey class 1402 suitably represents the public keys used when transmitting secured information over an non-secure connection. The PublicKey class 1402 is suitably a specialization of java.lang.Object. Its functionality is detailed in Table 101.

TABLE 101

PublicKey Class Functions and Descriptions

| Function | Description |
|---|---|
| public String export( ) | Exports the key into a MIME encoded string.<br>Throws: PrimaryException |
| public void ImportFromString(String key) | Imports the public key from a MIME encoded string.<br>Throws: PrimaryException |
| public void ImportFromURL(String url) | Imports the public key from an URL. Encoding depends on the protocol used.<br>Throws: PrimaryException |

The SecurityContext class 1404 suitably represents the security context of a client. The security context is used to represent client's identity and access rights for a secured device and is suitably obtained through authentication. The SecurityContext class 1404 is suitably a specialization of java.lang.Object. Its functionality is detailed in Table 102.

TABLE 102

SecurityContext Class Functions

| Function |
|---|
| public Session getSession( ) |

The SecurityManager class 1406 suitably represents an object that encapsulates the context and behavior associated with security management. The SecurityManager class 1406 is suitably a specialization of Base class 302. Its functionality is detailed in Table 103.

TABLE 103

SecurityManager Class Functions and Descriptions

| Function | Description |
|---|---|
| public void AddUser(User user) | Adds a user to the list of users.<br>Throws: PrimaryException<br>Parameter doc:<br>user - user object to add |
| public void AddUserGroup (UserGroup user) | Adds a group to the list of groups.<br>Throws: PrimaryException<br>Parameter doc:<br>group - group object to add |

TABLE 103-continued

SecurityManager Class Functions and Descriptions

| Function | Description |
|---|---|
| public PublicKey getDevPublcKey( ) | Retrieves device's public key used for secure transmission.<br>See: setClientPublicKey<br>Return doc:<br>Public key of the device, so that user names and passwords can be exchanged with clients |
| public UserGroup getUserGroups( )<br>public User getUsers( ) | |
| public Session Logon(String name, String password) | Authenticates a user and returns a security context.<br>Throws: PrimaryException<br>Return doc:<br>Security descriptor encapsulating user's identity. |
| public void RemoveUser(User user) | Removes existing user.<br>Throws: PrimaryException<br>Parameter doc:<br>user - user object to remove |
| public void RemoveUserGroup(UserGroup user) | Removes a group from the list of groups. Must have administrative privileges.<br>Throws: PrimaryException<br>Parameter doc:<br>group - group object to remove |
| public void setUserGroups(UserGroup userGroups)<br>public void setUsers(User users) | |

The Session class 1408 suitably represents an object that encapsulates the settings maintained during a logon session. The Session class 1408 is suitably a specialization of Base class 302. Its functionality is detailed in Table 104.

TABLE 104

Session Class Functions and Descriptions

| Function | Description |
|---|---|
| public SecurityContext ChangeIdentity(SecurityContext newId) | Change the current identity of the user interacting with the device. Requires previous logon with the device to establish the a security context for the new identity.<br>Return doc:<br>The security context of the old identity. |
| public LogicalController getController( )<br>public Locale getLocale( )<br>public String getOverrideTimeFormat( )<br>public SecurityContext getSecurityContext( )<br>public int getUTCOffset( ) | |
| public void Logoff( ) | Logs off the current user. |
| public void setClientPublicKey(PublicKey clientPublicKey)<br>public void setController(LogicalController controller)<br>public void setLocale(Locale locale)<br>public void setOverrideTimeFormat(String overrideTimeFormat)<br>public void setUTCOffset(int UTCOffset) | |

The User class 1410 suitably represents a single authenticatable user. The User class 1410 is suitably a specialization of Base class 302. Its functionality is detailed in Table 105.

TABLE 105

User Class Functions

Function public String getDescription( )
public String getEmail( )
public String getFirst( )
public UserGroup getGroups( )
public String getID( )
public String getLast( )
public void setDescription(String description)
public void setEmail(String email)
public void setFirst(String first)
public void setGroups(UserGroup groups)
public void setID(String ID)
public void setLast(String last)
public void setPassword(String password)

The UserGroup class 1412 suitably represents a group of users. The Session class 1412 is suitably a specialization of Base class 302. Its functionality is detailed in Table 105.

TABLE 105

UserGroup Class Functions

Function public UserGroup getGroups( )
public String getName( )
public User getUsers( )
public void setGroups(UserGroup groups)
public void setName(String name)

Figure 11:
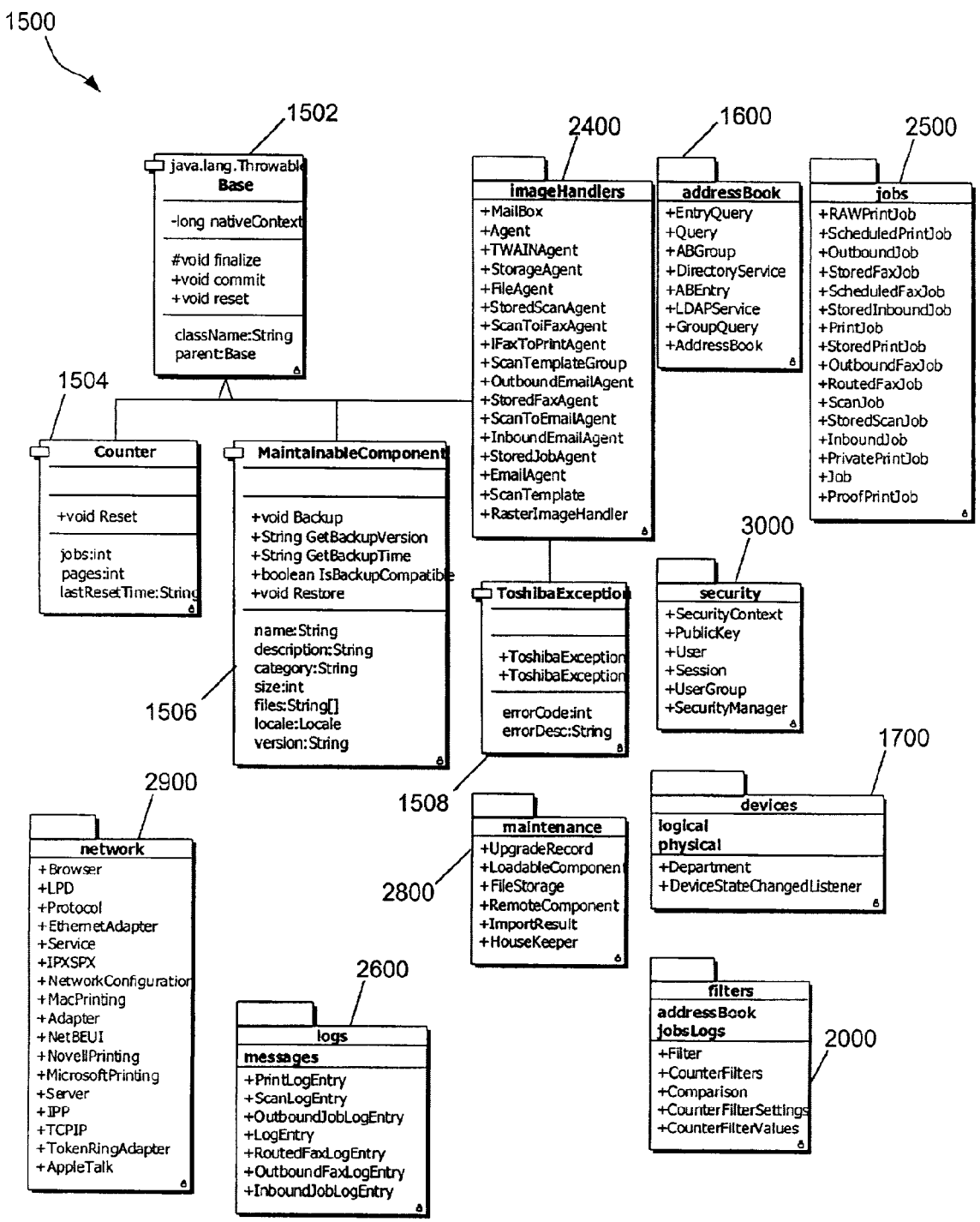
FIG. 11 is a class diagram representing a primary package in a presently preferred embodiment of the invention.

Turning now to FIG. 11, there is provided a class diagram representing the Primary package 1500 in a presently preferred embodiment of the invention. The Primary package 1500 comprises a number of packages, including: an AddressBook package 1600, a Devices package 1700, a Filters package 2000, an ImageHandlers package 2400, a Jobs package 2500, a Logs package 2600, a Maintenance package 2800, Network package 2900, and a Security package 3000. A list of the elements of Primary package 1500 is shown in Table 106.

TABLE 106

Structure of Primary Package

| Element | Type |
| --- | --- |
| Base | Class |
| Counter | Class |
| MaintainableComponent | Class |
| ToshibaException | Class |
| AddressBook | Package |
| Devices | Package |
| Filters | Package |
| ImageHandlers | Package |
| Jobs | Package |
| Logs | Package |
| Maintenance | Package |
| Network | Package |
| Security | Package |

As shown in Table 106, the Primary package 1500 comprises four classes: Base 1502, Counter 1504, MaintainableComponent 1506, and ToshibaException 1508. The Base class 1502 is the base class for all SCs used in the packages subordinate to Primary package 1500. Base class 1502 is suitably a specialization of java.lang.Throwable. The functionality of Base class 1502 is detailed in Table 107.

TABLE 107

Base Class Functions and Descriptions

| Function | Description |
| --- | --- |
| public native void commit( ) | Commits object to persistent storage. Ignored for transient objects. Throws: ToshibaException |
| protected native void finalize( ) | Finalization method override -- internal. |
| protected native String getClassName( ) | Class name retrieval -- internal |
| public native Base getParent( ) | Retrieves the parent object -- the object with the smallest life scope that completely encloses the life scope of this object. |
| public native void reset( ) | Resets the object's state to what it was after the last commit. Ignored for transient objects. Throws: ToshibaException |

The Counter class 1504 represents a single job and page counter. It is a specialization of Base class 1502. The functionality of Counter class 1504 is detailed in Table 108.

TABLE 108

Counter Class Functions and Descriptions

| Function | Description |
| --- | --- |
| public native int getJobs( ) | |
| public native String getLastResetTime( ) | |
| public native int getPages( ) | |
| public native void Reset( ) | Retrieves the parent object -- the object with the smallest life scope that completely encloses the life scope of this object. Resets the counts kept in that object. If filtering by Department is active, that operation will apply only to that department. Throws: ToshibaException |

The MaintainableComponent class 1506 is an abstraction for a component that is suitably maintained by the user. It is suitably a specialization of Base class 1502. The functionality of the MaintainableComponent class 1506 is detailed in Table 109.

TABLE 109

MaintainableComponent Class Functions and Descriptions

| Function | Description |
| --- | --- |
| public native void Backup(String toURL) | Backs up this component given a target URL. Existing files on the target URL will be replaced. Throws: PrimaryException Parameter doc: Incremental - TRUE to perform incremental operation fromURL - URL to restore from |
| public native String GetBackupTime(String fromURL) | Retrieve the time of a backup given the backup file. Throws: ToshibaException Return doc: Backup time Parameter doc: fromURL -- the URL to check for backup time from |
| public native String GetBackupVersion(String fromURL) | Retrieve the version of a backup file. Throws: ToshibaException Return doc: Backup time Parameter doc: fromURL -- the URL to check for backup from |

TABLE 109-continued

MaintainableComponent Class Functions and Descriptions

| Function | Description |
| --- | --- |
| public native String getCategory( ) | |
| public native String getDescription( ) | |
| public native String getFiles( ) | |
| public native Locale getLocale( ) | |
| public native String getName( ) | |
| public native int getSize( ) | |
| public native boolean IsBackupCompatible(String fromURL) | Returns indication whether a backup file at the specified URL is compatible with this component.<br>Throws: ToshibaException<br>Parameter doc:<br>fromURL -- URL to check backup file from |
| public native void Restore(String fromURL, boolean incremental) | Restore component from a URL.<br>Parameter doc:<br>incremental - TRUE to perform incremental operation<br>fromURL - URL to restore from |

The ToshibaException class 1508 is the base class for all exceptions. It is suitably a specialization of Base class 1502. The functionality of ToshibaException class 1508 is detailed in Table 110.

TABLE 110

ToshibaException Class Functions

Function public native int getErrorCode( )
public native String getErrorDesc( )
protected native void setErrorCode(int errCode)
protected native void setErrorDesc(String errDesc)

Figure 12:
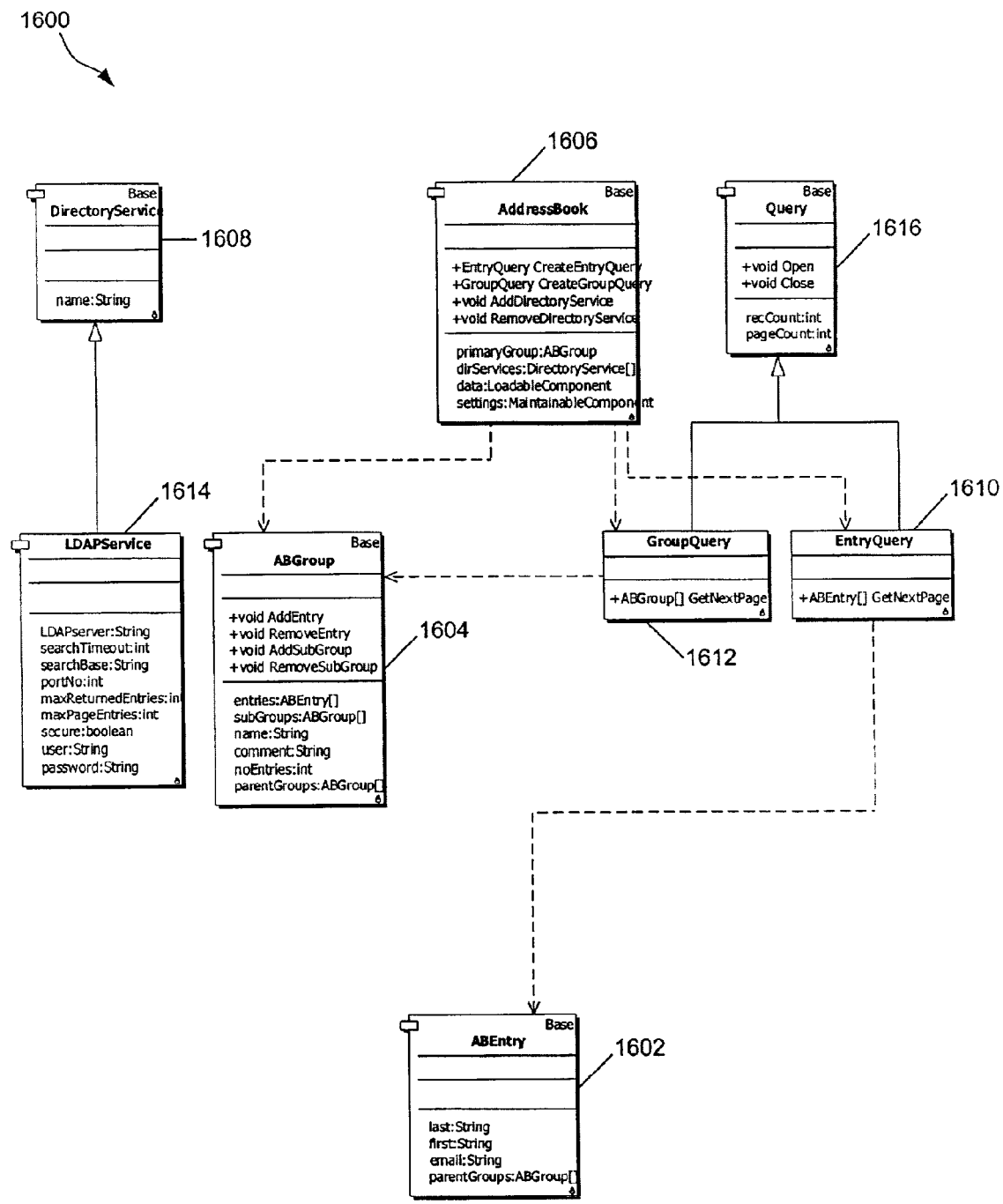
FIG. 12 is a class diagram representing an address book package in a presently preferred embodiment of the invention.

Turning now to FIG. 12, a class diagram representing the AddressBook package 1600 in a presently preferred embodiment of the invention is provided. The AddressBook package 1600 comprises a number of classes. Its structure is detailed in Table 111.

TABLE 111

Structure of AddressBook Package

| Element | Type |
| --- | --- |
| ABEntry | Class |
| ABGroup | Class |
| AddressBook | Class |
| DirectoryService | Class |
| EntryQuery | Class |
| GroupQuery | Class |
| LDAPService | Class |
| Query | Class |

The ABEntry class 1602 suitably represents a single entry in an Address Book. It is suitably a specialization of Base class 1502. The functionality of the ABEntry 1602 class is detailed in Table 112.

TABLE 112

ABEntry Class Functions

Function public native String getEmail( )
public native String getFirst( )
public native String getLast( )
public native ABGroup getParentGroups( )
public native void setEmail(String email)
public native void setFirst(String first)
public native void setLast(String last)

The ABGroup 1604 class suitably represents an Address Book group. It is suitably a specialization of Base class 1502. The functionality of the ABGroup 1604 class is detailed in Table 113.

TABLE 113

ABGroup Class Functions

| Function | Description |
| --- | --- |
| public native void AddEntry(ABEntry entry) | Add specified entry to the address book and associate it with this group. |
| public native void AddSubGroup(ABGroup subGroup) | Add specified group as a sub-group. |
| public native String getComment( ) | |
| public native ABEntry getEntries( ) | |
| public native String getName( ) | |
| public native int getNoEntries( ) | |
| public native ABGroup getParentGroups( ) | |
| public native ABGroup getSubGroups( ) | |
| public native void RemoveEntry(ABEntry entry) | Remove specified entry from this group. |
| public native void RemoveSubGroup(ABGroup subGroup) | Remove specified group from being a sub-group. |
| public native void setComment(String comment) | |
| public native void setName(String name) | |
| public native void setParentGroups(ABGroup parentGroups) | |

The AddressBook class 1606 suitably represents an address book, which is suitably a collection of entries, groups and directory services. It suitably depends on ABGroup class 1604, EntryQuery class 1610, and GroupQuery class 1612. The AddressBook class 1606 is suitably a specialization of Base class 1502. The functionality of the AddressBook class 1606 is detailed in Table 114.

TABLE 114

AddressBook Class Functions and Descriptions

| Function | Description |
| --- | --- |
| public native void AddDirectoryService(DirectoryService service) | Add new directory service.<br>Throws: ToshibaException<br>Parameter doc:<br>service - directory service to add |
| public native EntryQuery CreateEntryQuery(DirectoryService service, ABEntryFilterSettings last) | Query entries using specified directory service based on partial first, last and email.<br>Throws: ToshibaException<br>Parameter doc:<br>first - partial first name<br>last - partial last name<br>email - partial email address |

TABLE 114-continued

AddressBook Class Functions and Descriptions

| Function | Description |
|---|---|
| public native GroupQuery CreateGroupQuery(DirectoryService service, ABGroupFilterSettings filter) | Create query for groups using specified directory service and partial group name. Throws: ToshibaException Parameter doc: service - directory service to use; NULL to search address book itself grpName - partial group name |
| public native LoadableComponent getData( ) | |
| public native DirectoryService getDirServices( ) | |
| public native ABGroup getPrimaryGroup( ) | |
| public native MaintainableComponent getSettings( ) | |
| public native void RemoveDirectoryService(DirectoryService service) | Remove existing directory service. Throws: ToshibaException Parameter doc: service - directory service to remove |

The DirectoryService class 1608 is suitably an abstract representation of a name lookup service or directory service. It is suitably a specialization of Base class 1502. The functionality of the DirectoryService class 1608 is detailed in Table 115.

TABLE 115

DirectoryService Class Functions

Function public native String getName( )
public native void SetName(String name)

The EntryQuery class 1610 is suitably a representation of a query for address book entries. It suitably depends on ABEntry class 1602. The EntryQuery class 1610 is suitably a specialization of Query class 1616. Its functionality is detailed in Table 116.

TABLE 116

EntryQuery Class Functions and Descriptions

| Function | Description |
|---|---|
| public native ABEntry GetNextPage( ) | Retrieve the next page of entries. Throws: ToshibaException |

The GroupQuery 1612 class is suitably a representation of a query for address book groups. It is suitably a specialization of Query class 1616. The functionality of the GroupQuery class 412 is detailed in Table 117.

TABLE 117

GroupQuery Class Functions and Descriptions

| Function | Description |
|---|---|
| public native ABGroup GetNextPage( ) | Retrieve the next page of groups. Throws: ToshibaException |

The LDAPService class 1614 is a specialization of DirectoryService class 1608 for the LDAP protocol. The functionality of the LDAPService class 1614 is detailed in Table 118.

TABLE 118

LDAPService Class Functions

Function public native String getLDAPserver( )
public native int getMaxPageEntries( )
public native int getMaxReturnedEntries( )
public native String getPassword( )
public native int getPortNo( )
public native String getSearchBase( )
public native int getSearchTimeout( )
public native String getUser( )
public native boolean isSecure( )
public native void setLDAPserver(String LDAPserver)
public native void setMaxPageEntries(int maxPageEntries)
public native void setMaxReturnedEntries(int maxReturnedEntries)
public native void setPassword(String password)
public native void setPortNo(int portNo)
public native void setSearchBase(String searchBase)
public native void setSearchTimeout(int searchTimeout)
public native void setSecure(boolean secure)
public native void setUser(String user)

The Query class 1616 is suitably a representation of a query for address book groups or individual entries. It is suitably a specialization of Base class 1502. The functionality of the Query class is detailed in Table 119.

TABLE 119

Query Class Functions and Descriptions

| Function | Description |
|---|---|
| public native void Close( ) | Close query. Throws: PrimaryException |
| public native int getPageCount( ) | |
| public native int getRecCount( ) | |
| public native void Open( ) | Open or execute query. Throws: PrimaryException |
| public native void setPageCount(int pageCount) | |
| public native void setRecCount(int recCount) | |

Figure 13:
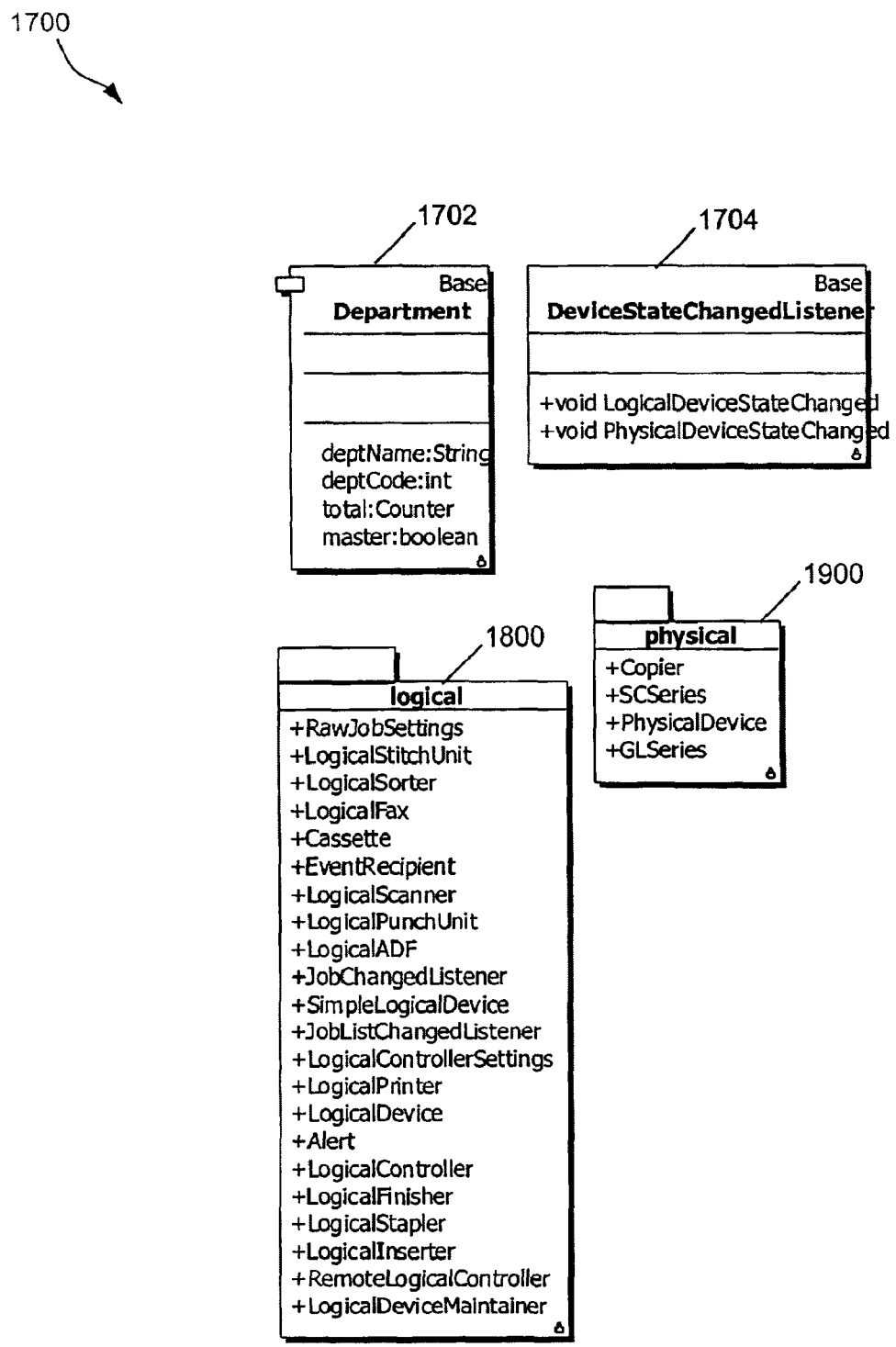
FIG. 13 is a class diagram representing a devices package in a presently preferred embodiment of the invention.

Turning now to FIG. 13, a class diagram representing the Devices package 1700 in a presently preferred embodiment of the invention is provided. The Devices package 1700 comprises classes and subpackages. Its structure is detailed in Table 120.

TABLE 120

Structure of Devices Package

| Element | Type |
| --- | --- |
| Department | Class |
| DeviceStateChangedListener | Class |
| Logical | Package |
| Physical | Package |

The Department class 1702 is suitably a representation of a department. It is an abstraction used to account for resource usage. Each department is suitably assigned a unique identification. In corporate environments, departments often correspond to business subdivisions. The Department class 1702 is suitably a specialization of Base class 1502. Its functionality is detailed in Table 121.

TABLE 121

Department Class Functions

Function public native int getDeptCode( )
public native String getDeptName( )
public native Counter getTotal( )
public native boolean isMaster( )
public native void setDeptCode(int deptCode)
public native void setDeptName(String deptName)

The DeviceStateChangedListener class 1704 is suitably the base class for "device changed state" events. It is suitably a specialization of Base class 1502. The functionality of the DeviceStateChangedListener class 1706 is detailed in Table 122.

TABLE 122

DeviceStateChangedListener Class Functions and Descriptions

| Function | Description |
| --- | --- |
| public native void LogicalDeviceStateChanged(LogicalDevice device) | Called when logical device changed state. |
| public native void PhysicalDeviceStateChanged(PhysicalDevice device) | |

The Logical subpackage 1800 and Physical subpackage 1900 each comprises a number of classes.

Figure 14:
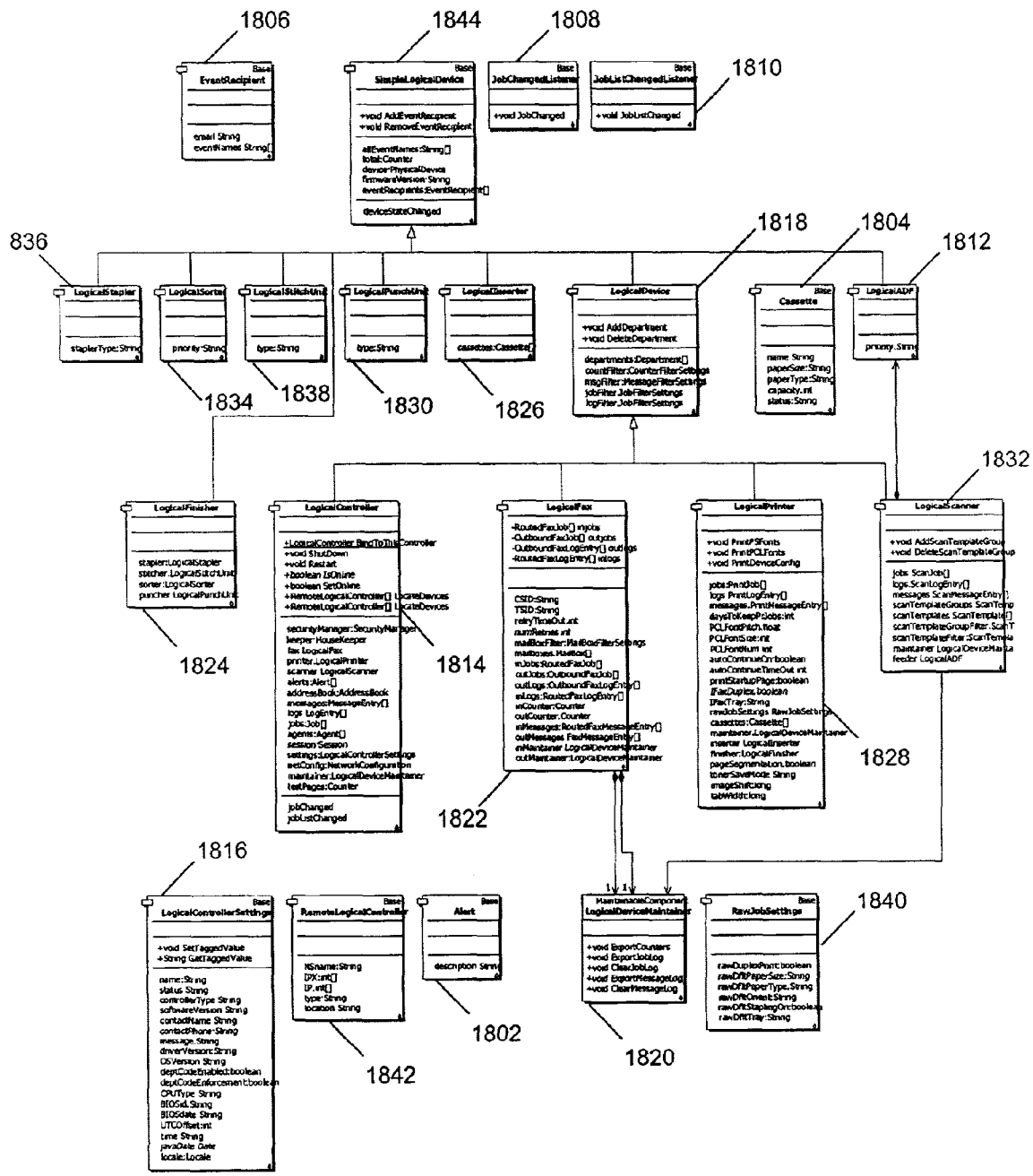
FIG. 14 is a class diagram representing a logical devices package in a presently preferred embodiment of the invention.

Turning now to FIG. 14, a class diagram representing the Logical subpackage 1800 in a presently preferred embodiment of the invention is provided. The Logical subpackage 1800 comprises a plurality of classes. Its structure is detailed in Table 123.

TABLE 123

Structure of Logical Subpackage

| Element | Type |
| --- | --- |
| Alert | Class |
| Cassette | Class |
| EventRecipient | Class |
| JobChangedListener | Class |
| JobListChangedListener | Class |

TABLE 123-continued

Structure of Logical Subpackage

| Element | Type |
| --- | --- |
| LogicalADF | Class |
| LogicalController | Class |
| LogicalControllerSettings | Class |
| LogicalDevice | Class |
| LogicalDeviceMaintainer | Class |
| LogicalFax | Class |
| LogicalFinisher | Class |
| LogicalInserter | Class |
| LogicalPrinter | Class |
| LogicalPunchUnit | Class |
| LogicalScanner | Class |
| LogicalSorter | Class |
| LogicalStapler | Class |
| LogicalStitchUnit | Class |
| RawJobSettings | Class |
| RemoteLogicalController | Class |
| SimpleLogicalDevice | Class |

The Alert class 1802 is suitably a generic device alert. Alerts suitably originate from logical devices and Alert objects are preferably read-only. The Alert class 1802 is suitably a specialization of Base class 1502. Its functionality is detailed in Table 124.

TABLE 124

Alert Class Functions and Descriptions

| Function | Description |
| --- | --- |
| public native String getDescription( ) | Retrieves the description of the alert |

The Cassette class 1804 suitably represents a single paper cassette of a DID. The Cassette class 1804 is suitably a specialization of Base class 1502. Its functionality is detailed in Table 125.

TABLE 125

Cassette Class Functions and Descriptions

| Function | Description |
| --- | --- |
| public native int getCapacity( ) | Retrieves capacity of the cassette. |
| public native String getName( ) | Retrieves the unique name of the cassette. |
| public native String getPaperSize( ) | Retrieves paper size currently loaded in the cassette. |
| public native String getPaperType( ) | Retrieves the paper type (logo, hole-punched, etc.) of the cassette. |
| public native String getStatus( ) | Retrieves the status of the cassette. |
| public native void setPaperType(String paperType) | |

The EventRecipient class 1806 suitably represents a single event recipient. The EventRecipient class 1806 is suitably a specialization of Base class 1502. Its functionality is detailed in Table 126.

TABLE 126

EventRecipient Class Functions and Descriptions

| Function | Description |
| --- | --- |
| public native String getEmail( ) | Retrieve the email address of the recipient. |
| public native String getEventNames( ) | |
| public native void setEmail(String email) | |
| public native void setEventNames(String eventNames) | |

The JobChangedListener class 1808 is suitably an abstract base class for job change events listeners. The JobChangedListener class 1808 is suitably a specialization of Base class 1502. Its functionality is detailed in Table 127.

TABLE 127

JobChangedListener Class Functions and Descriptions

| Function | Description |
| --- | --- |
| public native void JobChanged(Job job) | Called when a job has changed. The argument identifies the particular job that has changed. See: Primary.Jobs |

The JobListChangedListener class 1810 is suitably a base class for job list change events. The JobListChangedListener class 1810 is suitably a specialization of Base class 1502. Its functionality is detailed in Table 128.

TABLE 128

JobListChangedListener Class Functions and Descriptions

| Function | Description |
| --- | --- |
| public native void JobListChanged(String jobType) | Called when the job list has changed. The argument contains the type of job list that has changed. See: Primary.Jobs |

The LogicalADF class 1812 suitably represents a logical Automatic Document Feeder ("ADF"), which is a device that receives input sheets for scanning, copying, etc. The LogicalADF class 1812 is suitably a specialization of SimpleLogicalDevice class 1844. Its functionality is detailed in Table 128.

TABLE 128

LogicalADF Class Functions

| Function |
| --- |
| public native String getPriority( ) |
| public native void setPriority(String priority) |

The LogicalController class 1814 is suitably a representation of a logical device controller, preferably a logical device that controls other logical devices, such as a logical printer or logical scanner. The LogicalController class 1814 is suitably a specialization of LogicalDevice class 1818. Its functionality is detailed in Table 129.

TABLE 129

LogicalController Class Functions and Descriptions

| Function | Description |
| --- | --- |
| public native void addJobChangedListener(JobChangedListener listener) | |
| public native void addJobListChangedListener(JobListChangedListener listener) | |
| public static native LogicalController BindToThisController( ) | Binds to the LogicalController object to which the server is associated. Throws: ToshibaException Return doc: The logical controller |
| public native AddressBook getAddressBook( ) | |
| public native Agent getAgents( ) | |
| public native Alert getAlerts( ) | |
| public native LogicalFax getFax( ) | |
| public native Job getJobs( ) | |
| public native HouseKeeper getKeeper( ) | |
| public native LogEntry getLogs( ) | |
| public native LogicalDeviceMaintainer getMaintainer( ) | |
| public native MessageEntry getMessages( ) | |
| public native NetworkConfiguration getNetConfig( ) | |
| public native LogicalPrinter getPrinter( ) | |
| public native LogicalScanner getScanner( ) | |
| public native SecurityManager getSecurityManager( ) | |
| public native Session get Session( ) | Retrieves the session associated with the controller or null object if no session exists |
| public native LogicalControllerSettings getSettings( ) | |
| Public native Counter getTestPages( ) | |
| public native boolean IsOnline( ) | Returns the "online" state of the controller. Return doc: Current state of the controller. |
| public native RemoteLogicalController LocateDevices(int[ ] IPfrom, int[ ] IPto, | Locate devices from a range of IP addresses, controller and network protocol types. |

TABLE 129-continued

LogicalController Class Functions and Descriptions

| Function | Description |
|---|---|
| String controllerTypes, String protocols) | Parameter doc:<br>IPfrom - the beginning IP address<br>IPto - the ending IP address controller<br>Types - type names for the controllers to be located<br>protocols - network protocol names to be used for location<br>Return doc:<br>Array of RemoteLogicalController objects -- one for each distinct device found. |
| public native RemoteLogicalController LocateDevices(String controllerTypes, String protocols, int[] subnet) | Locates devices on a particular subnet by specifying controller and network protocol types.<br>Return doc:<br>Array of RemoteLogicalController objects -- one for each distinct device found.<br>Parameter doc:<br>controllerTypes - array of strings containing the type names of the controllers to be located.<br>protocols - array of network protocol names to be used for location<br>subnet - array of integers indicating the subnet to be used for location; if null controller's subnet is used |
| public native synchronized void removeJobChangedListener(JobChangedListener listener)<br>public native void removeJobListChangedListener(JobListChangedListener listener) | |
| public native void Restart(boolean bSoft) | Restarts the controller.<br>Parameter doc:<br>bSoft - TRUE to perform software restart; FALSE to reboot completely. |
| public native void setNetConfig(NetworkConfiguration netConfig) | |
| public native boolean SetOnline(boolean newState) | Sets the controller's online state.<br>Return doc:<br>The previous "online" state. |
| public native void ShutDown( ) | Shuts down the controller. |

The LogicalControllerSettings class 1816 is suitably a representation of the settings of a logical controller. Preferably, the controller has a set of constants that change only when the controller software is upgraded. The LogicalControllerSettings class 1816 is suitably a specialization of Base class 1502. Its functionality is detailed in Table 130.

TABLE 130

LogicalControllerSettings Class Functions and Descriptions

| Function | Description |
|---|---|
| public native String getBIOSdate( ) | |
| public native String getBIOSid( ) | |
| public native String getContactName( ) | |
| public native String getContactPhone( ) | |
| public native String getControllerType( ) | |
| public native String getCPUType( ) | |
| public native String getDriverVersion( ) | |
| public native Date getJavaDate( ) | |
| public native Locale getLocale( ) | |
| public native String getMessage( ) | |
| public native String getName( ) | |
| public native String getOSVersion( ) | |
| public native String getSoftwareVersion( ) | |
| public native String getStatus( ) | |
| public native String GetTaggedValue(String name) | Retrieves a tagged value by name.<br>Throws:<br>PrimaryException<br>Return doc:<br>tagged value<br>Parameter doc:<br>name -- name of the value to get |
| public native String getTime( ) | |
| public native int getUTCOffset( ) | |
| public native boolean isDeptCodeEnabled( ) | |
| public native boolean isDeptCodeEnforcement( ) | |

TABLE 130-continued

LogicalControllerSettings Class Functions and Descriptions

| Function | Description |
| --- | --- |
| public native void setContactName(String contactName) | |
| public native void setContactPhone(String contactPhone) | |
| public native void setDeptCodeEnforcement(boolean deptCodeEnforcement) | |
| public native void setJavaDate(Date javaDate) | |
| public native void setLocale(Locale locale) | |
| public native void setMessage(String message) | |
| public native void SetTaggedValue(String name, String val) | Sets the tagged value.<br>Throws:<br>PrimaryException<br>Parameter doc:<br>name -- name of the value to set<br>val -- value to set |
| public native void setTime(String time) | |
| public native void setUTCOffset(int UTCOffset) | |

The LogicalDevice class 1818 is suitably an abstract class representation a logical device. Logical devices are components of physical devices, which are actual devices that have physical form, i.e. those devices which one can walk up to and use. Each physical device preferably contains at least one logical device, while MFPs contain more than one logical device. The LogicalDevice class 1818 is suitably a specialization of SimpleLogicalDevice class 1844. Its functionality is detailed in Table 131.

TABLE 131

LogicalDevice Class Functions and Descriptions

| Function | Description |
| --- | --- |
| public native void AddDepartment(int deptCode, String deptName) | Adds a new department to the list.<br>Parameter doc:<br>deptCode - the new department's code<br>deptName - new department's name |
| public void DeleteDepartment(int deptCode) | Deletes existing department from the list.<br>Throws: PrimaryException<br>Parameter doc:<br>deptCode - the new department's code |
| public native CounterFilterSettings get CounterFilter( ) | |
| public native Department getDepartments( ) | |

TABLE 131-continued

LogicalDevice Class Functions and Descriptions

| Function | Description |
| --- | --- |
| public native JobFilterSettings getJobFilter( ) | |
| public native JobFilterSettings getLogFilter( ) | |
| public native MessageFilterSettings getMsgFilter( ) | |
| public void setCountFilter(Department countFilter) | |
| public void setJobFilter(JobFilterSettings jobFilter) | |
| public void setLogFilter(JobFilterSettings logFilter) | |
| public void setMsgFilter(MessageFilterSettings msgFilter) | |

The LogicalDeviceMaintainer class 1820 is closely related to LogicalController class 1814. It encapsulates the behavior and semantics associated with the maintenance of the LogicalController class 1814. The LogicalDeviceMaintainer class 1820 is suitably a specialization of MaintainableComponent class 1506. Its functionality is detailed in Table 132.

TABLE 132

LogicalDeviceMaintainer Class Functions and Descriptions

| Function | Description |
| --- | --- |
| public native void ClearJobLog(String timeEarliest) | Clears job log.<br>Throws: ToshibaException<br>Parameter doc:<br>timeEarliest - earliest time to be left any entries earlier than that time will be cleared; NULL for all |

TABLE 132-continued

LogicalDeviceMaintainer Class Functions and Descriptions

| Function | Description |
| --- | --- |
| public native void ClearMessageLog(String timeEarliest) | Clears message log.<br>Throws: ToshibaException<br>Parameter doc:<br>timeEarliest - earliest time to be left in; any entries earlier than that time will be cleared; NULL for all |
| public native void ExportCounters(String format, String exportURL, boolean bHeading) | Export the counter information. If filtering Department is active, that will export information only for that department.<br>Throws: ToshibaException<br>Parameter doc:<br>format - format name<br>exportURL - URL to store the exported file<br>heading - TRUE to include a heading row at the beginning |
| public native void ExportJobLog(String format, String exportURL, boolean bHeading) | Export job log into a specific format file on the network.<br>Throws: ToshibaException<br>Parameter doc:<br>format - format name<br>exportURL - URL to store the export file<br>heading - TRUE to include a heading row at the beginning |
| public native void ExportMessageLog(String format, String exportURL, boolean bHeading) | Exports message log into a particular format network file.<br>Throws: ToshibaException<br>Parameter doc:<br>format - format name<br>exportURL - network path to store the export file<br>heading - TRUE to include a heading row at the beginning |

The LogicalFax class 1822 is designed to represent a fax machine device. It is suitably a specialization of LogicalDevice class 1818. The LogicalFax class 1822 suitably depends on the LogicalDeviceMaintainer class 1820. Its functionality is detailed in Table 133.

TABLE 133

LogicalFax Class Functions

Function public native String getCSID( )
public native Counter getInCounter( )
public native RoutedFaxJob[] getInJobs( )
public native RoutedFaxLogEntry getInLogs( )
public native LogicalDeviceMaintainer getInMaintainer( )
public native RoutedFaxMessageEntry getInMessages( )
public native MailBox getMailboxes( )
public native MailBoxFilterSettings getMailboxFilter( )
public native int getNumRetries( )
public native Counter getOutCounter( )
public native OutboundFaxJob getOutJobs( )
public native OutboundFaxLogEntry getOutLogs( )
public native LogicalDeviceMaintainer getOutMaintainer( )
public native FaxMessageEntry getOutMessages( )
public native int getRetryTimeOut( )
public native String getTSID( )
public native setMailBoxFilter(MailBoxFilterSettings mailBoxFilter)

The LogicalFinisher class 1824 is designed to represent a logical finishing unit, which is a unit that finishes print output. It is suitably a specialization of SimpleLogicalDevice class 1844. The functionality of the LogicalFinisher class 1824 is detailed in Table 134.

TABLE 134

LogicalFinisher Class Functions

Function public native LogicalPunchUnit getPuncher( )
public native LogicalSorter getSorter( )
public native LogicalStapler getStapler( )
public native LogicaLStitchUnit getStitcher( )
public native void setPuncher(LogicalPunchUnit puncher)
public native void setSorter(LogicalSorter sorter)
public native void setStapler(LogicalStapler stapler)
public native void setStitcher(LogicalStitchUnit stitcher)

The LogicalInserter class 1826 is designed to represent a logical inserter unit, which is a device that combines preprinted sheets with device output. It is suitably a specialization of SimpleLogicalDevice class 1844. The functionality of the LogicalInserter class 1826 is detailed in Table 135.

TABLE 135

LogicalFinisher Class Functions

Function public native Cassette getCassettes( )

The LogicalPrinter class 1828 is designed to represent a printer or printing device. The LogicalPrinter class 1828 is suitably a specialization of LogicalDevice class 1818. Its functionality is detailed in Table 136.

TABLE 136

LogicalPrinter Class Functions and Descriptions

| Function | Description |
|---|---|
| public native int getAutoContinueTimeOut( ) | |
| public native Cassette getCassettes( ) | |
| public native int getDaysToKeepPrJobs( ) | |
| public native LogicalFinisher getFinisher( ) | |
| public native String getIFaxTray( ) | |
| public native long getImageShift( ) | |
| public native LogicalInserter getInserter( ) | |
| public native PrintJob getJobs( ) | |
| public native PrintLogEntry getLogs( ) | |
| public native LogicalDeviceMaintainer getMaintainer( ) | |
| public native PrintMessageEntry getMessages( ) | |
| public native int getPCLFontNum( ) | |
| public native float getPCLFontPitch( ) | |
| public native int getPCLFontSize( ) | |
| public native RawJobSettings getRawJobSettings( ) | |
| public native long getTabWidth( ) | |
| public native String getTonerSaveMode( ) | |
| public native boolean isAutoContinueOn( ) | |
| public native boolean isIFaxDuplex( ) | |
| public native boolean isPageSegmentation( ) | |
| public native boolean isPrintStartupPage( ) | |
| public native void PrintDeviceConfig( ) | Prints logical device configuration sheet<br>Throws: ToshibaException |
| public native void PrintPCLFonts( ) | Prints PCL fonts available on the logical device<br>Throws: ToshibaException |
| public native void PrintPSFonts( ) | Prints PostScript fonts available on the logical device<br>Throws: ToshibaException |
| public native void setAutoContinueOn(boolean autoContinueOn) | |
| public native void setAutoContinueTimeOut(int autoContinueTimeOut) | |
| public native void setDaysToKeepPrJobs(int daysToKeepPrJobs) | |
| public native void setFinisher(LogicalFinisher finisher) | |
| public native void setIFaxDuplex(boolean IFaxDuplex) | |
| public native void setIFaxTray(String IFaxTray) | |
| public native void setImageShift(long imageShift) | |
| public native void setInserter(LogicalInserter inserter) | |
| public native void setPageSegmentation(boolean pageSegmentation) | |
| public native void setPCLFontNum(int PCLFontNum) | |
| public native void setPCLFontPitch(float PCLFontPitch) | |
| public native void setPCLFontSize(int PCLFontSize) | |
| public native void setPrintStartupPage(boolean printStartupPage) | |
| public native void setTab Width (long TabWidth) | |
| public native void setTonerSaveMode(String tonerSaveMode) | |

The LogicalPunchUnit class 1830 is designed to represent a logical puncher unit, which is a device that punches holes in device output. It is suitably a specialization of SimpleLogicalDevice class 1844. The functionality of the LogicalPunchUnit class 1830 is detailed in Table 137.

TABLE 137

LogicalPunchUnit Class Functions

| Function |
|---|
| public native String getType( ) |

The LogicalScanner class 1832 is designed to represent a scanner. It is suitably a specialization of the LogicalDevice class 1818. The LogicalScanner class 1832 depends on LogicalDeviceMaintainer class 1820. Its functionality is detailed in Table 138.

TABLE 138

LogicalScanner Class Functions and Descriptions

| Function | Description |
|---|---|
| public void<br>AddScanTemplateGroup(ScanTemplateGroup newGroup) | Adds a Scan Template Group to the list.<br>Throws: ToshibaException<br>Parameter doc: |

TABLE 138-continued

LogicalScanner Class Functions and Descriptions

| Function | Description |
| --- | --- |
| | newGroup - object containing information about the new group |
| public void DeleteScanTemplateGroups(int[ ] templateGrpNos) | Deletes a list of template groups. Throws: ToshibaException Parameter doc: templateGrpNos -- array of template group numbers to delete Exception doc: ToshibaException -- some template group numbers were not found |
| public LogicalADF getFeeder( ) | |
| public ScanJob getJobs( ) | |
| public ScanLogEntry getLogs( ) | |
| public LogicalDeviceMaintainer getMaintainer( ) | |
| public ScanMessageEntry getMessages( ) | |
| public ScanTemplateFilterSettings getScanTemplateFilter( ) | |
| public ScanTemplateGroupFilterSettings getScanTemplateGroupFilter( ) | |
| public ScanTemplateGroup getScanTemplateGroups( ) | |
| public ScanTemplateGroup getScanTemplateGroups(int index) | |
| public ScanTemplate getScanTemplates( ) | |
| public void setFeeder(LogicalADF feeder) | |
| public void setScanTemplateFilter(ScanTemplateFilterSettings scanTemplateFilter) | |
| public void setScanTemplateGroupFilter(ScanTemplateGroupFilter Settings scanTemplateGroupFilter) | |
| public void setScanTemplateGroups(ScanTemplateGroup scanTemplateGroups) | |
| public void setScanTemplateGroups(int index, ScanTemplateGroup scanTemplateGroups) | |
| public void setScanTemplates(ScanTemplate scanTemplates) | |

The LogicalSorter class 1834 is designed to represent a logical sorter unit, which is a unit that sorts the device output. It is suitably a specialization of SimpleLogicalDevice class 1844. The functionality of the LogicalSorter class 1834 is detailed in Table 139.

TABLE 139

LogicalSorter Class Functions

| Function |
| --- |
| public native String getPriority( ) |
| public native void SetPriority(String priority) |

The LogicalStapler class 1836 is designed to represent a logical stapler unit, which is a unit that staples device output. It is suitably a specialization of SimpleLogicalDevice class 1844. The functionality of the LogicalStapler class 1836 is detailed in Table 140.

TABLE 140

LogicalStapler Class Functions

| Function |
| --- |
| public native String getStaplerType( ) |

The LogicalStitchUnit class 1838 is designed to represent a logical stiching unit, which is a unit that stitches device output. It is suitably a specialization of SimpleLogicalDevice class 1844. The functionality of the LogicalStitchUnit class 1838 is detailed in Table 141.

TABLE 141

LogicalStapler Class Functions

| Function |
| --- |
| public native String getType( ) |

The RawJobSettings class 1840 is an abstraction of the configuration parameters for RAW jobs, which are PDL-based jobs with no PJL commands. The RawJobSettings class 1840 is suitably a specialization of the Base class 1502. Its functionally is detailed in Table 142.

TABLE 142

RawJobSettings Class Functions

| Function |
| --- |
| public native String getRawDfltOrient( ) |
| public native String getRawDfltPaperSize( ) |

TABLE 142-continued

RawJobSettings Class Functions

Function public native String getRawDfltPaperType( )
public native String getRawDfltTray( )
public native boolean isRawDfltStaplingOn( )
public native boolean isRawDuplexPrint( )
public native void setRawDfltOrient(String rawDfltOrient)
public native void setRawDfltPaperSize(String rawDfltPaperSize)
public native void setRawDfltPaperType(String rawDfltPaperType)
public native void setRawDfltStaplingOn(boolean rawDfltStaplingOn)

The RemoteLogicalController class 1842 is an abstraction of a remote logical controller. This class is useful when locating controllers other than the controller currently being utilized.

The RemoteLogicalController class 1842 is suitably a specialization of the Base class 1502. Its functionality is detailed in Table 143.

TABLE 143

RemoteLogicalController Class Functions

Function public native int[ ]getIP( )
public native int[ ]getIPX( )
public native String getLocation( )
public native String getNSname( )
public native String getType( )
public native void setLocation(String location)

The SimpleLogicalDevice class 1844 is designed to represent a simple logical device, such as finishers, staplers, sorters, etc. It is suitably a specialization of the Base class 1502. The functionality of SimpleLogicalDevice class 1844 is detailed in Table 144.

Figure 15:
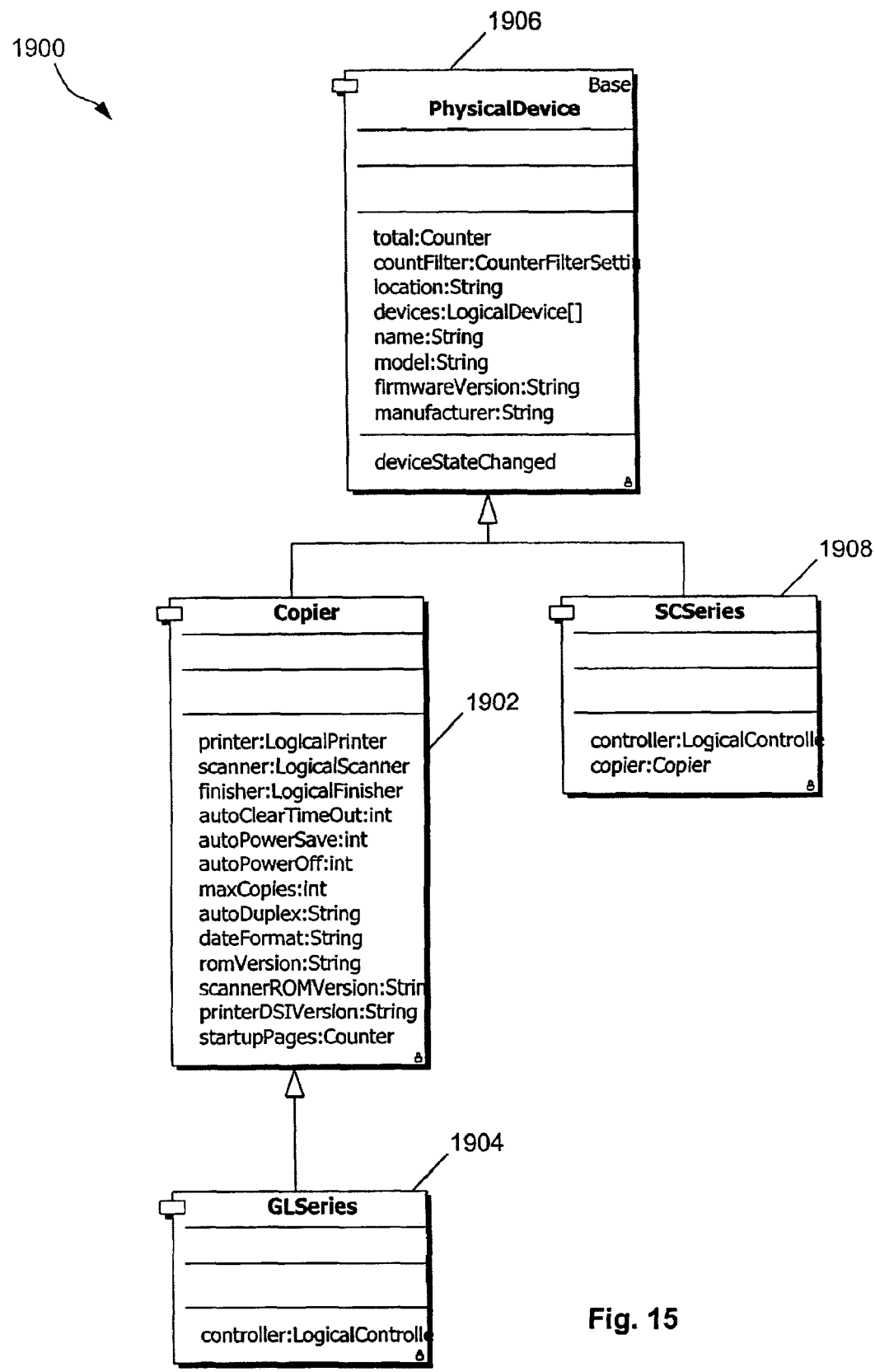
FIG. 15 is a class diagram representing a physical devices package in a presently preferred embodiment of the invention.

Turning now to FIG. 15, a class diagram representing a physical devices package in a presently preferred embodiment of the invention is provided. The Physical subpackage 1900 comprises a number of classes. Its structure is detailed in Table 145.

TABLE 145

Structure of Physical Subpackage

| Element | Type |
|---|---|
| Copier | Class |
| GLSeries | Class |
| PhysicalDevice | Class |
| SCSeries | Class |

The Copier class 1902 is an abstraction designed to represent a copier machine. The Copier class 1902 is suitably a specialization of PhysicalDevice class 1906. Its functionality is detailed in Table 146.

TABLE 146

Copier Class Functions

Function public native int getAutoClearTimeOut( )
public native String getAutoDuplex( )
public native int getAutoPowerOff( )
public native int getAutoPowerSave( )
public native String getDateFormat( )
public native LogicalFinisher getFinisher( )
public native int getMaxCopies( )
public native LogicalPrinter getPrinter( )
public native String getPrinterDSIVersion( )
public native String getRomVersion( )
public native LogicalScanner getScanner( )
public native String getScannerROMVersion( )
public native Counter getStartupPages( )
public native void setAutoClearTimeOut(int autoClearTimeOut)
public native void setAutoDuplex(String autoDuplex)
public native void setAutoPowerOff(int autoPowerOff)
public native void setAutoPowerSave(int autoPowerSave)

TABLE 144

SimpleLogicalDevice Class Functions and Descriptions

| Function | Description |
|---|---|
| public native void addDeviceStateChangedListener(DeviceStateChangedListener listener) | |
| public native void AddEventRecipient(EventRecipient newRecipient) | Adds an event recipient to the current list of recipients. Throws: ToshibaException Parameter doc: newRecipient - the new event recipient. |
| public static native String getAllEventNames( ) | Static method to retrieve all the possible event names. Return doc: Event names list (localized) |
| public native PhysicalDevice getDevice( ) | |
| public native EventRecipient getEventRecipients( ) | |
| public native String getFirmwareVersion( ) | |
| public native Counter getTotal( ) | |
| public native void removeDeviceStateChangedListener(DeviceStateChangedListener listener) | |
| public native void RemoveEventRecipient(EventRecipient recipient) | Removes an event recipient from the current list of recipients. Throws: ToshibaException Parameter doc: recipient - the existing event recipient. |

TABLE 146-continued

Copier Class Functions

Function public native void setDateFormat(String dateFormat)
public native void setFinisher(LogicalFinisher finisher)
public native void setMaxCopies(int maxCopies)
public native void setPrinterDSIVersion(String printerDSIVersion)
public native void setStartupPages(Counter startupPages)

It should be noted that an abstraction designed to represent any specific device is suitably added to the Physical subpackage 1900. As such, the PhysicalDevice subclass 1900 is suitably expandable to include classes for any DID device in the world. One such specific device series is the GLSeries device. The GLSeries class 1904 is an abstraction designed to represent a GLSeries device. The GLSeries class 1904 is suitably a specialization of Copier class 1902. Its functionality is detailed in Table 147.

TABLE 147

GLSeries Class Functions

Function public native LogicalController getController( )

Similarly, the SCSeries class 1908 is an abstraction designed to represent an SCSeries device controller. The SCSeries class 1908 is suitably a specialization of PhysicalDevice class 1906. Its functionality is detailed in Table 148.

TABLE 148

SCSeries Class Functions

Function public native LogicalController getController( )
public native Copier getCopier( )

The PhysicalDevice class 1906 is an abstraction designed to represent a physical device, which is an actual device that has physical form, i.e. those devices which one can walk up to and use. The PhysicalDevice class 1906 is suitably a specialization of Base class 1502. Its functionality is detailed in Table 149.

TABLE 149

PhysicalDevice Class Functions

Function public native void
addDeviceStateChangedListener(DeviceStateChangedListener listener)
public native CounterFilterSettings getCountFilter( )
public native LogicalDevice getDevices( )
public native String getFirmwareVersion( )
public native String getLocation( )
public native String getManufacturer( )
public native String getModel( )
public native String getName( )
public native Counter getTotal( )
public native void
removeDeviceStateChangedListener(DeviceStateChangedListener listener)
public native void setCountFilter(CounterFilterSettings countFilter)
public native void setLocation(String location)

Figure 16:
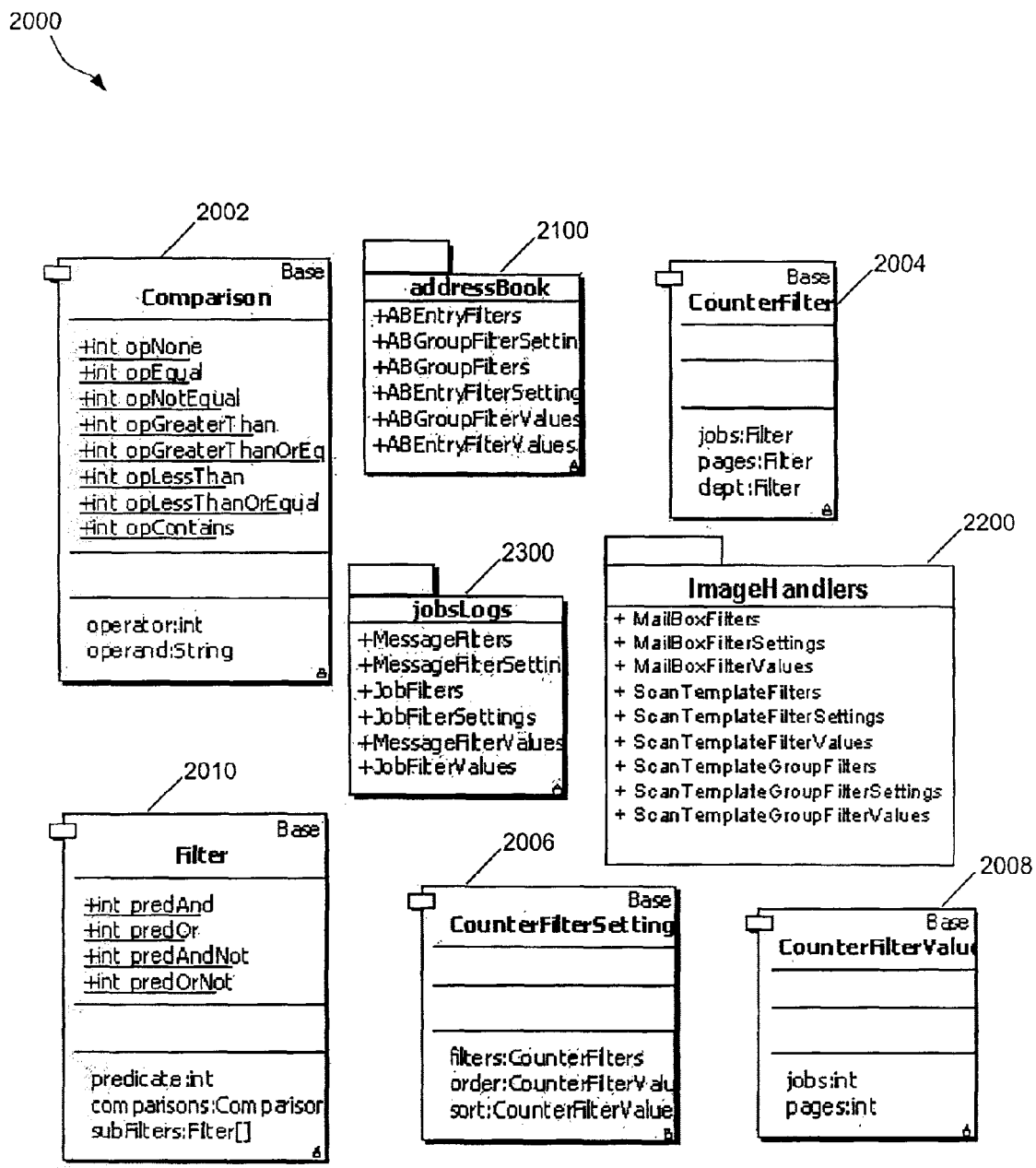
FIG. 16 is a class diagram representing a filters package in a presently preferred embodiment of the invention.

Turning now to FIG. 16, a class diagram representing a filters package in a presently preferred embodiment of the invention is provided. The Filters subpackage 2000 comprises a number of classes and subpackes. Its structure is detailed in Table 150.

TABLE 150

Structure of Filters Subpackage

| Element | Type |
| --- | --- |
| Comparison | Class |
| CounterFilter | Class |
| CounterFilterSettings | Class |
| CounterFilterValues | Class |
| Filter | Class |
| AddressBook | Package |
| ImageHandlers | Package |

The Comparison class 2002 is a data object that represents a single comparison. Comparison operators are suitably constants defined in the class. Preferably, the comparand is in a string form even when the actual data type is not in string form. The Comparison class 2002 is suitably a specialization of Base class 1502. Its functionality is detailed in Table 151.

TABLE 151

Comparison Class Functions

Function public native String getOperand( )
public native int getOperator( )
public native void setOperand(String operand)
public native void setOperator(int operator)

The CounterFilters class 2004 is a data object that represents counter filters. The CounterFilters class 2004 is suitably a specialization of Base class 1502. Its functionality is detailed in Table 152.

TABLE 152

CounterFilters Class Functions

Function public native Filter getDept( )
public native Filter getJobs( )
public native Filter getPages( )
public native void setDept(Filter dept)
public native void setJobs(Filter jobs)
public native void setPages(Filter pages)

The CounterFiltersSettings class 2006 is a container for all filter definations, such as the objects that are be retrieved, sorting orders, etc. The CounterFilterSettings class 2006 is suitably a specialization of Base class 1502. Its functionality is detailed in Table 153.

TABLE 153

CounterFilterSettings Class Functions

Function public native CounterFilters getFilters( )
public native CounterFilterValues getOrder( )
public native CounterFilterValues getSort( )
public native void setFilters(CounterFilters filters)

The CounterFiltersValues class 2008 denfines the sort order and column order in export operations. Sort numbers are preferably positive to indicate ascending sorts and negative to indicate descending sorts. The absolute values of the sort numbers suitably represent the sort order between the different fields, the number "1" having the highest priority and the number "0" having no sort. The CounterFilterValues class 2008 is suitably a specialization of Base class 1502. Its functionality is detailed in Table 154.

TABLE 154

CounterFilterSettings Class Functions

Function public native int getJobs( )
public native int getPages( )
public native void setJobs(int jobs)
public native void setPages(int pages)

The Filter class 2010 is a data object that represents a particular filter. A filter is preferably composed of a predicate and a list of comparisons that are affected by the predicate. Filters suitably have sub-filters, wherein each of the sub-filters evaluates to TRUE in order for the filter to evaluate to TRUE. The Filter class 2010 is suitably a specialization of Base class 1502. Its functionality is detailed in Table 155.

TABLE 155

Filter Class Functions

Function public native Comparison getComparisons( )
public native int getPredicate( )
public native Filter getSubFilters( )
public native void setComparisons(Comparison comparisons)
public native void setPredicate(int predicate)
public native void setSubFilters(Filter subFilters)

The AddressBook subpackage 2100, ImageHandlers subpackage 2200, and JobsLogs subpackage 2300 each comprises a number of classes.

Figure 17:
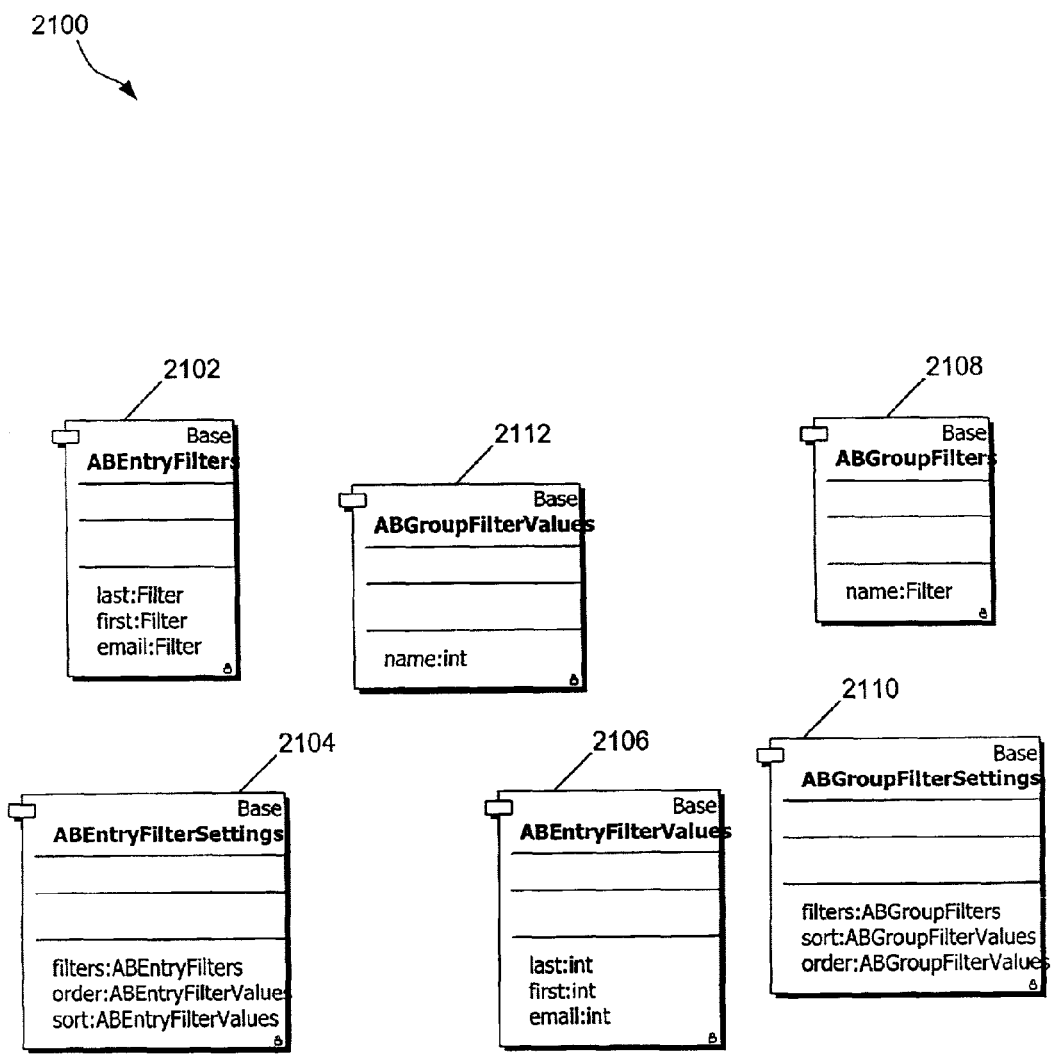
FIG. 17 is a class diagram representing an address book filters package in a presently preferred embodiment of the invention.

Turning now to FIG. 17, a class diagram representing the AddressBook subpackage 2100 in a presently preferred embodiment of the invention is provided. The AddressBook subpackage 2100 comprises a plurality of classes. Its structure is detailed in Table 156.

TABLE 156

Structure of AddressBook Subpackage

| Element | Type |
| --- | --- |
| ABEntryFilters | Class |
| ABEntryFilterSettings | Class |
| ABEntryFilterValues | Class |

TABLE 156-continued

Structure of AddressBook Subpackage

| Element | Type |
| --- | --- |
| ABGroupFilters | Class |
| ABGroupFilterSettings | Class |
| ABGroupFilterValues | Class |

The ABEntryFilters class 2102 is a data object that contains detailed filter specifications for all fields in an Address Book entry. The ABEntryFilters class 2102 is suitably a specialization of Base class 1502. Its functionality is detailed in Table 157.

TABLE 157

ABEntryFilters Class Functions

Function public native Filter getEmail( )
public native Filter getFirst( )
public native Filter getLast( )
public native void setEmail(Filter email)
public native void setFirst(Filter first)
public native void setLast(Filter last)

The ABEntryFilterSettings class 2104 contains data objects that are used to specify how Address Book entries are filtered and sorted prior to their retrieval. The ABEntryFilterSettings class 2104 is suitably a specialization of Base class 1502. Its functionality is detailed in Table 158.

TABLE 158

ABEntryFilterSettings Class Functions

Function public native ABEntryFilters getFilters( )
public native ABEntryFilterValues getOrder( )
public native ABEntryFilterValues getSort( )
public native void setFilters(ABEntryFilters filters)
public native void setOrder(ABEntryFilterValues order)
public native void setSort(ABEntryFilterValues sort)

The ABEntryFilterValues 2106 represents objects that contain filter values for all fields in an Address Book entry. The ABEntryFilterValues 2106 is suitably a specialization of Base class 1502. Its functionality is detailed in Table 159.

TABLE 159

ABEntryFilterValues Class Functions

Function public native int getEmail( )
public native int getFirst( )
public native int getLast( )
public native void setEmail(int email)
public native void setFirst(int first)
public native void setLast(int last)

The ABGroupFilters 2108 represents objects that contain detailed filter specifications for all fields in an Address Book Group. The ABGroupFilters 2108 is suitably a specialization of Base class 1502. Its functionality is detailed in Table 160.

TABLE 160

ABGroupFilters Class Functions

Function public native Filter getName( )
public native void setName(Filter name)

The ABGroupFilterSettings 2110 represents objects that specify how Address Book Groups are filtered and sorted prior to retrieval. The ABGroupFilterSettings 2110 is suitably a specialization of Base class 1502. Its functionality is detailed in Table 161.

TABLE 161

ABGroupFilterSettings Class Functions

Functions public native ABGroupFilters getFilters( )
public native ABGroupFilterValues getOrder( )
public native ABGroupFilterValues getSort( )
public native void setFilters(ABGroupFilters filters)
public native void setOrder(ABGroupFilterValues order)
public native void setSort(ABGroupFilterValues sort)

The ABGroupFilterValues 2112 represents objects that contain filter values for all fields in an Address Book Group. The ABGroupFilterValues 2112 is suitably a specialization of Base class 1502. Its functionality is detailed in Table 162.

TABLE 162

ABGroupFilters Class Functions

Function public native int getName( )
public native void setName(int name)

Figure 18:
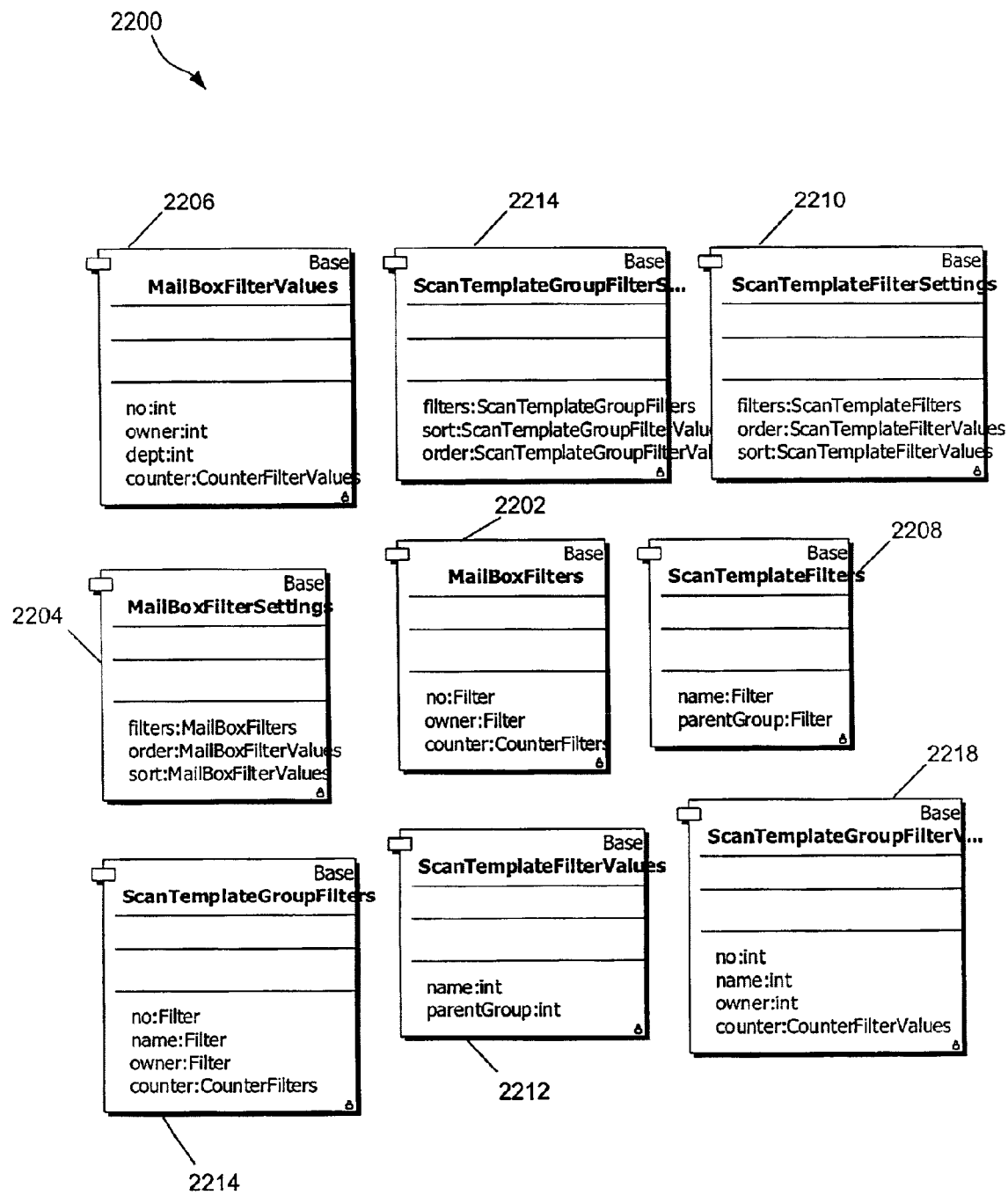
FIG. 18 is a class diagram representing an image handlers filters package in a presently preferred embodiment of the invention.

Turning now to FIG. 18, a class diagram representing the ImageHandlers subpackage 2200 in a presently preferred embodiment of the invention is provided. The ImageHandlers subpackage 2200 comprises a plurality of classes. Its structure is detailed in Table 156.

TABLE 163

Structure of ImageHandlers Subpackage

| Element | Type |
| --- | --- |
| MailBoxFilters | Class |
| MailBoxFilterSettings | Class |
| MailBoxFilterValues | Class |
| ScanTemplateFilters | Class |
| ScanTemplateFilterSettings | Class |
| ScanTemplateFilterValues | Class |
| ScanTemplateGroupFilters | Class |
| ScanTemplateGroupFilterSettings | Class |
| ScanTemplateGroupFilterValues | Class |

The MailBoxFilters 2202 represents a data object that contains detailed filter specifications for all fields in a MailBox. The MailBoxFilters 2202 is suitably a specialization of Base class 1502. Its functionality is detailed in Table 164.

TABLE 164

MailBoxFilters Class Functions

Function public native CounterFilters getCounter( )
public native Filter getNo( )
public native Filter getOwner( )
public native void setCounter(CounterFilters counter)
public native void setNo(Filter no)
public native void setOwner(Filter owner)

The MailBoxFilterSettings 2204 specify how Mail Boxes are filtered and sorted prior to their retrieval. The MailBoxFilterSettings 2204 is suitably a specialization of Base class 1502. Its functionality is detailed in Table 165.

TABLE 165

MailBoxFilterSettings Class Functions

Function public native MailBoxFilters getFilters( )
public native MailBoxFilterValues getOrder( )
public native MailBoxFilterValues getSort( )
public native void setFilters(MailBoxFilters filters)
public native void setOrder(MailBoxFilterValues order)
public native void setSort(MailBoxFilterValues sort)

The MailBoxFilterValues class 2206 represents objects containing filter values for all fields in a Mail Box. The MailBoxFilterValues class 2206 is suitably a specialization of Base class 1502. Its functionality is detailed in Table 166.

TABLE 166

MailBoxFilterValues Class Functions

Function public native CounterFilterValues getCounter( )
public native int getDept( )
public native int getNo( )
public native int getOwner( )
public native void setCounter(CounterFilterValues counter)
public native void setDept(int dept)
public native void setNo(int no)
public native void setOwner(int owner)

The ScanTemplateFilters class 2208 represents a data object that contains detailed filter specifications for all fields in a Scan Template. The ScanTemplateFilters class 2208 is suitably a specialization of Base class 1502. Its functionality is detailed in Table 167.

TABLE 167

ScanTemplateFilters Class Functions

Function public native Filter getName( )
public native Filter getParentGroup( )
public native void setName(Filter name)
public native void setParentGroup(Filter parentGroup)

The ScanTemplateFilterSettings class 2210 is suitably used to specify the manner in which Scan Templates are filtered and sorted prior to their retrieval. The ScanTemplateFilterSettings class 2210 is suitably a specialization of Base class 1502. Its functionality is detailed in Table 168.

TABLE 168

ScanTemplateFilterSettings Class Functions

Function public native ScanTemplateFilters getFilters( )
public native ScanTemplateFilterValues getOrder( )
public native ScanTemplateFilterValues getSort( )
public native void setFilters(ScanTemplateFilters filters)
public native void setOrder(ScanTemplateFilterValues order)
public native void setSort(ScanTemplateFilterValues sort)

The ScanTemplateFilterValues class 2212 represents objects containing filter values for all fields in a Scan Template. The ScanTemplateFilterValues class 2212 is suitably a specialization of Base class 1502. Its functionality is detailed in Table 169.

TABLE 169

ScanTemplateFilterValues Class Functions

Function public native int getName( )
public native int getParentGroup( )
public native void setName(int name)
public native void setParentGroup(int parentGroup)

The ScanTemplateGroupFilters class 2214 contains detailed filter specifications for all fields in a Scan Template Group. The ScanTemplateGroup Filters class 2214 is suitably a specialization of Base class 1502. Its functionality is detailed in Table 170.

TABLE 170

ScanTemplateGroupFilters Class Functions

Function public native CounterFilters getCounter( )
public native Filter getName( )
public native Filter getNo( )
public native Filter getOwner( )
public native void setCounter(CounterFilters counter)
public native void setName(Filter name)
public native void setNo(Filter no)

The ScanTemplateGroupFilterSettings class 2216 contains objects that specify the manner in which Scan Template Groups are filtered and sorted prior to their retrieval. The ScanTemplateGroupFilterSettings class 2216 is suitably a specialization of Base class 1502. Its functionality is detailed in Table 171.

TABLE 171

ScanTemplateGroupFilterSettings Class Functions

Function public native ScanTemplateGroupFilters getFilters( )
public native ScanTemplateGroupFilterValues getOrder( )
public native ScanTemplateGroupFilterValues getSort( )
public native void setFilters(ScanTemplateGroupFilters filters)
public native void setOrder(ScanTemplateGroupFilterValues order)
public native void setSort(ScanTemplateGroupFilterValues sort)

The ScanTemplateGroupFilterValues class 2218 contains filter values for all fields in a Scan Template Group. The ScanTemplateGroupFilterValues class 2218 is suitably a specialization of Base class 1502. Its functionality is detailed in Table 172.

TABLE 172

ScanTemplateGroupFilterValues Class Functions

Function public native CounterFilterValues getCounter( )
public native int getName( )
public native int getNo( )
public native int getOwner( )
public native void setCounter(CounterFilterValues counter)
public native void setName(int name)
public native void setNo(int no)
public native void setOwner(int owner)

Figure 19:
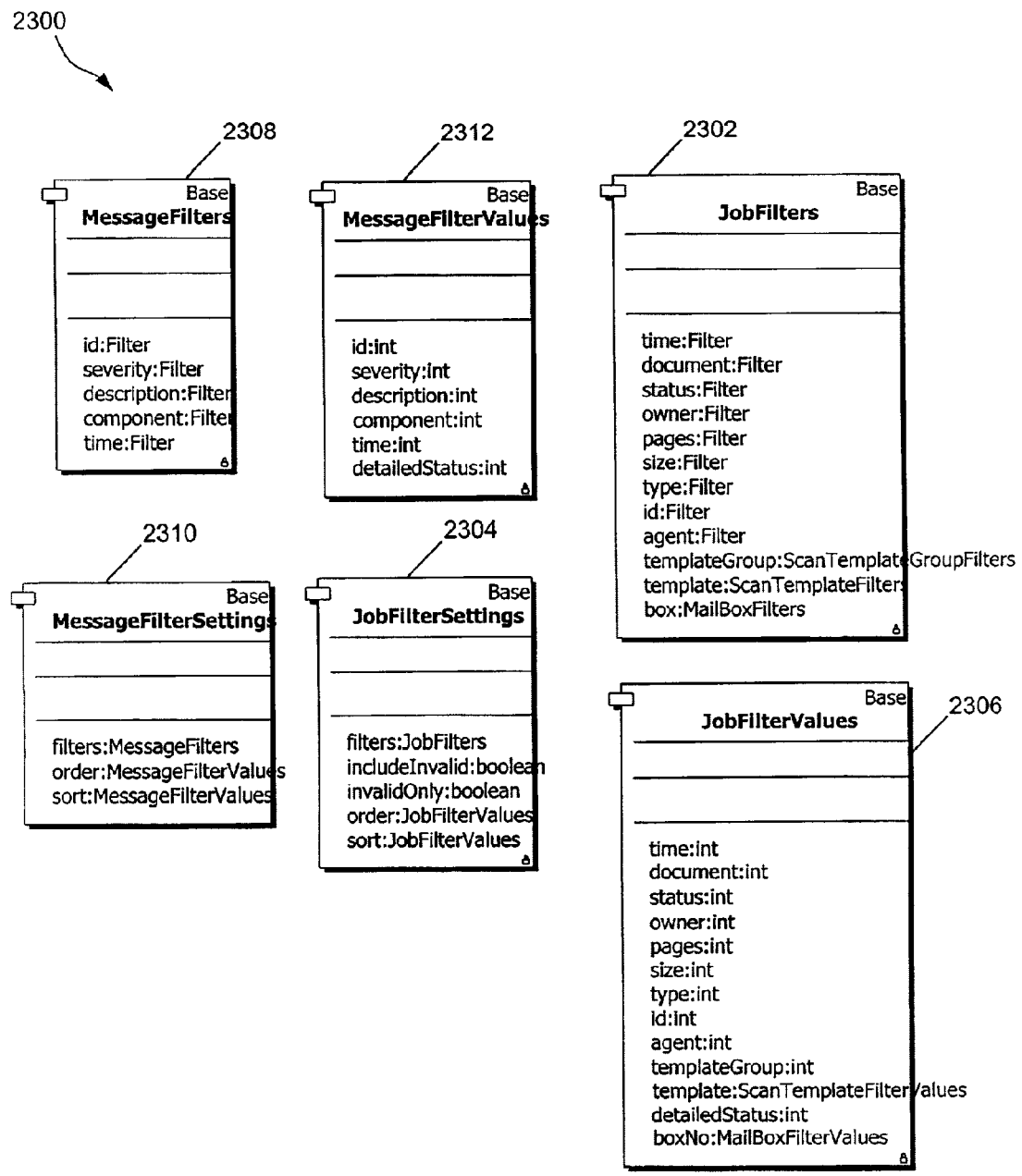
FIG. 19 is a class diagram representing a job log filters package in a presently preferred embodiment of the invention.

Turning now to FIG. 19, a class diagram representing the JobsLogs subpackage 2300 in a presently preferred embodiment of the invention is provided. The JobsLogs subpackage 2300 comprises a plurality of classes. Its structure is detailed in Table 173.

TABLE 173

Structure of JobsLogs Subpackage

| Element | Type |
| --- | --- |
| JobFilters | Class |
| JobFilterSettings | Class |
| JobFilterValues | Class |
| MessageFilters | Class |
| MessageFilterSettings | Class |
| MessageFilterValues | Class |

The JobFilters class 2302 contains detailed filter specifications for all fields in a Job or a Job Log. The JobFilters class 2302 is suitably a specialization of Base class 1502. Its functionality is detailed in Table 174.

TABLE 174

JobFilters Class Functions

Function public native Filter getAgent( )
public native MailBoxFilters getBox( )
public native Filter getDocument( )
public native Filter getId( )
public native Filter getOwner( )
public native Filter getPages( )
public native Filter getSize( )
public native Filter getStatus( )
public native ScanTemplateFilters getTemplate( )
public native ScanTemplateGroupFilters getTemplateGroup( )
public native Filter getTime( )
public native Filter getType( )
public native void setAgent(Filter agent)
public native void setBox(MailBoxFilters box)
public native void setDocument(Filter document)
public native void setId(Filter id)
public native void setOwner(Filter owner)
public native void setPages(Filter pages)
public native void setSize(Filter size)
public native void setStatus(Filter status)
public native void setTemplate(ScanTemplateFilters template)
public native void setTemplateGroup(ScanTemplateGroupFilters templateGroup)
public native void setTime(Filter time)
public native void setType(Filter type)

The JobFilterSettings class 2304 contains objects that are suitably used to specify how jobs and logs are filtered and sorted prior to their retrieval. The JobFilterSettings class 2304 is suitably a specialization of Base class 1502. Its functionality is detailed in Table 175.

TABLE 175

JobFilterSettings Class Functions

Function public native JobFilters getFilters( )
public native JobFilterValues getOrder( )
public native JobFilterValues getSort( )
public native boolean isIncludeInvalid( )
public native boolean isInvalidOnly( )
public native void setFilters(JobFilters filters)
public native void setIncludeInvalid(boolean includeInvalid)
public native void setInvalidOnly(boolean invalidOnly)
public native void setOrder(JobFilterValues order)
public native void setSort(JobFilterValues sort)

The JobFilterValues class 2306 represents objects containing filter values for all fields in a job or job log. JobFilterValues class 2306 is suitably a specialization of Base class 1502. Its functionality is detailed in Table 176.

TABLE 176

JobFilterValues Class Functions

Function public native int getAgent( )
public native MailBoxFilterValues getBoxNo( )
public native int getDetailedStatus( )
public native int getDocument( )
public native int getId( )
public native int getOwner( )
public native int getPages( )
public native int getSize( )
public native int getStatus( )
public native ScanTemplateFilterValues getTemplate( )
public native int getTemplateGroup( )
public native int getTime( )
public native int getType( )
public native void setAgent(int agent)
public native void setBoxNo(MailBoxFilterValues boxNo)
public native void setDetailedStatus(int detailedStatus)
public native void setDocument(int document)
public native void setId(int id)
public native void setOwner(int owner)
public native void setPages(int pages)
public native void setSize(int size)
public native void setStatus(int status)
public native void setTemplate(ScanTemplateFilterValues template)
public native void setTemplateGroup(int templateGroup)
public native void setTime(int time)
public native void setType(int type)

The MessageFilters class 2308 is an object containing detailed filter specifications for fields in a message. MessageFilters class 2308 is suitably a specialization of Base class 1502. Its functionality is detailed in Table 177.

TABLE 177

MessageFilters Class Functions

Function public native Filter getComponent( )
public native Filter getDescription( )
public native Filter getId( )
public native Filter getSeverity( )
public native Filter getTime( )
public native void setComponent(Filter component)
public native void setDescription(Filter description)
public native void setId(Filter id)

TABLE 177-continued

MessageFilters Class Functions

Function public native void setSeverity(Filter severity)
public native void setTime(Filter time)

The MessageFilterSettings class 2310 specifies how messages are filtered and sorted prior to their retrieval. The MessageFilterSettings class 2310 is suitably a specialization of Base class 1502. Its functionality is detailed in Table 178.

TABLE 178

MessageFilterSettings Class Functions

Function public native MessageFilters getFilters( )
public native MessageFilterValues getOrder( )
public native MessageFilterValues getSort( )
public native void setFilters(MessageFilters filters)
public native void setOrder(MessageFilterValues order)
public native void setSort(MessageFilterValues sort)

The MessageFilterValues class 2312 is an object containing filter values for fields in a Message. The MessageFilterValues class 2312 is suitably a specialization of Base class 1502. Its functionality is detailed in Table 179.

TABLE 179

MessageFilterValues Class Functions

Function public native int getComponent( )
public native int getDescription( )
public native int getDetailedStatus( )
public native int getId( )
public native int getSeverity( )
public native int getTime( )
public native void setComponent(int component)
public native void setDescription(int description)
public native void setDetailedStatus(int detailedStatus)
public native void setId(int id)
public native void setSeverity(int severity)
public native void setTime(int time)

Figure 20:
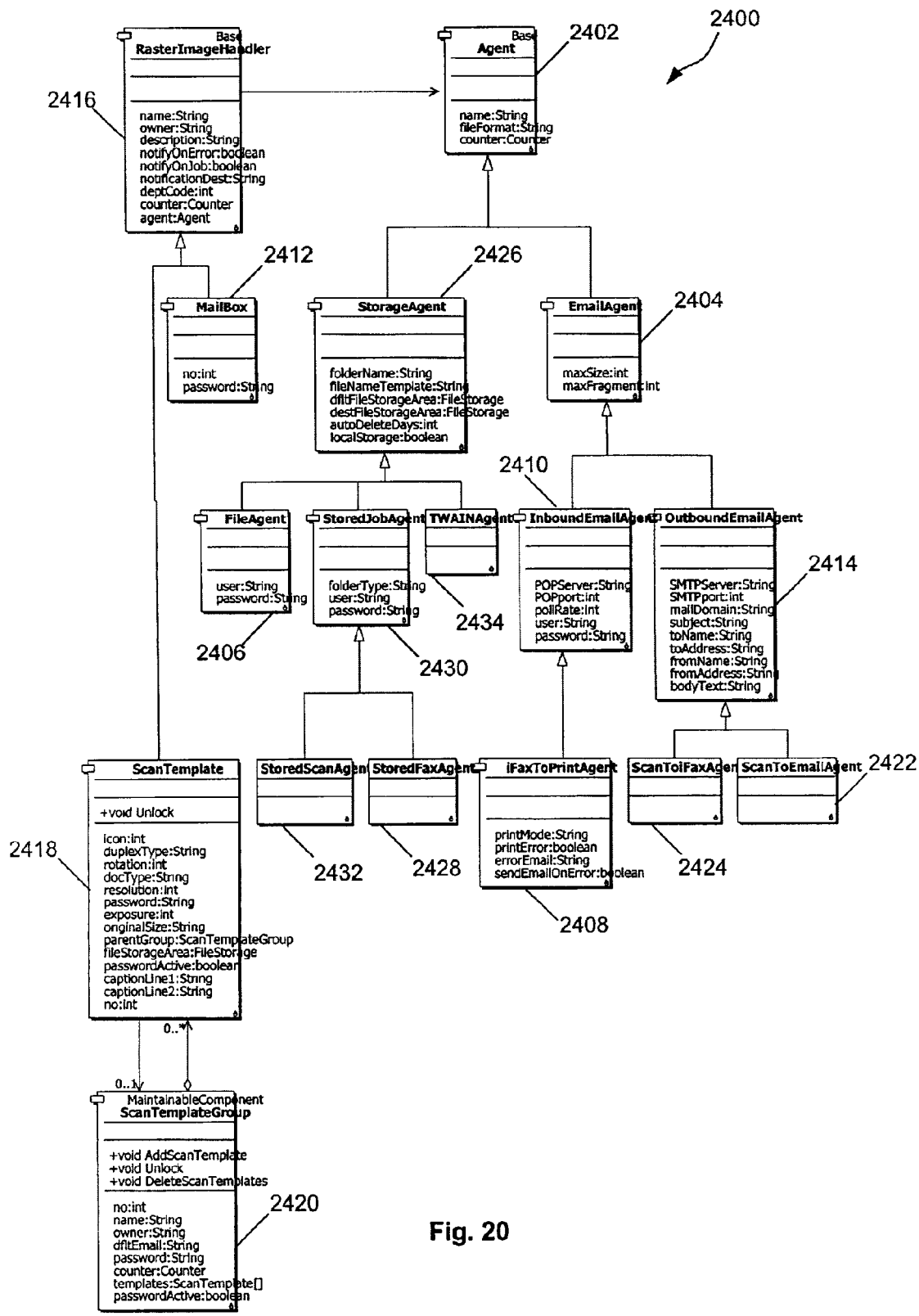
FIG. 20 is a class diagram representing an image handlers package in a presently preferred embodiment of the invention.

Turning now to FIG. 20, a class diagram representing the ImageHandlers package 2400 in a presently preferred embodiment of the invention is provided. The ImageHandlers package 2400 comprises a plurality of classes. Its structure is detailed in Table 180.

TABLE 180

Structure of ImageHandlers Package

| Element | Type |
| --- | --- |
| Agent | Class |
| EmailAgent | Class |
| FileAgent | Class |
| iFaxToPrintAgent | Class |
| InboundEmailAgent | Class |
| MailBox | Class |
| OutboundEmailAgent | Class |
| RasterImageHandler | Class |
| ScanTemplate | Class |
| ScanTemplateGroup | Class |
| ScanToEmailAgent | Class |

TABLE 180-continued

Structure of ImageHandlers Package

| Element | Type |
|---|---|
| ScanToiFaxAgent | Class |
| StorageAgent | Class |
| StoredFaxAgent | Class |
| StoredJobAgent | Class |
| StoredScanAgent | Class |
| TWAINAgent | Class |

The Agent class 2402 contains a generic image processing agent. The Agent class 2402 is suitably a specialization of Base class 1502. Its functionality is detailed in Table 181.

TABLE 181

Agent Class Functions

Function public Counter getCounter( )
public String getFileFormat( )
public String getName( )
public void setCounter(Counter counter)
public void setFileFormat(String fileFormat)
public void setName(String name)

The EmailAgent class 2404 contains a generic email image processing agent. The EmailAgent class 2404 is suitably a specialization of Agent class 2402. Its functionality is detailed in Table 182.

TABLE 182

EmailAgent Class Functions

Function public int getMaxFragment( )
public int getMaxSize( )
public void setMaxFragment(int maxFragment)
public void setMaxSize(int maxSize)

The FileAgent class 2406 specifies a StorageAgent to represent agent to handle requests for storage. The FileAgent class 2406 is suitably a specialization of StorageAgent class 2426. Its functionality is detailed in Table 183.

TABLE 183

FileAgent Class Functions

Function public String getUser( )
public void setPassword(String password)
public void setUser(String user)

The iFaxToPrintAgent class 2408 is the specialization of the InboundEmailAgent 2410 to represent the iFaxToPrintAgent. Its functionality is detailed in Table 184.

TABLE 184 iFaxToPrintAgent Class Functions

Function public String getErrorEmail( )
public String getPrintMode( )
public boolean isPrintError( )
public boolean isSendEmailOnError( )
public void setErrorEmail(String errorEmail)
public void setPrintError(boolean printError)
public void setPrintMode(String printMode)
public void setSendEmailOnFrror(boolean sendEmailOnError)

The InboundEmailAgent class 2410 represents a generic inbound image processing email agent. The InboundEmailAgent class 2410 is suitably a specialization of EmailAgent class 2404. Its functionality is detailed in Table 185.

TABLE 185

InboundEmailAgent Class Functions

Function public int getPollRate( )
public int getPOPport( )
public String getPOPServer( )
public String getUser( )
public void setPassword(String password)
public void setPollRate(int pollRate)
public void setPOPport(int POPport)
public void setPOPServer(String POPServer)
public void setUser(String user)

The MailBox class 2412 is a processor for inbound faxes. After arriving at the mailbox, the inbound faxes are handled by an agent. The MailBox class 2412 is suitably a specialization of RasterImageHandler class 2416. Its functionality is detailed in Table 186.

TABLE 186

MailBox Class Functions

Function public int getNo( )
public void setNo(int no)
public void setPassword(String password)

The OutboundEmailAgent class 2414 is a generic outbound image processing email agent. The OutboundEmailAgent class 2414 is suitably a specialization of EmailAgent class 2404. Its functionality is detailed in Table 187.

TABLE 187

OutboundEmailAgent Class Functions

| Function |
| --- |
| public String getBodyText( ) |
| public String getFromAddress( ) |
| public String getFromName( ) |
| public String getMailDomain( ) |
| public int getSMTPport( ) |
| public String getSMTPServer( ) |
| public String getSubject( ) |
| public String getToAddress( ) |
| public String getToName( ) |
| public void setBodyText(String bodyText) |
| public void setFromAddress(String fromAddress) |
| public void setFromName(String fromName) |
| public void setMailDomain(String mailDomain) |
| public void setSMTPport(int SMTPport) |
| public void setSMTPServer(String SMTPServer) |
| public void setSubject(String subject) |
| public void setToAddress(String toAddress) |
| public void setToName(String toName) |

The RasterImageHandler class 2416 is a generic raster image processing handler. The RasterImageHandler class 2416 is suitably a specialization of Base class 1502. Its functionality is detailed in Table 188.

TABLE 188

RasterImageHandler Class Functions

| Function |
| --- |
| public Agent getAgent( ) |
| public Counter getCounter( ) |
| public int getDeptCode( ) |
| public String getDescription( ) |
| public String getName( ) |
| public String getNotificationDest( ) |
| public String getOwner( ) |
| public boolean isNotifyOnError( ) |
| public boolean isNotifyOnJob( ) |
| public void setAgent(Agent agent) |
| public void setDeptCode(int deptCode) |
| public void setDescription(String description) |
| public void setName(String name) |
| public void setNotificationDest(String notificationDest) |
| public void setNotifyOnError(boolean notifyOnError) |
| public void setNotifyOnJob(boolean notifyOnJob) |
| public void setOwner(String owner) |

The ScanTemplate class 2418 is an image handler that is capable of processing scans. The ScanTemplate class 2418 is suitably a specialization of RasterImageHandler class 2416. Its functionality is detailed in Table 189.

TABLE 189

ScanTemplate Class Functions and Descriptions

| Function | Description |
| --- | --- |
| public String getCaptionLine1( ) | |
| public String getCaptionLine2( ) | |
| public String getDocType( ) | |
| public String getDuplexType( ) | |
| public int getExposure( ) | |
| public FileStorage getFileStorageArea( ) | |
| public int getIcon( ) | |
| public int getNo( ) | |
| public String getOriginalSize( ) | |
| public ScanTemplateGroup getParentGroup( ) | |
| public int getResolution( ) | |
| public int getRotation( ) | |
| public boolean isPasswordActive( ) | |
| public void setCaptionLine1(String captionLine1) | |
| public void setCaptionLine2(String captionLine2) | |
| public void setDocType(String docType) | |
| public void setDuplexType(String duplexType) | |
| public void setExposure(int exposure) | |
| public void setFileStorageArea(FileStorage fileStorageArea) | |
| public void setIcon(int icon) | |
| public void setOriginalSize(String originalSize) | |
| public void setParentGroup(ScanTemplateGroup parentGroup) | |
| public void setPassword(String password) | |
| public void setResolution(int resolution) | |
| public void setRotation(int rotation) | |
| public void Unlock(String password) | Unlocks the current object. Throws: ToshibaException Parameter doc: password -- password to unlock the object Exception doc: ToshibaException -- password does NOT match |

The ScanTemplateGroup class 2420 is a collection of scan templates. The ScanTemplateGroup class 2420 is suitably a specialization of MaintainableComponent class 1506. Its functionality is detailed in Table 190.

TABLE 190

ScanTemplateGroup Class Functions and Descriptions

| Function | Description |
| --- | --- |
| public void AddScanTemplate(ScanTemplate newTemplate) | Adds a new template to the group.<br>Throws: ToshibaException<br>Parameter doc:<br>newGroup -- object containing information about the group |
| public void DeleteScanTemplates(int[ ] templateNos) | Deletes a list of templates.<br>Throws: ToshibaException<br>Parameter doc:<br>templateNos -- array of template numbers to delete<br>Exception doc:<br>ToshibaException -- some templates were not found |
| public Counter getCounter( ) | |
| public String getDfltEmail( ) | |
| public String getName( ) | |
| public int getNo( ) | |
| public String getOwner( ) | |
| public ScanTemplate getTemplates( ) | |
| public ScanTemplate getTemplates(int index) | |
| public boolean isPasswordActive( ) | |
| public void setDfltEmail(String dfltEmail) | |
| public void setName(String name) | |
| public void setNo(int no) | |
| public void setOwner(String owner) | |
| public void setPassword(String password) | |
| public void setTemplates(ScanTemplate templates) | |
| public void setTemplates(int index, ScanTemplate templates) | |
| public void Unlock(String password) | Unlocks the current object.<br>Throws: ToshibaException<br>Parameter doc:<br>password -- password to unlock the object<br>Exception doc:<br>ToshibaException -- password does NOT match |

The ScanToEmailAgent class 2422 handles scan-to-email requests. The ScanToEmailAgent class 2422 is suitably a specialization of OutboundEmailAgent class 2414.

The ScanToEmailAgent class 2424 handles scan-to-iFax requests. The ScanToiFaxAgent class 2424 is suitably a specialization of OutboundEmailAgent class 2414.

The StorageAgent class 2426 is a representation of a generic storage-based agent for processing inbound images. The StorageAgent class 2426 is suitably a specialization of Agent class 2402. Its functionality is detailed in Table 191.

TABLE 191

StorageAgent Class Functions

Function public int getAutoDeleteDays( )
public FileStorage getDestFileStorageArea( )
public FileStorage getDfltFileStorageArea( )
public String getFileNameTemplate( )
public String getFolderName( )
public boolean isLocalStorage( )
public void setAutoDeleteDays(int autoDeleteDays)

TABLE 191-continued

StorageAgent Class Functions

Function public void setDestFileStorageArea(FileStorage destFileStorageArea)
public void setDfltFileStorageArea(FileStorage dfltFileStorageArea)
public void setFileNameTemplate(String fileNameTemplate)
public void setFolderName(String folderName)
public void setLocalStorage(boolean localStorage)

The StoredFaxAgent class 2428 represents an agent to handle fax-to-storage requests. The StoredFaxAgent class 2428 is suitably a specialization of StoredJobAgent class 2430.

The StoredJobAgent class 2430 is an abstract representation of an agent for stored jobs. The StoredJobAgent class 2430 is suitably a specialization of StorageAgent class 2426. Its functionality is detailed in Table 192.

TABLE 192

StoredJobAgent Class Functions

Function public String getFolderType( )
public String getUser( )
public void setFolderType(String folderType)
public void setPassword(String password)
public void setUser(String user)

The StoredScanAgent class 2432 represents an agent for handling scan-to-storage requests. The StoredScanAgent class 2432 is suitably a specialization of StoredJobAgent class 2430.

The TWAINAgent class 2434 represents an agent for handling requests for storage into a for subsequent TWAIN acquisition. The TWAINAgent class 2434 is suitably a specialization of StorageAgent class 2426.

Figure 21:
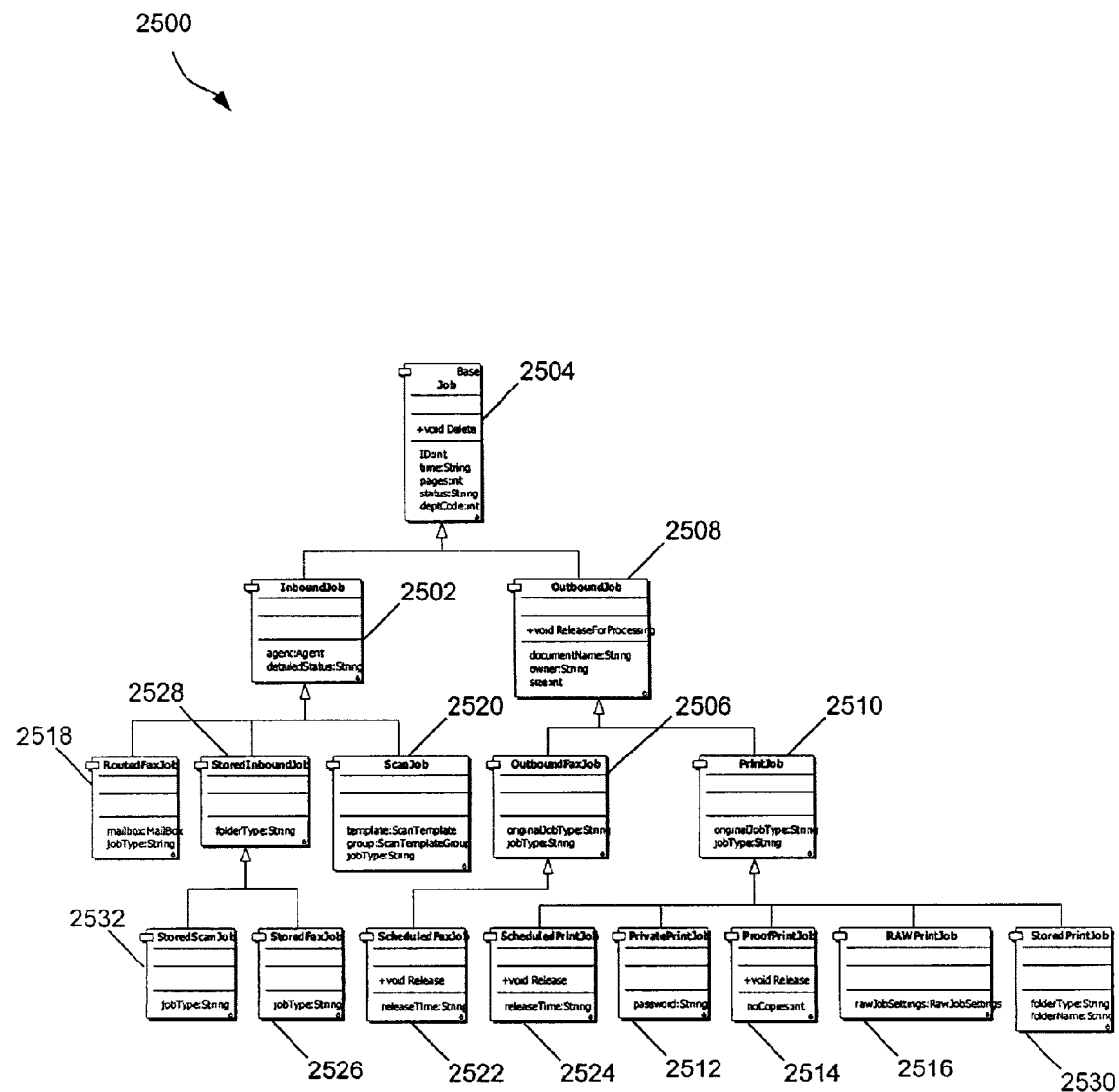
FIG. 21 is a class diagram representing a jobs package in a presently preferred embodiment of the invention.

Turning now to FIG. 21, a class diagram representing the Jobs package 2500 in a presently preferred embodiment of the invention is provided. The Jobs package 2500 comprises a plurality of classes. Its structure is detailed in Table 193.

TABLE 193

Structure of Jobs Package

| Element | Type |
|---|---|
| InboundJob | Class |
| Job | Class |
| OutboundFaxJob | Class |
| OutboundJob | Class |
| PrintJob | Class |
| PrivatePrintJob | Class |
| ProofPrintJob | Class |
| RAWPrintJob | Class |
| RoutedFaxJob | Class |
| ScanJob | Class |
| ScheduledFaxJob | Class |
| ScheduledPrintJob | Class |
| StoredFaxJob | Class |
| StoredInboundJob | Class |
| StoredPrintJob | Class |
| StoredScanJob | Class |

The InboundJob class 2502 is an abstraction of an inbound job. Inbound jobs are those job for which devices receive image data. The InboundJob class 2502 is suitably a specialization of Job class 2504. Its functionality is detailed in Table 194.

TABLE 194

InboundJob Class Functions

Function public Agent getAgent( )
public String getDetailedStatus( )

The Job class 2504 is an abstraction of a generic job. Jobs represent the rudimentary units of work for digital imaging devices. The Job class 2504 is suitably a specialization of Base class 1502. Its functionality is detailed in Table 195.

TABLE 195

Job Class Functions and Descriptions

| Function | Description |
|---|---|
| public native void Delete( ) | Deletes this job from the queue.<br>Note: The Job object will continue to be valid until all references to it are released; the "status" field will indicate that the Job has been deleted.<br>Throws: ToshibaException |
| public native int getDeptCode( )<br>public native int getID( )<br>public native int getPages( )<br>public native String getStatus( )<br>public native String getTime( )<br>public native void setDeptCode(int deptCode) | |

The OutboundFaxJob class 2506 represents an outbound fax job (i.e. PC-Fax job). These type of jobs are suitably awaiting immediate transmission. The OutboundFaxJob class 2506 is a specialization of OutboundJob class 2508. Its functionality is detailed in Table 196.

TABLE 196

OutboundFaxJob Class Functions and Descriptions

| Function | Description |
|---|---|
| public static native String getJobType( ) | Static method that returns the job type for Outbound Fax jobs. |
| public native String getOriginalJobType( ) | |

The OutboundJob class 2508 is an abstraction of an outbound job. Outbound jobs are suitably those devices that receive PDL for and RIP. Examples of outbound jobs include print jobs and PC-Fax jobs. The OutboundJob class 2508 is suitably a specialization of Job class 2504. Its functionality is detailed in Table 197.

TABLE 197

OutboundJob Class Functions and Descriptions

| Function | Description |
|---|---|
| public native String getDocumentName( )<br>public native String getOwner( )<br>public native int getSize( ) | |

TABLE 197-continued

OutboundJob Class Functions and Descriptions

| Function | Description |
| --- | --- |
| public native void ReleaseForProcessing( ) | Releases the job for further processing in case this job is invalid.<br>Throws: ToshibaException |

The PrintJob class 2510 represents a generic print job. The PrintJob class 2510 is a specialization of OutboundJob class 2508. Its functionality is detailed in Table 198.

TABLE 198

PrintJob Class Functions and Descriptions

| Function | Description |
| --- | --- |
| public static native String getJobType( ) | Static method that returns the job type for regular Print jobs. |
| public native String getOriginalJobType( ) | |

The PrivatePrintJob class 2512 represents a private print job, which is a job that must be released manually from a console of the digital imaging device. The PrivatePrintJob class 2512 is suitably a specialization of PrintJob class 2510. Its functionality is detailed in Table 199.

TABLE 199

PrivatePrintJob Class Functions

| Function |
| --- |
| public native void setPassword(String password) |

The ProofPrintJob class 2514 represents a proof-print job. The ProofPrintJob class 2514 is suitably a specialization of PrintJob class 2510. Its functionality is detailed in Table 200.

TABLE 200

PrivatePrintJob Class Functions and Descriptions

| Function | Description |
| --- | --- |
| public native int getNoCopies( ) | |
| public native void Release( ) | Releases the job immediately.<br>Throws: ToshibaException |
| public native void setNoCopies(int noCopies) | |

The RAWPrintJob class 2516 represents a RAW job, which is a job that does not contain any PJL commands. The RAWPrintJob class 2516 is suitably a specialization of PrintJob class 2510. Its functionality is detailed in Table 201.

TABLE 201

RAWPrintJob Class Functions

| Function |
| --- |
| public native RawJobSettings getRawJobSettings( )<br>public native void setRawJobSettings(RawJobSettings rawJobSettings) |

The RoutedFaxJob class 2518 represents an inbound fax job that is being routed to a recipient on the network. The RoutedFaxJob class 2518 is suitably a specialization of InboundJob class 2502. Its functionality is detailed in Table 202.

TABLE 202

RoutedFaxJob Class Functions and Descriptions

| Function | Description |
| --- | --- |
| public static native String getJobType( ) | Static method that returns the job type for Routed Fax jobs. |
| public native MailBox getMailbox( ) | |

The ScanJob class 2520 represents a scan job. Scan jobs are suitably manually initiated by a user. The ScanJob class 2520 is suitably a specialization of InboundJob class 2502. Its functionality is detailed in Table 203.

TABLE 203

ScanJob Class Functions and Descriptions

| Function | Description |
| --- | --- |
| public ScanTemplateGroup getGroup( ) | |
| public static String getJobType( ) | Static method that returns the job type for Scan jobs. |
| public ScanTemplate getTemplate( ) | |

The ScheduledFaxJob class 2522 represents a fax job scheduled for transmission at a time in the future. The ScheduledFaxJob class 2522 is suitably a specialization of OutboundFaxJob class 2506. Its functionality is detailed in Table 204.

TABLE 204

ScheduledFaxJob Class Functions and Descriptions

| Function | Description |
| --- | --- |
| public native String getReleaseTime( ) | |
| public native void Release( ) | Releases the job immediately.<br>Throws: ToshibaException |
| public native void setReleaseTime(String releaseTime) | |

The ScheduledPrintJob class 2524 represents a print job scheduled for printing at a time in the future. The ScheduledPrintJob class 2524 is suitably a specialization of PrintJob class 2510. Its functionality is detailed in Table 205.

TABLE 205

ScheduledPrintJob Class Functions and Descriptions

| Function | Description |
| --- | --- |
| public native String getReleaseTime( ) | |
| public native void Release( ) | Releases the job immediately.<br>Throws: ToshibaException |
| public native void setReleaseTime(String releaseTime) | |

The StoredFaxJob class 2526 represents stored fax jobs. The StoredFaxJob class 2526 is suitably a specialization of StoredInboundJob class 2528. Its functionality is detailed in Table 206.

TABLE 206

StoredFaxJob Class Functions and Descriptions

| Function | Description |
|---|---|
| public static String getJobType( ) | Static method that returns the job type for Stored Fax jobs. |

The StoredInboundJob class 2528 is an abstraction for inbound jobs that are stored. The StoredInboundJob class 2528 is suitably a specialization of InboundJob class 2502. Its functionality is detailed in Table 207.

TABLE 207

StoredInboundJob Class Functions

| Function |
|---|
| public String getFolderType( ) |

The StoredPrintJob class 2530 is a single stored job that is saved on the device for future printing and/or proofing. The StoredPrintJob class 2530 is suitably a specialization of PrintJob class 2510. Its functionality is detailed in Table 208.

TABLE 208

StoredPrintJob Class Functions

| Function |
|---|
| public native String getFolderName( ) |
| public native String getFolderType( ) |
| public native void setFolderName(String folderName) |

The StoredScanJob class 2532 represents stored scan jobs. The StoredScanJob class 2532 is suitably a specialization of StoredInboundJob class 2528. Its functionality is detailed in Table 209.

TABLE 209

StoredScanJob Class Functions and Descriptions

| Function | Description |
|---|---|
| public static String getJobType( ) | Static method that returns the job type for Stored Scan jobs. |

Figure 22:
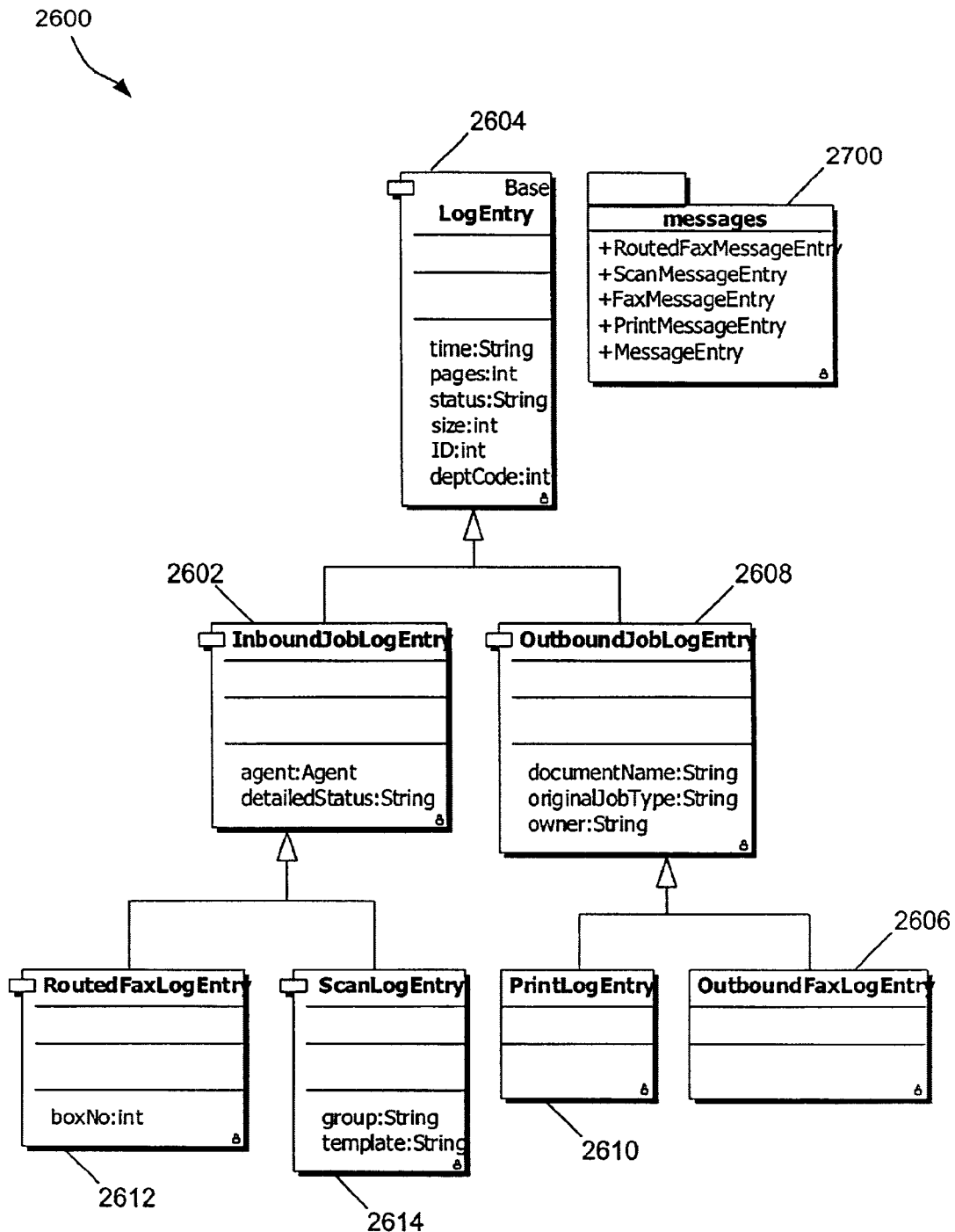
FIG. 22 is a class diagram representing a logs package in a presently preferred embodiment of the invention.

Turning now to FIG. 22, a class diagram representing the Logs package 2600 in a presently preferred embodiment of the invention is provided. The Logs package 2600 comprises a subpackage a plurality of classes. Its structure is detailed in Table 210.

TABLE 210

Structure of Logs Package

| Element | Type |
|---|---|
| Messages | Package |
| InboundJobLogEntry | Class |
| LogEntry | Class |
| OutboundFaxLogEntry | Class |
| OutboundJobLogEntry | Class |
| PrintLogEntry | Class |
| RoutedFaxLogEntry | Class |
| ScanLogEntry | Class |

The InboundJobLogEntry class 2602 represents an abstract log entry for an incoming job. The InboundJobLogEntry class 2602 is suitably a specialization of LogEntry class 2604. Its functionality is detailed in Table 211.

TABLE 211

InboundJobLogEntry Class Functions

| Function |
|---|
| public Agent getAgent( ) |
| public String getDetailedStatus( ) |

The LogEntry class 2604 represents an generic job log entry. The LogEntry class 2604 is suitably a specialization of Base class 1502. Its functionality is detailed in Table 212.

TABLE 212

LogEntry Class Functions

| Function |
|---|
| public native int getDeptCode( ) |
| public native int getID( ) |
| public native int getPages( ) |
| public native int getSize( ) |
| public native String getStatus( ) |
| public native String getTime( ) |
| public native void setDeptCode(int deptCode) |

The OutboundFaxLogEntry class 2606 represents a log entry for all types of outbound fax jobs. The OutboundFaxLogEntry class 2606 is suitably a specialization of OutboundJobLogEntry class 2608.

The OutboundJobLogEntry class 2608 represents a log entry for all types of outbound jobs. The OutboundJobLogEntry class 2608 is suitably a specialization of LogEntry class 2604. Its functionality is detailed in Table 213.

TABLE 213

OutboundJobLogEntry Class Functions

| Function |
|---|
| public native String getDocumentName( ) |
| public native String getOriginalJobType( ) |
| public native String getOwner( ) |

The PrintLogEntry class 2610 is a representation of a print job log entry. The PrintLogEntry class 2610 is suitably a specialization of OutboundJobLogEntry class 2608.

The RoutedFaxLogEntry class 2612 is a representation of an abstract log entry for an inbound routed fax job. The RoutedFaxLogEntry class 2612 is a specialization of InboundJobLogEntry class 2602. Its functionality is detailed in Table 214.

TABLE 214

RoutedFaxLogEntry Class Functions

Function public int getBoxNo( )

The ScanLogEntry class 2614 is a representation of a log entry for a scan job. The ScanLogEntry class 2614 is a specialization of InboundJobLogEntry class 2602. Its functionality is detailed in Table 215.

TABLE 215

ScanLogEntry Class Functions

Function public native String getGroup( )
public native String getTemplate( )

Figure 23:
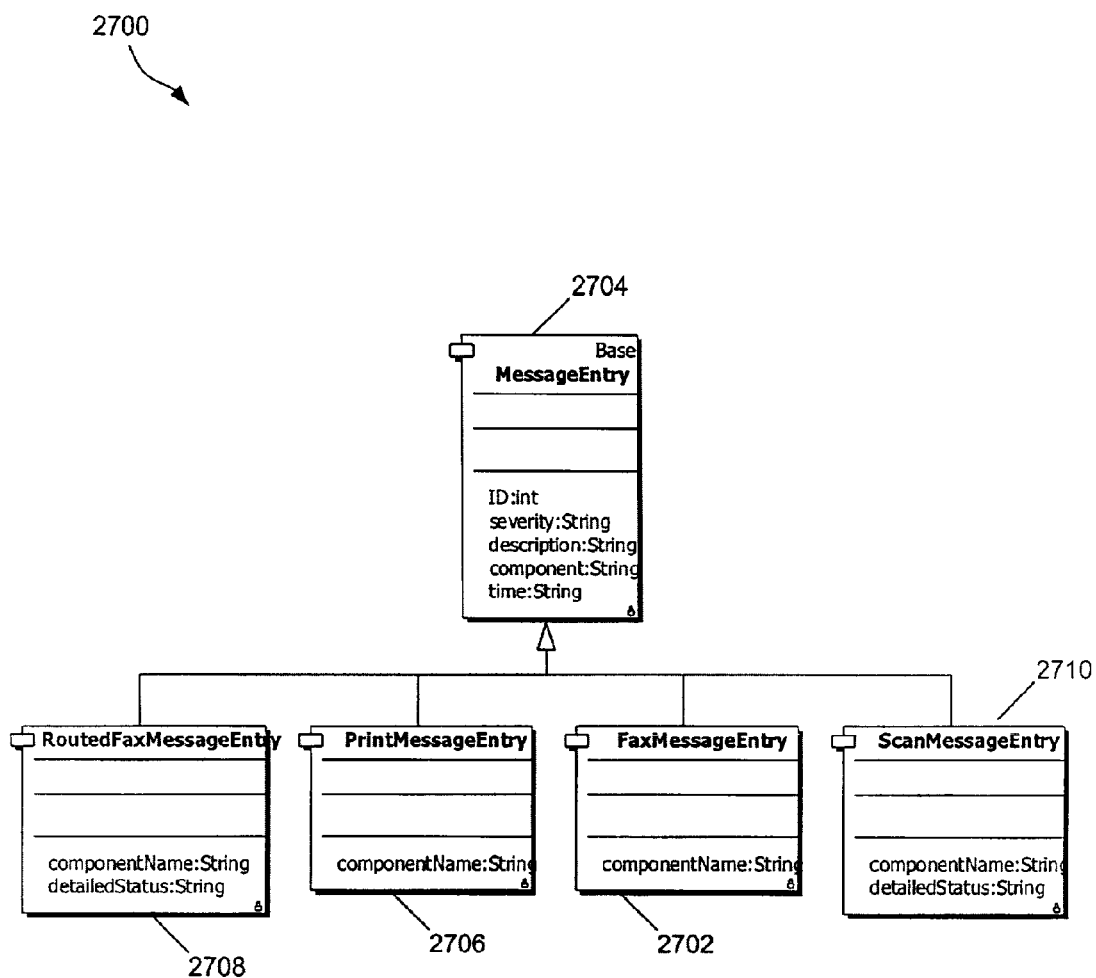
FIG. 23 is a class diagram representing a message logs package in a presently preferred embodiment of the invention.

Turning now to FIG. 23, a class diagram representing the Logs Message subpackage 2700 in a presently preferred embodiment of the invention is provided. The Logs Message subpackage 2700 comprises a plurality of classes. Its structure is detailed in Table 216.

TABLE 216

Structure of Logs Package

| Element | Type |
|---|---|
| FaxMessageEntry | Class |
| MessageEntry | Class |
| PrintMessageEntry | Class |
| RoutedFaxMessageEntry | Class |
| ScanMessageEntry | Class |

The FaxMessageEntry class 2702 is a representation of a fax message entry. The FaxMessageEntry class 2702 is suitably a specialization of MessageEntry class 2704. Its functionality is detailed in Table 217.

TABLE 217

FaxMessageEntry Class Functions

Function public static native String getComponentName( )

The MessageEntry class 2704 is an abstract representation of a generic message log entry. The MessageEntry class 2704 is suitably a specialization of Base class 1502. Its functionality is detailed in Table 218.

TABLE 218

MessageEntry Class Functions

Function public native String getComponent( )
public native String getDescription( )
public native int getID( )
public native String getSeverity( )
public native String getTime( )

The PrintMessageEntry class 2706 is a representation of a print message entry. The PrintMessageEntry class 2706 is suitably a specialization of MessageEntry class 2704. Its functionality is detailed in Table 219.

TABLE 219

PrintMessageEntry Class Functions

Function public static native String getComponentName( )

The RoutedFaxMessageEntry class 2708 is a representation of a routed fax message entry. The RoutedFaxMessageEntry class 2708 is suitably a specialization of MessageEntry class 2704. Its functionality is detailed in Table 220.

TABLE 220

RoutedFaxMessageEntry Class Functions

Function public static native String getComponentName( )
public native String getDetailedStatus( )

The ScanMessageEntry class 2710 is a representation of a scan message entry. The ScanMessageEntry class 2710 is suitably a specialization of MessageEntry class 2704. Its functionality is detailed in Table 221.

TABLE 221

ScanMessageEntry Class Functions

Function public static native String getComponentName( )
public native String getDetailedStatus( )

Figure 24:
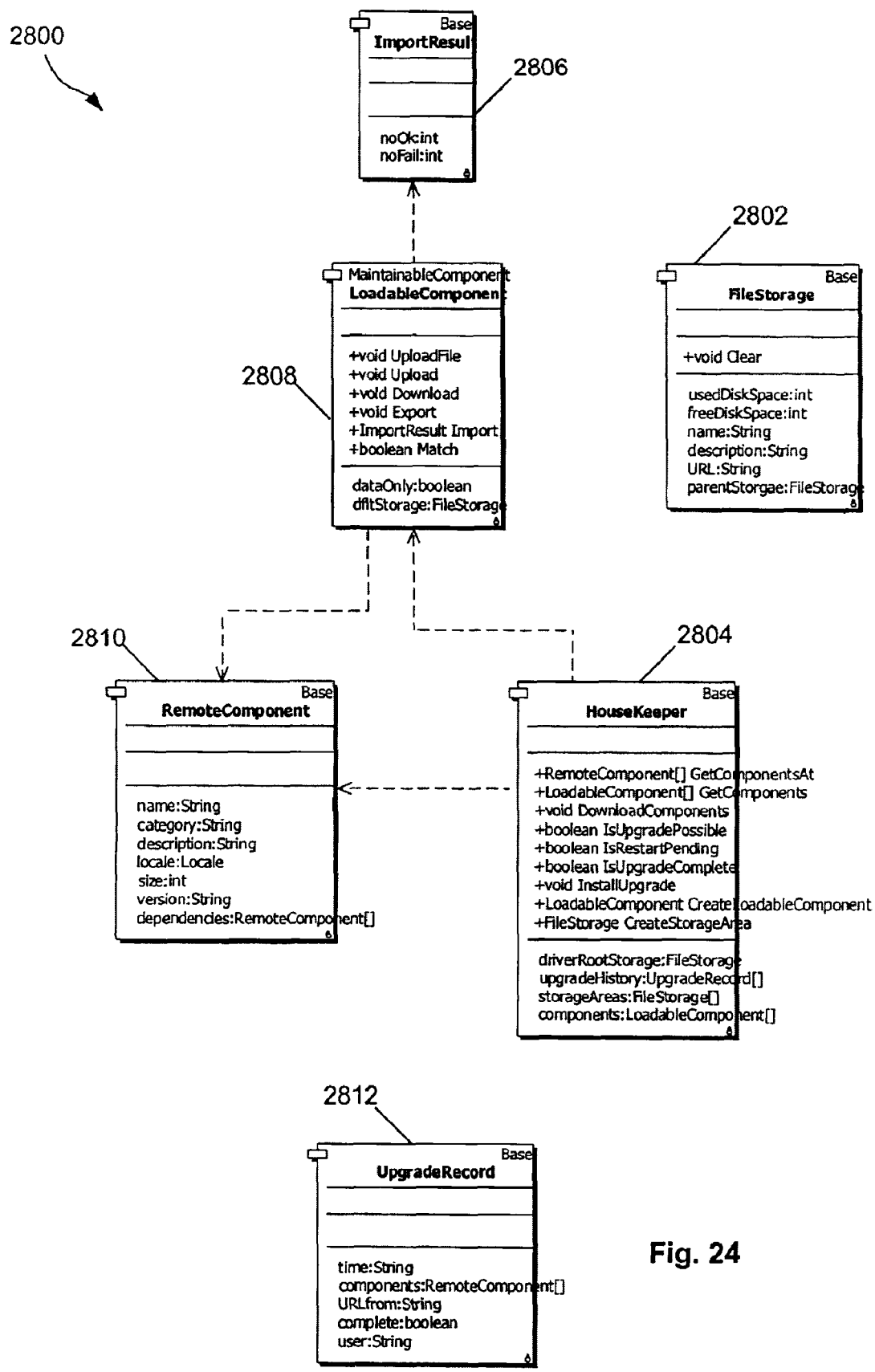
FIG. 24 is a class diagram representing a maintenance package in a presently preferred embodiment of the invention.

Turning now to FIG. 24, a class diagram representing the Maintenance package 2800 in a presently preferred embodiment of the invention is provided. The Maintenance package 2800 comprises a plurality of classes. Its structure is detailed in Table 222.

TABLE 222

Structure of Maintenance Package

| Element | Type |
|---|---|
| FileStorage | Class |
| HouseKeeper | Class |
| ImportResult | Class |
| LoadableComponent | Class |
| RemoteComponent | Class |
| UpgradeRecord | Class |
| Diagrams | Class |

The FileStorage class 2802 is a representation of the file storage maintained by the device. Generally, the physical storage is on the device itself. The FileStorage class 2802 is a specialization of Base class 1502. Its functionality is detailed in Table 223.

TABLE 223

FileStorage Class Functions

| Function | Description |
| --- | --- |
| public native void Clear( ) | Remove all components (files) in the area. Throws: ToshibaException |
| public native String getDescription( ) | |
| public native int getFreeDiskSpace( ) | |
| public native String getName( ) | |
| public native FileStorage getParentStorgae( ) | |
| public native String getURL( ) | |

TABLE 223-continued

FileStorage Class Functions

| Function | Description |
| --- | --- |
| public native int getUsedDiskSpace( ) | |
| public native void setDescription(String description) | |

The HouseKeeper class 2804 is an abstraction to provide housekeeping and general maintenance functionality in the form of a utility class. The HouseKeeper class 2804 is suitably a specialization of Base class 1502. Its functionality is detailed in Table 224.

TABLE 224

HouseKeeper Class Functions and Descriptions

| Function | Description |
| --- | --- |
| public native LoadableComponent CreateLoadableComponent(String name, FileStorage dfltStorage) | Creates a loadable component with unique name. Throws: ToshibaException Parameter doc: name - Unique name of the component to be created dfltStorage - default storage resides; NULL - device discretion |
| public native FileStorage CreateStorageArea(String name, FileStorage parent, String URL) | Creates a storage area by unique name, optionally with parent and location. Throws: ToshibaException Parameter doc: name - Unique name of the area to be created parent - parent storage area; NULL - no parent URL - URL where the storage resides; NULL - device discretion |
| public native void DownloadComponents(LoadableComponent components, String urlTo) | Download files given a locale, category and component set. Throws: ToshibaException Parameter doc: components - list of components to download urlTo - URL where to store the files into Exception doc: ToshibaException |
| public native LoadableComponent getComponents( ) | |
| public native LoadableComponent GetComponents(Locale locale, String category) | Retrieves the component set associated with this file storage given alocale and category. Throws: ToshibaException Parameter doc: locale - object representing the target localecategory - name of category this file belongs to Return doc: The component list Exception doc: ToshibaException |
| public native RemoteComponent GetComponentsAt(String fromURL) | Retrieve the list of components that are available at the specified URL. Throws: ToshibaException Parameter doc: fromURL - URL where to check for components Return doc: List of components that can be backed up. |
| public native RemoteComponent GetComponentsAt(String fromURL) public native FileStorage getDriverRootStorage( ) public native FileStorage getStorageAreas( ) public native UpgradeRecord getUpgradeHistory( ) | |
| public native void InstallUpgrade(String urlFrom, LoadableComponent components) | Upgrade components from the specified URL. This method will check for dependent components and will upgrade these first. If intermediate restart is required before the upgrade is complete, this operation will return, IsRestartPending will return TRUE and IsUpgradeComplete will return FALSE. |

TABLE 224-continued

HouseKeeper Class Functions and Descriptions

| Function | Description |
|---|---|
| | Throws: ToshibaException |
| | Parameter doc: |
| | urlFrom - Source URL to install from |
| | components - List of components to install |
| public native boolean IsRestartPending( ) | Determines if a restart is currently pending. |
| | Throws: ToshibaException |
| | Return doc: |
| | Indication of whether restart is currently pending |
| public native boolean IsUpgradeComplete( ) | Indicates if the previously initiated upgrade operation is complete. |
| | Throws: ToshibaException |
| public native boolean IsUpgradePossible( ) | Determines if an upgarde is possible at this moment. |
| | The reasons upgrade may not be possible are: |
| | 1. Upgrade is already running or is not complete; |
| | 2. Restart is pending. |
| | Throws: ToshibaException |
| | Return doc: |
| | Indication of whether upgrade is possible |

The ImportResult class 2806 is a representation of import results. The ImportResult class 2806 is suitably a specialization of Base class 1502. Its functionality is detailed in Table 225.

TABLE 225

ImportResult Class Functions

| Function |
|---|
| public native int getNoFail( ) |
| public native int getNoOk( ) |

The LoadableComponent class 2808 is a representation of a software or data component that can be backed up, downloaded or uploaded. The LoadableComponent class 2808 is a specialization of MaintainableComponent class 1502. Its functionality is detailed in Table 226.

TABLE 226

LoadableComponent Class Functions

| Function | Description |
|---|---|
| public native void Download(String urlTo) | Creates a loadable component with unique name. |
| | Throws: ToshibaException |
| | Parameter doc: |
| | name - Unique name of the component to be created |
| | dfltStorage - default storage resides; |
| | NULL - device discretion |
| public native void Export(String toURL, String format) | Downloads all files of the component to a URL. |
| | Throws: ToshibaException |
| | Parameter doc: |
| | urlTo - URL where to download the files to |
| | Exception doc: <{ToshibaException}> |
| public native void DownloadComponents(LoadableComponent components, String urlTo) | Export this component to a specified URL. |
| | Throws: ToshibaException |
| | Parameter doc: |
| | toURL - URL to export to |
| | format - format ID ["CSV", "TSV", "SSV", "PSV"] |
| public native FileStorage getDfltStorage( ) | |
| public native ImportResult Import(String toURL, String format, boolean replace) | Import this component from a specified URL. |
| | Throws: ToshibaException |
| | Parameter doc: |
| | fromURL - URL to import from |
| | format - format ID ["CSV", "TSV"] |
| | replace - TRUE: replace contents, FALSE: add/update |
| | Return doc: |
| | detailed information about the import operation |

TABLE 226-continued

LoadableComponent Class Functions

| Function | Description |
|---|---|
| public native boolean isDataOnly( ) | |
| public native boolean Match(RemoteComponent counterpart) | Return indication of whether this component matches with the remote component supplied as an argument.<br>Throws: ToshibaException |
| public native void Upload(String urlFrom) | Uploads all files of the component into a device maintained storage.<br>Throws: ToshibaException<br>Parameter doc:<br>urlFrom - URL where to get the file from<br>Exception doc: <{ToshibaException}> |
| public native void UploadFile(FileStorage storage, String urlFrom) | Uploads a single file into the device maintained storage for a particular locale, category and component.<br>This method is useful when uploading using HTTP protocol, since this protocol allows only single file operation.<br>Throws: ToshibaException<br>Parameter doc:<br>storage - storage on the device to upload file to<br>urlFrom - URL where to get the file from<br>Exception doc:<br><{ToshibaException}> |

The RemoteComponent class 2810 is a representation of a remote component. The RemoteComponent class 2810 is suitably a specialization of Base class 2810. Its functionality is detailed in Table 227.

TABLE 227

RemoteComponent Class Functions

Function public native String getCategory( )
public native RemoteComponent getDependencies( )
public native String getDescription( )
public native Locale getLocale( )
public native String getName( )
public native int getSize( )
public native String getVersion( )

The UpgradeRecord class 2812 is a representation of a single historical record of an upgrade operation. The UpgradeRecord class 2812 is suitably a specialization of Base class 1502. Its functionality is detailed in Table 228.

TABLE 228

Upgrade Class Functions

Function public native RemoteComponent getComponents( )
public native String getTime( )
public native String getURLfrom( )
public native String getUser( )
public native boolean isComplete( )

Figure 25:
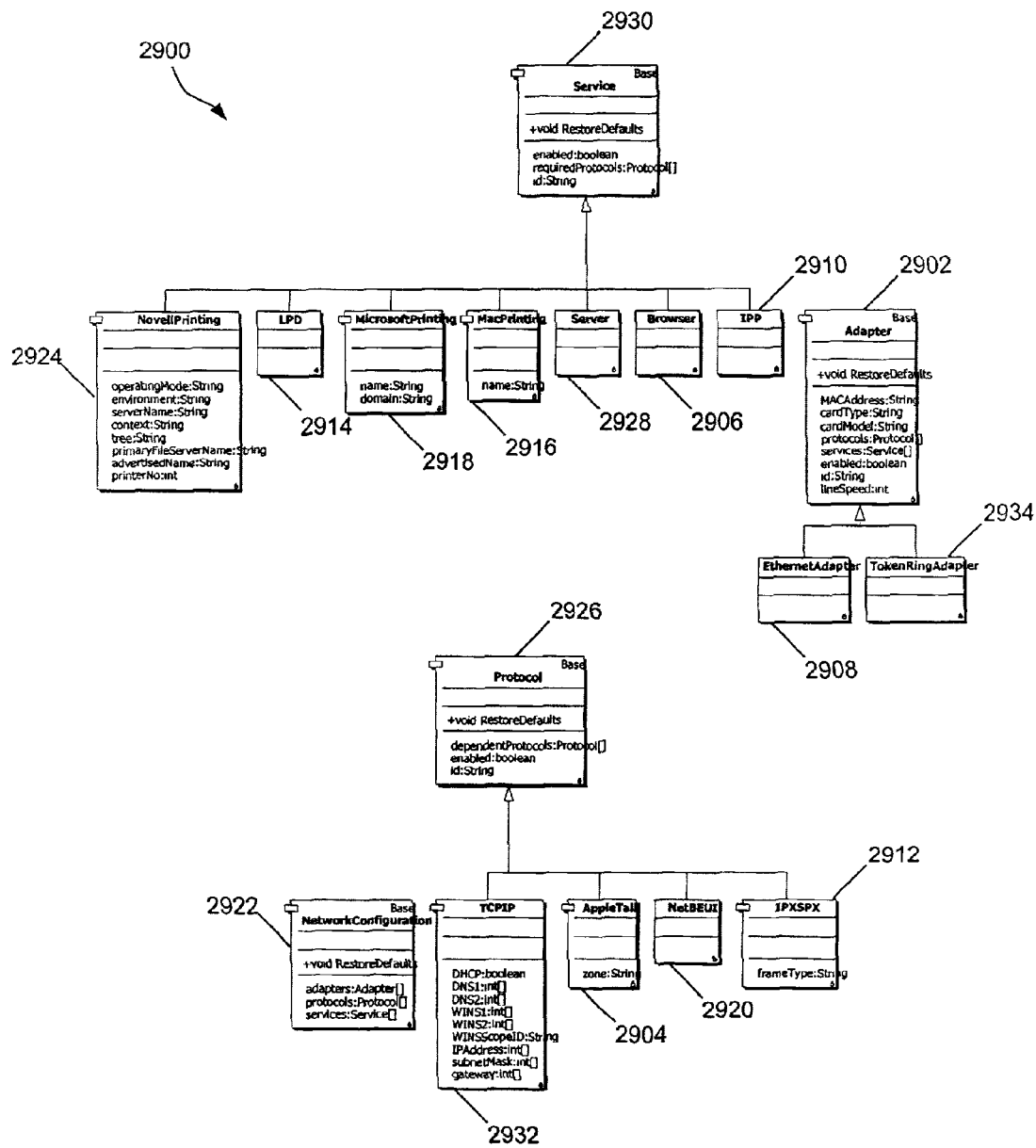
FIG. 25 is a class diagram representing a network package in a presently preferred embodiment of the invention.

Turning now to FIG. 25, a class diagram representing the Network package 2900 in a presently preferred embodiment of the invention is provided. The Network package 2900 comprises a plurality of classes. Its structure is detailed in Table 229.

TABLE 229

Structure of Network Package

| Element | Type |
|---|---|
| Adapter | Class |
| AppleTalk | Class |
| Browser | Class |
| EthernetAdapter | Class |
| IPP | Class |
| IPXSPX | Class |
| LPD | Class |
| MacPrinting | Class |
| MicrosoftPrinting | Class |
| NetBEUI | Class |
| NetworkConfiguration | Class |
| NovellPrinting | Class |
| Protocol | Class |
| Server | Class |
| Service | Class |
| TCPIP | Class |
| TokenRingAdapter | Class |
| WirelessEthernetAdapter | Class |

The Adapter class 2902 is an abstract base class representing a single network adapter. The Adapter class 2902 is suitably a specialization of Base class 1502. Its functionality is detailed in Table 230.

TABLE 230

Adapter Class Functions

| Function | Description |
|---|---|
| public native String getCardModel( ) | |
| public native String getCardType( ) | |
| public native String getId( ) | |
| public native int getLineSpeed( ) | |
| public native String getMACAddress( ) | |
| public native Protocol getProtocols( ) | |
| public native Service getServices( ) | |
| public native boolean isEnabled( ) | |

TABLE 230-continued

Adapter Class Functions

| Function | Description |
|---|---|
| public native void RestoreDefaults( ) | Restores factory default settings for all properties. Throws: ToshibaException |
| public native void setEnabled(boolean enabled) | |
| public native void setLineSpeed(int lineSpeed) | |

The AppleTalk class 2904 is a representation of AppleTalk protocol. The AppleTalk class 2904 is a specialization of Protocol class 2926. Its functionality is detailed in Table 231.

TABLE 231

AppleTalk Class Functions

| Function |
|---|
| public native String getZone( ) |
| public native void setZone(String zone) |

The Browser class 2906 represents a network browser service. The Browser class 2906 is a specialization of Service class 2930.

The EthernetAdapter class 2908 represents an Ethernet Adapter. The EthernetAdapter class 2908 is a specialization of Adapter class 2902.

The IPP class 2910 represents printing using the Internet Printing Protocol. The IPP class 2910 is a specialization of Service class 2930.

The IPXSPX class 2912 is a representation of the IPX/SPX protocol. The IPXSPX class 2912 is a specialization of Protocol class 2926. Its functionality is detailed in Table 232.

TABLE 232

IPXSPX Class Functions

| Function |
|---|
| public native String getFrameType( ) |
| public native void setFrameType(String frameType) |

The LPD class 2914 represents printing using the LPD Protocol (UNIX). The LPD class 2914 is a specialization of Service class 2930.

The MacPrinting class 2916 represents printing using AppleTalk networks. The MacPrinting class 2916 is a specialization of Service class 2930. Its functionality is detailed in Table 233.

TABLE 233

MacPrinting Class Functions

| Function |
|---|
| public native String getName( ) |
| public native void setName(String name) |

The MicrosoftPrinting class 2918 represents printing using Microsoft networks. The MicrosoftPrinting class 2918 is a specialization of Service class 2930. Its functionality is detailed in Table 234.

TABLE 234

MicrosoftPrinting Class Functions

| Function |
|---|
| public native String getDomain( ) |
| public native String getName( ) |
| public native void setDomain(String domain) |
| public native void setName(String name) |

The NetBEUI class 2920 is a representation of the NetBEUI protocol. The NetBEUI class 2920 is suitably a specialization of Protocol class 2926.

The NetworkConfiguration class 2922 is a container for network configuration parameters. The NetworkConfiguration class 2922 is a specialization of Base class 1502. Its functionality is detailed in Table 235.

TABLE 235

NetworkConfiguration Class Functions

| Function | Description |
|---|---|
| public native Adapter getAdapters( ) | |
| public native Protocol getProtocols( ) | |
| public native Service getServices( ) | |
| public native void RestoreDefaults( ) | Resets to factory default configuration. Throws: ToshibaException |

The NovellPrinting class 2924 represents printing using Novell networks. The NovellPrinting class 2924 is a specialization of Service class 2930. Its functionality is detailed in Table 236.

TABLE 236

NovellPrinting Class Functions

| Function |
|---|
| public native String getAdvertisedName( ) |
| public native String getContext( ) |
| public native String getEnvironment( ) |
| public native String getOperatingMode( ) |
| public native String getPrimaryFileServerName( ) |
| public native int getPrinterNo( ) |
| public native String getServerName( ) |
| public native String getTree( ) |
| public native void setAdvertisedName(String advertisedName) |
| public native void setContext(String context) |
| public native void setEnvironment(String environment) |
| public native void setOperatingMode(String operatingMode) |
| public native void setPrimaryFileServerName(String primaryFileServerName) |
| public native void setPrinterNo(int printerNo) |
| public native void setServerName(String serverName) |
| public native void setTree(String tree) |

The Protocol class 2926 is an abstract base class for all network protocols. The Protocol class 2926 is a specialization of Base class 1502. Its functionality is detailed in Table 237.

TABLE 237

Protocol Class Functions

| Function | Description |
|---|---|
| public native Protocol getDependentProtocols( ) | |
| public native String getId( ) | |
| public native boolean isEnabled( ) | |
| public native void RestoreDefaults( ) | Restores factory default settings for all properties. Throws: ToshibaException |
| public native void setEnabled(boolean enabled) | |

The Server class 2928 represents a Server service for allowing file sharing. The Server class 2928 is suitably a specialization of Service class 2930.

The Service class 2930 represents an abstract base class for all network services. The Service class 2930 is suitably a specialization of Base class 1502. Its functionality is detailed in Table 238.

TABLE 238

Service Class Functions

| Function | Description |
|---|---|
| public native String getId( ) | |
| public native Protocol getRequiredProtocols( ) | |
| public native boolean isEnabled( ) | |
| public native void RestoreDefaults( ) | Restores factory default settings for all properties. Throws: ToshibaException |
| public native void setEnabled(boolean enabled) | |

The TCPIP class 2932 represents the TCP/IP protocol. The TCPIP class 2932 is a specialization of Protocol class 2926. Its functionality is detailed in Table 239.

TABLE 239

TCPIP Class Functions

Function public native int[] getDNS1( )
    public native int[] getDNS2( )
    public native int[] getGateway( )
    public native int[] getIPAddress( )
    public native int[] getSubnetMask( )
    public native int[] getWINS1( )
    public native int[] getWINS2( )
    public native String getWINSScopeID( )
    public native boolean isDHCP( )
    public native void setDHCP(boolean DHCP)
    public native void setDNS1(int[] DNS1)
    public native void setDNS2(int[] DNS2)
    public native void setGateway(int[] gateway)
    public native void setIPAddress(int[] IPAddress)
    public native void setSubnetMask(int[] subnetMask)
    public native void setWINS1(int[] WINS1)
    public native void setWINS2(int[] WINS2)
    public native void setWINSScopeID(String WINSScopeID)

The TokenRingAdapter class 2934 is a representation of a TokenRing adapter. The TokenRingAdapter class 2934 is suitably a specialization of Adapter class 2902.

The WirelessEthernetAdapter class 2936 representation of a wireless Ethernet adapter. The WirelessEthernetAdapter class 2936 is suitably a specialization of EthernetAdapter class 2908. Its functionality is detailed in Table 240.

TABLE 240

WirelessEthernetAdapter Class Functions

Function public native String getAdapterModel( )
public native String getAdapterVersion( )
public native String getAuthenticationType( )
public native int getChannel( )
public native String getCountryVersion( )
public native int getDataRate( )
public native int getDataRetries(
public native String getDfltAccessPoint( )
public native int getFragmentThreshold( )
public native String getManufacturer( )
public native String getNetworkType( )
public native int getRTSRetryLimit( )
public native int getRTSThreshold( )
public native String getSSID( )
public native int getWEPencryptionStrength( )
public native int getXmitPower( )
public native void setAuthenticationType(String authenticationType)
public native void setChannel(int channel)
public native void setDataRate(int dataRate)
public native void setDataRetries(int dataRetries)
public native void setDfltAccessPoint(String dfltAccessPoint)
public native void setFragmentThreshold(int fragmentThreshold)
public native void setNetworkType(String networkType)
public native void setRTSRetryLimit(int RTSRetryLimit)
public native void setRTSThreshold(int RTSThreshold)
public native void setSSID(String SSID)
public native void setWEPencryptionStrength(int WEPencryptionStrength)
public native void setWEPkey(String WEPkey)
public native void setXmitPower(int xmitPower)

Figure 26:
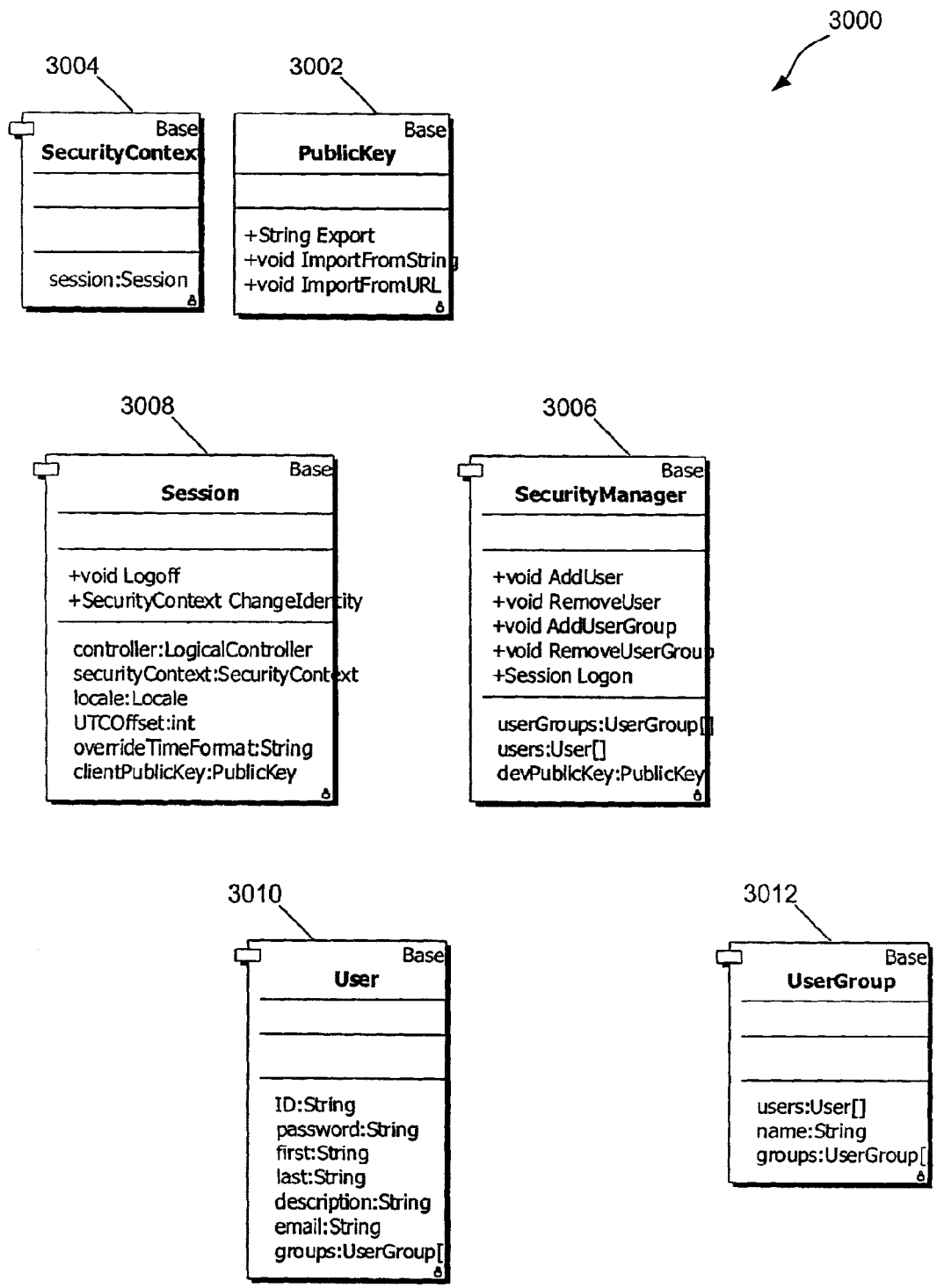
FIG. 26 is a class diagram representing a security package in a presently preferred embodiment of the invention.

Turning now to FIG. 26, a class diagram representing the Security package 3000 in a presently preferred embodiment of the invention is provided. The Network package 3000 comprises a plurality of classes. Its structure is detailed in Table 241.

TABLE 241

Structure of Security Package

| Element | Type |
|---|---|
| PublicKey | Class |
| SecurityContext | Class |
| SecurityManager | Class |
| Session | Class |
| User | Class |
| UserGroup | Class |
| Diagrams | Class |

The PublicKey class 3002 is a representation of the public keys used for transmission of secured information over unsecure connections. The PublicKey class 3002 is a specialization of Base class 1502. Its functionality is detailed in Table 242.

TABLE 242

PublicKey Class Functions

| Function | Description |
|---|---|
| public native String Export( ) | Exports the key into a MIME encoded string.<br>Throws: ToshibaException |
| public native void ImportFromString(String key) | Imports the public key from a MIME encoded string.<br>Throws: ToshibaException |

TABLE 242-continued

PublicKey Class Functions

| Function | Description |
|---|---|
| public native void ImportFromURL(String url) | Imports the public key from an URL. Encoding depends on the protocol used.<br>Throws: ToshibaException |

The SecurityContext class 3004 is a representation of the security context of a client. This security context is suitably used to represent a client's identity and access rights before a secured device. The SecurityContext class 3004 is a specialization of Base class 1502. Its functionality is detailed in Table 243.

TABLE 243

SecurityContext Class Functions

| Function |
|---|
| public native Session getSession( ) |

The SecurityManager class 3006 is an object that encapsulates the context and behavior associated with security management. The SecurityManager class 3006 is a specialization of Base class 1502. Its functionality is detailed in Table 244.

TABLE 244

SecurityManager Class Functions

| Function | Description |
|---|---|
| public native void AddUser(User user) | Adds a user to the list of users. Must have administrative privileges.<br>Throws: ToshibaException<br>Parameter doc:<br>user - user object to add public native void |
| AddUserGroup(UserGroup user) | Adds a group to the list of groups. Must haveadministrative privileges.<br>Throws: ToshibaException<br>Parameter doc:<br>group - group object to add |
| public native PublicKey getDevPublicKey( ) | Retrieves device's public key used for secure transmission.<br>Return doc:<br>Public key of the device, so that user names and passwords can be exchanged with clients |
| public native UserGroup getUserGroups( )<br>public native User getUsers( ) | |
| public native Session Logon(String name, String password) | Authenticates a user and returns a security context.<br>Throws: ToshibaException<br>Return doc:<br>Security descriptor encapsulating user's identity. |
| public native void RemoveUser(User user) | Removes existing user.<br>Throws: ToshibaException<br>Parameter doc:<br>user - user object to remove |
| public native void RemoveUserGroup(UserGroup user) | Removes a group from the list of groups. Must have administrative privileges.<br>Throws: ToshibaException<br>Parameter doc:<br>group - group object to remove |
| public native void setUserGroups(UserGroup userGroups)<br>public native void setUsers(User users) | |

The Session class 3008 is the context of a logon session. All settings that are maintained during a session with a logical controller are suitably encapsulated by objects of this class. The Session class 3008 is a specialization of Base class 1502. Its functionality is detailed in Table 245.

TABLE 245

Session Class Functions

| Function | Description |
|---|---|
| public native SecurityContext ChangeIdentity(SecurityContext newId) | Change the current identity of the user |

TABLE 245-continued

Session Class Functions

| Function | Description |
|---|---|
| | interacting with the device. Requires previous logon with the device to establish the a securitycontext for the new identity. Throws: ToshibaException Return doc: The security context of the old identity. |
| public native LogicalController getController( ) | |
| public native Locale getLocale( ) | |
| public native String getOverrideTimeFormat( ) | |
| public native SecurityContext getSecurityContext( ) | |
| public native void Logoff( ) | Logs off the current user. Throws: ToshibaException |
| public native void setClientPublicKey(PublicKey clientPublicKey) | |
| public native void setController(LogicalController controller) | |
| public native void setLocale(Locale locale) | |
| public native void setOverrideTimeFormat(String overrideTimeFormat) | |
| public native void setUTCOffset(int UTCOffset) | |

The User class 3010 is a single authenticatable user. The User class 3010 is a specialization of Base class 1502. Its functionality is detailed in Table 235.

TABLE 235

User Class Functions

| Function |
|---|
| public native String getDescription( ) |
| public native String getEmail( ) |
| public native String getFirst( ) |

TABLE 235-continued

User Class Functions

| Function |
|---|
| public native UserGroup getGroups( ) |
| public native String getID( ) |
| public native String getLast( ) |
| public native void setDescription(String description) |
| public native void setEmail(String email) |
| public native void setFirst(String first) |
| public native void setGroups(UserGroup groups) |
| public native void setID(String ID) |
| public native void setLast(String last) |
| public native void setPassword(String password) |

The UserGroup class 3012 is a representation of a group of users. The UserGroup class 3012 is a specialization of Base class 1502. Its functionality is detailed in Table 236.

TABLE 236

UserGroup Class Functions

| Function |
|---|
| public native UserGroup getGroups( ) |
| public native String getName( ) |
| public native User getUsers( ) |
| public native void setGroups(UserGroup groups) |
| public native void setName(String name) |

In addition, there is provided in Appedix A another preferred embodiment of the present invention.

Although the preferred embodiment(s) have been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

Appendix A
| Root Package |
|---|
*Subpackages*
    package com
Class Diagrams
<default>
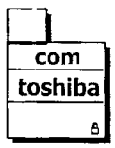
| Package *com* |
|---|
*Subpackages*
    package com.toshiba
Class Diagrams
com
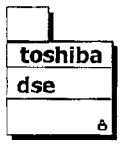
| Package *com.toshiba* |
|---|
*Subpackages*
    package com.toshiba.dse
Class Diagrams
    toshiba

Package *com.toshiba.dse*

Subpackages package com.toshiba.dse.sdk

Class Diagrams dse

Package *com.toshiba.dse.sdk*

Subpackages package com.toshiba.dse.sdk.addressBook
package com.toshiba.dse.sdk.devices
package com.toshiba.dse.sdk.filters
package com.toshiba.dse.sdk.imageHandlers
package com.toshiba.dse.sdk.jobs
package com.toshiba.dse.sdk.localImplementation
package com.toshiba.dse.sdk.logs
package com.toshiba.dse.sdk.maintenance
package com.toshiba.dse.sdk.network package com.toshiba.dse.sdk.security
*Classes*
class Base
class Counter
class MaintainableComponent
class ToshibaException
Class Diagrams
sdk
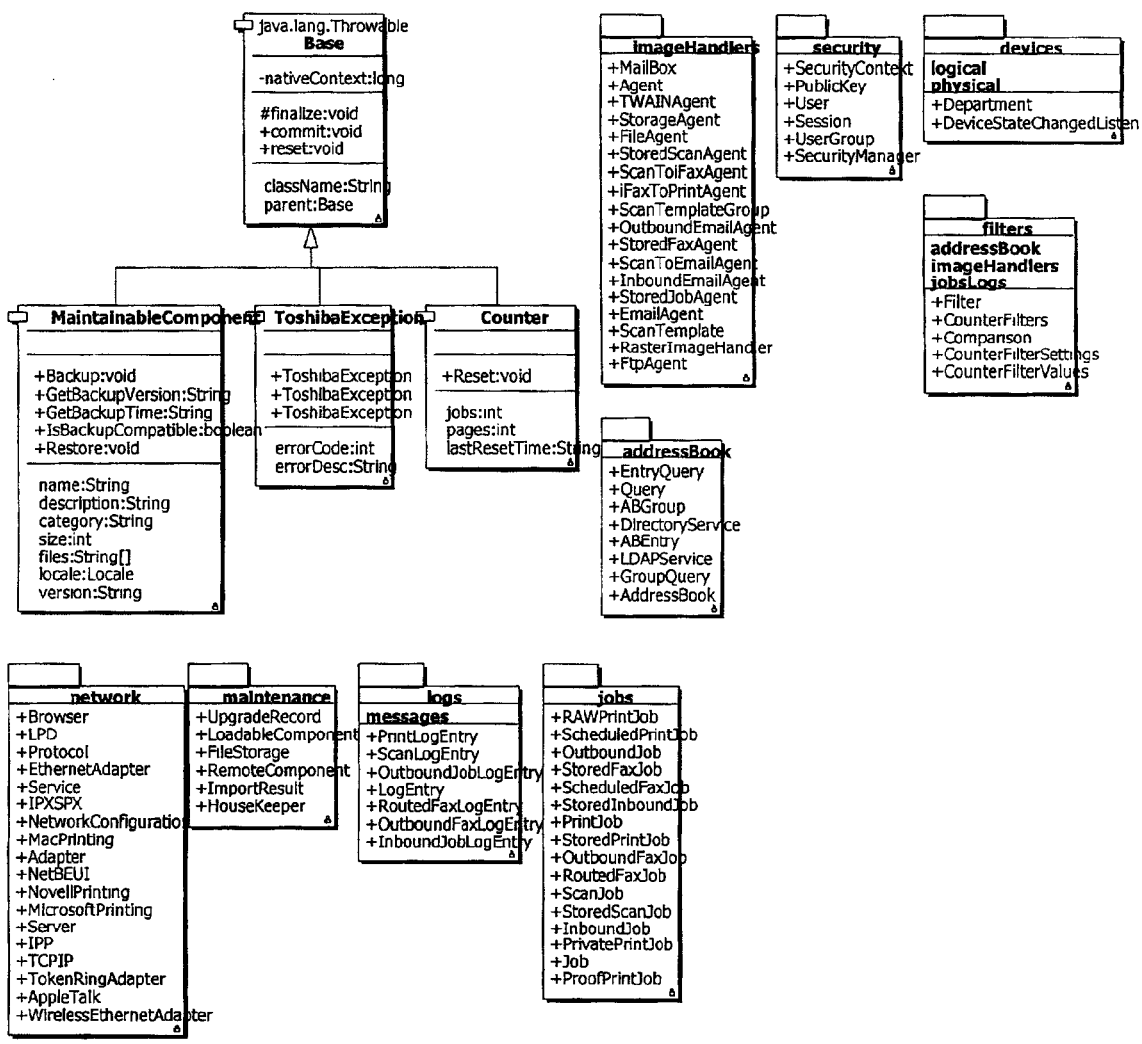

Class Detail

Class *Base* package: com.toshiba.dse.sdk

Description:

This is the base class for all Java beans used in the subordinate packages.

Extends:
java.lang.Throwable

--- public native `void commit()`

Commits object to persistent storage. Ignored for transient objects.

Throws:
ToshibaException

--- protected native `void finalize()`

Finalization method override -- internal.

--- protected native `String getClassName()`

Class name retrieval -- internal

--- public native `Base getParent()`

Retrieves the parent object -- the object with the smallest life scope that completely encloses the life scope of this object.

--- public native `void reset()`

Resets the object's state to what it was after the last commit. Ignored for transient objects.

Throws:
ToshibaException

---

Class *Counter* package: com.toshiba.dse.sdk

Description:

Represents a single job and page counter.

Extends:
com.toshiba.dse.sdk.Base

Methods:

| |
|---|
| public native int getJobs() |
| public native String getLastResetTime() |
| public native int getPages() |
| public native void Reset()<br><br>Resets the counts kept in that object.<br><br>If filtering by Department is active, that operation will apply only to that department.<br><br>Throws:<br>ToshibaException |

Class *MaintainableComponent* package: com.toshiba.dse.sdk

Description:

Abstraction for a component that can be maintained by the user.

Extends:
com.toshiba.dse.sdk.Base

Methods:

| |
|---|
| public native void Backup(String toURL)<br><br>Backs up this component given a target URL.<br><br>Existing files on the target URL will be replaced.<br><br>Throws:<br>ToshibaException<br><br>Parameter doc:<br>incremental - TRUE to perform incremental operation<br>fromURL - URL to restore from |

Methods public native String GetBackupTime(String fromURL)

Retrieve the time of a backup given the backup file.

Throws:
     ToshibaException

Return doc:
     Backup time

Parameter doc:
     fromURL -- the URL to check for backup time from

--- public native String GetBackupVersion(String fromURL)

Retrieve the version of a backup file.

Throws:
     ToshibaException

Parameter doc:
     fromURL -- URL to check the backup from

Return doc:
     Backup version

--- public native String getCategory()

--- public native String getDescription()

--- public native String getFiles()

--- public native Locale getLocale()

--- public native String getName()

--- public native int getSize()

--- public native String getVersion()

Methods:

| |
|---|
| `public native boolean IsBackupCompatible(String fromURL)` <br><br>Returns indication whether a backup file at the specified URL is compatible with this component.<br><br>Throws:<br>  ToshibaException<br><br>Parameter doc:<br>  fromURL — URL to check backup file from |
| `public native void Restore(String fromURL, boolean incremental)` <br><br>Restore component from a URL.<br><br>Throws:<br>  ToshibaException<br><br>Parameter doc:<br>  incremental - TRUE to perform incremental operation<br>  fromURL - URL to restore from |

Class *ToshibaException* package: com.toshiba.dse.sdk

Description:

This is the base class for all exceptions.

Extends:
  com.toshiba.dse.sdk.Base

Methods:

| |
|---|
| `public native int getErrorCode()` |
| `public native String getErrorDesc()` |
| `protected native void setErrorCode(int errCode)` |
| `protected native void setErrorDesc(String errDesc)` |

| Package *com.toshiba.dse.sdk.addressBook* |
|---|
*Classes*
   class ABEntry
   class ABGroup
   class AddressBook
   class DirectoryService
   class EntryQuery
   class GroupQuery
   class LDAPService
   class Query
Class Diagrams
addressBook
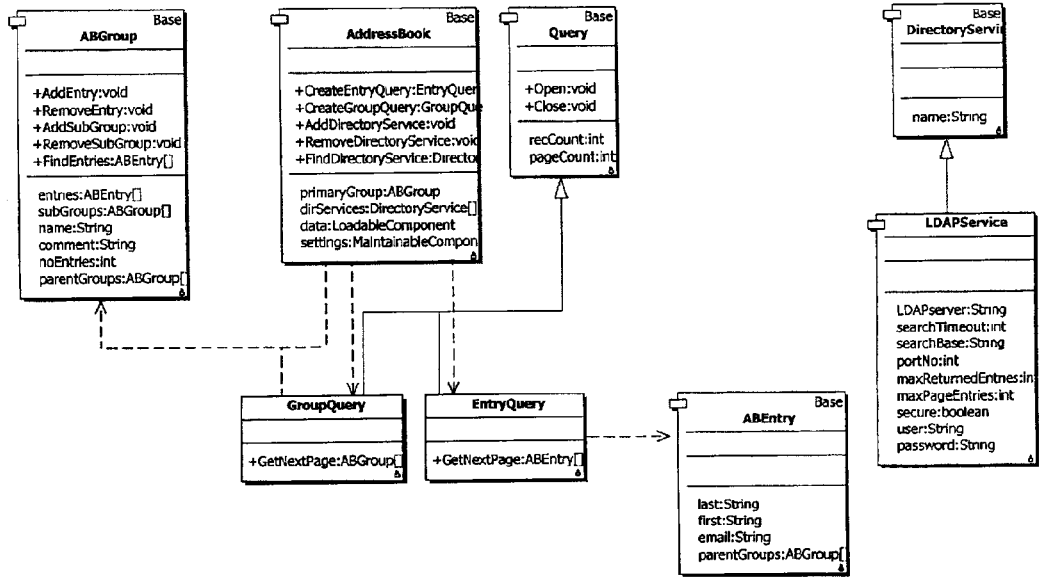
Class Detail
| Class *ABEntry* |
|---|
package: com.toshiba.dse.sdk.addressBook
Description:
   Represents a single entry in the Address Book.
Extends:

com.toshiba.dse.sdk.Base

Methods

| |
|---|
| public native String getEmail() |
| public native String getFirst() |
| public native String getLast() |
| public native ABGroup getParentGroups() |
| public native void setEmail(String email) |
| public native void setFirst(String first) |
| public native void setLast(String last) |
| public native void setParentGroups(ABGroup parentGroups) |

Class *ABGroup* package: com.toshiba.dse.sdk.addressBook

Description:

Represents an Address Book group.

Extends:
com.toshiba.dse.sdk.Base

Methods

| |
|---|
| public native void AddEntry(ABEntry entry)<br>Add specified entry to the address book and associate it with this group. |
| public native void AddSubGroup(ABGroup subGroup)<br>Add specified group as a sub-group. |
| public native ABEntry FindEntries(ABEntryFilterSettings filterSettings)<br>Query for set of entries |
| public native String getComment() |
| public native ABEntry getEntries() |

| Methods |
|---|
| public native String getName() |
| public native int getNoEntries() |
| public native ABGroup getParentGroups() |
| public native ABGroup getSubGroups() |
| public native void RemoveEntry(ABEntry entry)<br>   Remove specified entry from this group. |
| public native void RemoveSubGroup(ABGroup subGroup)<br>   Remove specified group from being a sub-group. |
| public native void setComment(String comment) |
| public native void setName(String name) |
| public native void setParentGroups(ABGroup parentGroups) |

Class *AddressBook* package: com.toshiba.dse.sdk.addressBook

Description:

Represents an address book -- collection of entries, groups and directory services.

Extends:
com.toshiba.dse.sdk.Base

| Methods |
|---|
| public native void AddDirectoryService(DirectoryService service)<br>   Add new directory service.<br>   Throws:<br>     ToshibaException<br>   Parameter doc:<br>     service - directory service to add |

```
public native EntryQuery CreateEntryQuery(DirectoryService service,
ABEntryFilterSettings last)
```

Query entries using specified directory service based on partial first, last and email.

Throws:
ToshibaException

Parameter doc:
first - partial first name
last - partial last name
email - partial email address

```
public native GroupQuery CreateGroupQuery(DirectoryService service,
ABGroupFilterSettings filter)
```

Create query for groups using specified directory service and partial group name.

Throws:
ToshibaException

Parameter doc:
service - directory service to use; NULL to search address book itself
grpName - partial group name

```
public native DirectoryService FindDirectoryService(String exactName)
```

Searches for existing directory service.

Throws:
ToshibaException

Parameter doc:
exactName - exact name of the directory service to search for ret:
- the directory service object

```
public native LoadableComponent getData()
```

```
public native DirectoryService getDirServices()
```

```
public native ABGroup getPrimaryGroup()
```

Methods

```
public native MaintainableComponent getSettings()
```

```
public native void RemoveDirectoryService(DirectoryService service)
```
Remove existing directory service.

Throws:
  ToshibaException

Parameter doc:
  service - directory service to remove

Class *DirectoryService* package: com.toshiba.dse.sdk.addressBook

Description:

Abstract representation of a name lookup service, aka directory service.

Extends:
  com.toshiba.dse.sdk.Base

Methods

```
public native String getName()
```

```
public native void setName(String name)
```

Class *EntryQuery* package: com.toshiba.dse.sdk.addressBook

Description:

Represents a query for entries.

Extends:
  com.toshiba.dse.sdk.addressBook.Query

Methods

```
public native ABEntry GetNextPage()
```
Retrieve next page of entries.

Throws:
  ToshibaException

Class *GroupQuery* package: com.toshiba.dse.sdk.addressBook

Description:

Represents query for groups.

Extends:
com.toshiba.dse.sdk.addressBook.Query

Methods:

| |
|---|
| public native ABGroup GetNextPage() |
| Retrieve next page of groups. Throws: ToshibaException |

Class *LDAPService* package: com.toshiba.dse.sdk.addressBook

Description:

Specialization of DirectoryService using LDAP protocol.

Extends:
com.toshiba.dse.sdk.addressBook.DirectoryService

Methods:

| |
|---|
| public native String getLDAPserver() |
| public native int getMaxPageEntries() |
| public native int getMaxReturnedEntries() |
| public native String getPassword() |
| public native int getPortNo() |
| public native String getSearchBase() |
| public native int getSearchTimeout() |
| public native String getUser() |
| public native boolean isSecure() |

| Methods |
|---|
| public native void setLDAPserver(String LDAPserver) |
| public native void setMaxPageEntries(int maxPageEntries) |
| public native void setMaxReturnedEntries(int maxReturnedEntries) |
| public native void setPassword(String password) |
| public native void setPortNo(int portNo) |
| public native void setSearchBase(String searchBase) |
| public native void setSearchTimeout(int searchTimeout) |
| public native void setSecure(boolean secure) |
| public native void setUser(String user) |

Class *Query* package: com.toshiba.dse.sdk.addressBook

Description:

Abstract representation of a query for groups or individual entries.

Extends:
com.toshiba.dse.sdk.Base

| Methods |
|---|
| public native void Close()<br><br>Close query.<br><br>Throws:<br>ToshibaException |
| public native int getPageCount() |
| public native int getRecCount() |

```
public native void Open()
```
Open/execute query.

Throws:
ToshibaException

```
public native void setPageCount(int pageCount)
```

Package *com.toshiba.dse.sdk.devices*

*Subpackages*
    package com.toshiba.dse.sdk.devices.logical
    package com.toshiba.dse.sdk.devices.physical

*Classes*
    class Department
    class DeviceStateChangedListener

Class Diagrams devices

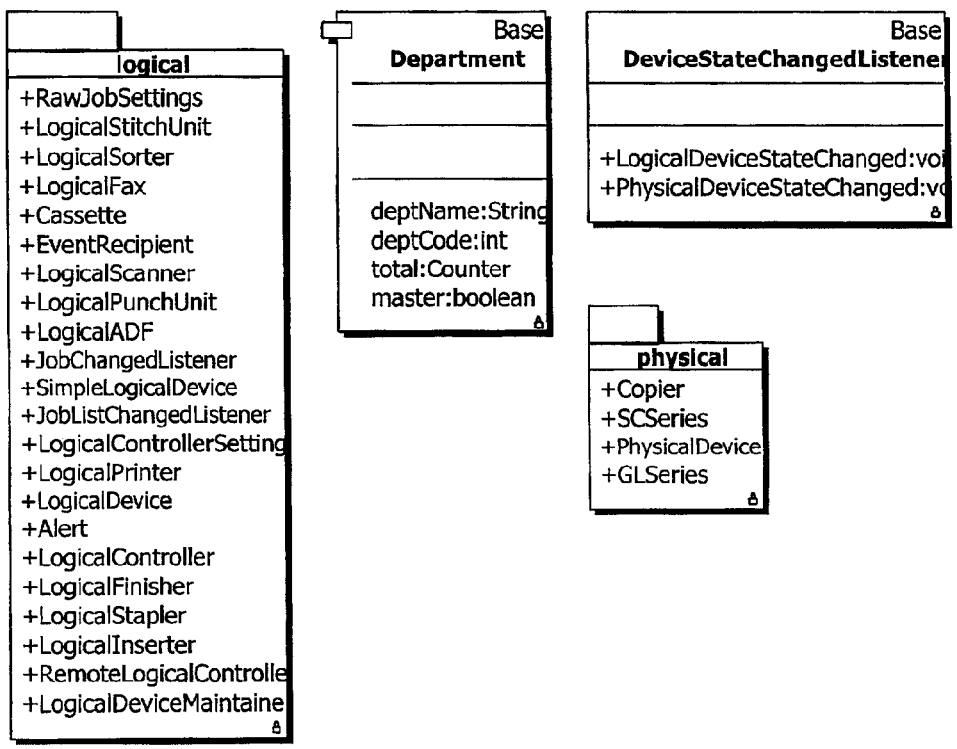

Class Detail

**Class *Department*** package: com.toshiba.dse.sdk.devices

Description:

Represents a department -- abstraction used to account for resource usage.

Each department has a unique number. Typically departments correspond to business subdivisions, but that may not always be the case.

Extends:
   com.toshiba.dse.sdk.Base

| Methods |
|---|
| public native int getDeptCode() |
| public native String getDeptName() |
| public native Counter getTotal() |

Methods:

| |
|---|
| public native boolean isMaster() |
| public native void setDeptCode(int deptCode) |
| public native void setDeptName(String deptName) |

Class *DeviceStateChangedListener* package: com.toshiba.dse.sdk.devices

Description:

Base class for a "device changed state" events.

Extends:
com.toshiba.dse.sdk.Base

Methods:

| |
|---|
| public native void LogicalDeviceStateChanged(LogicalDevice device) |
|    Called when logical device changed state. |
| public native void PhysicalDeviceStateChanged(PhysicalDevice device) |

Package *com.toshiba.dse.sdk.devices.logical*

*Classes*
  class Alert
  class Cassette
  class EventRecipient
  class JobChangedListener
  class JobListChangedListener
  class LogicalADF
  class LogicalController
  class LogicalControllerSettings
  class LogicalDevice
  class LogicalDeviceMaintainer
  class LogicalFax
  class LogicalFinisher
  class LogicalInserter
  class LogicalPrinter
  class LogicalPunchUnit
  class LogicalScanner class LogicalSorter
class LogicalStapler
class LogicalStitchUnit
class RawJobSettings
class RemoteLogicalController
class SimpleLogicalDevice
Class Diagrams
logical
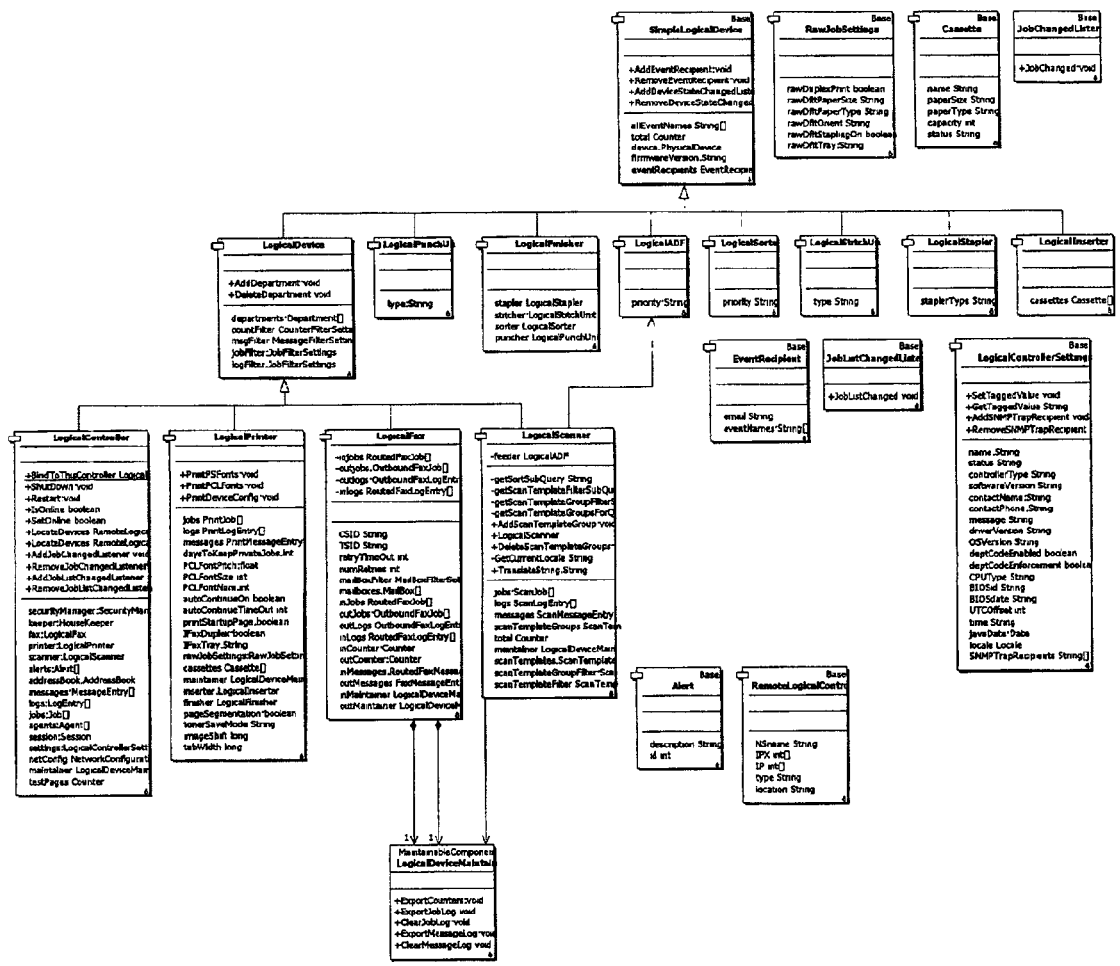
Class Detail
| Class *Alert* |
|---|
package: com.toshiba.dse.sdk.devices.logical

Description:

Generic device alert. Alerts originate from the logical devices and the Alert objects are read-only.

Extends:

com.toshiba.dse.sdk.Base

Methods

| |
|---|
| public native String getDescription() |
|     Retrieves the description of the alert. |
| public native int getId() |
|     Retrieves the bindary ID of the alert. |

Class *Cassette* package: com.toshiba.dse.sdk.devices.logical

Description:

Represents a single paper cassette.

Extends:

com.toshiba.dse.sdk.Base

Methods

| |
|---|
| public native int getCapacity() |
|     Retrieves capacity of the cassette. |
| public native String getName() |
|     Retrieves the unique name of the cassette. |
| public native String getPaperSize() |
|     Retrieves paper size currently loaded in the cassette. |
| public native String getPaperType() |
|     Retrieves the paper type (logo, hole-punched, etc.) of the cassette. |
| public native String getStatus() |
|     Retrieves the status of the cassette. |

Methods:

| |
|---|
| `public native void setPaperType(String paperType)` |
| Sets the paper type of the cassette. |

Class *EventRecipient* package: com.toshiba.dse.sdk.devices.logical

Description:

Represents a single event recipient.

Extends:
com.toshiba.dse.sdk.Base

Methods:

| |
|---|
| `public native String getEmail()` |
| Retrieve the email address of the recipient. |
| `public native String getEventNames()` |
| `public native void setEmail(String email)` |
| `public native void setEventNames(String eventNames)` |

Class *JobChangedListener* package: com.toshiba.dse.sdk.devices.logical

Description:

Abstract base class for job change events' listeners.

Extends:
com.toshiba.dse.sdk.Base

Methods:

| |
|---|
| `public native void JobChanged(Job job)` |
| Called when a job has changed. The argument identifies the job that has changed.<br>See:<br>  `toshiba.Jobs` |

Class *JobListChangedListener* package: com.toshiba.dse.sdk.devices.logical

Description:

Base class for job list change events.

Extends:
com.toshiba.dse.sdk.Base

Methods

```
public native void JobListChanged(String jobType)
```
Called when the job list has changed. The argument contains the type of job list that has changed.

See:
   toshiba.Jobs

Class *LogicalADF* package: com.toshiba.dse.sdk.devices.logical

Description:

Represents a logical Automatic Document Feeder (ADF) -- device that receives the input sheets for scanning or copying.

Extends:
com.toshiba.dse.sdk.devices.logical.SimpleLogicalDevice

Methods

```
public native String getPriority()
```

```
public native void setPriority(String priority)
```

Class *LogicalController* package: com.toshiba.dse.sdk.devices.logical

Description:

Represents a logical device controller. This is a logical device that controls other logical devices, such as logical printers and scanners.

Extends:
com.toshiba.dse.sdk.devices.logical.LogicalDevice

| |
|---|
| public native void AddJobChangedListener(JobChangedListener listener)<br>Throws:<br>  ToshibaException |
| public native void AddJobListChangedListener(JobListChangedListener listener)<br>Throws:<br>  ToshibaException |
| public static native LogicalController BindToThisController()<br>Binds to the LogicalController object this server is associated to.<br>Throws:<br>  ToshibaException<br>Return doc:<br>  The logical controller |
| public native AddressBook getAddressBook() |
| public native Agent getAgents() |
| public native Alert getAlerts() |
| public native LogicalFax getFax() |
| public native Job getJobs() |
| public native HouseKeeper getKeeper() |
| public native LogEntry getLogs() |
| public native LogicalDeviceMaintainer getMaintainer() |
| public native MessageEntry getMessages() |
| public native NetworkConfiguration getNetConfig() |
| public native LogicalPrinter getPrinter() |
| public native LogicalScanner getScanner() |

| |
|---|
| Methods: |
| public native `SecurityManager getSecurityManager()` |
| public native `Session getSession()`<br><br>Retrieves the session associated with the this controller or null object if no session exists. |
| public native `LogicalControllerSettings getSettings()` |
| public native `Counter getTestPages()` |
| public native `boolean IsOnline()`<br><br>Returns the "online" state of the controller.<br><br>Throws:<br>ToshibaException<br><br>Return doc:<br>Current state of the controller. |
| public native `RemoteLogicalController LocateDevices(int[] IPfrom, int[] IPto, String controllerTypes, String protocols)`<br><br>Locate devices from a range of IP addresses, controller and network protocol types.<br><br>Throws:<br>ToshibaException<br><br>Parameter doc:<br>IPfrom - the beginning IP address<br>IPto - the ending IP address<br>controllerTypes - type names for the controllers to be located<br>protocols - network protocol names to be used for location<br><br>Return doc:<br>Array of RemoteLogicalController objects -- one for each distinct device found. |

```
public native RemoteLogicalController LocateDevices(String controllerTypes,
String protocols, int[] subnet)
```

Locates devices on a particular subnet by specifying controller and network protocol types.

Throws:
ToshibaException

Return doc:
Array of RemoteLogicalController objects -- one for each distinct device found.

Parameter doc:
controllerTypes - array of strings containing the type names of the controllers to be located.
protocols - array of network protocol names to be used for location
subnet - array of integers indicating the subnet to be used for location; if null controller's subnet is used

---

```
public native void RemoveJobChangedListener(JobChangedListener listener)
```

Throws:
ToshibaException

---

```
public native void RemoveJobListChangedListener(JobListChangedListener listener)
```

Throws:
ToshibaException

---

```
public native void Restart(boolean bSoft)
```

Restarts the controller.

Throws:
ToshibaException

Parameter doc:
bSoft - TRUE to perform software restart; FALSE to reboot completely.

Methods:

```
public native boolean SetOnline(boolean newState)
```
Sets the controller's online state.

Throws:
  ToshibaException

Return doc:
  The previous "online" state.

---

```
public native void ShutDown()
```
Shuts down the controller.

Throws:
  ToshibaException

---

Class *LogicalControllerSettings* package: com.toshiba.dse.sdk.devices.logical

Description:

Closely related to LogicalController and represents its settings. These are configuration parameters of the controller that are inessential to its day-to-day operation.

Extends:
  com.toshiba.dse.sdk.Base

Methods:

```
public native void AddSNMPTrapRecipient(String recipient)
```
Add SNMP trap recipient.

Throws:
  ToshibaException

Parameter doc:
  recipient -- DNS name or IP address

---

```
public native String getBIOSdate()
```

---

```
public native String getBIOSid()
```

---

```
public native String getContactName()
```

| Methods: |
|---|
| public native String getContactPhone() |
| public native String getControllerType() |
| public native String getCPUType() |
| public native String getDriverVersion() |
| public Date getJavaDate() |
| public native Locale getLocale() |
| public native String getMessage() |
| public native String getName() |
| public native String getOSVersion() |
| public native String getSNMPTrapRecipients() |
| public native String getSoftwareVersion() |
| public native String getStatus() |
| public native String GetTaggedValue(String name)<br>  Retrieve tagged value by name.<br>  Throws:<br>    ToshibaException<br>  Return doc:<br>    tagged value<br>  Parameter doc:<br>    name -- name of the value to get |
| public native String getTime() |
| public native int getUTCOffset() |
| public native boolean isDeptCodeEnabled() |
| public native boolean isDeptCodeEnforcement() |

| Methods |
|---|
| public native void RemoveSNMPTrapRecipient(String recipient)<br>Remove SNMP trap recipient.<br>Throws:<br>  ToshibaException<br>Parameter doc:<br>  recipient -- DNS name or IP address |
| public native void setContactName(String contactName) |
| public native void setContactPhone(String contactPhone) |
| public native void setDeptCodeEnforcement(boolean deptCodeEnforcement) |
| public void setJavaDate(Date javaDate) |
| public native void setLocale(Locale locale) |
| public native void setMessage(String message) |
| public native void setSNMPTrapRecipients(String recipients) |
| public native void SetTaggedValue(String name, String val)<br>Throws:<br>  ToshibaException<br>Parameter doc:<br>  name -- name of the value to set<br>  val -- value to set |
| public native void setTime(String time) |
| public native void setUTCOffset(int UTCOffset) |

Class *LogicalDevice* package: com.toshiba.dse.sdk.devices.logical

Description:

Abstract class representing a Logical Device.

Logical devices are components of Physical devices -- actual devices that you can actually walk up to. Each Physical Device contains at least one Logical Device and MFP contain more than one Logical Device.

Example: Digital copier is a Physical Device that contains two logical ones: scanner and a printer.

Extends:
   com.toshiba.dse.sdk.devices.logical.SimpleLogicalDevice

Methods

| |
|---|
| `public native void AddDepartment(int deptCode, String deptName)` <br> Adds a new department to the list. <br> Throws: <br>   ToshibaException <br> Parameter doc: <br>   deptCode - the new department's code <br>   deptName - new department's name |
| `public native void DeleteDepartment(int deptCode)` <br> Deletes existing department from the list. <br> Throws: <br>   ToshibaException <br> Parameter doc: <br>   deptCode - the new department's code |
| `public native CounterFilterSettings getCountFilter()` |
| `public native Department getDepartments()` |
| `public native JobFilterSettings getJobFilter()` |
| `public native JobFilterSettings getLogFilter()` |
| `public native MessageFilterSettings getMsgFilter()` |
| `public native void setCountFilter(CounterFilterSettings countFilter)` |
| `public native void setJobFilter(JobFilterSettings jobFilter)` |

Methods

| |
|---|
| public native void setLogFilter(JobFilterSettings logFilter) |
| public native void setMsgFilter(MessageFilterSettings msgFilter) |

Class *LogicalDeviceMaintainer* package: com.toshiba.dse.sdk.devices.logical

Description:

Closely related to LogicalController. Encapsulates the behavior and semantics associated with the maintenance of LogicalController.

Extends:
com.toshiba.dse.sdk.MaintainableComponent

Methods

| |
|---|
| public native void ClearJobLog(String timeEarliest)<br><br>Clears job log.<br><br>Throws:<br>ToshibaException<br><br>Parameter doc:<br>timeEarliest - earliest time to be left any entries earlier than that time will be cleared; NULL for all |
| public native void ClearMessageLog(String timeEarliest)<br><br>Clears message log.<br><br>Throws:<br>ToshibaException<br><br>Parameter doc:<br>timeEarliest - earliest time to be left in; any entries earlier than that time will be cleared; NULL for all |

```
public native void ExportCounters(String format, String exportURL, boolean
bHeading)
```

Export the counter information.

If filtering Department is active, that will export information only for that department.

Throws:
  ToshibaException

Parameter doc:
  format - format name
  exportURL - URL to store the exported file
  heading - TRUE to include a heading row at the beginning

---

```
public native void ExportJobLog(String format, String exportURL, boolean
bHeading)
```

Export job log into a specific format file on the network.

Throws:
  ToshibaException

Parameter doc:
  format - format name
  exportURL - URL to store the export file
  heading - TRUE to include a heading row at the beginning

---

```
public native void ExportMessageLog(String format, String exportURL, boolean
bHeading)
```

Exports message log into a particular format network file.

Throws:
  ToshibaException

Parameter doc:
  format - format name
  exportURL - network path to store the export file
  heading - TRUE to include a heading row at the beginning

---

**Class *LogicalFax*** package: com.toshiba.dse.sdk.devices.logical

Description:

A specialization of LogicaDevice that represents a fax.

Extends:
com.toshiba.dse.sdk.devices.logical.LogicalDevice

| Methods |
|---|
| public String getCSID() |
| public Counter getInCounter() |
| public RoutedFaxJob getInJobs() |
| public RoutedFaxLogEntry getInLogs() |
| public LogicalDeviceMaintainer getInMaintainer() |
| public RoutedFaxMessageEntry getInMessages() |
| public MailBox getMailboxes() |
| public MailBoxFilterSettings getMailBoxFilter() |
| public int getNumRetries() |
| public Counter getOutCounter() |
| public OutboundFaxJob getOutJobs() |
| public OutboundFaxLogEntry getOutLogs() |
| public LogicalDeviceMaintainer getOutMaintainer() |
| public FaxMessageEntry getOutMessages() |
| public int getRetryTimeOut() |
| public String getTSID() |
| public void setMailBoxFilter(MailBoxFilterSettings mailBoxFilter) |

Class *LogicalFinisher* package: com.toshiba.dse.sdk.devices.logical
Description:

Represents a logical finisher unit -- unit that finishes the print output.

Extends:
com.toshiba.dse.sdk.devices.logical.SimpleLogicalDevice

Methods

| |
|---|
| public native LogicalPunchUnit getPuncher() |
| public native LogicalSorter getSorter() |
| public native LogicalStapler getStapler() |
| public native LogicalStitchUnit getStitcher() |

Class *LogicalInserter* package: com.toshiba.dse.sdk.devices.logical

Description:

Represents a logical inserter unit -- device that will intermingle preprinted sheets with the print output.

Extends:
com.toshiba.dse.sdk.devices.logical.SimpleLogicalDevice

Methods

| |
|---|
| public native Cassette getCassettes() |

Class *LogicalPrinter* package: com.toshiba.dse.sdk.devices.logical

Description:

A specialization of LogicaDevice that represents a printer.

Extends:
com.toshiba.dse.sdk.devices.logical.LogicalDevice

Methods

| |
|---|
| public native int getAutoContinueTimeOut() |
| public native Cassette getCassettes() |
| public native int getDaysToKeepPrivateJobs() |

| Methods |
|---|
| public native LogicalFinisher getFinisher() |
| public native String getIFaxTray() |
| public native long getImageShift() |
| public native LogicalInserter getInserter() |
| public native PrintJob getJobs() |
| public native PrintLogEntry getLogs() |
| public native LogicalDeviceMaintainer getMaintainer() |
| public native PrintMessageEntry getMessages() |
| public native int getPCLFontNum() |
| public native float getPCLFontPitch() |
| public native int getPCLFontSize() |
| public native RawJobSettings getRawJobSettings() |
| public native long getTabWidth() |
| public native String getTonerSaveMode() |
| public native boolean isAutoContinueOn() |
| public native boolean isIFaxDuplex() |
| public native boolean isPageSegmentation() |
| public native boolean isPrintStartupPage() |
| public native void PrintDeviceConfig()<br>  Prints logical device configuration sheet.<br>  Throws:<br>    ToshibaException |

| |
|---|
| Methods: |
| public native void PrintPCLFonts()<br>Prints PCL fonts available on the logical device.<br>Throws:<br>  ToshibaException |
| public native void PrintPSFonts()<br>Prints PostScript fonts available on the logical device.<br>Throws:<br>  ToshibaException |
| public native void setAutoContinueOn(boolean autoContinueOn) |
| public native void setAutoContinueTimeOut(int autoContinueTimeOut) |
| public native void setDaysToKeepPrivateJobs(int daysToKeepPrivJobs) |
| public native void setIFaxDuplex(boolean IFaxDuplex) |
| public native void setIFaxTray(String IFaxTray) |
| public native void setImageShift(long imageShift) |
| public native void setPageSegmentation(boolean pageSegmentation) |
| public native void setPCLFontNum(int PCLFontNum) |
| public native void setPCLFontPitch(float PCLFontPitch) |
| public native void setPCLFontSize(int PCLFontSize) |
| public native void setPrintStartupPage(boolean printStartupPage) |
| public native void setTabWidth(long tabWidth) |
| public native void setTonerSaveMode(String tonerSaveMode) |

**Class *LogicalPunchUnit*** package: com.toshiba.dse.sdk.devices.logical
Description:

Represents a logical puncher -- device the punches holes in the paper output.

Extends:
com.toshiba.dse.sdk.devices.logical.SimpleLogicalDevice

Methods:

| |
|---|
| public native String getType() |

Class *LogicalScanner* package: com.toshiba.dse.sdk.devices.logical

Description:

Represents a logical device that scans in paper sheets.

Extends:
com.toshiba.dse.sdk.devices.logical.LogicalDevice

Methods:

| |
|---|
| public void AddScanTemplateGroup(ScanTemplateGroup newGroup) <br> Throws: <br>     ToshibaException |
| public void DeleteScanTemplateGroups(int[] templateGrpNos) |
| private String GetCurrentLocale() |
| public ScanJob getJobs() |
| public ScanLogEntry getLogs() |
| public LogicalDeviceMaintainer getMaintainer() |
| public ScanMessageEntry getMessages() |
| public ScanTemplateFilterSettings getScanTemplateFilter() |
| private String getScanTemplateFilterSubQuery(ScanTemplateFilterSettings scanTemplateFilterSettings) |
| public ScanTemplateGroupFilterSettings getScanTemplateGroupFilter() |

Methods:

| |
|---|
| private String getScanTemplateGroupFilterSubQuery(ScanTemplateGroupFilterSettings scanTemplateGroupFilterSettings) |
| public ScanTemplateGroup getScanTemplateGroups() |
| public ScanTemplateGroup getScanTemplateGroups(int index) |
| private ScanTemplateGroup getScanTemplateGroupsForQuery(String sqlQuery) |
| public ScanTemplate getScanTemplates() |
| private String getSortSubQuery(int val, String DBField) |
| public Counter getTotal() |
| public void setScanTemplateFilter(ScanTemplateFilterSettings scanTemplateFilter) |
| public void setScanTemplateGroupFilter(ScanTemplateGroupFilterSettings scanTemplateGroupFilter) |
| public void setScanTemplates(ScanTemplate scanTemplates) |
| public native String TranslateString(String locale, int id) |

Class *LogicalSorter* package: com.toshiba.dse.sdk.devices.logical

Description:

Represents a logical sorter unit -- device that sorts the paper output.

Extends:
    com.toshiba.dse.sdk.devices.logical.SimpleLogicalDevice

Methods:

| |
|---|
| public native String getPriority() |
| public native void setPriority(String priority) |

Class *LogicalStapler* package: com.toshiba.dse.sdk.devices.logical

Description:

Represents a logical stapler unit -- device that staples the output paper.

Extends:
com.toshiba.dse.sdk.devices.logical.SimpleLogicalDevice

Methods:

| |
|---|
| public native String getStaplerType() |

Class *LogicalStitchUnit* package: com.toshiba.dse.sdk.devices.logical

Description:

Represents a logical stitch unit -- device that stitches the output paper.

Extends:
com.toshiba.dse.sdk.devices.logical.SimpleLogicalDevice

Methods:

| |
|---|
| public native String getType() |

Class *RawJobSettings* package: com.toshiba.dse.sdk.devices.logical

Description:

Abstraction of the configuration parameters for RAW jobs -- PDL-based jobs that do not have any PJL commands in them.

Extends:
com.toshiba.dse.sdk.Base

Methods:

| |
|---|
| public native String getRawDfltOrient() |
| public native String getRawDfltPaperSize() |
| public native String getRawDfltPaperType() |
| public native String getRawDfltTray() |
| public native boolean isRawDfltStaplingOn() |

| Method |
|---|
| public native boolean isRawDuplexPrint() |
| public native void setRawDfltOrient(String rawDfltOrient) |
| public native void setRawDfltPaperSize(String rawDfltPaperSize) |
| public native void setRawDfltPaperType(String rawDfltPaperType) |
| public native void setRawDfltStaplingOn(boolean rawDfltStaplingOn) |
| public native void setRawDfltTray(String rawDfltTray) |
| public native void setRawDuplexPrint(boolean rawDuplexPrint) |

Class *RemoteLogicalController* package: com.toshiba.dse.sdk.devices.logical

Description:

Represents a remote Logical Controller -- abstraction useful when locating other controllers from this controller.

Extends:
com.toshiba.dse.sdk.Base

| Methods |
|---|
| public native int[] getIP() |
| public native int[] getIPX() |
| public native String getLocation() |
| public native String getNSname() |
| public native String getType() |

Class *SimpleLogicalDevice* package: com.toshiba.dse.sdk.devices.logical

Description:

Abstraction for simple devices such as finishers, staplers, sorters, etc.

Extends:

com.toshiba.dsc.sdk.Base

Methods public native void AddDeviceStateChangedListener(DeviceStateChangedListener listener)

Throws:
ToshibaException

--- public native void AddEventRecipient(EventRecipient newRecipient)

Adds an event recipient to the current list of recipients.

Throws:
ToshibaException

See:

Parameter doc:
newRecipient - the new event recipient.

--- public static native String getAllEventNames()

Static method to retrieve all the possible event names.

Return doc:
Event names list (localized)

--- public native PhysicalDevice getDevice()

--- public native EventRecipient getEventRecipients()

--- public native String getFirmwareVersion()

--- public native Counter getTotal()

--- public native void RemoveDeviceStateChangedListener(DeviceStateChangedListener listener)

Throws:
ToshibaException

| Methods |
|---|
| public native void RemoveEventRecipient(EventRecipient recipient)<br>  Removes an event recipient from the current list of recipients.<br>Throws:<br>  ToshibaException<br>See:<br><br>Parameter doc:<br>  recipient - the existing event recipient. |

| Package *com.toshiba.dse.sdk.devices.physical* |
|---|

*Classes*
  class Copier
  class GLSeries
  class PhysicalDevice
  class SCSeries

Class Diagrams physical

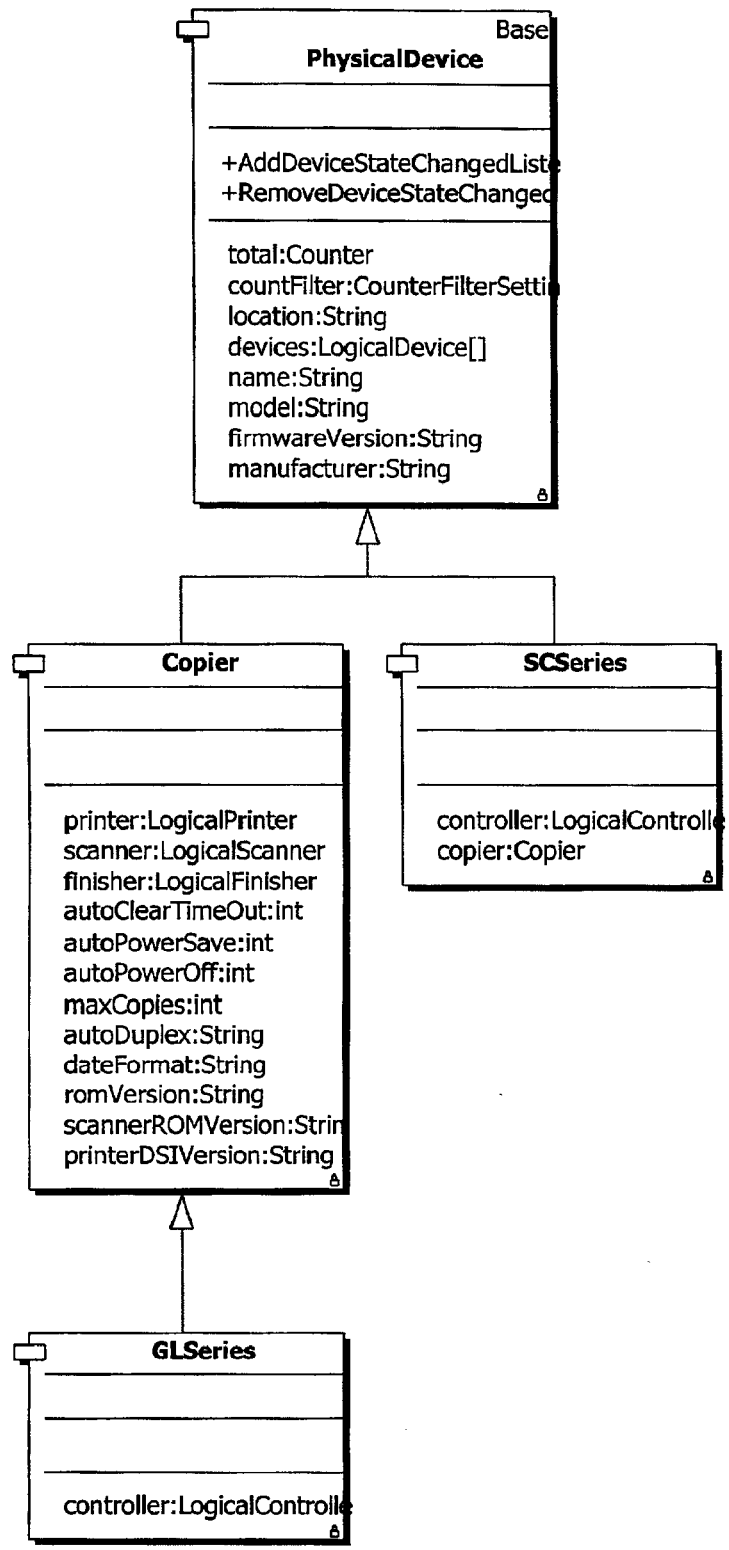

Class Detail

Class *Copier* package: com.toshiba.dse.sdk.devices.physical

Description:

Represents a physical copier machine.

Extends:
com.toshiba.dse.sdk.devices.physical.PhysicalDevice

| Methods |
|---|
| public native int getAutoClearTimeOut() |
| public native String getAutoDuplex() |
| public native int getAutoPowerOff() |
| public native int getAutoPowerSave() |
| public native String getDateFormat() |
| public native LogicalFinisher getFinisher() |
| public native int getMaxCopies() |
| public native LogicalPrinter getPrinter() |
| public native String getPrinterDSIVersion() |
| public native String getRomVersion() |
| public native LogicalScanner getScanner() |
| public native String getScannerROMVersion() |
| public native void setAutoClearTimeOut(int autoClearTimeOut) |
| public native void setAutoDuplex(String autoDuplex) |
| public native void setAutoPowerOff(int autoPowerOff) |
| public native void setAutoPowerSave(int autoPowerSave) |

| Methods |
|---|
| public native void setDateFormat(String dateFormat) |
| public native void setMaxCopies(int maxCopies) |

Class *GLSeries* package: com.toshiba.dse.sdk.devices.physical

Description:

Represents a physical GL-10xx device.

Extends:
com.toshiba.dse.sdk.devices.physical.Copier

| Methods |
|---|
| public native LogicalController getController() |

Class *PhysicalDevice* package: com.toshiba.dse.sdk.devices.physical

Description:

Abstraction of a physical device. Physical devices are device units that users can actually walk up to.

Extends:
com.toshiba.dse.sdk.Base

| Methods |
|---|
| public native void AddDeviceStateChangedListener(DeviceStateChangedListener listener)<br><br>Throws:<br>    ToshibaException |
| public native CounterFilterSettings getCountFilter() |
| public native LogicalDevice getDevices() |
| public native String getFirmwareVersion() |
| public native String getLocation() |

Methods

| |
|---|
| public native String getManufacturer() |
| public native String getModel() |
| public native String getName() |
| public native Counter getTotal() |
| public native void RemoveDeviceStateChangedListener(DeviceStateChangedListener listener)<br>Throws:<br>   ToshibaException |
| public native void setCountFilter(CounterFilterSettings countFilter) |
| public native void setLocation(String location) |

Class *SCSeries* package: com.toshiba.dse.sdk.devices.physical

Description:

Specialization of PhysicalDevice to represent standalone SC-x device controller.

Extends:

com.toshiba.dse.sdk.devices.physical.PhysicalDevice

Methods

| |
|---|
| public native LogicalController getController() |
| public native Copier getCopier() |

Package *com.toshiba.dse.sdk.filters*

*Subpackages* package com.toshiba.dse.sdk.filters.addressBook
   package com.toshiba.dse.sdk.filters.imageHandlers
   package com.toshiba.dse.sdk.filters.jobsLogs

*Classes*
class Comparison
class CounterFilters
class CounterFilterSettings
class CounterFilterValues
class Filter
Class Diagrams
filters
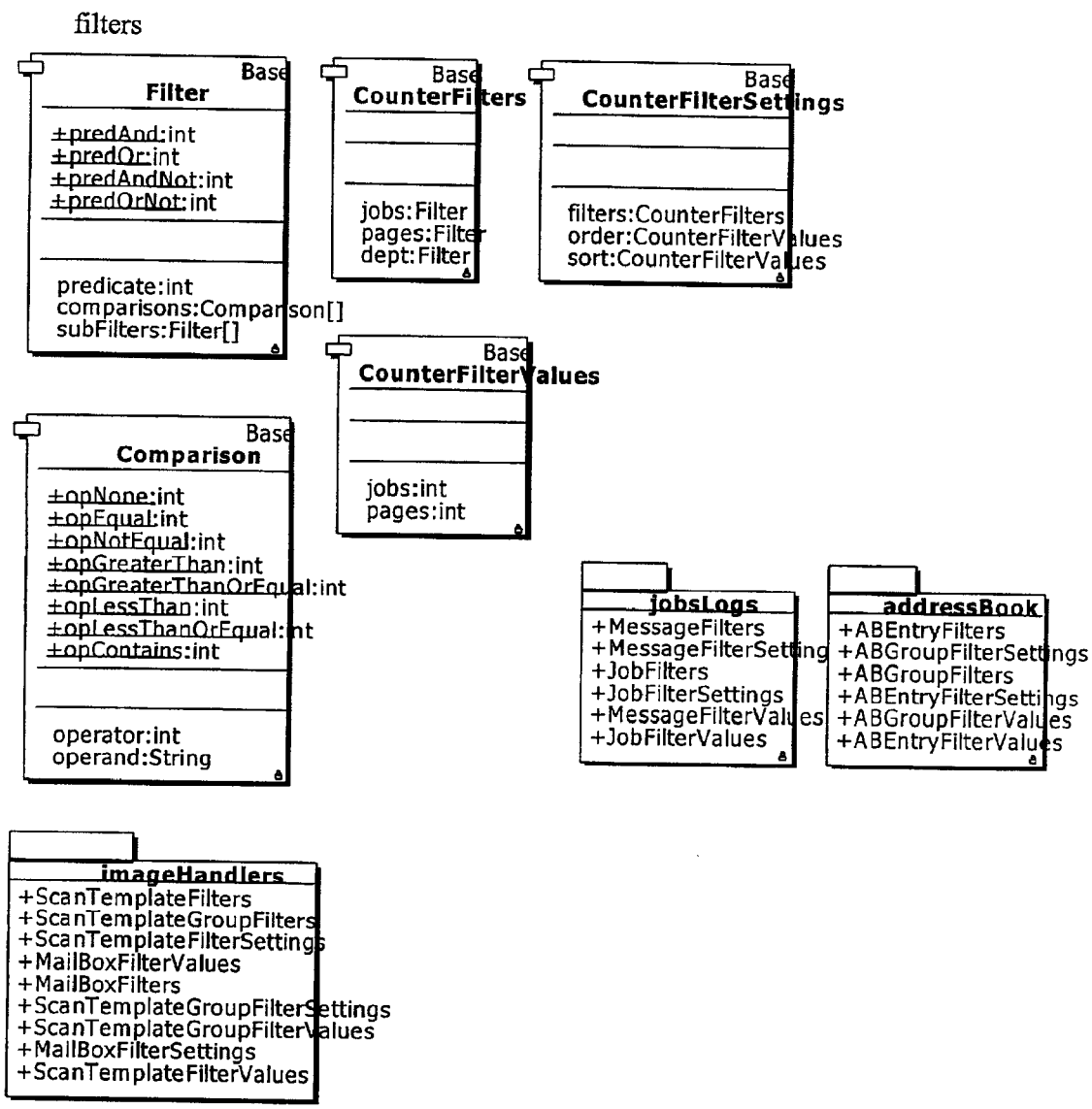

Class Detail

Class *Comparison* package: com.toshiba.dse.sdk.filters

Description:

Data object that represents a single comparison.

It is composed of comparison operator and a comparand. Comparison operators are constants defined in the class: opXxx.

The comparand is always in a string form even if the actual data type is other than string.

Extends:
   com.toshiba.dse.sdk.Base

| Methods: |
|---|
| public native String getOperand() |
| public native int getOperator() |
| public native void setOperand(String operand) |
| public native void setOperator(int operator) |

Class *CounterFilters* package: com.toshiba.dse.sdk.filters

Description:

Data object - representating the filters for Counters

Extends:
   com.toshiba.dse.sdk.Base

| Methods: |
|---|
| public native Filter getDept() |
| public native Filter getJobs() |
| public native Filter getPages() |
| public native void setDept(Filter dept) |

Methods:

| |
|---|
| public native void setJobs(Filter jobs) |
| public native void setPages(Filter pages) |

Class *CounterFilterSettings* package: com.toshiba.dse.sdk.filters

Description:

Data object representing the filter settings for counters.

Extends:

com.toshiba.dse.sdk.Base

Methods:

| |
|---|
| public native CounterFilters getFilters() |
| public native CounterFilterValues getOrder() |
| public native CounterFilterValues getSort() |
| public native void setFilters(CounterFilters filters) |
| public native void setOrder(CounterFilterValues order) |
| public native void setSort(CounterFilterValues sort) |

Class *CounterFilterValues* package: com.toshiba.dse.sdk.filters

Description:

Data object representing the variuos filter values for counters.

Extends:

com.toshiba.dse.sdk.Base

Methods:

| |
|---|
| public native int getJobs() |
| public native int getPages() |
| public native void setJobs(int jobs) |

Methods

| |
|---|
| public native void setPages(int pages) |

Class *Filter* package: com.toshiba.dse.sdk.filters

Description:

Data object that represents a particular filter.

Filter is a composed of a predicate and a list comparisons that are affected by that predicate.

Filter can have sub-filters. Each of these subfilters must evaluate to TRUE in order for this filter to evaluate to TRUE.

Extends:
com.toshiba.dse.sdk.Base

Methods

| |
|---|
| public native Comparison getComparisons() |
| public native int getPredicate() |
| public native Filter getSubFilters() |
| public native void setComparisons(Comparison comparisons) |
| public native void setPredicate(int predicate) |
| public native void setSubFilters(Filter subFilters) |

Package *com.toshiba.dse.sdk.filters.addressBook*

*Classes*
 class ABEntryFilters
 class ABEntryFilterSettings
 class ABEntryFilterValues
 class ABGroupFilters
 class ABGroupFilterSettings
 class ABGroupFilterValues

Class Diagrams
addressBook
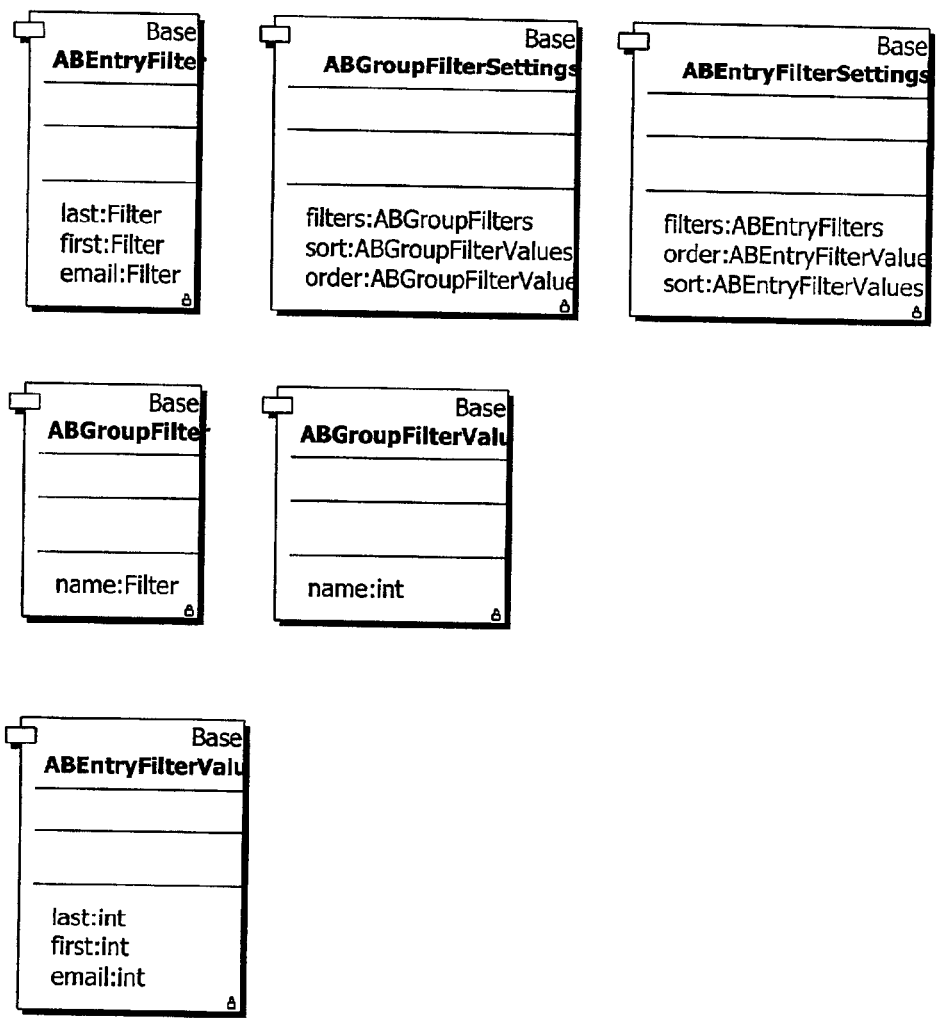
Class Detail
| Class *ABEntryFilters* |
|---|
package: com.toshiba.dse.sdk.filters.addressBook
Description:
Data object that contains detailed filter specifications for all fields in an Address Book entry.
Extends:
com.toshiba.dse.sdk.Base

Methods:

| |
|---|
| public native Filter getEmail() |
| public native Filter getFirst() |
| public native Filter getLast() |
| public native void setEmail(Filter email) |
| public native void setFirst(Filter first) |
| public native void setLast(Filter last) |

Class *ABEntryFilterSettings* package: com.toshiba.dse.sdk.filters.addressBook

Description:

> Objects of this class are used to specify how Address Book entries are filtered and sorted prior to their retrieval.

Extends:
> com.toshiba.dse.sdk.Base

Methods:

| |
|---|
| public native ABEntryFilters getFilters() |
| public native ABEntryFilterValues getOrder() |
| public native ABEntryFilterValues getSort() |
| public native void setFilters(ABEntryFilters filters) |
| public native void setOrder(ABEntryFilterValues order) |
| public native void setSort(ABEntryFilterValues sort) |

Class *ABEntryFilterValues* package: com.toshiba.dse.sdk.filters.addressBook

Description:

This represents objects that contain filter values for all fields in a Address Book entry.

See note on the Filters package diagram for more details.

Extends:
com.toshiba.dse.sdk.Base

| Methods |
|---|
| public native int getEmail() |
| public native int getFirst() |
| public native int getLast() |
| public native void setEmail(int email) |
| public native void setFirst(int first) |
| public native void setLast(int last) |

Class *ABGroupFilters* package: com.toshiba.dse.sdk.filters.addressBook

Description:

Data object that contains detailed filter specifications for all fields in an Address Book Group.

Extends:
com.toshiba.dse.sdk.Base

| Methods |
|---|
| public native Filter getName() |
| public native void setName(Filter name) |

Class *ABGroupFilterSettings* package: com.toshiba.dse.sdk.filters.addressBook

Description:

Objects of this class are used to specify how Address Book Groups are filtered and sorted prior to their retrieval.

Extends:

com.toshiba.dse.sdk.Base

| Methods |
|---|
| public native ABGroupFilters getFilters() |
| public native ABGroupFilterValues getOrder() |
| public native ABGroupFilterValues getSort() |
| public native void setFilters(ABGroupFilters filters) |
| public native void setOrder(ABGroupFilterValues order) |
| public native void setSort(ABGroupFilterValues sort) |

Class *ABGroupFilterValues* package: com.toshiba.dse.sdk.filters.addressBook

Description:

This represents objects that contain filter values for all fields in a Address Book group.

See note on the Filters package diagram for more details.

Extends:
com.toshiba.dse.sdk.Base

| Methods |
|---|
| public native int getName() |
| public native void setName(int name) |

Package *com.toshiba.dse.sdk.filters.imageHandlers*

*Classes*
- class MailBoxFilters
- class MailBoxFilterSettings
- class MailBoxFilterValues
- class ScanTemplateFilters
- class ScanTemplateFilterSettings
- class ScanTemplateFilterValues class ScanTemplateGroupFilters
class ScanTemplateGroupFilterSettings
class ScanTemplateGroupFilterValues

Class Diagrams imageHandlers

Class Detail

Class *MailBoxFilters* package: com.toshiba.dse.sdk.filters.imageHandlers

Description:

Data object that contains detailed filter specifications for all fields in a Mail Box.

Extends:
com.toshiba.dse.sdk.Base

Methods

| |
|---|
| public native CounterFilters getCounter() |
| public native Filter getNo() |
| public native Filter getOwner() |
| public native void setCounter(CounterFilters counter) |
| public native void setNo(Filter no) |
| public native void setOwner(Filter owner) |

Class *MailBoxFilterSettings* package: com.toshiba.dse.sdk.filters.imageHandlers

Description:

Objects of this class are used to specify how Mail Boxes are filtered and sorted prior to their retrieval.

Extends:
com.toshiba.dse.sdk.Base

Methods

| |
|---|
| public native MailBoxFilters getFilters() |
| public native MailBoxFilterValues getOrder() |
| public native MailBoxFilterValues getSort() |
| public native void setFilters(MailBoxFilters filters) |
| public native void setOrder(MailBoxFilterValues order) |
| public native void setSort(MailBoxFilterValues sort) |

Class *MailBoxFilterValues* package: com.toshiba.dse.sdk.filters.imageHandlers

Description:

This represents objects that contain filter values for all fields in a Mailbox.

See note on the Filters package diagram for more details.

Extends:
com.toshiba.dse.sdk.Base

| Methods: |
|---|
| public native CounterFilterValues getCounter() |
| public native int getDept() |
| public native int getNo() |
| public native int getOwner() |
| public native void setCounter(CounterFilterValues counter) |
| public native void setDept(int dept) |
| public native void setNo(int no) |
| public native void setOwner(int owner) |

Class *ScanTemplateFilters* package: com.toshiba.dse.sdk.filters.imageHandlers

Description:

Data object that contains detailed filter specifications for all fields in a Scan Template.

Extends:
com.toshiba.dse.sdk.Base

| Methods: |
|---|
| public native Filter getName() |
| public native Filter getParentGroup() |
| public native void setName(Filter name) |
| public native void setParentGroup(Filter parentGroup) |

Class *ScanTemplateFilterSettings* package: com.toshiba.dse.sdk.filters.imageHandlers

Description:

Objects of this class are used to specify how Scan Templates are filtered and sorted prior to their retrieval.

Extends:
com.toshiba.dse.sdk.Base

Methods

| |
|---|
| public native ScanTemplateFilters getFilters() |
| public native ScanTemplateFilterValues getOrder() |
| public native ScanTemplateFilterValues getSort() |
| public native void setFilters(ScanTemplateFilters filters) |
| public native void setOrder(ScanTemplateFilterValues order) |
| public native void setSort(ScanTemplateFilterValues sort) |

Class *ScanTemplateFilterValues* package: com.toshiba.dse.sdk.filters.imageHandlers

Description:

This represents objects that contain filter values for all fields in a Scan Template.

See note on the Filters package diagram for more details.

Extends:
com.toshiba.dse.sdk.Base

Methods

| |
|---|
| public native int getName() |
| public native int getParentGroup() |
| public native void setName(int name) |
| public native void setParentGroup(int parentGroup) |

Class *ScanTemplateGroupFilters* package: com.toshiba.dse.sdk.filters.imageHandlers

Description:

Data object that contains detailed filter specifications for all fields in a Scan Template Group.

Extends:
com.toshiba.dse.sdk.Base

Methods

| |
|---|
| public native CounterFilters getCounter() |
| public native Filter getName() |
| public native Filter getNo() |
| public native Filter getOwner() |
| public native void setCounter(CounterFilters counter) |
| public native void setName(Filter name) |
| public native void setNo(Filter no) |
| public native void setOwner(Filter owner) |

Class *ScanTemplateGroupFilterSettings* package: com.toshiba.dse.sdk.filters.imageHandlers

Description:

Objects of this class are used to specify how Scan Template Groups are filtered and sorted prior to their retrieval.

Extends:
com.toshiba.dse.sdk.Base

Methods

| |
|---|
| public native ScanTemplateGroupFilters getFilters() |
| public native ScanTemplateGroupFilterValues getOrder() |
| public native ScanTemplateGroupFilterValues getSort() |

| Methods |
|---|
| public native void setFilters(ScanTemplateGroupFilters filters) |
| public native void setOrder(ScanTemplateGroupFilterValues order) |
| public native void setSort(ScanTemplateGroupFilterValues sort) |

Class *ScanTemplateGroupFilterValues* package: com.toshiba.dse.sdk.filters.imageHandlers

Description:

This represents objects that contain filter values for all fields in a Scan Template Group.

See note on the Filters package diagram for more details.

Extends:
com.toshiba.dse.sdk.Base

| Methods |
|---|
| public native CounterFilterValues getCounter() |
| public native int getName() |
| public native int getNo() |
| public native int getOwner() |
| public native void setCounter(CounterFilterValues counter) |
| public native void setName(int name) |
| public native void setNo(int no) |
| public native void setOwner(int owner) |

Package *com.toshiba.dse.sdk.filters.jobsLogs*

*Classes*
  class JobFilters
  class JobFilterSettings class JobFilterValues
class MessageFilters
class MessageFilterSettings
class MessageFilterValues
Class Diagrams
jobsLogs
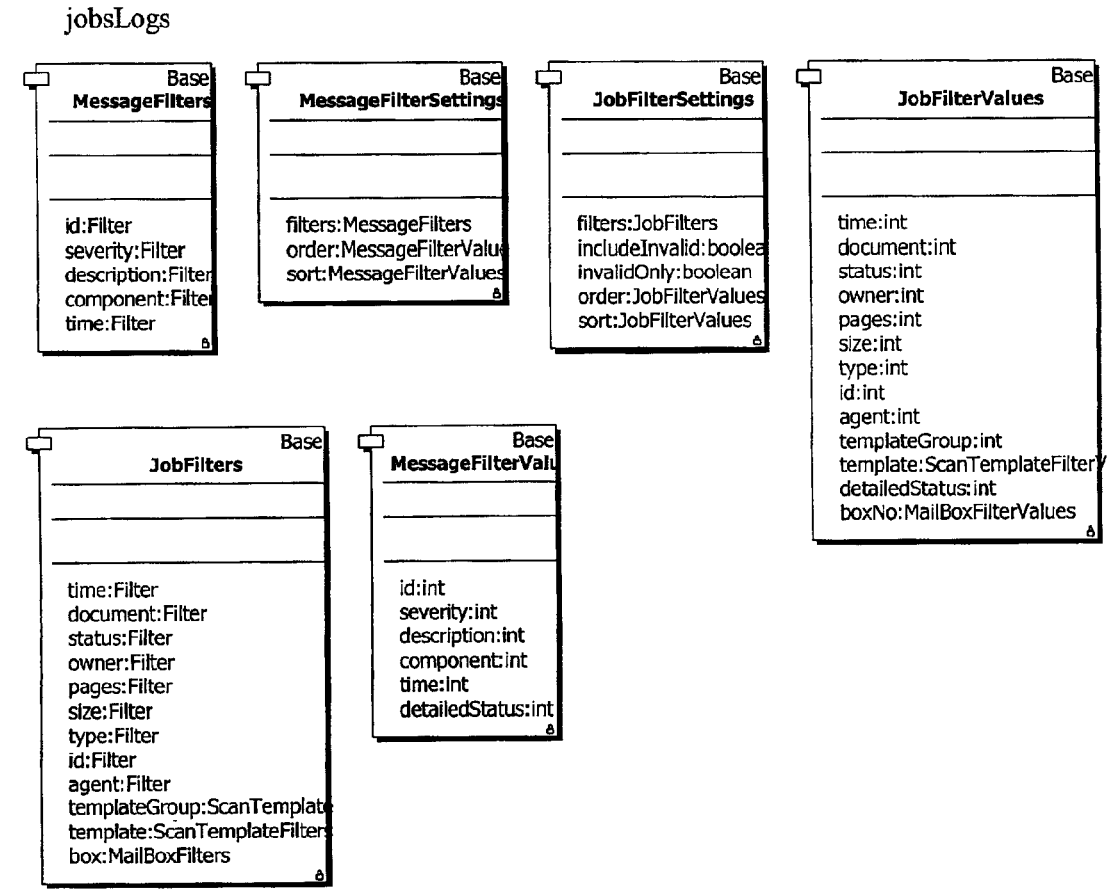
Class Detail
**Class *JobFilters***
package: com.toshiba.dse.sdk.filters.jobsLogs
Description:
Data object that contains detailed filter specifications for all fields in a Job or a Job Log.
Extends:

com.toshiba.dse.sdk.Base

| Methods |
|---|
| public native Filter getAgent() |
| public native MailBoxFilters getBox() |
| public native Filter getDocument() |
| public native Filter getId() |
| public native Filter getOwner() |
| public native Filter getPages() |
| public native Filter getSize() |
| public native Filter getStatus() |
| public native ScanTemplateFilters getTemplate() |
| public native ScanTemplateGroupFilters getTemplateGroup() |
| public native Filter getTime() |
| public native Filter getType() |
| public native void setAgent(Filter agent) |
| public native void setBox(MailBoxFilters box) |
| public native void setDocument(Filter document) |
| public native void setId(Filter id) |
| public native void setOwner(Filter owner) |
| public native void setPages(Filter pages) |
| public native void setSize(Filter size) |
| public native void setStatus(Filter status) |
| public native void setTemplate(ScanTemplateFilters template) |

| Methods |
|---|
| public native void setTemplateGroup(ScanTemplateGroupFilters templateGroup) |
| public native void setTime(Filter time) |
| public native void setType(Filter type) |

Class *JobFilterSettings* package: com.toshiba.dse.sdk.filters.jobsLogs

Description:

Objects of this class are used to specify how jobs and logs are filtered and sorted prior to their retrieval.

The property includeInvalid determines whether or not to include the invalid jobs (jobs with wrong department code) in the list. Note, however, that department codes must be enforced for that to take effect.

If no jobtypes are selected, but includeInvalid is TRUE, then only invalid jobs from all types are returned. If invalidOnly is TRUE, only invalid jobs from the types selected are returned. When no job types are selected then invalidOnly is equivalent to includeInvalid.

Extends:
com.toshiba.dse.sdk.Base

| Methods |
|---|
| public native JobFilters getFilters() |
| public native JobFilterValues getOrder() |
| public native JobFilterValues getSort() |
| public native boolean isIncludeInvalid() |
| public native boolean isInvalidOnly() |
| public native void setFilters(JobFilters filters) |
| public native void setIncludeInvalid(boolean includeInvalid) |
| public native void setInvalidOnly(boolean invalidOnly) |

| Methods |
|---|
| public native void setOrder(JobFilterValues order) |
| public native void setSort(JobFilterValues sort) |

Class *JobFilterValues* package: com.toshiba.dse.sdk.filters.jobsLogs

Description:

This represents objects that contain filter values for all fields in a job or job log.

See note on the Filters package diagram for more details.

Extends:
com.toshiba.dse.sdk.Base

| Methods |
|---|
| public native int getAgent() |
| public native MailBoxFilterValues getBoxNo() |
| public native int getDetailedStatus() |
| public native int getDocument() |
| public native int getId() |
| public native int getOwner() |
| public native int getPages() |
| public native int getSize() |
| public native int getStatus() |
| public native ScanTemplateFilterValues getTemplate() |
| public native int getTemplateGroup() |
| public native int getTime() |
| public native int getType() |

Methods

| |
|---|
| public native void setAgent(int agent) |
| public native void setBoxNo(MailBoxFilterValues boxNo) |
| public native void setDetailedStatus(int detailedStatus) |
| public native void setDocument(int document) |
| public native void setId(int id) |
| public native void setOwner(int owner) |
| public native void setPages(int pages) |
| public native void setSize(int size) |
| public native void setStatus(int status) |
| public native void setTemplate(ScanTemplateFilterValues template) |
| public native void setTemplateGroup(int templateGroup) |
| public native void setTime(int time) |
| public native void setType(int type) |

Class *MessageFilters* package: com.toshiba.dse.sdk.filters.jobsLogs

Description:

Data object that contains detailed filter specifications for all fields in a Message.

Extends:
com.toshiba.dse.sdk.Base

Methods

| |
|---|
| public native Filter getComponent() |
| public native Filter getDescription() |
| public native Filter getId() |

| Methods |
|---|
| public native Filter getSeverity() |
| public native Filter getTime() |
| public native void setComponent(Filter component) |
| public native void setDescription(Filter description) |
| public native void setId(Filter id) |
| public native void setSeverity(Filter severity) |
| public native void setTime(Filter time) |

Class *MessageFilterSettings* package: com.toshiba.dse.sdk.filters.jobsLogs

Description:

Same as JobFilterSettings, but for messages. See description of JobFilterSettings for more information.

Extends:
com.toshiba.dse.sdk.Base

| Methods |
|---|
| public native MessageFilters getFilters() |
| public native MessageFilterValues getOrder() |
| public native MessageFilterValues getSort() |
| public native void setFilters(MessageFilters filters) |
| public native void setOrder(MessageFilterValues order) |
| public native void setSort(MessageFilterValues sort) |

Class *MessageFilterValues* package: com.toshiba.dse.sdk.filters.jobsLogs

Description:

This represents objects that contain filter values for all fields in a Message.

See note on the Filters package diagram for more details.

Extends:
   com.toshiba.dse.sdk.Base

| Methods |
|---|
| public native int getComponent() |
| public native int getDescription() |
| public native int getDetailedStatus() |
| public native int getId() |
| public native int getSeverity() |
| public native int getTime() |
| public native void setComponent(int component) |
| public native void setDescription(int description) |
| public native void setDetailedStatus(int detailedStatus) |
| public native void setId(int id) |
| public native void setSeverity(int severity) |
| public native void setTime(int time) |

| Package *com.toshiba.dse.sdk.imageHandlers* |
|---|

*Classes*
   class Agent
   class EmailAgent
   class FileAgent
   class FtpAgent
   class iFaxToPrintAgent
   class InboundEmailAgent
   class MailBox class OutboundEmailAgent
class RasterImageHandler
class ScanTemplate
class ScanTemplateGroup
class ScanToEmailAgent
class ScanToiFaxAgent
class StorageAgent
class StoredFaxAgent
class StoredJobAgent
class StoredScanAgent
class TWAINAgent

Class Diagrams imageHandlers

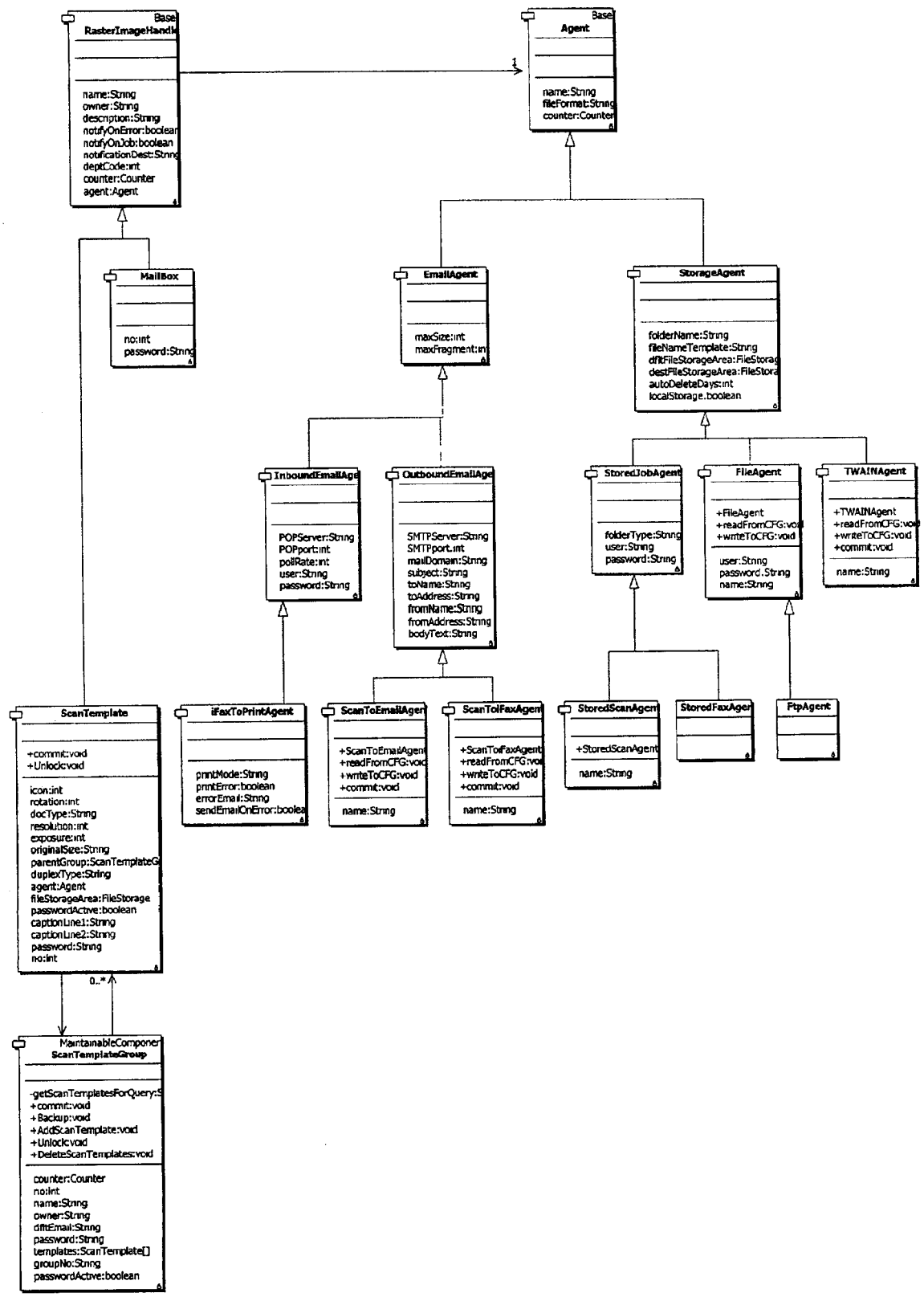

Class Detail

Class *Agent* package: com.toshiba.dse.sdk.imageHandlers

Description:

Abstract class representing a generic image processing agent.

Extends:
com.toshiba.dse.sdk.Base

Methods

| |
|---|
| public Counter getCounter() |
| public String getFileFormat() |
| public String getName() |
| public void setCounter(Counter counter) |
| public void setFileFormat(String fileFormat) |
| public void setName(String name) |

Class *EmailAgent* package: com.toshiba.dse.sdk.imageHandlers

Description:

Abstract class representing a generic email image processing agent.

Extends:
com.toshiba.dse.sdk.imageHandlers.Agent

Methods

| |
|---|
| public int getMaxFragment() |
| public int getMaxSize() |
| public void setMaxFragment(int maxFragment) |
| public void setMaxSize(int maxSize) |

Class *FileAgent* package: com.toshiba.dse.sdk.imageHandlers

Description:

Specialization of StorageAgent to represent agent to handle requests for storage into a file share.

Extends:
com.toshiba.dse.sdk.imageHandlers.StorageAgent

| Methods |
|---|
| public String getName() |
| public String getPassword() |
| public String getUser() |
| public native void readFromCFG() |
| public void setPassword(String password) |
| public void setUser(String user) |
| public native void writeToCFG() |

Class *FtpAgent* package: com.toshiba.dse.sdk.imageHandlers

Description:

Specialization of FileAgent to represent agent to handle requests for storage into a FTP location..

Extends:
com.toshiba.dse.sdk.imageHandlers.FileAgent

Class *iFaxToPrintAgent* package: com.toshiba.dse.sdk.imageHandlers

Description:

Specialization of InboundEmailAgent to represent iFax-to-print agent.

Extends:
com.toshiba.dse.sdk.imageHandlers.InboundEmailAgent

| Methods |
|---|
| public String getErrorEmail() |
| public String getPrintMode() |
| public boolean isPrintError() |
| public boolean isSendEmailOnError() |
| public void setErrorEmail(String errorEmail) |
| public void setPrintError(boolean printError) |
| public void setPrintMode(String printMode) |
| public void setSendEmailOnError(boolean sendEmailOnError) |

Class *InboundEmailAgent* package: com.toshiba.dse.sdk.imageHandlers

Description:

Abstract class representing a generic inbound image processing email agent.

Extends:
com.toshiba.dse.sdk.imageHandlers.EmailAgent

| Methods |
|---|
| public int getPollRate() |
| public int getPOPport() |
| public String getPOPServer() |
| public String getUser() |
| public void setPassword(String password) |
| public void setPollRate(int pollRate) |
| public void setPOPport(int POPport) |
| public void setPOPServer(String POPServer) |

| Methods |
|---|
| public void setUser(String user) |

Class *MailBox* package: com.toshiba.dse.sdk.imageHandlers

Description:

Specialization of RasterImageHandler which is a processor
for inbound faxes.

After arriving at the mailbox, the inbound faxes are handled by an agent;
this is what makes this class a RasterImageHandler.

Extends:
    com.toshiba.dse.sdk.imageHandlers.RasterImageHandler

| Methods |
|---|
| public int getNo() |
| public void setNo(int no) |
| public void setPassword(String password) |

Class *OutboundEmailAgent* package: com.toshiba.dse.sdk.imageHandlers

Description:

Abstract class representing a generic outbound image
processing email agent.

Extends:
    com.toshiba.dse.sdk.imageHandlers.EmailAgent

| Methods |
|---|
| public String getBodyText() |
| public String getFromAddress() |
| public String getFromName() |
| public String getMailDomain() |

| Methods |
|---|
| public int getSMTPport() |
| public String getSMTPServer() |
| public String getSubject() |
| public String getToAddress() |
| public String getToName() |
| public void setBodyText(String bodyText) |
| public void setFromAddress(String fromAddress) |
| public void setFromName(String fromName) |
| public void setMailDomain(String mailDomain) |
| public void setSMTPport(int SMTPport) |
| public void setSMTPServer(String SMTPServer) |
| public void setSubject(String subject) |
| public void setToAddress(String toAddress) |
| public void setToName(String toName) |

Class *RasterImageHandler* package: com.toshiba.dse.sdk.imageHandlers

Description:

Abstract representation of a generic raster image processing handler.

Extends:
    com.toshiba.dse.sdk.Base

| Methods |
|---|
| public Agent getAgent() |
| public Counter getCounter() |

| Methods |
|---|
| public int getDeptCode() |
| public String getDescription() |
| public String getName() |
| public String getNotificationDest() |
| public String getOwner() |
| public boolean isNotifyOnError() |
| public boolean isNotifyOnJob() |
| public void setAgent(Agent agent) |
| public void setDeptCode(int deptCode) |
| public void setDescription(String description) |
| public void setName(String name) |
| public void setNotificationDest(String notificationDest) |
| public void setNotifyOnError(boolean notifyOnError) |
| public void setNotifyOnJob(boolean notifyOnJob) |
| public void setOwner(String owner) |

Class *ScanTemplate* package: com.toshiba.dse.sdk.imageHandlers

Description:

Specialization of RasterImageHandler that represents a data template of information used when scanning.

Extends:
com.toshiba.dse.sdk.imageHandlers.RasterImageHandler

| Methods |
|---|
| public void commit() |

| Method |
|---|
| public Agent getAgent() |
| public String getCaptionLine1() |
| public String getCaptionLine2() |
| public String getDocType() |
| public String getDuplexType() |
| public int getExposure() |
| public FileStorage getFileStorageArea() |
| public int getIcon() |
| public int getNo() |
| public String getOriginalSize() |
| public ScanTemplateGroup getParentGroup() |
| public int getResolution() |
| public int getRotation() |
| public boolean isPasswordActive() |
| public void setAgent(Agent agent) |
| public void setCaptionLine1(String captionLine1) |
| public void setCaptionLine2(String captionLine2) |
| public void setDocType(String docType) |
| public void setDuplexType(String duplexType) |
| public void setExposure(int exposure) |
| public void setFileStorageArea(FileStorage fileStorageArea) |
| public void setIcon(int icon) |

| Methods |
|---|
| public void setNo(int no) |
| public void setOriginalSize(String originalSize) |
| public void setParentGroup(ScanTemplateGroup parentGroup) |
| public void setPassword(String password) |
| public void setResolution(int resolution) |
| public void setRotation(int rotation) |
| public void Unlock(String password)<br>Throws:<br>   ToshibaException |

Class *ScanTemplateGroup* package: com.toshiba.dse.sdk.imageHandlers

Description:

Representation of a collection of scan templates.

Extends:
   com.toshiba.dse.sdk.MaintainableComponent

| Methods |
|---|
| public void AddScanTemplate(ScanTemplate newTemplate)<br>Throws:<br>   ToshibaException |
| public void Backup(String toURL)<br>Throws:<br>   ToshibaException |
| public void commit() |
| public void DeleteScanTemplates(int[] templateNos) |
| public Counter getCounter() |

| Methods |
|---|
| public String getDfltEmail() |
| public String getGroupNo() |
| public String getName() |
| public int getNo() |
| public String getOwner() |
| private ScanTemplate getScanTemplatesForQuery(String sqlQuery) |
| public ScanTemplate getTemplates() |
| public ScanTemplate getTemplates(int index) |
| public boolean isPasswordActive() |
| public void setCounter(Counter counter) |
| public void setDfltEmail(String dfltEmail) |
| public void setName(String name) |
| public void setNo(int no) |
| public void setOwner(String owner) |
| public void setPassword(String password) |
| public void setTemplates(ScanTemplate templates) |
| public void setTemplates(int index, ScanTemplate templates) |
| public void Unlock(String password)<br>  Throws:<br>    ToshibaException |

Class *ScanToEmailAgent* package: com.toshiba.dse.sdk.imageHandlers

Description:

Specialization of OutboundEmailAgent to handle scan-to-email requests.

Extends:
com.toshiba.dse.sdk.imageHandlers.OutboundEmailAgent

| Methods |
|---|
| public void commit() |
| public String getName() |
| public native void readFromCFG() |
| public native void writeToCFG() |

Class *ScanToiFaxAgent* package: com.toshiba.dse.sdk.imageHandlers

Description:

Specialization of OutboundEmailAgent to handle scan-to-iFax requests.

Extends:
com.toshiba.dse.sdk.imageHandlers.OutboundEmailAgent

| Methods |
|---|
| public void commit() |
| public String getName() |
| public native void readFromCFG() |
| public native void writeToCFG() |

Class *StorageAgent* package: com.toshiba.dse.sdk.imageHandlers

Description:

Abstract class representing a generic storage-based agent for processing inbound (scanned) images.

Extends:
com.toshiba.dse.sdk.imageHandlers.Agent

| Methods |
|---|
| public int getAutoDeleteDays() |
| public FileStorage getDestFileStorageArea() |
| public FileStorage getDfltFileStorageArea() |
| public String getFileNameTemplate() |
| public String getFolderName() |
| public boolean isLocalStorage() |
| public void setAutoDeleteDays(int autoDeleteDays) |
| public void setDestFileStorageArea(FileStorage destFileStorageArea) |
| public void setDfltFileStorageArea(FileStorage dfltFileStorageArea) |
| public void setFileNameTemplate(String fileNameTemplate) |
| public void setFolderName(String folderName) |
| public void setLocalStorage(boolean localStorage) |

Class *StoredFaxAgent* package: com.toshiba.dse.sdk.imageHandlers

Description:

Specialization of StorageJobAgent to represent agent to handle fax-to-storage requests.

Extends:
  com.toshiba.dse.sdk.imageHandlers.StoredJobAgent

Class *StoredJobAgent* package: com.toshiba.dse.sdk.imageHandlers

Description:

Abstract representation of an agent for stored jobs.

Extends:
  com.toshiba.dse.sdk.imageHandlers.StorageAgent

Methods:

| |
|---|
| public String getFolderType() |
| public String getPassword() |
| public String getUser() |
| public void setFolderType(String folderType) |
| public void setPassword(String password) |
| public void setUser(String user) |

Class *StoredScanAgent* package: com.toshiba.dse.sdk.imageHandlers

Description:

Specialization of StorageJobAgent to represent agent to handle scan-to-storage requests.

Extends:
com.toshiba.dse.sdk.imageHandlers.StoredJobAgent

Methods:

| |
|---|
| public String getName() |

Class *TWAINAgent* package: com.toshiba.dse.sdk.imageHandlers

Description:

Specialization of StorageAgent to represent agent to handle requests for storage into a file share for subsequent TWAIN acquisition.

Extends:
com.toshiba.dse.sdk.imageHandlers.StorageAgent

Methods:

| |
|---|
| public void commit() |
| public String getName() |
| public native void readFromCFG() |

*Methods*

```
public native void writeToCFG()
```

Package *com.toshiba.dse.sdk.jobs*

*Classes*
    class InboundJob
    class Job
    class OutboundFaxJob
    class OutboundJob
    class PrintJob
    class PrivatePrintJob
    class ProofPrintJob
    class RAWPrintJob
    class RoutedFaxJob
    class ScanJob
    class ScheduledFaxJob
    class ScheduledPrintJob
    class StoredFaxJob
    class StoredInboundJob
    class StoredPrintJob
    class StoredScanJob

Class Diagrams jobs

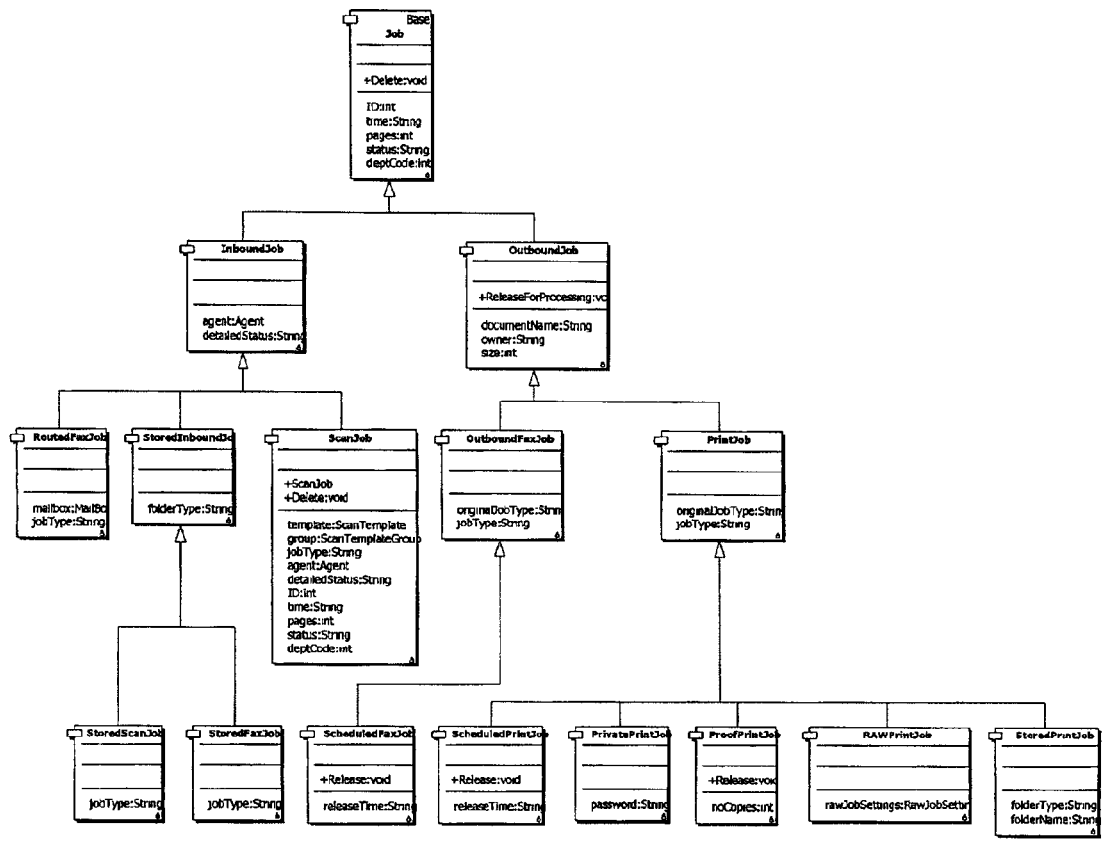
Class Detail
| Class *InboundJob* |
|---|
package: com.toshiba.dse.sdk.jobs
Description:
Abstraction of an inbound job. Inbound jobs are those that devices receive the raster image data for.
Examples: Incoming fax or scan job.
Extends:
com.toshiba.dse.sdk.jobs.Job
| Methods |
|---|
| public Agent getAgent() |
| public String getDetailedStatus() |

Class *Job* package: com.toshiba.dse.sdk.jobs

Description:

Abstraction of generic job. Jobs represent the rudimentary units of work for digital imaging devices.

Extends:

com.toshiba.dse.sdk.Base

| Methods |
|---|
| public native void Delete() <br><br> Deletes this job from the queue. <br><br> Note: The Job object will continue to be valid until all references to it are released; the "status" field will indicate that the Job has been deleted. <br><br> Throws: <br>   ToshibaException |
| public native int getDeptCode() |
| public native int getID() |
| public native int getPages() |
| public native String getStatus() |
| public native String getTime() |
| public native void setDeptCode(int deptCode) |

Class *OutboundFaxJob* package: com.toshiba.dse.sdk.jobs

Description:

Specialization of OutboundJob that represents an outbound fax job, a.k.a PC-Fax job.

This type of jobs are awaiting immediate transmission.

Extends:

com.toshiba.dse.sdk.jobs.OutboundJob

Methods

| |
|---|
| public static native String getJobType() |
|   Static method that returns the job type for Outbound Fax jobs. |
| public native String getOriginalJobType() |

Class *OutboundJob* package: com.toshiba.dse.sdk.jobs

Description:

Abstraction of an outbound job. Outbound jobs are those that devices receive PDL for and RIP into raster.

Examples: Print or PC-Fax job.

Extends:
  com.toshiba.dse.sdk.jobs.Job

Methods

| |
|---|
| public native String getDocumentName() |
| public native String getOwner() |
| public native int getSize() |
| public native void ReleaseForProcessing() <br>   Releases the job for further processing in case this job is invalid. <br> Throws: <br>   ToshibaException |

Class *PrintJob* package: com.toshiba.dse.sdk.jobs

Description:

Specialization of InboundJob that represents a generic print job.

Extends:
  com.toshiba.dse.sdk.jobs.OutboundJob

Methods:

| |
|---|
| public static native String getJobType() |
|    Static method that returns the job type for regular Print jobs. |
| public native String getOriginalJobType() |

Class *PrivatePrintJob* package: com.toshiba.dse.sdk.jobs

Description:

Specialization of PrintJob representing a private print job -- job that must be released manually from the console of the device.

Extends:
   com.toshiba.dse.sdk.jobs.PrintJob

Methods:

| |
|---|
| public native void setPassword(String password) |

Class *ProofPrintJob* package: com.toshiba.dse.sdk.jobs

Description:

Specialization of PrintJob representing a proof-print job.

Extends:
   com.toshiba.dse.sdk.jobs.PrintJob

Methods:

| |
|---|
| public native int getNoCopies() |
| public native void Release() |
|    Releases the job immediately. |
|    Throws: |
|       ToshibaException |
| public native void setNoCopies(int noCopies) |

Class *RAWPrintJob* package: com.toshiba.dse.sdk.jobs

Description:

Specialization of PrintJob representing a RAW job -- job that does not contain any PJL commands.

Extends:
com.toshiba.dse.sdk.jobs.PrintJob

| Methods |
|---|
| public native RawJobSettings getRawJobSettings() |
| public native void setRawJobSettings(RawJobSettings rawJobSettings) |

Class *RoutedFaxJob* package: com.toshiba.dse.sdk.jobs

Description:

Specialization of InboundJob that represents inbound fax job that is being routed to recipient on the network.

Currently this is the only inbound fax job, but that may not always be the case.

Extends:
com.toshiba.dse.sdk.jobs.InboundJob

| Methods |
|---|
| public static native String getJobType() |
|    Static method that returns the job type for Routed Fax jobs. |
| public native MailBox getMailbox() |

Class *ScanJob* package: com.toshiba.dse.sdk.jobs

Description:

Specialization of InboundJob representing a scan job. Scan jobs are initiated by the user manually inserting sheets of paper and selecting scan option.

The ultimate destination of scan jobs depends on the agent used.

Extends:
    com.toshiba.dse.sdk.jobs.InboundJob

| Methods |
|---|
| public void Delete() |
| public Agent getAgent() |
| public int getDeptCode() |
| public String getDetailedStatus() |
| public ScanTemplateGroup getGroup() |
| public int getID() |
| public static String getJobType()<br>    Static method that returns the job type for Scan jobs. |
| public int getPages() |
| public String getStatus() |
| public ScanTemplate getTemplate() |
| public String getTime() |
| public void setDeptCode(int deptCode) |

Class *ScheduledFaxJob* package: com.toshiba.dse.sdk.jobs

Description:

Specialization of the OutboundFaxJob that represents a fax job scheduled for transmission at certain time in the future.

Extends:
    com.toshiba.dse.sdk.jobs.OutboundFaxJob

| Methods |
|---|
| public native String getReleaseTime() |
| public native void Release()<br>  Releases the job immediately.<br>  Throws:<br>    ToshibaException |
| public native void setReleaseTime(String releaseTime) |

Class *ScheduledPrintJob* package: com.toshiba.dse.sdk.jobs

Description:

Specialization of the PrintJob that represents a print job scheduled for printing at some time in the future.

Extends:
  com.toshiba.dse.sdk.jobs.PrintJob

| Methods |
|---|
| public native String getReleaseTime() |
| public native void Release()<br>  Releases the job immediately.<br>  Throws:<br>    ToshibaException |
| public native void setReleaseTime(String releaseTime) |

Class *StoredFaxJob* package: com.toshiba.dse.sdk.jobs

Description:

Specialization of StoredInboundJob to represent stored fax jobs.

Extends:
  com.toshiba.dse.sdk.jobs.StoredInboundJob

```
public static String getJobType()
```
Static method that returns the job type for Stored Fax jobs.

Class *StoredInboundJob* package: com.toshiba.dse.sdk.jobs

Description:

Abstraction for inbound jobs that are stored.

Extends:
com.toshiba.dse.sdk.jobs.InboundJob

```
public String getFolderType()
```

Class *StoredPrintJob* package: com.toshiba.dse.sdk.jobs

Description:

Represents a single stored job -- job that is kept on the device for future printing and/or proofing.

Extends:
com.toshiba.dse.sdk.jobs.PrintJob

```
public native String getFolderName()
```

```
public native String getFolderType()
```

```
public native void setFolderName(String folderName)
```

Class *StoredScanJob* package: com.toshiba.dse.sdk.jobs

Description:

Specialization of StoredInboundJob to represent stored scan jobs.

Extends:
com.toshiba.dse.sdk.jobs.StoredInboundJob

| Methods |
|---|
| public static String getJobType() |
| Static method that returns the job type for Stored Scan jobs. |

Package *com.toshiba.dse.sdk.localImplementation*

*Classes*
    class LogicalScannerMaintainer
    class ScanCounter
    class ScanDBHandler
    class ScanFileStorage
    class ScanUtil
    class ToshibaResource
    class ToshibaXMLParser

Class Diagrams localImplementation

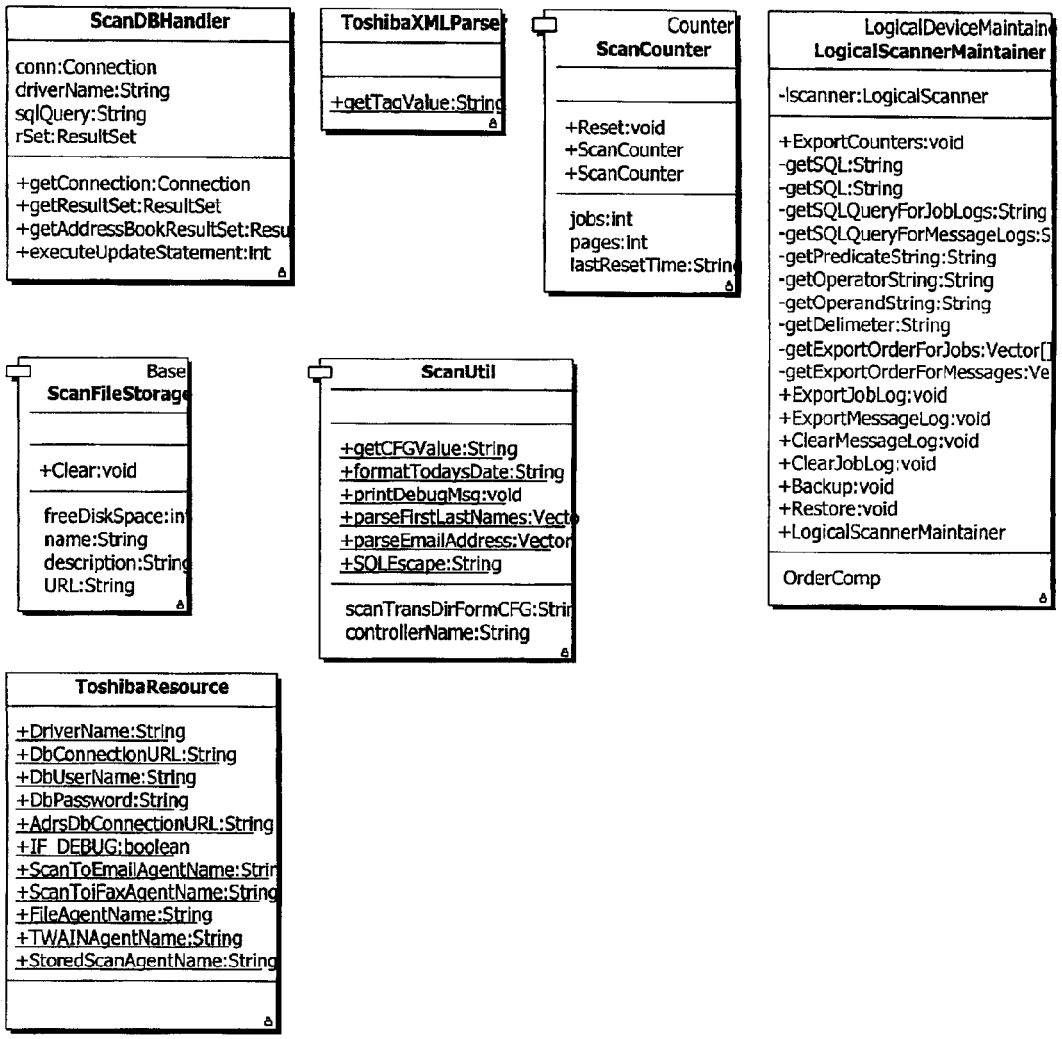
Class Detail
Class *LogicalScannerMaintainer*
package: com.toshiba.dse.sdk.localImplementation
Description:
Closely related to LogicalController. Encapsulates the behavior and semantics associated with the maintenance of LogicalController.
Extends:
com.toshiba.dse.sdk.devices.logical.LogicalDeviceMaintainer

| | |
|---|---|
| final static class | LogicalScannerMaintainer.OrderComp<br>*********************************************************<br>OrderComp.java - implementing the comparator for comparing vector objects<br><br>Change History<br>----------------------------------------------------------<br>Date Name Comments<br>----------------------------------------------------------<br>10/31/2001 Ashish Gupta Created<br>---------------------------------------------------------- |

| |
|---|
| public void Backup(String toURL)<br>Throws:<br>   ToshibaException |
| public void ClearJobLog(String timeEarliest) |
| public void ClearMessageLog(String timeEarliest) |
| public void ExportCounters(String format, String exportURL, boolean bHeading)<br>Throws:<br>   ToshibaException |
| public void ExportJobLog(String format, String exportURL, boolean bHeading)<br>Throws:<br>   ToshibaException |
| public void ExportMessageLog(String format, String exportURL, boolean bHeading)<br>Throws:<br>   ToshibaException |
| private String getDelimeter(String format) |
| private Vector getExportOrderForJobs(JobFilterValues jobFilterValues) |

| Methods: |
|---|
| private Vector getExportOrderForMessages(MessageFilterValues msgFilterValues) |
| private String getOperandString(String op) |
| private String getOperatorString(int opVal) |
| private String getPredicateString(int predVal) |
| private String getSQL(String beginQuery, JobFilters logFilters, String dateFieldName) |
| private String getSQL(String beginQuery, String jobStatuses, String timeFrom, String timeTo, String dateFieldName) |
| private String getSQLQueryForJobLogs(JobFilters logFilters) |
| private String getSQLQueryForMessageLogs(MessageFilters msgFilters) |
| public int compare(Object a, Object b) |
| public void Restore(String toURL)<br>   Throws:<br>      ToshibaException |

Class *ScanCounter* package: com.toshiba.dse.sdk.localImplementation

Description:

Represents a single job and page counter.

Extends:
   com.toshiba.dse.sdk.Counter

| Methods: |
|---|
| public int getJobs() |
| public String getLastResetTime() |
| public int getPages() |

Methods

```
public void Reset()
```

Resets the counts kept in that object.

If filtering by Department is active, that operation will apply only to that department.

Throws:
  ToshibaException

Class *ScanDBHandler* package: com.toshiba.dse.sdk.localImplementation

Description:

Methods

```
public int executeUpdateStatement(String sqlQuery)
```

Throws:
  SQLException
  Exception

```
public ResultSet getAddressBookResultSet(String sqlQuery)
```

Throws:
  SQLException
  Exception

```
public Connection getConnection(String strConnectionURL, String strUserName, String strPassword)
```

Throws:
  SQLException
  ClassNotFoundException
  Exception

```
public ResultSet getResultSet(String sqlQuery)
```

Throws:
  SQLException
  Exception

Class *ScanFileStorage* package: com.toshiba.dse.sdk.localImplementation

Description:

Represents the file storage maintained by the device.

Normally the physical storage is on the device itself, but that may not always be the case.

Extends:
com.toshiba.dse.sdk.Base

---

```
public void Clear()
```
Remove all components (files) in the area.

Throws:
ToshibaException

---

```
public String getDescription()
```

---

```
public int getFreeDiskSpace()
```
Download files given a locale, category and component set.

Parameter doc:
components - list of components to download
urlTo - URL where to store the files into

Exception doc:
ToshibaException

---

```
public String getName()
```

---

```
public String getURL()
```

---

```
public void setName(String name)
```

---

```
public void setURL(String URL)
```

Class *ScanUtil* package: com.toshiba.dse.sdk.localImplementation

Description:

Methods:

| |
|---|
| public static String formatTodaysDate() |
| public static native String getCFGValue(String key) |
| public static String getControllerName() |
| public static native String getScanTransDirFormCFG() |
| public static Vector parseEmailAddress(String toAddress) |
| public static Vector parseFirstLastNames(String toName) |
| public static void printDebugMsg(String msg) |
| public static String SQLEscape(String sqlString1) |

Class *ToshibaResource* package: com.toshiba.dse.sdk.localImplementation
Description:

Class *ToshibaXMLParser* package: com.toshiba.dse.sdk.localImplementation
Description:

Methods:

public static String getTagValue(String strXML, String strTag, String strIdentifier, String strId, boolean bTrimWhiteSpace)

Throws:
ToshibaException

---

Package *com.toshiba.dse.sdk.logs*

*Subpackages*
 package com.toshiba.dse.sdk.logs.messages

*Classes*
 class InboundJobLogEntry
 class LogEntry class OutboundFaxLogEntry
class OutboundJobLogEntry
class PrintLogEntry
class RoutedFaxLogEntry
class ScanLogEntry

Class Diagrams logs

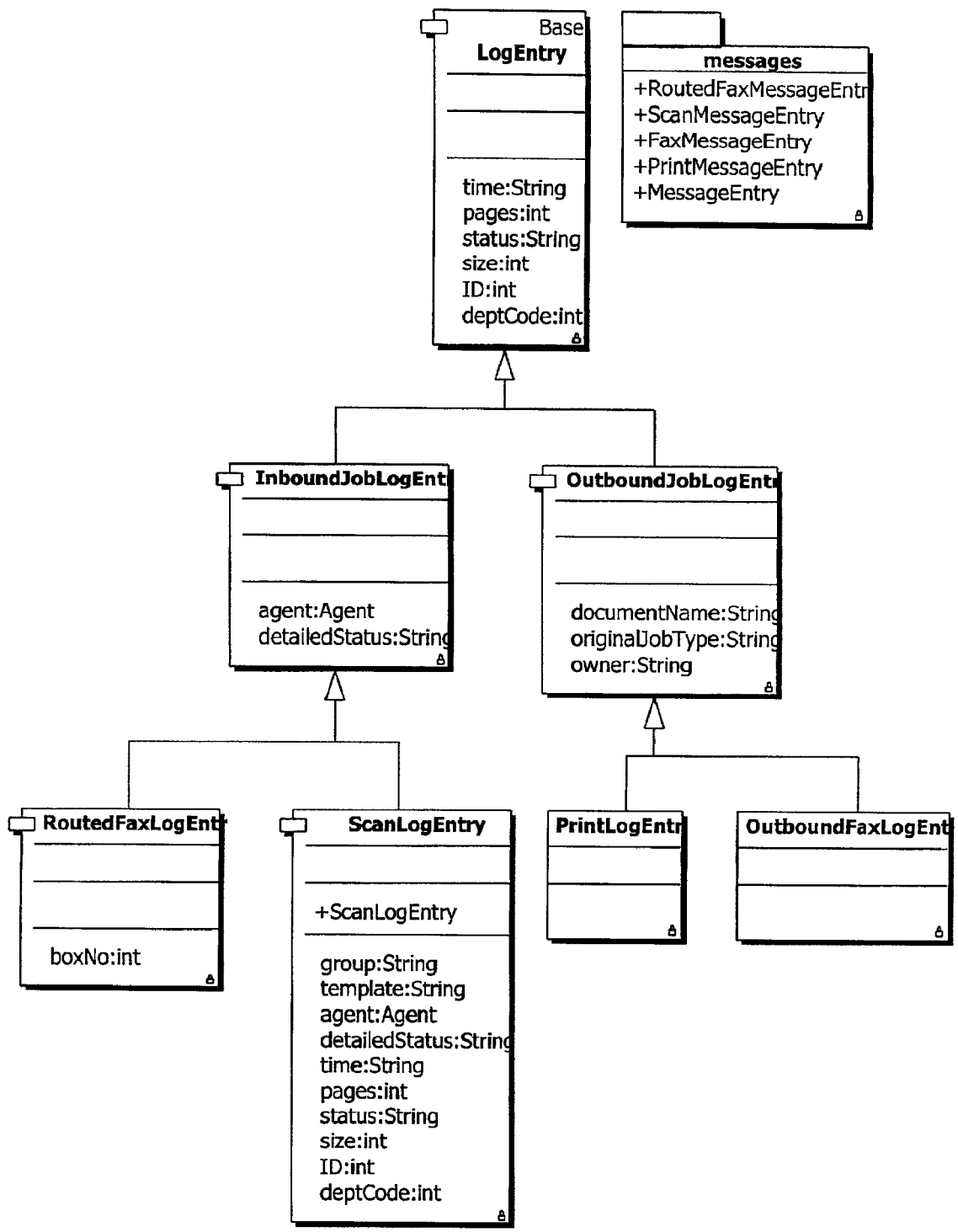

Class Detail

Class *InboundJobLogEntry* package: com.toshiba.dse.sdk.logs

Description:

Represents abstract log entry for an incoming job.

Extends:
  com.toshiba.dse.sdk.logs.LogEntry

Methods:

| |
|---|
| public Agent getAgent() |
| public String getDetailedStatus() |

Class *LogEntry* package: com.toshiba.dse.sdk.logs

Description:

Abstract representation of a generic job log entry.

Extends:
  com.toshiba.dse.sdk.Base

Methods:

| |
|---|
| public native int getDeptCode() |
| public native int getID() |
| public native int getPages() |
| public native int getSize() |
| public native String getStatus() |
| public native String getTime() |
| public native void setDeptCode(int deptCode) |

Class *OutboundFaxLogEntry* package: com.toshiba.dse.sdk.logs

Description:

Represents log entry for all types of outbound fax jobs.

Currently this class does not have any specific properties and methods -- it overrides the behavior of its abstract superclass.

Extends:
com.toshiba.dse.sdk.logs.OutboundJobLogEntry

Class *OutboundJobLogEntry* package: com.toshiba.dse.sdk.logs

Description:

Represents an abstract log entry made for an outgoing job.

Extends:
com.toshiba.dse.sdk.logs.LogEntry

| Methods |
|---|
| public native String getDocumentName() |
| public native String getOriginalJobType() |
| public native String getOwner() |

Class *PrintLogEntry* package: com.toshiba.dse.sdk.logs

Description:

Representation of a print job log entry (all job types).

Currently this class does not have any specific properties and methods -- it overrides the behavior of its abstract superclass.

Extends:
com.toshiba.dse.sdk.logs.OutboundJobLogEntry

Class *RoutedFaxLogEntry* package: com.toshiba.dse.sdk.logs

Description:

Represents abstract log entry for an inbound routed fax job.

Extends:
com.toshiba.dse.sdk.logs.InboundJobLogEntry

| Methods |
|---|
| public int getBoxNo() |

| Class *ScanLogEntry* |
|---| package: com.toshiba.dse.sdk.logs

Description:

Represents a log entry for an scan job.

Extends:
   com.toshiba.dse.sdk.logs.InboundJobLogEntry

| Methods |
|---|
| public Agent getAgent() |
| public int getDeptCode() |
| public String getDetailedStatus() |
| public String getGroup() |
| public int getID() |
| public int getPages() |
| public int getSize() |
| public String getStatus() |
| public String getTemplate() |
| public String getTime() |
| public void setDeptCode(int deptCode) |

| Package *com.toshiba.dse.sdk.logs.messages* |
|---|

*Classes*
   class FaxMessageEntry
   class MessageEntry class PrintMessageEntry
class RoutedFaxMessageEntry
class ScanMessageEntry
Class Diagrams
messages
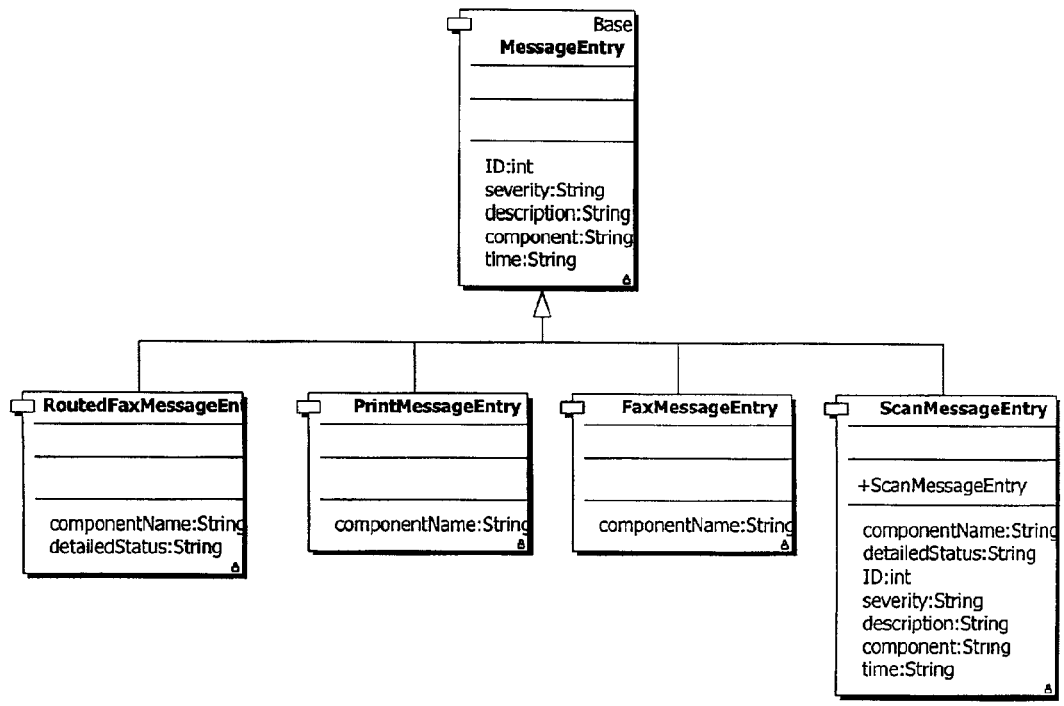
Class Detail
| Class *FaxMessageEntry* |
|---|
package: com.toshiba.dse.sdk.logs.messages
Description:
Representation of a fax message entry.
Extends:
com.toshiba.dse.sdk.logs.messages.MessageEntry
```
public static native String getComponentName()
```

| Class *MessageEntry* |
|---| package: com.toshiba.dse.sdk.logs.messages

Description:

Generic message log entry.

Extends:
   com.toshiba.dse.sdk.Base

Methods

| |
|---|
| public native String getComponent() |
| public native String getDescription() |
| public native int getID() |
| public native String getSeverity() |
| public native String getTime() |

| Class *PrintMessageEntry* |
|---| package: com.toshiba.dse.sdk.logs.messages

Description:

Representation of a print message entry.

Extends:
   com.toshiba.dse.sdk.logs.messages.MessageEntry

Methods

| |
|---|
| public static native String getComponentName() |

| Class *RoutedFaxMessageEntry* |
|---| package: com.toshiba.dse.sdk.logs.messages

Description:

Representation of a routed (inbound) fax message entry.

Extends:
   com.toshiba.dse.sdk.logs.messages.MessageEntry

| Methods |
|---|
| public static native String getComponentName() |
| public native String getDetailedStatus() |

Class *ScanMessageEntry* package: com.toshiba.dse.sdk.logs.messages

Description:

Representation of a scan message entry.

Extends:
com.toshiba.dse.sdk.logs.messages.MessageEntry

| Methods |
|---|
| public String getComponent() |
| public static String getComponentName() |
| public String getDescription() |
| public String getDetailedStatus() |
| public int getID() |
| public String getSeverity() |
| public String getTime() |

Package *com.toshiba.dse.sdk.maintenance*

*Classes*
  class FileStorage
  class HouseKeeper
  class ImportResult
  class LoadableComponent
  class RemoteComponent
  class UpgradeRecord

Class Diagrams
maintenance
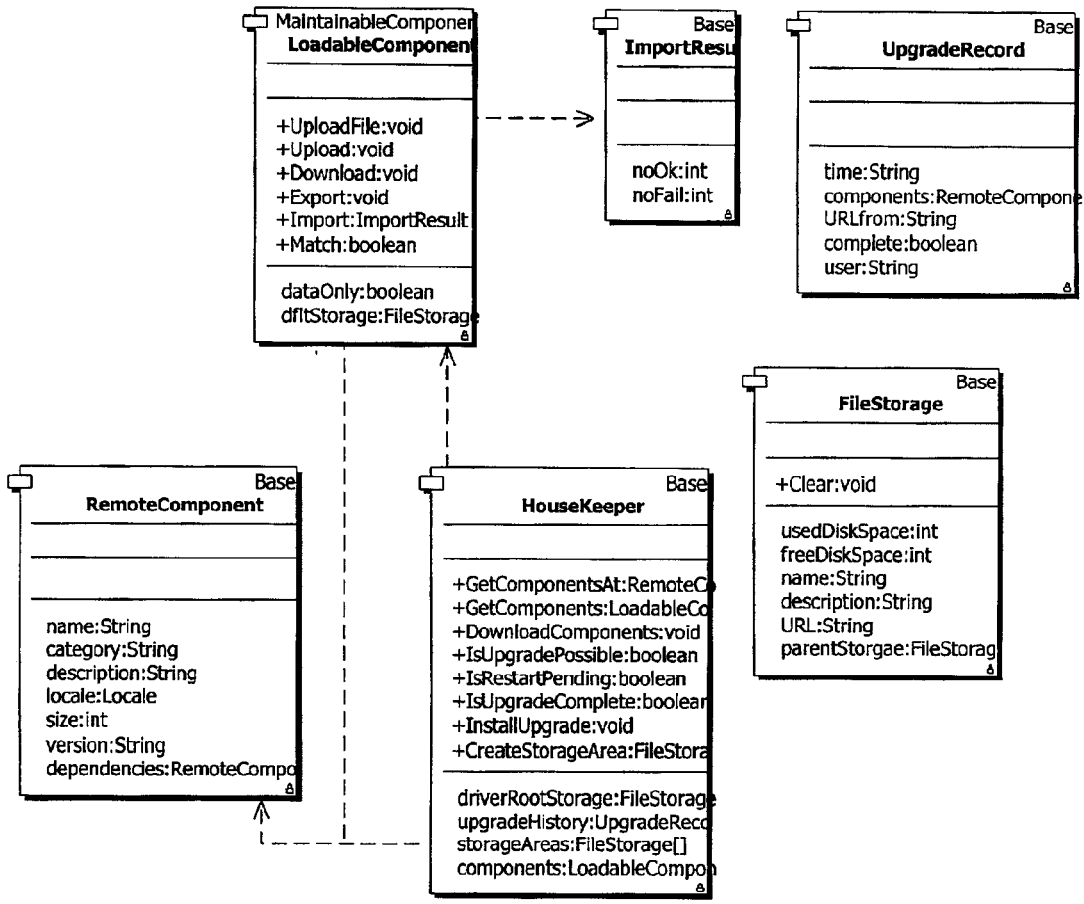
Class Detail
Class *FileStorage*
package: com.toshiba.dse.sdk.maintenance
Description:
Represents the file storage maintained by the device.
Normally the physical storage is on the device itself, but that may not always be the case.
Extends:
   com.toshiba.dse.sdk.Base

| Methods |
|---|
| public native void Clear()<br>Remove all components (files) in the area.<br>Throws:<br>ToshibaException |
| public native String getDescription() |
| public native int getFreeDiskSpace() |
| public native String getName() |
| public native FileStorage getParentStorgae() |
| public native String getURL() |
| public native int getUsedDiskSpace() |
| public native void setDescription(String description) |
| public native void setURL(String URL) |

Class *HouseKeeper* package: com.toshiba.dse.sdk.maintenance

Description:

Abstraction for a house-keeping functionality in the form of a utility class. Provides general maintenance functionality.

Extends:
com.toshiba.dse.sdk.Base

```
public native FileStorage CreateStorageArea(String name, FileStorage parent,
String URL)
```

Creates a storage area by unique name, optionally with
parent and location.

Throws:
 ToshibaException

Parameter doc:
 name - Unique name of the area to be created
 parent - parent storage area; NULL - no parent
 URL - URL where the storage resides; NULL - device discretion

---

```
public native void DownloadComponents(LoadableComponent components, String
urlTo)
```

Download files given a locale, category and component set.

Throws:
 ToshibaException

Parameter doc:
 components - list of components to download
 urlTo - URL where to store the files into

Exception doc:
 ToshibaException

---

```
public native LoadableComponent getComponents()
``` public native LoadableComponent GetComponents(Locale locale, String category)

Retrieves the component set associated with this file storage given a locale and category.

Throws:
ToshibaException

Parameter doc:
locale - object representing the target locale
category - name of category this file belongs to

Return doc:
The component list

Exception doc:
ToshibaException

--- public native RemoteComponent GetComponentsAt(String fromURL)

Retrieve the list of components that are available at the specified URL.

Throws:
ToshibaException

Parameter doc:
fromURL - URL where to check for components

Return doc:
List of components that can be backed up.

--- public native FileStorage getDriverRootStorage()

--- public native FileStorage getStorageAreas()

--- public native UpgradeRecord getUpgradeHistory()

Methods

```
public native void InstallUpgrade(String urlFrom, LoadableComponent components)
```

Upgrade components from the specified URL.

This method will check for dependent components and will upgrade these first.

If intermediate restart is required before the upgrade is complete, this operation will return, IsRestartPending will return TRUE and IsUpgradeComplete will return FALSE.

Throws:
ToshibaException

Parameter doc:
urlFrom - Source URL to install from
components - List of components to install

---

```
public native boolean IsRestartPending()
```

Determines if a restart is currently pending.

Throws:
ToshibaException

Return doc:
Indication of whether restart is currently pending or not

---

```
public native boolean IsUpgradeComplete()
```

Indicates if the previously initiated upgrade operation is complete.

Throws:
ToshibaException

Methods:

| |
|---|
| public native boolean IsUpgradePossible() |
| Determines if an upgarde is possible at this moment. |
| The reasons upgrade may not be possible are: |
| 1. Upgrade is already running or is not complete; 2. Restart is pending. |
| Throws: |
|   ToshibaException |
| Return doc: |
|   Indication of whether upgrade is possible or not |

Class *ImportResult* package: com.toshiba.dse.sdk.maintenance

Description:

Data object representing the result of an import operation.

Extends:
  com.toshiba.dse.sdk.Base

Methods:

| |
|---|
| public native int getNoFail() |
| public native int getNoOk() |

Class *LoadableComponent* package: com.toshiba.dse.sdk.maintenance

Description:

Represents a software or data component that can be backed up, downloaded or uploaded.

Not all instances will allow all operations.

Extends:
  com.toshiba.dse.sdk.MaintainableComponent

```
public native void Download(String urlTo)
```

Downloads all files of the component to a URL.

Throws:
ToshibaException

Parameter doc:
urlTo - URL where to download the files to

Exception doc:
<{ToshibaException}>

---

```
public native void Export(String toURL, String format)
```

Export this component to a specified URL.

May not be supported by all components.

Throws:
ToshibaException

Parameter doc:
toURL - URL to export to
format - format ID ["CSV", "TSV", "SSV", "PSV"]

---

```
public native FileStorage getDfltStorage()
```

---

```
public native ImportResult Import(String toURL, String format, boolean replace)
```

Import this component from a specified URL.

May not be supported by all components.

Throws:
ToshibaException

Parameter doc:
fromURL - URL to import from
format - format ID ["CSV", "TSV"]
replace - TRUE: replace contents, FALSE: add/update

Return doc:
detailed information about the import operation

---

```
public native boolean isDataOnly()
```

| Method |
|---|
| public native boolean Match(RemoteComponent counterpart)<br><br>Return indication of whether this component matches with the remote component supplied as an argument.<br><br>The precise algorith is implementation specific.<br><br>Throws:<br>    ToshibaException |
| public native void Upload(String urlFrom)<br><br>Uploads all files of the component into a device maintained storage.<br><br>Throws:<br>    ToshibaException<br><br>Parameter doc:<br>    urlFrom - URL where to get the file from<br><br>Exception doc:<br>    <{ToshibaException}> |
| public native void UploadFile(FileStorage storage, String urlFrom)<br><br>Uploads a single file into the device maintained storage for a particular locale, category and component.<br><br>This method is useful when uploading using HTTP protocol, since this protocol allows only single file operation.<br><br>Throws:<br>    ToshibaException<br><br>Parameter doc:<br>    storage - storage on the device to upload file to<br>    urlFrom - URL where to get the file from<br><br>Exception doc:<br>    <{ToshibaException}> |

Class *RemoteComponent* package: com.toshiba.dse.sdk.maintenance

Description:

Represents a remote component -- component that exists at some URL.

Extends:
    com.toshiba.dse.sdk.Base

| Methods |
|---|
| public native String getCategory() |
| public native RemoteComponent getDependencies() |
| public native String getDescription() |
| public native Locale getLocale() |
| public native String getName() |
| public native int getSize() |
| public native String getVersion() |

| Class *UpgradeRecord* |
|---| package: com.toshiba.dse.sdk.maintenance

Description:

Represents a single historical record of an upgrade operation.

Extends:
    com.toshiba.dse.sdk.Base

| Methods |
|---|
| public native RemoteComponent getComponents() |
| public native String getTime() |
| public native String getURLfrom() |
| public native String getUser() |
| public native boolean isComplete() |

Package *com.toshiba.dse.sdk.network*

*Classes*
- class Adapter
- class AppleTalk
- class Browser
- class EthernetAdapter
- class IPP
- class IPXSPX
- class LPD
- class MacPrinting
- class MicrosoftPrinting
- class NetBEUI
- class NetworkConfiguration
- class NovellPrinting
- class Protocol
- class Server
- class Service
- class TCPIP
- class TokenRingAdapter
- class WirelessEthernetAdapter

Class Diagrams network

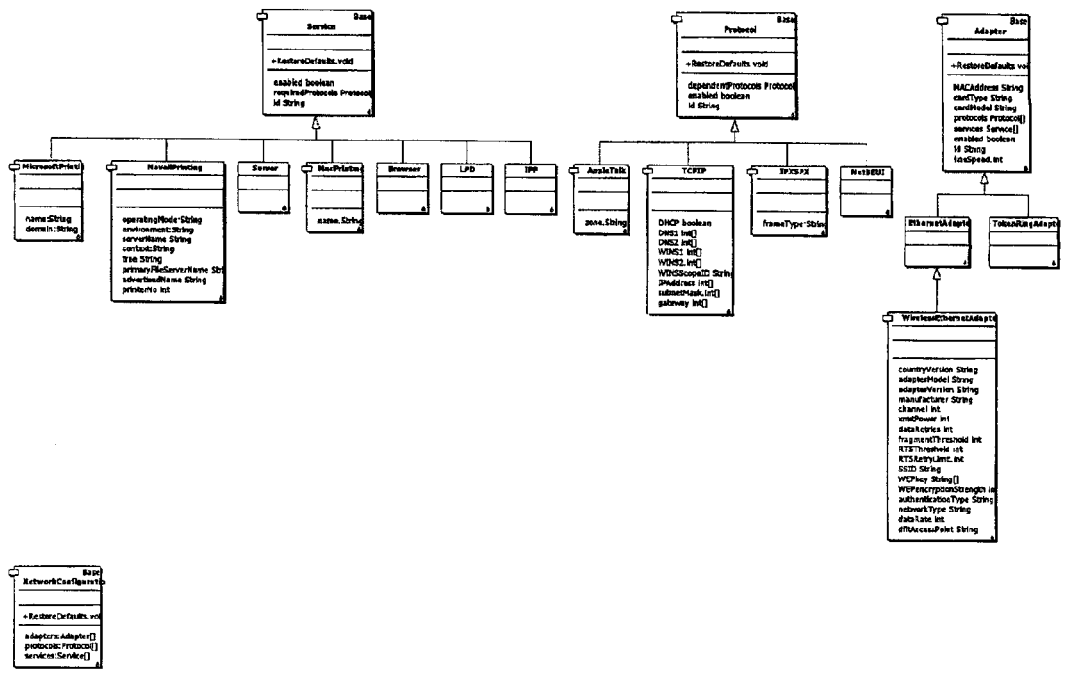
Class Detail
| Class *Adapter* |
|---|
package: com.toshiba.dse.sdk.network
Description:
Abstract base class representing a single network adapter.
Extends:
com.toshiba.dse.sdk.Base
| |
|---|
| public native String getCardModel() |
| public native String getCardType() |
| public native String getId() |
| public native int getLineSpeed() |
| public native String getMACAddress() |
271

| Methods: |
|---|
| public native Protocol getProtocols() |
| public native Service getServices() |
| public native boolean isEnabled() |
| public native void RestoreDefaults() <br> Restores factory default settings for all properties. <br> Throws: <br>    ToshibaException |
| public native void setEnabled(boolean enabled) |
| public native void setLineSpeed(int lineSpeed) |

Class *AppleTalk* package: com.toshiba.dse.sdk.network

Description:

Specialization of Protocol representing AppleTalk protocol.

Extends:
   com.toshiba.dse.sdk.network.Protocol

| Methods: |
|---|
| public native String getZone() |
| public native void setZone(String zone) |

Class *Browser* package: com.toshiba.dse.sdk.network

Description:

Specialization of Service representing network browser service.

Extends:
   com.toshiba.dse.sdk.network.Service

Class *EthernetAdapter* package: com.toshiba.dse.sdk.network

Description:

Specialization of Adapter representing an Ethernet adapter.

Extends:
com.toshiba.dse.sdk.network.Adapter

Class *IPP* package: com.toshiba.dse.sdk.network

Description:

Specialization of Service for printing using the Internet Printing Protocol.

Extends:
com.toshiba.dse.sdk.network.Service

Class *IPXSPX* package: com.toshiba.dse.sdk.network

Description:

Specialization of Protocol representing IPX/SPX protocol.

Extends:
com.toshiba.dse.sdk.network.Protocol

| Methods: |
|---|
| public native String getFrameType() |
| public native void setFrameType(String frameType) |

Class *LPD* package: com.toshiba.dse.sdk.network

Description:

Specialization of Service for printing using the LPD protocol (UNIX).

Extends:
com.toshiba.dse.sdk.network.Service

Class *MacPrinting* package: com.toshiba.dse.sdk.network

Description:

Specialization of Service for printing on AppleTalk networks.

Extends:
  com.toshiba.dse.sdk.network.Service

| Methods |
|---|
| public native String getName() |
| public native void setName(String name) |

Class *MicrosoftPrinting* package: com.toshiba.dse.sdk.network

Description:

Specialization of Service for printing on Microsoft networks.

Extends:
  com.toshiba.dse.sdk.network.Service

| Methods |
|---|
| public native String getDomain() |
| public native String getName() |
| public native void setDomain(String domain) |
| public native void setName(String name) |

Class *NetBEUI* package: com.toshiba.dse.sdk.network

Description:

Specialization of Protocol representing NetBEUI protocol.

Extends:
  com.toshiba.dse.sdk.network.Protocol

Class *NetworkConfiguration* package: com.toshiba.dse.sdk.network

Description:

Container for network configuration parameters.

Extends:
  com.toshiba.dse.sdk.Base

| Methods |
|---|
| public native Adapter getAdapters() |
| public native Protocol getProtocols() |
| public native Service getServices() |
| public native void RestoreDefaults()<br>Resets to factory default configuration.<br>Throws:<br>  ToshibaException |

| Class *NovellPrinting* |
|---| package: com.toshiba.dse.sdk.network

Description:

Specialization of Service for printing on Novell networks.

Extends:
   com.toshiba.dse.sdk.network.Service

| Methods |
|---|
| public native String getAdvertisedName() |
| public native String getContext() |
| public native String getEnvironment() |
| public native String getOperatingMode() |
| public native String getPrimaryFileServerName() |
| public native int getPrinterNo() |
| public native String getServerName() |
| public native String getTree() |
| public native void setAdvertisedName(String advertisedName) |

Methods

| |
|---|
| public native void setContext(String context) |
| public native void setEnvironment(String environment) |
| public native void setOperatingMode(String operatingMode) |
| public native void setPrimaryFileServerName(String primaryFileServerName) |
| public native void setPrinterNo(int printerNo) |
| public native void setServerName(String serverName) |
| public native void setTree(String tree) |

Class *Protocol* package: com.toshiba.dse.sdk.network

Description:

Abstract base class for all network protocols.

Extends:

com.toshiba.dse.sdk.Base

Methods

| |
|---|
| public native Protocol getDependentProtocols() |
| public native String getId() |
| public native boolean isEnabled() |
| public native void RestoreDefaults()<br><br>Restores factory default settings for all properties.<br><br>Throws:<br>   ToshibaException |
| public native void setEnabled(boolean enabled) |

Class *Server* package: com.toshiba.dse.sdk.network

Description:

Specialization of Service representing an Server service allowing for file sharing.

Extends:
com.toshiba.dse.sdk.network.Service

Class *Service* package: com.toshiba.dse.sdk.network

Description:

Abstract base class for all network Services.

Extends:
com.toshiba.dse.sdk.Base

Methods

| |
|---|
| public native `String getId()` |
| public native `Protocol getRequiredProtocols()` |
| public native `boolean isEnabled()` |
| public native `void RestoreDefaults()`<br>Restores factory default settings for all properties.<br>Throws:<br>   ToshibaException |
| public native `void setEnabled(boolean enabled)` |

Class *TCPIP* package: com.toshiba.dse.sdk.network

Description:

Specialization of Protocol representing TCP/IP protocol.

Extends:
com.toshiba.dse.sdk.network.Protocol

Methods

| |
|---|
| public native `int[] getDNS1()` |
| public native `int[] getDNS2()` |

```
public native int[] getGateway()

public native int[] getIPAddress()

public native int[] getSubnetMask()

public native int[] getWINS1()

public native int[] getWINS2()

public native String getWINSScopeID()

public native boolean isDHCP()

public native void setDHCP(boolean DHCP)

public native void setDNS1(int[] DNS1)

public native void setDNS2(int[] DNS2)

public native void setGateway(int[] gateway)

public native void setIPAddress(int[] IPAddress)

public native void setSubnetMask(int[] subnetMask)

public native void setWINS1(int[] WINS1)

public native void setWINS2(int[] WINS2)

public native void setWINSScopeID(String WINSScopeID)
```

Class *TokenRingAdapter* package: com.toshiba.dse.sdk.network

Description:

Specialization of Adapter to represent a Token Ring adapter.

Extends:
   com.toshiba.dse.sdk.network.Adapter

Class *WirelessEthernetAdapter* package: com.toshiba.dse.sdk.network

Description:

Specialization of Adapter representing an wireless Ethernet adapter.

Extends:
com.toshiba.dse.sdk.network.EthernetAdapter

| Method |
|---|
| public native String getAdapterModel() |
| public native String getAdapterVersion() |
| public native String getAuthenticationType() |
| public native int getChannel() |
| public native String getCountryVersion() |
| public native int getDataRate() |
| public native int getDataRetries() |
| public native String getDfltAccessPoint() |
| public native int getFragmentThreshold() |
| public native String getManufacturer() |
| public native String getNetworkType() |
| public native int getRTSRetryLimit() |
| public native int getRTSThreshold() |
| public native String getSSID() |
| public native int getWEPencryptionStrength() |
| public native int getXmitPower() |
| public native void setAuthenticationType(String authenticationType) |

| Methods |
|---|
| public native void setChannel(int channel) |
| public native void setDataRate(int dataRate) |
| public native void setDataRetries(int dataRetries) |
| public native void setDfltAccessPoint(String dfltAccessPoint) |
| public native void setFragmentThreshold(int fragmentThreshold) |
| public native void setNetworkType(String networkType) |
| public native void setRTSRetryLimit(int RTSRetryLimit) |
| public native void setRTSThreshold(int RTSThreshold) |
| public native void setSSID(String SSID) |
| public native void setWEPencryptionStrength(int WEPencryptionStrength) |
| public native void setWEPkey(String WEPkey) |
| public native void setXmitPower(int xmitPower) |

Package *com.toshiba.dse.sdk.security*

*Classes*
- class PublicKey
- class SecurityContext
- class SecurityManager
- class Session
- class User
- class UserGroup

Class Diagrams security

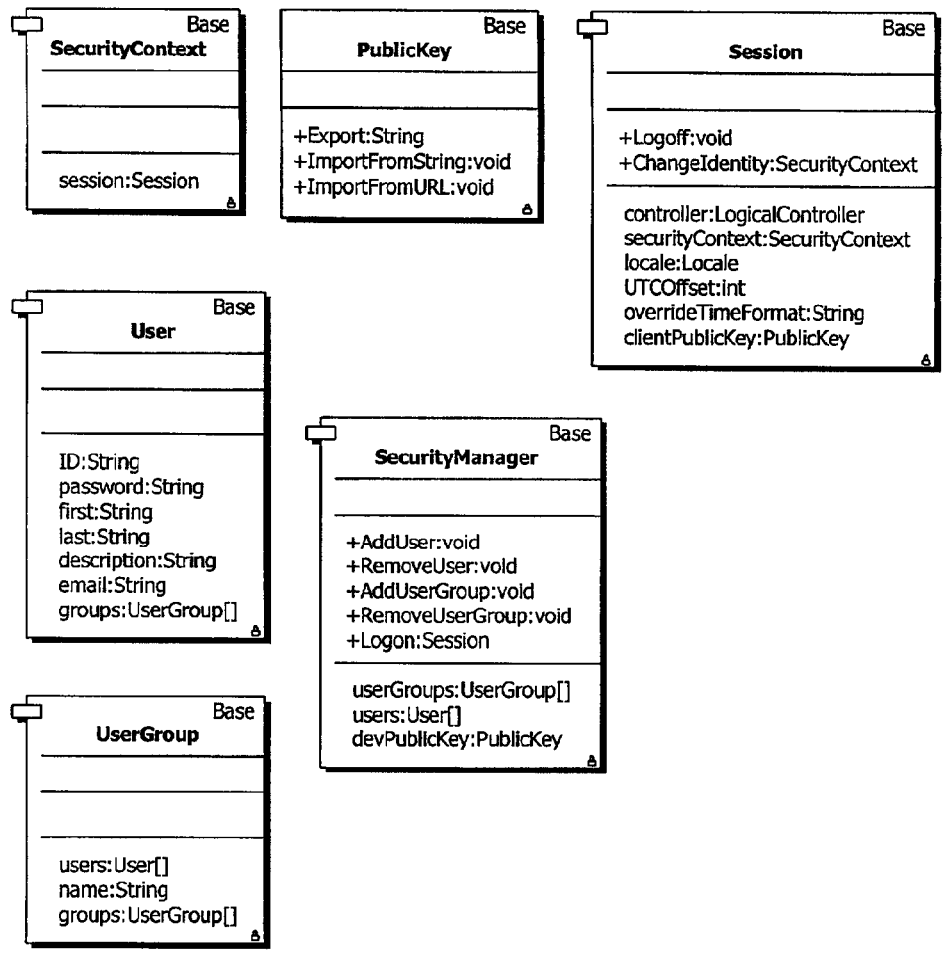
Class Detail
Class *PublicKey*
package: com.toshiba.dse.sdk.security
Description:
Represents the public keys used for transmission of secured information over unsecure connection.
Extends:
com.toshiba.dse.sdk.Base

Methods

| |
|---|
| `public native String Export()` |
| Exports the key into a MIME encoded string. |
| Throws: |
|   ToshibaException |
| `public native void ImportFromString(String key)` |
| Imports the public key from a MIME encoded string. |
| Throws: |
|   ToshibaException |
| `public native void ImportFromURL(String url)` |
| Imports the public key from an URL. Encoding depends on the protocol used. |
| Throws: |
|   ToshibaException |

Class *SecurityContext* package: com.toshiba.dse.sdk.security

Description:

Represents the security context of a client. This security context is used to represent client's identity and access rights before a secured device.

The only method of obtaining a security context is through authentication.

Extends:
  com.toshiba.dse.sdk.Base

Methods

| |
|---|
| `public native Session getSession()` |

Class *SecurityManager* package: com.toshiba.dse.sdk.security

Description:

Object that encapsulates the context and behavior associated with security management.

Extends:
   com.toshiba.dse.sdk.Base

---

Methods:

public native void AddUser(User user)

Adds a user to the list of users. Must have administrative privileges.

Throws:
  ToshibaException

Parameter doc:
  user - user object to add

--- public native void AddUserGroup(UserGroup user)

Adds a group to the list of groups. Must have administrative privileges.

Throws:
  ToshibaException

Parameter doc:
  group - group object to add

--- public native PublicKey getDevPublicKey()

Retrieves device's public key used for secure transmission.

See:
  setClientPublicKey

Return doc:
  Public key of the device, so that user names and passwords can be exchanged with clients

--- public native UserGroup getUserGroups()

--- public native User getUsers()

```
public native Session Logon(String name, String password)
```
Authenticates a user and returns a security context.

Throws:
ToshibaException

Return doc:
Security descriptor encapsulating user's identity.

---

```
public native void RemoveUser(User user)
```
Removes existing user.

Throws:
ToshibaException

Parameter doc:
user - user object to remove

---

```
public native void RemoveUserGroup(UserGroup user)
```
Removes a group from the list of groups. Must have administrative privileges.

Throws:
ToshibaException

Parameter doc:
group - group object to remove

Class *Session* package: com.toshiba.dse.sdk.security

Description:

The context of a logon session. All settings that are maintainer during a session with a logical controller are encapsulated by objects of this class.

Extends:
com.toshiba.dse.sdk.Base

Methods

| |
|---|
| public native SecurityContext ChangeIdentity(SecurityContext newId)<br><br>Change the current identity of the user interacting with the device. Requires previous logon with the device to establish the a security context for the new identity.<br><br>Throws:<br>ToshibaException<br><br>Return doc:<br>The security context of the old identity. |
| public native LogicalController getController() |
| public native Locale getLocale() |
| public native String getOverrideTimeFormat() |
| public native SecurityContext getSecurityContext() |
| public native int getUTCOffset() |
| public native void Logoff()<br><br>Logs off the current user.<br><br>Throws:<br>ToshibaException |
| public native void setClientPublicKey(PublicKey clientPublicKey) |
| public native void setLocale(Locale locale) |
| public native void setOverrideTimeFormat(String overrideTimeFormat) |
| public native void setUTCOffset(int UTCOffset) |

Class *User* package: com.toshiba.dse.sdk.security

Description:

Represents a single authenticatable user.

Extends:
com.toshiba.dse.sdk.Base

| Methods |
|---|
| public native String getDescription() |
| public native String getEmail() |
| public native String getFirst() |
| public native UserGroup getGroups() |
| public native String getID() |
| public native String getLast() |
| public native void setDescription(String description) |
| public native void setEmail(String email) |
| public native void setFirst(String first) |
| public native void setGroups(UserGroup groups) |
| public native void setID(String ID) |
| public native void setLast(String last) |
| public native void setPassword(String password) |

Class *UserGroup* package: com.toshiba.dse.sdk.security

Description:

Represents a group of users.

Extends:
com.toshiba.dse.sdk.Base

| Methods |
|---|
| public native UserGroup getGroups() |
| public native String getName() |

| Methods |
|---|
| public native User getUsers() |
| public native void setGroups(UserGroup groups) |
| public native void setName(String name) |

What is claimed is:

1. A common object model based interface for digital imaging devices comprising:

a plurality of common object sets, each object set including a plurality of common objects, each common object in a given set being adapted to associate a uniform function in a unique, corresponding software development environment of a plurality thereof, thereby associating a uniform programming language interface for each object function in each software development environment; wherein each common object includes a corresponding programming language object adapted for its corresponding software development environment, which adaptation includes instantiation with native terms and abstractions associated with the corresponding programming language and software development environment; and wherein each programming language interface is adapted for data communication and behavior invocation between the corresponding software development environment and a selected, associated digital imaging device.

2. The common object model based interface for digital imaging devices of claim 1, wherein the software development environment is a general purpose programming environment.

3. The common object model based interface for digital imaging devices of claim 2, wherein the uniform function is one of the group consisting of copying, scanning, faxing and printing.

4. The common object model based interface for digital imaging devices of claim 3, wherein the selected digital imaging device is a multifunction peripheral device.

5. A system for communicating with a digital imaging device including a common object model based interface, the system comprising:

means adapted for receiving data associated with a first software development environment;

means adapted for associating at least one common object associated with the data from the first software development environment with a uniform function in the first software development environment;

means adapted for associating an uniform programming interface for the at least one object in the first software development environment, wherein the uniform function is associated with the uniform programming interface;

programming language object means adapted for instantiating the at least one object in the first software development environment with native data representative of a second development environment, wherein the second development environment is unique from the first development environment, and wherein the uniform function of the first software development environment is instantiated into a uniform function of the second software development environment; and data communications means adapted for communicating behavior invocation between the first software development environment and the second development environment, wherein the second development environment corresponds to an operating language of a selected digital imaging device.

6. The system of claim 5, wherein the selected digital imaging device is communicatively coupled to a network.

7. The system of claim 5, wherein the first software development environment is a general purpose programming environment and the second software development environment is a device-specific programming environment.

8. The system of claim 7, wherein the uniform function is one of the group consisting of copying, scanning, faxing and printing.

9. The system of claim 8, wherein the selected digital imaging device is a multifunction peripheral device.

* * * * *